US012719903B2

(12) United States Patent
Kim et al.

(10) Patent No.: US 12,719,903 B2
(45) Date of Patent: Aug. 25, 2026

(54) CYBER THREAT INFORMATION PROCESSING APPARATUS, CYBER THREAT INFORMATION PROCESSING METHOD, AND STORAGE MEDIUM STORING CYBER THREAT INFORMATION PROCESSING PROGRAM

(71) Applicant: SANDS LAB INC., Gwacheon-si (KR)

(72) Inventors: Ki Hong Kim, Seoul (KR); Sung Eun Park, Seongnam-si (KR); Min Jun Choi, Seoul (KR); Hyun Jong Lee, Seoul (KR); Se Jun Jang, Seoul (KR); Chang Gyun Kim, Paju-si (KR)

(73) Assignee: SANDS LAB INC., Seoul (KR)

( * ) Notice: Subject to any disclaimer, the term of this patent is extended or adjusted under 35 U.S.C. 154(b) by 104 days.

(21) Appl. No.: 18/812,957

(22) Filed: Aug. 22, 2024

(65) Prior Publication Data

US 2025/0071130 A1 Feb. 27, 2025

(30) Foreign Application Priority Data

Aug. 23, 2023 (KR) ........................ 10-2023-0110825

(51) Int. Cl.
*H04L 9/40* (2022.01)

(52) U.S. Cl.
CPC ........ *H04L 63/1425* (2013.01); *H04L 63/126* (2013.01); *H04L 63/1441* (2013.01)

(58) Field of Classification Search
CPC ......................... H04L 63/1425; H04L 63/126; H04L 63/1441
See application file for complete search history.

(56) References Cited

U.S. PATENT DOCUMENTS

| | | | | |
|---|---|---|---|---|
| 9,171,167 | B2 * | 10/2015 | Ayyagari | H04L 63/1433 |
| 10,354,064 | B2 * | 7/2019 | Guilley | G06F 21/54 |
| 11,228,610 | B2 * | 1/2022 | Medalion | H04L 63/1433 |
| 12,073,603 | B2 * | 8/2024 | Yang | G06V 10/764 |
| 12,086,431 | B1 * | 9/2024 | Dreier | G06F 16/1827 |
| 12,111,376 | B2 * | 10/2024 | Zhu | G01R 33/5611 |
| 2020/0334093 | A1 * | 10/2020 | Dubey | G06F 18/23 |
| 2022/0345483 | A1 * | 10/2022 | Shua | H04L 9/0825 |

(Continued)

FOREIGN PATENT DOCUMENTS

KR 10-2437376 B1 8/2022

OTHER PUBLICATIONS

Zhu et al., "BBDetector: A Precise and Scalable Third-Party Library Detection in Binary Executables with Fine-Grained Function-Level Features", Appl. Sci., vol. 13, 2023, pp. 1-15.

(Continued)

*Primary Examiner* — Viral S Lakhia
(74) *Attorney, Agent, or Firm* — Morgan, Lewis & Bockius LLP

(57) ABSTRACT

Disclosed is a method of processing cyber threat information including disassembling an input file to acquire analysis target functions in assembly code, calculating a function hash value for each of quantized function vectors of the analysis target functions, determining at least one candidate function from pre-stored comparison target functions based on the calculated function hash value, and classifying cyber threat information for the analysis target functions based on similarity for the at least one candidate function.

7 Claims, 74 Drawing Sheets

(56) References Cited

U.S. PATENT DOCUMENTS

| | | | | |
|---|---|---|---|---|
| 2022/0366332 | A1* | 11/2022 | Duessel | G06Q 10/0635 |
| 2023/0325469 | A1* | 10/2023 | Schiff | G06V 10/774 |
| 2023/0401051 | A1* | 12/2023 | Sree Prakash | G06V 10/82 |
| 2025/0061197 | A1* | 2/2025 | Fujii | G06F 21/566 |

OTHER PUBLICATIONS

Office Action issued in corresponding Korean Patent Application No. 10-2023-0110825, dated May 12, 2025.

* cited by examiner

FIG. 6

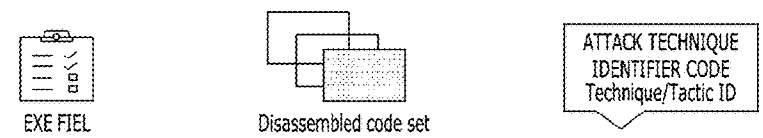

| FIEL | OP CODE | T-ID | DESCRIPTION |
|---|---|---|---|
| malware.exe | MOV DWORD PTR SS: [EBP-4], 1<br>MOV DWORD PTR SS: [EBP-8], 2<br>MOV EDX, DWORD PTR SS: [EBP-8]<br>LEA EAX, DWORD PTR SS: [EBP-4] | 1022 | CHANGE SYSTEM MAJOR REGISTRY |
| | PUSH EBP<br>MOV EBP, ESP<br>SUB ESP, 18<br>AND ESP, FFFFFFF0<br>MOV EAX, 0 | 1077 | REGISTER STARTUP PROGRAM |
| | LEA EAX, DWORD PTR SS: [EBP-4]<br>MOV EDX, DWORD PTR SS: [EBP-8]<br>LEA EAX, DWORD PTR SS: [EBP-4]<br>LEA EAX, DWORD PTR SS: [EBP-4] | 1034 | TURN OFF WINDOWS FIREWALL |
| | PUSH EBP<br>MOV EBP, ESP<br>MOV EAX, DWORD PTR SS: [EBP+B]<br>ADD EAX, DWORD PTR SS: [EBP+C]<br>POP EBP<br>RETN | 1090 | ADD NEW USER |
| | CMP DWORD PTR SS: [EBP-4], 2<br>JNZ SHORT if. 00401035<br>PUSH if. 0040C008<br>CALL if.printf<br>ADD ESP, 4<br>JMP SHORT if. 00401042 | 2011 | CREATE BACKDOOR |
| | CMP DWORD PTR SS: [EBP-B], 1<br>JE SHORT switch. 00401027<br>CMP DWORD PTR SS: [EBP-B], 2<br>JE SHORT switch. 00401036<br>CMP DWORD PTR SS: [EBP-B], 3<br>JE SHORT switch. 00401045<br>JMP SHORT switch. 00401054 | 3744 | SUSPEND OPERATION OF SECURITY PROGRAM |

FIG. 8

| OP-CODE | OP-CODE → CRC-16 | ASM-CODE | ASM-CODE → CRC-32 |
|---|---|---|---|
| push | 0x45E9 | 55 | 0xC9034AF6 |
| mov | 0x10E3 | 8B EC | 0x3012FD2C |
| lea | 0xAACE | 8D 45 0C | 0x9214A6AA |
| push | 0x45E9 | 50 | 0xB969BE79 |
| push | 0x45E9 | 6A 00 | 0xDECB91D2 |
| push | 0x45E9 | FF 75 08 | 0x1D4AE87E |
| push | 0x45E9 | 6A 01 | 0xA9CCA144 |
| call | 0x09F8 | FF 15 B0 20 40 00 | 0x284055E2 |
| pop | 0x7117 | 59 | 0xC0B506DD |
| push | 0x45E9 | 50 | 0xB969BE79 |
| call | 0x09F8 | E8 AB FF FF FF | 0x4452C315 |
| add | 0x8B0B | 83 C4 10 | 0xAE137EE5 |
| pop | 0x7117 | 5D | 0xC7D8C2C4 |
| retn | 0x12B3 | C3 | 0xD06F7C87 |

FIG. 9

| OP-CODE Vector | ASM-CODE Vector |
| --- | --- |
| 17897 | 201 3 74 246 |
| 4323 | 48 18 253 44 |
| 43726 | 146 20 166 170 |
| 17897 | 185 105 121 44 |
| 17897 | 222 203 145 210 |
| 17897 | 29 74 232 126 |
| 17897 | 169 204 161 68 |
| 2552 | 40 64 85 226 |
| 28951 | 192 181 6 221 |
| 17897 | 185 105 190 121 |
| 2552 | 68 82 195 21 |
| 35595 | 174 19 126 229 |
| 28951 | 199 216 194 196 |
| 4787 | 208 111 124 135 |

FIG. 10

| | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| Fixed block | content | a | b | c | d | e | f | g | h | i | j | k | l | m | n | o | p | q | r | s | t | u | v | w | x | y | z | 0 | 1 |
| Original | ascii val | 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 48 | 49 |
| | ascii sum | 394 | | | | 410 | | | | 426 | | | | 442 | | | | 458 | | | | 474 | | | | 340 | | | |
| Kaq6Kau | b64 char | K | | | | a | | | | q | | | | 6 | | | | K | | | | a | | | | u | | | |

FIG. 13

| Label | | SHA-256 (size) | N-gram |
| --- | --- | --- | --- |
| T-ID | Attacker (or Group) | (OP-CODE + ASM-CODE)'s FUZZY HASH | |
| T10XX | TA504 | (OP-CODE + ASM-CODE)'s<br>32 : 76EcDrURBPQk58t... | {"3736":1, "3645":1, "4563":1, "6344":1, "4472":1, "7255":1 . . . . . . |
| | TA504 | E3EC2AA04AFECC6...<br>32 : 76EcDrURBPQk58tGcoHE... | {"3736":1, "3645":1, "4563":1, "6344":1, "4472":1, "7255":1, "5552":1, "5242":1, "4250":1. . . . . . |

FIG. 22 app1

```
0000000100003ed0 <_foo1>:
100003ed0: 55                      pushq   %rbp
100003ed1: 48 89 e5                movq    %rsp, %rbp
100003ed4: 48 83 ec 10             subq    $16, %rsp

100003ed8: c7 45 fc 02 00 00 00    movl    $2, -4(%rbp)
100003edf: c7 45 f8 01 00 00 00    movl    $1, -8(%rbp)
100003ee6: 83 7d f8 0a             cmpl    $10, -8(%rbp)
100003eea: 0f 8d 29 00 00 00       jge     0x100003f19
100003ef0: 8b 75 fc                movl    -4(%rbp), %esi
100003ef3: 8b 55 f8                movl    -8(%rbp), %edx
100003ef6: 8b 4d fc                movl    -4(%rbp), %ecx
100003ef9: 0f af 4d f8             imull   -8(%rbp), %ecx
100003efd: 48 8d 3d 9a 00 00 00    leaq    154(%rip), %rdi
100003f04: b0 00                   movb    $0, %al
100003f06: e8 71 00 00 00          callq   0x100003f7c
100003f0b: 8b 45 f8                movl    -8(%rbp), %eax
100003f0e: 83 c0 01                addl    $1, %eax
100003f11: 89 45 f8                movl    %eax, -8(%rbp)
100003f14: e9 cd ff ff ff          jmp     0x100003ee6

100003f19: c7 45 fc 09 00 00 00    movl    $9, -4(%rbp)
100003f20: c7 45 f4 01 00 00 00    movl    $1, -12(%rbp)
100003f27: 83 7d f4 0a             cmpl    $10, -12(%rbp)
100003f2b: 0f 8d 29 00 00 00       jge     0x100003f5a
100003f31: 8b 75 fc                movl    -4(%rbp), %esi
100003f34: 8b 55 f4                movl    -12(%rbp), %edx
100003f37: 8b 4d fc                movl    -4(%rbp), %ecx
100003f3a: 0f af 4d f4             imull   -12(%rbp), %ecx
100003f3e: 48 8d 3d 59 00 00 00    leaq    89(%rip), %rdi
100003f45: b0 00                   movb    $0, %al
100003f47: e8 30 00 00 00          callq   0x100003f7c
100003f4c: 8b 45 f4                movl    -12(%rbp), %eax
100003f4f: 83 c0 01                addl    $1, %eax
100003f52: 89 45 f4                movl    %eax, -12(%rbp)
100003f55: e9 cd ff ff ff          jmp     0x100003f27

100003f5a: 48 83 c4 10             addq    $16, %rsp
100003f5e: 5d                      popq    %rbp
100003f5f: c3                      retq
```

app3

```
0000000100003ef0 <_foo_cut>:
100003ef0: 55                      pushq   %rbp
100003ef1: 48 89 e5                movq    %rsp, %rbp
100003ef4: 48 83 ec 10             subq    $16, %rsp

100003ef8: 89 7d fc                movl    %edi, -4(%rbp)
100003efb: c7 45 f8 01 00 00 00    movl    $1, -8(%rbp)
100003f02: 83 7d f8 0a             cmpl    $10, -8(%rbp)
100003f06: 0f 8d 29 00 00 00       jge     0x100003f35
100003f0c: 8b 75 fc                movl    -4(%rbp), %esi
100003f0f: 8b 55 f8                movl    -8(%rbp), %edx
100003f12: 8b 4d fc                movl    -4(%rbp), %ecx
100003f15: 0f af 4d f8             imull   -8(%rbp), %ecx
100003f19: 48 8d 3d 7e 00 00 00    leaq    126(%rip), %rdi
100003f20: b0 00                   movb    $0, %al
100003f22: e8 55 00 00 00          callq   0x100003f7c
100003f27: 8b 45 f8                movl    -8(%rbp), %eax
100003f2a: 83 c0 01                addl    $1, %eax
100003f2d: 89 45 f8                movl    %eax, -8(%rbp)
100003f30: e9 cd ff ff ff          jmp     0x100003f02

100003f35: 48 83 c4 10             addq    $16, %rsp
100003f39: 5d                      popq    %rbp
100003f3a: c3                      retq
100003f3b: 0f 1f 44 00 00          nopl    (%rax,%rax)

0000000100003f40 <_foo1>:
100003f40: 55                      pushq   %rbp
100003f41: 48 89 e5                movq    %rsp, %rbp
100003f44: bf 02 00 00 00          movl    $2, %edi
100003f49: e8 a2 ff ff ff          callq   0x100003ef0
100003f4e: bf 09 00 00 00          movl    $9, %edi
100003f53: e8 98 ff ff ff          callq   0x100003ef0
100003f58: 5d                      popq    %rbp
100003f59: c3                      retq
100003f5a: 66 0f 1f 44 00 00       nopw    (%rax,%rax)
```

FIG. 24

```
0000000100003f40 <_foo1>:
100003f40: 55                      pushq   %rbp
100003f41: 48 89 e5                movq    %rsp, %rbp
100003f44: bf 02 00 00 00          movl    $2, %edi
100003f49: e8 a2 ff ff ff          callq   0x100003ef0 <_foo_out>
100003f4e: bf 09 00 00 00          movl    $9, %edi
100003f53: e8 98 ff ff ff          callq   0x100003ef0 <_foo_out>
100003f58: 5d                      popq    %rbp
100003f59: c3                      retq
100003f5a: 66 0f 1f 44 00 00       nopw    (%rax,%rax)
```

FIG. 25

| | app1 | app2 | app3 |
|---|---|---|---|
| CFG | 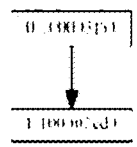 | 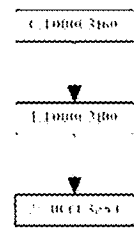 | 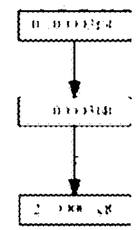 |
| Instruction Sequence | movl<br>xorl<br>movl<br>movl<br>cmpl<br>movl<br>movl<br>movl<br>imull<br>leaq<br>movb<br>movl<br>addl<br>movl<br>movl<br>movl<br>cmpl<br>movl<br>movl<br>movl<br>imull<br>leaq<br>movb<br>movl<br>addl<br>movl | movl<br>xorl<br>movl<br>movl<br>cmpl<br>movl<br>movl<br>movl<br>imull<br>leaq<br>movb<br>movl<br>addl<br>movl<br>movl<br>movl<br>cmpl<br>movl<br>movl<br>movl<br>imull<br>leaq<br>movb<br>movl<br>addl<br>movl | movl<br>xorl<br>movl<br>movl<br>cmpl<br>movl<br>movl<br>movl<br>imull<br>leaq<br>movb<br>movl<br>addl<br>movl<br>movl<br>movl<br>cmpl<br>movl<br>movl<br>movl<br>imull<br>leaq<br>movb<br>movl<br>addl<br>movl |
| Fuzzy hash | 3:92XvBtR72IxRvBtR72n:LRrRd | 3:92XvBtR72IxRvBtR72n:LRrRd | 3:92XvBtR72IxRvBtR72n:LRrRd |

FIG. 32

| DIVISION | CATEGORY | SYSTEM CALL API | EXAMPLE OF EXTRACTED PARAMETER | |
|---|---|---|---|---|
| 1 | SCRIPT EXECUTION/ OPENING | - WinExec<br>- System | COMMAND LINE COMMAND | powershell.exe -file C:₩Temp₩invite.ps1 |
| 2 | SERVER CONNECTION | - Socket | COMMUNICATION TYPE | AF_INET |
| | | - Connect | PORT NUMBER | 8080 |
| | | | IP ADDRESS | 10.10.0.42 |
| 3 | DOWNLOAD | - Send / SendTo<br>- Recv / RecvFrom | PACKET DATA | GET /invite.ps1₩r₩n₩r₩n |
| 4 | FILE EXTRACTION | - Fopen / Fwrite | TARGET FILE PATH | C:₩Temp₩invite2.ps1 |
| | | - CreateFile / WriteFile | CREATED CONTENT | echo ₩"connection ₩" |
| 5 | FILE EXECUTION/ OPENING | - CreateProcess<br>- ShellExecute | EXECUTION PROGRAM AND TARGET FILE | C:₩Program Files₩Microsoft Office₩root₩Office16₩WINWORD.EXE<br>C:₩Temp₩invite.docx |

FIG. 34

| DIVISION | API | | |
|---|---|---|---|
| Windows OS Native API | NtQueryVirtualMemory | NtAllocateVirtualMemory | NtFreeVirtualMemory |
| | NtProtectVirtualMemory | NtReadVirtualMemory | NtQueryInformationProcess |
| | NtQueryInformationThread | NtQueryObject | NtQueryKey |
| | NtDuplicateObject | NtWriteFile | NtFsControlFile |
| | NtSetInformationFile | NtClose | NtDelayExecution |
| | NtWaitForSingleObject | NtOpenThread | NtResumeThread |
| HTML DOM Parser API | CDocument write | CHyperlink SetUrlComponent | CIFrameElement CreateElement |
| | CWindow AddTimeoutCode | CScriptElement put src | CElement put innerHTML |
| | CImgElement put src | | |
| VBS Script Engine API | vbe6 StringConcat | vbe6 CreateObject | vbe6 GetObject |
| | vbe6_Invoke | vbe6_GetIDFromName | vbe6_CallByName |
| | vbe6 Shell | vbe6 Import | vbe6 Open |
| | vbe6_Print | vbe6_Close | |

FIG. 37

| DIVISION | SINGLE LABEL (Single Label) | | | MULTIPLE LABELS (Multi Label) | |
|---|---|---|---|---|---|
| CLASS LABEL (DEPENDENT VARIABLE) | 0 | T1059.005 | | [1, 1, 0] | T1059.005 T1564.007 |
| OUTPUT EXAMPLE | 0 | T1059.005 | 62% | T1059.005 | 95% |
| | 1 | T1564.007 | 35% | T1564.007 | 95% |
| | 2 | T1204.002 | 2% | T1204.002 | 3% |

FIG. 38

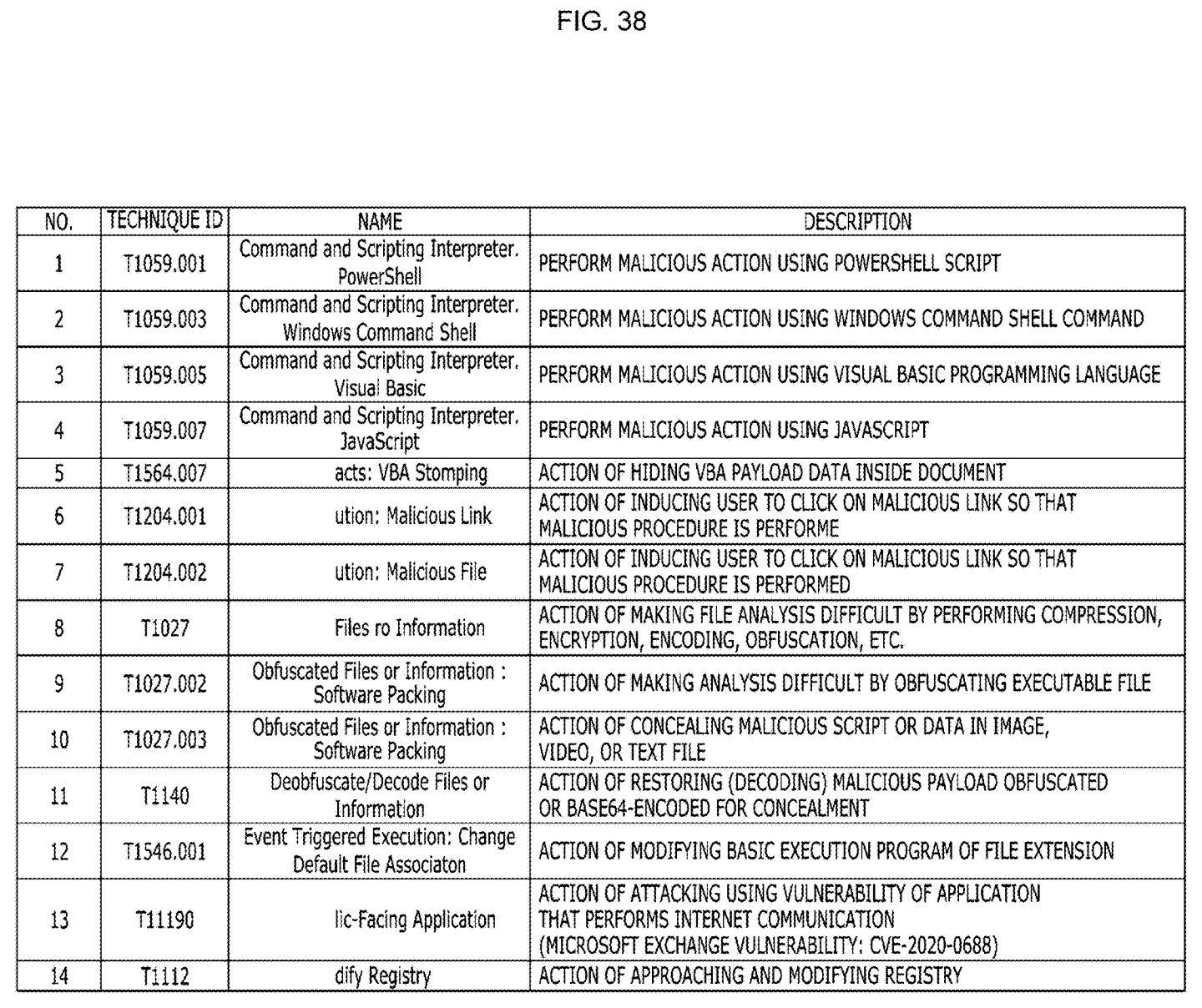

| NO. | TECHNIQUE ID | NAME | DESCRIPTION |
|---|---|---|---|
| 1 | T1059.001 | Command and Scripting Interpreter. PowerShell | PERFORM MALICIOUS ACTION USING POWERSHELL SCRIPT |
| 2 | T1059.003 | Command and Scripting Interpreter. Windows Command Shell | PERFORM MALICIOUS ACTION USING WINDOWS COMMAND SHELL COMMAND |
| 3 | T1059.005 | Command and Scripting Interpreter. Visual Basic | PERFORM MALICIOUS ACTION USING VISUAL BASIC PROGRAMMING LANGUAGE |
| 4 | T1059.007 | Command and Scripting Interpreter. JavaScript | PERFORM MALICIOUS ACTION USING JAVASCRIPT |
| 5 | T1564.007 | acts: VBA Stomping | ACTION OF HIDING VBA PAYLOAD DATA INSIDE DOCUMENT |
| 6 | T1204.001 | ution: Malicious Link | ACTION OF INDUCING USER TO CLICK ON MALICIOUS LINK SO THAT MALICIOUS PROCEDURE IS PERFORME |
| 7 | T1204.002 | ution: Malicious File | ACTION OF INDUCING USER TO CLICK ON MALICIOUS LINK SO THAT MALICIOUS PROCEDURE IS PERFORMED |
| 8 | T1027 | Files ro Information | ACTION OF MAKING FILE ANALYSIS DIFFICULT BY PERFORMING COMPRESSION, ENCRYPTION, ENCODING, OBFUSCATION, ETC. |
| 9 | T1027.002 | Obfuscated Files or Information : Software Packing | ACTION OF MAKING ANALYSIS DIFFICULT BY OBFUSCATING EXECUTABLE FILE |
| 10 | T1027.003 | Obfuscated Files or Information : Software Packing | ACTION OF CONCEALING MALICIOUS SCRIPT OR DATA IN IMAGE, VIDEO, OR TEXT FILE |
| 11 | T1140 | Deobfuscate/Decode Files or Information | ACTION OF RESTORING (DECODING) MALICIOUS PAYLOAD OBFUSCATED OR BASE64-ENCODED FOR CONCEALMENT |
| 12 | T1546.001 | Event Triggered Execution: Change Default File Associaton | ACTION OF MODIFYING BASIC EXECUTION PROGRAM OF FILE EXTENSION |
| 13 | T11190 | lic-Facing Application | ACTION OF ATTACKING USING VULNERABILITY OF APPLICATION THAT PERFORMS INTERNET COMMUNICATION (MICROSOFT EXCHANGE VULNERABILITY: CVE-2020-0688) |
| 14 | T1112 | dify Registry | ACTION OF APPROACHING AND MODIFYING REGISTRY |

FIG. 41

```
int WSAAPI send)
    [in] SOCKET      s,
    [in]  const char *buf,
    [in] int         len,
    [in] int         flags
);
```

FIG. 54

| Tag Data | Contents |
| --- | --- |
| <body> | onload="teclear();"background="ground.gif",<br>link="#ff2ff" text="#ff001e" link="fff2ff" |
| <image> | src="http://analytics.hosting24.com/do.php"<br>alt="web hosting" border="0" |
| <iframe> | src="http://Trenz.pl/rc" width=1 height=1<br>frameborder=0 |
| <a> | href="http://www.hosting24.com/" target="_blank |
| <SCRIPT><br><br></SCRIPT> | var width=document.body.clientWidth;<br>var height=document.body.clientHeight;<br><br>function doClickText(who, type, step, timeOut){<br><br>document.getElementById(who).style.display="no<br>ne";<br>if(type == 0) {<br>reveal('revealDiv1', step, timeout, 0);<br>reveal('revealDiv2', step, timeout, 1);<br>}<br>…. |

| Tag Data (6110) | Preprocessing (6120) | Fuzzy Hash (6130) | TAG FEATURE DATA (6140) |
|---|---|---|---|
| <body> | onload="<func>();"<br>background="<name>.gif", link="<hex>"<br>text="<hex>" link="<hex>" | 3:ktRIXLkG6JM6BbHIUN4bHIB4bHI1:2rbi<br>M6Bjm4jn4jb | {'6B74': 1, '7452': 1, '526C': 1, '6C58': 1, '584C': 1,<br>'4C6B': 1, ··· '346A': 2, '6A6E': 1, '6E34': 1, '6A62': 1} |
| <image> | src="<http><url><ext:php>" alt="<string>"<br>border="0" | 3:TYHXBZCzcfVNxC2RYHjZWxKql7HI5on:<br>TYHXq6n0/Hj/9n | {'5459': 2, '5948': 3, '4858': 2, '5842': 1, '425A': 1,<br>'5A43': 1, ··· '2F39': 1, '396E': 1} |
| <iframe> | src="<http><url>" width=1 height=1<br>frameborder=0 | 3:TYHXBZCtGPF/O+cLhiALV:TYHXqqF/<br>nEhfh | {'5459': 2, '5948': 2, '4858': 2, '5842': 1, '425A': 1,<br>'5A43': 1, ··· '6E45': 1, '4568': 1, '6866': 1, '6668': 1} |
| <a> | href="<http><url>" target="<string>" | 3:FHxZCtX+HIWxKql4:F^F+Tn | {'4648': 1, '4878': 1, '785A': 4, '5A43': 1, '4374': 1,<br>'7458': 1, ··· '3646': 1, '462B': 1, '2B54': 1, '546E': 1} |
| <SCRIPT><br></SCRIPT> | var<name>=document.body.clientWidth;<br>var<name>=document.body.clientHeight;<br><br>function <func> (who, type, step, timeOut) {<br>document.getElementById(who).style.display=<br>"<string>";<br>if(type == 0) {<br>reveal(<string>, step, timeout, 0);<br>reveal(<string>, step, timeout, 1);<br>}<br>··· . | 24:7wt5mlAp3oKp0yypLipophypolaPxhRR<br>VaRPRYb:7251hoKuyyc2zyalaPxhURPR2 | {'3777': 1, '7774': 1, '7435': 1, '356D': 1, '6D6C': 1,<br>'6C41': 1, ··· '6855': 1, '5552': 1, '5232': 1} |

CYBER THREAT INFORMATION PROCESSING APPARATUS, CYBER THREAT INFORMATION PROCESSING METHOD, AND STORAGE MEDIUM STORING CYBER THREAT INFORMATION PROCESSING PROGRAM

CROSS-REFERENCE TO RELATED APPLICATIONS

This application claims the benefit of Korean Patent Application No. 10-2023-0110825, filed on Aug. 23, 2023, which is hereby incorporated by reference as if fully set forth herein.

BACKGROUND OF THE INVENTION

Field of the Invention

The disclosed embodiments relate to a cyber threat information processing apparatus, a cyber threat information processing method, and a storage medium storing a cyber threat information processing program.

Discussion of the Related Art

The damage from cybersecurity threats, which are gradually becoming more sophisticated, centering on new or variant malware, has been increasing. In order to reduce such damage even a little and to respond at an early stage, countermeasure technology has been advancing through multi-dimensional pattern composition, various types of complex analysis, etc. However, recent cyber-attacks tend to increase day by day rather than being adequately responded to within a control range. These cyberattacks threaten finance, transportation, environment, health, etc. that directly affect lives of people beyond the existing information and communication technology (ICT) infrastructure.

One of basic technologies to detect and respond to most existing cybersecurity threats is to create a database of patterns for cyberattacks or malware in advance, and utilize appropriate monitoring technologies where data flow is required. Existing technology has evolved based on a method of identifying and responding to threats when a data flow or code matching a monitored pattern is detected. Such conventional technology has an advantage of being able to rapidly and accurately perform detection when a data flow or code matches a previously secured pattern. However, the technology has a problem in that, in the case of a new or mutant threat for which a pattern is not secured or is bypassed, detection is impossible or it takes a significantly long time for analysis.

The related art is focused on a method of advancing technology to detect and analyze malware itself even when artificial intelligence (AI) analysis is used. However, there is no fundamental technology to counter cybersecurity threats, and thus there is a problem in that it is difficult to address new malware or new variants of malware with this method alone, and there is a limitation.

For example, there is a problem in that only the technology for detecting and analyzing previously discovered malware itself cannot address decoy information or fake information for deceiving a detection or analysis system thereof, and confusion occurs.

In the case of mass-produced malware having enough data to be learned, characteristic information thereof can be sufficiently secured, and thus it is possible to distinguish whether code is malicious or a type of malware. However, in the case of advanced persistent threat (APT) attacks, which are made in relatively small numbers and attack precisely, since training data does not match in many cases, and targeted attacks make up the majority, even when the existing technology is advanced, there are limitations.

In addition, conventionally, methods and expression techniques for describing malware, attack code, or cyber threats have differed depending on the position or analysis perspective of an analyst. For example, a method of describing malware and attack activity has not been standardized worldwide, and thus there has been a problem in that, even when the same incident or the same malware is detected, explanations of experts in the field are different, and thus confusion had occurred. Even a malware detection name has not been unified, and thus, for the same malicious file, it has been impossible to identify an attack performed correctly, or attacks have been differently organized. Therefore, there has been a problem in that identified attack techniques cannot be described in a normalized and standardized manner.

A conventional malware detection and analysis method focuses on detection of malware itself, and thus has a problem in that, in the case of malware performing significantly similar malicious activity, when generating attackers are different, the attackers cannot be identified.

In connection with the above problems, the conventional method has a problem in that it is difficult to predict a type of cyber threat attack occurring in the near future by such an individual case-focused detection method.

SUMMARY OF THE INVENTION

The present disclosure is to address at least the above-mentioned problems and/or disadvantages and to provide at least the advantages described below. Accordingly, an aspect of the present disclosure is to provide a cyber threat information processing apparatus, a cyber threat information processing method, and a storage medium storing a cyber threat information processing program capable of detecting and addressing malware not exactly matching data learned by AI and addressing a variant of malware.

Another aspect of the present disclosure is to provide a cyber threat information processing apparatus, a cyber threat information processing method, and a storage medium storing a cyber threat information processing program capable of identifying malware, an attack technique, an attacker, and an attack prediction method in a significantly short time even for a variant of malware.

Another aspect of the present disclosure is to provide a cyber threat information processing apparatus, a cyber threat information processing method, and a storage medium storing a cyber threat information processing program capable of providing information about malware, for which a malware detection name, etc. is not unified or a cyberattack technique cannot be accurately described, in a normalized and standardized scheme.

Another aspect of the present disclosure is to provide a cyber threat information processing apparatus, a cyber threat information processing method, and a storage medium storing a cyber threat information processing program capable of identifying different attackers creating malware that performs significantly similar malicious activity and predicting a cyber threat attack occurring in the future.

A disclosed embodiment provides a method of processing cyber threat information, the method including: disassembling an input file to acquire analysis target functions in assembly code; calculating a function hash value for each of quantized function vectors of the analysis target functions; determining at least one candidate function from pre-stored comparison target functions based on the calculated function hash value; and classifying cyber threat information for the analysis target functions based on similarity for the at least one candidate function.

The determining includes determining at least one candidate function corresponding to each of the analysis target functions from the pre-stored comparison target functions based on the calculated function hash value.

The determining includes determining the at least one candidate function having the same function hash value as a function hash value for each of the analysis target functions among the pre-stored comparison target functions.

The classifying includes classifying the cyber threat information for the analysis target function based on similarity between at least one candidate function having the same function hash value and an analysis target function corresponding to the at least one candidate function.

The classifying includes: determining the analysis target function to be the same function as a candidate function corresponding to the similarity when the similarity is less than a first threshold value; determining the analysis target function to be the same function as the candidate function corresponding to the similarity when the similarity is equal to or greater than the first threshold value and less than a second threshold value; determining the analysis target function to be a function different from the candidate function corresponding to the similarity when the similarity is equal to or greater than the second threshold value; and classifying the cyber threat information for the analysis target function based on a result of the determination.

A disclosed embodiment provides an apparatus for processing cyber threat information, the apparatus including: a database configured to store data; and a processor configured to process the data, wherein the processor is configured to: disassemble an input file to acquire analysis target functions in assembly code; calculate a function hash value for each of quantized function vectors of the analysis target functions; determine at least one candidate function from pre-stored comparison target functions based on the calculated function hash value; and classify cyber threat information for the analysis target functions based on similarity for the at least one candidate function.

The processor determines at least one candidate function corresponding to each of the analysis target functions from the pre-stored comparison target functions based on the calculated function hash value.

The processor determines the at least one candidate function having the same function hash value as a function hash value for each of the analysis target functions among the pre-stored comparison target functions.

The processor classifies the cyber threat information for the analysis target function based on similarity between at least one candidate function having the same function hash value and an analysis target function corresponding to the at least one candidate function.

The processor is further configured to: determine the analysis target function to be the same function as a candidate function corresponding to the similarity when the similarity is less than a first threshold value, determine the analysis target function to be the same function as the candidate function corresponding to the similarity when the similarity is equal to or greater than the first threshold value and less than a second threshold value, determine the analysis target function to be a function different from the candidate function corresponding to the similarity when the similarity is equal to or greater than the second threshold value, and classify the cyber threat information for the analysis target function based on a result of the determination.

A disclosed embodiment provides a storage medium configured to store a computer-executable program for providing an application service that performs steps of: disassembling an input file to acquire analysis target functions in assembly code; calculating a function hash value for each of quantized function vectors of the analysis target functions; determining at least one candidate function from pre-stored comparison target functions based on the calculated function hash value; and classifying cyber threat information for the analysis target functions based on similarity for the at least one candidate function.

According to embodiments disclosed below, it is possible to detect and address malware not exactly matching data learned by machine learning and address a variant of malware.

According to the embodiments, it is possible to identify malware, an attack technique, and an attacker in a significantly short time even for a variant of malware, and furthermore to predict an attack technique of a specific attacker in the future.

According to the embodiments, it is possible to accurately identify a cyberattack implementation method based on whether such malware exists, an attack technique, an attack identifier, and an attacker, and provide the cyberattack implementation method as a standardized model. According to the embodiments, it is possible to provide information about malware, for which malware detection names, etc. are not unified or a cyberattack technique cannot be accurately described, using a normalized and standardized scheme.

In addition, it is possible to provide a means capable of predicting a possibility of generating previously unknown malware and attackers who can develop the malware, and predicting a cyber threat attack occurring in the future.

According to the embodiments, it is possible to more clearly detect and recognize different attack techniques or different attack groups generated according to differences in an execution process even when execution results of executed files are the same.

According to the embodiments, it is possible to identify cyber threat information, attack techniques, and attack groups for various file types included in a file even when the file is a non-executable file, not an executable file.

According to the embodiments, it is possible to monitor a webpage, identify a webpage including a malicious action or information, and furthermore, identify cyber threat information, an attack technique, and an attack group included in the webpage.

According to the embodiment, even when the user is not an expert, the user may easily understand the mechanism and analysis basis of the CTI.

According to the embodiments, it may enable profiling of malicious code, attack techniques, attack groups, and threat types.

According to the embodiments, it is possible to efficiently reduce the candidate group of the function to be compared

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 is a diagram illustrating an example of disassembling malware to determine that a file includes malicious activity as an example of in-depth analysis;

FIG. 8 is a diagram illustrating values obtained by converting opcode and ASM code into normalized code according to a disclosed embodiment;

FIG. 9 is a diagram illustrating vectorized values of opcode and ASM code according to a disclosed embodiment;

FIG. 10 is a diagram illustrating an example of converting a block unit of code into a hash value according to a disclosed embodiment;

FIG. 13 is a diagram illustrating an example of performing labeling by identifying an attack identifier and an attacker using training data according to a disclosed embodiment;

FIG. 22 is a diagram for describing another example of generating instruction sequences including characteristic information using instructions in a ControlBlock;

FIG. 24 is a diagram for describing yet another example of generating instruction sequences including characteristic information using instructions in a ControlBlock;

FIG. 25 is a diagram disclosing an example of generating an instruction sequence according to the above-described examples;

FIG. 32 is a diagram illustrating an object extracted by dynamic execution of a non-executable file and extracted information by a second type of analysis for a file according to an embodiment;

FIG. 34 is a diagram illustrating API hooking list information when a third analysis unit performs mild-dynamic analysis according to an embodiment;

FIG. 37 is an exemplary diagram for describing a classification model of an attack technique classifier according to a disclosed embodiment;

FIG. 38 is a diagram illustrating an attack technique identified by selectively combining various analytical techniques for a non-executable file according to a disclosed embodiment;

FIG. 41 is a diagram for describing an example of hooking a system call on program code according to an embodiment;

FIG. 54 is a diagram disclosing an example of obtaining feature information related to a cyber security threat from structure information based on a tag of HTML data as a method of processing cyber threat information according to an embodiment;

FIG. 55 is a diagram illustrating a process of processing and converting a part that may include cyber threat information, except for HTML grammar, in an HTML document according to an embodiment;

DETAILED DESCRIPTION OF THE EMBODIMENTS

Hereinafter, embodiments will be described in detail with reference to the accompanying drawings. In the embodiments, a framework, a module, an application program interface, etc. may be implemented as a device coupled with a physical device or may be implemented as software.

When an embodiment is implemented as software, the software may be stored in a storage medium, installed in a computer, etc., and executed by a processor.

Embodiments of a cyber threat information processing apparatus and a cyber threat information processing method are disclosed in detail as follows.

Figure 1:
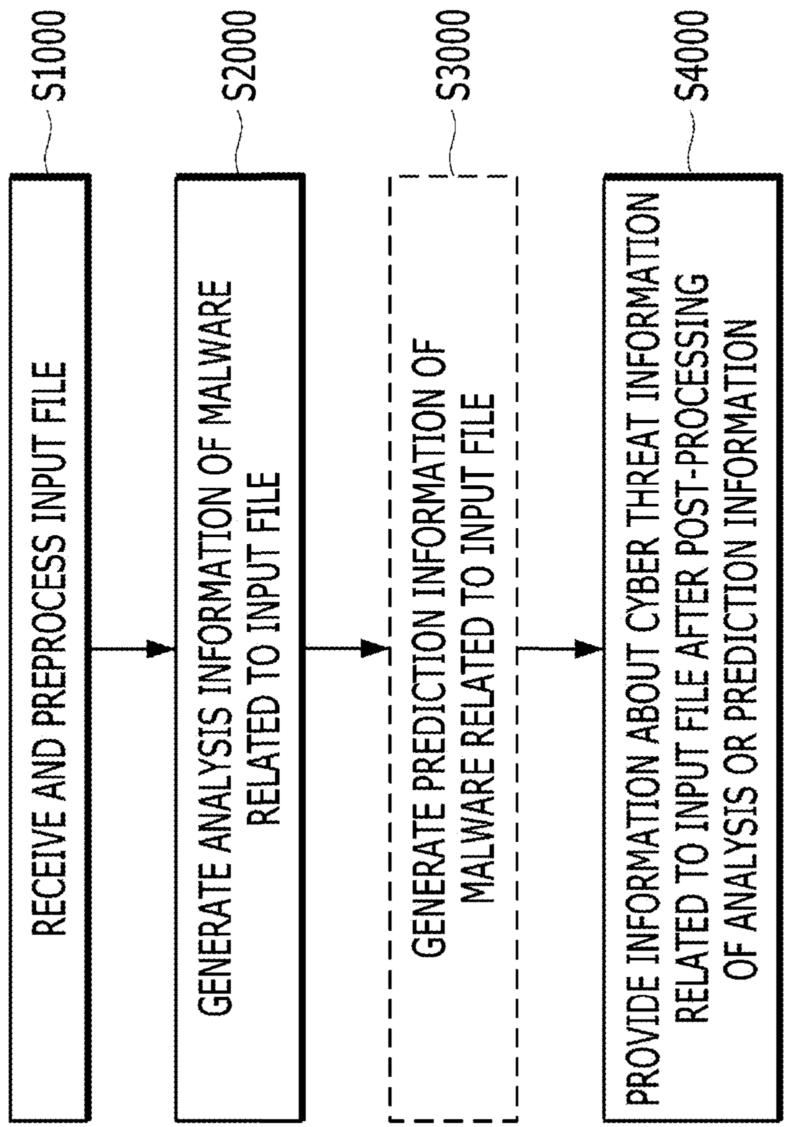
FIG. 1 is a diagram illustrating an embodiment of a cyber threat information processing method.

FIG. 1 is a diagram illustrating an embodiment of a cyber threat information processing method. The embodiment of the cyber threat information processing method is described as follows.

A file input to a cyber threat information processing apparatus is preprocessed (S1000).

Identification information capable of identifying a file may be obtained through preprocessing of the file. An example of performing preprocessing of a file is as follows.

Various types of meta information may be obtained from a received file, including source information of the file, collection information for obtaining the file, and user information of the file. For example, when the file includes a uniform resource locator (URL) or is included in an e-mail, it is possible to obtain collection information for the file. The user information may include information about a user generating, uploading, or finally saving the file, etc. In a preprocessing process, as meta information of the file, it is possible to obtain internet protocol (IP) information, country information based thereon, API key information, for example, API information of a user requesting analysis, etc.

It is possible to extract a hash value of the file in the preprocessing process. When the hash value is previously known to the cyber threat information processing apparatus, a type of file or a degree of risk may be identified based on the hash value.

When the file is not previously known, analysis information for identifying the file type may be obtained by inquiring about pre-stored information or, if necessary, the hash value and file information on an external reference website.

For example, information according to file type may be obtained from a site such as cyber threats analysis system (C-TAS) operated by Korea Internet & Security Agency, cyber threat alliance (CTA) operating system (OS), or Virus Total as the external reference website.

For example, it is possible to search for the file from the site by using a hash value of a hash function such as Message-Digest algorithm 5 (MD5), Secure Hash Algorithm 1 (SHA1), or SHA 256 of the file. In addition, the file may be identified using a search result.

As an example of performing file analysis, when an input file is transmitted through a mobile network, network transmission packet recombination technology, etc. is used for packets transmitted through network traffic, so that, when the input file is suspicious mobile malware, the file may be saved. The packet recombination technology recombines a series of packets corresponding to one piece of executable code in the collected network traffic, and when a file transmitted by the recombined packets is suspicious mobile malware, this file is saved.

When the suspicious mobile malware is not extracted from the transmitted file in this step, it is possible to directly access a download URL in the file to download and save the suspicious mobile malware.

Malicious activity analysis information related to the input file is generated (S2000).

The malicious activity analysis information related to the input file may include static analysis information for analyzing information about the file itself or dynamic analysis information for determining whether malicious activity is performed by executing information obtained from the input file.

The analysis information in this step may include in-depth analysis information that uses information processed from an executable file related to the input file or performs memory analysis related to the file.

In-depth analysis may include AI analysis to accurately identify malicious activity.

The analysis information in this step may include correlation analysis information capable of estimating a correlation for attack activity or an attacker by correlating analysis information previously stored in relation to the file or generated analysis information with each other.

In this step, a plurality of pieces of analysis information may be aggregated to provide an overall analysis result.

For example, static analysis information, dynamic analysis information, in-depth analysis information, correlation analysis information, etc. for a single file may be integrated and analyzed for accurate attack technique and attacker identification. Integrated analysis removes an overlap between pieces of analysis information, and common information between pieces of analysis information may be used to increase accuracy.

For example, cyber threat infringement information (indicator of compromise, IoC) collected through several analyses and pathways may be standardized through normalization or enrichment of information.

In the embodiment of acquiring the analysis information, it is unnecessary to calculate all the analysis information described above in order. For example, any one of acquisition of the static analysis information and acquisition of the dynamic analysis information may be performed, and the dynamic analysis information may be acquired before the static analysis information.

The in-depth analysis information does not have to proceed after static analysis or dynamic analysis is performed, and correlation analysis may be performed without the in-depth analysis information.

Accordingly, the processing order for acquiring the analysis information may be changed, or acquisition may be selectively performed. In addition, the process of acquiring the analysis information and the process of generating the prediction information described above may be performed in parallel based on the information acquired from the file. For example, even when dynamic analysis is not completed, correlation analysis information may be generated. Similarly, dynamic analysis or in-depth analysis may be performed simultaneously.

In this case, the preprocessing process (S1000) exemplified above is for obtaining or identifying the information of the file, and thus, when static analysis, dynamic analysis, in-depth analysis, or correlation analysis is performed individually or in parallel, each preprocessing process may be performed as a part of each analysis step.

A detailed embodiment of this step will be described below.

Prediction information of malicious activity related to the input file may be generated (S3000).

In order to increase analysis accuracy, a data set of the various types of information analyzed above may be used to generate prediction information for whether malicious activity occurs, attack technique, an attacker group, etc.

The prediction information may be generated through AI analysis of a previously analyzed data set. The generation of the prediction information is not an essential step, and when an appropriately analyzed data set is prepared for AI analysis and a condition is satisfied, prediction information for malicious attack activity may be generated in the future.

An embodiment performs machine learning based on AI based on various types of analysis information. An embodiment may generate prediction information based on a data set for the analyzed information. For example, additional analysis information may be generated based on data learned by AI, and the regenerated analysis information may be used again as input data of AI as new training data.

Here, the prediction information may include malware creator information, malware tactic information, malware attack group prediction, malware similarity prediction information, and malware spread degree prediction information.

The generated prediction information may include first prediction information for predicting a risk level of the malware itself and second prediction information for predicting the attacker, attack group, similarity, spread degree, etc. of the malware.

Predictive analysis information including the first prediction information and the second prediction information may be stored in a server or a database.

A detailed embodiment thereof will be described below.

After post-processing of the analysis information or prediction information, cyber threat information related to the input file is provided (S4000).

The embodiment determines a type of malware and a risk level of the malware based on the analysis information or the prediction information. In addition, the embodiment creates profiling information for the malware. Therefore, it is possible to save a result of performing self-analysis on the file or a result of performing additional and predictive analysis through file analysis. The generated profiling information includes an attack technique for malware or labeling for an attacker.

The cyber threat information may include information on which preprocessing is performed, generated or identified analysis information, generated prediction information, aggregate information of these pieces of information, or information determined based on these pieces of information.

As for the provided cyber threat information, analysis information stored in a database in relation to the input file may be used, or the analyzed or predicted information may be included.

According to an embodiment, when a user inquires about not only malicious activity for an input file but also cyber threat information for a previously stored file or malicious activity, information thereon may be provided.

Such integrated analysis information may be stored in a standardized format in a server or database in response to the corresponding file. Such integrated analysis information may be stored in a standardized format and used for searching for or inquiring about cyber threat information.

An additional example of inquiring about the cyber threat information by the user will be described in detail below.

In addition, the illustrations of various user interfaces that provide real-time cyber threat information according to the embodiments of the present invention will be described below.

Figure 2:
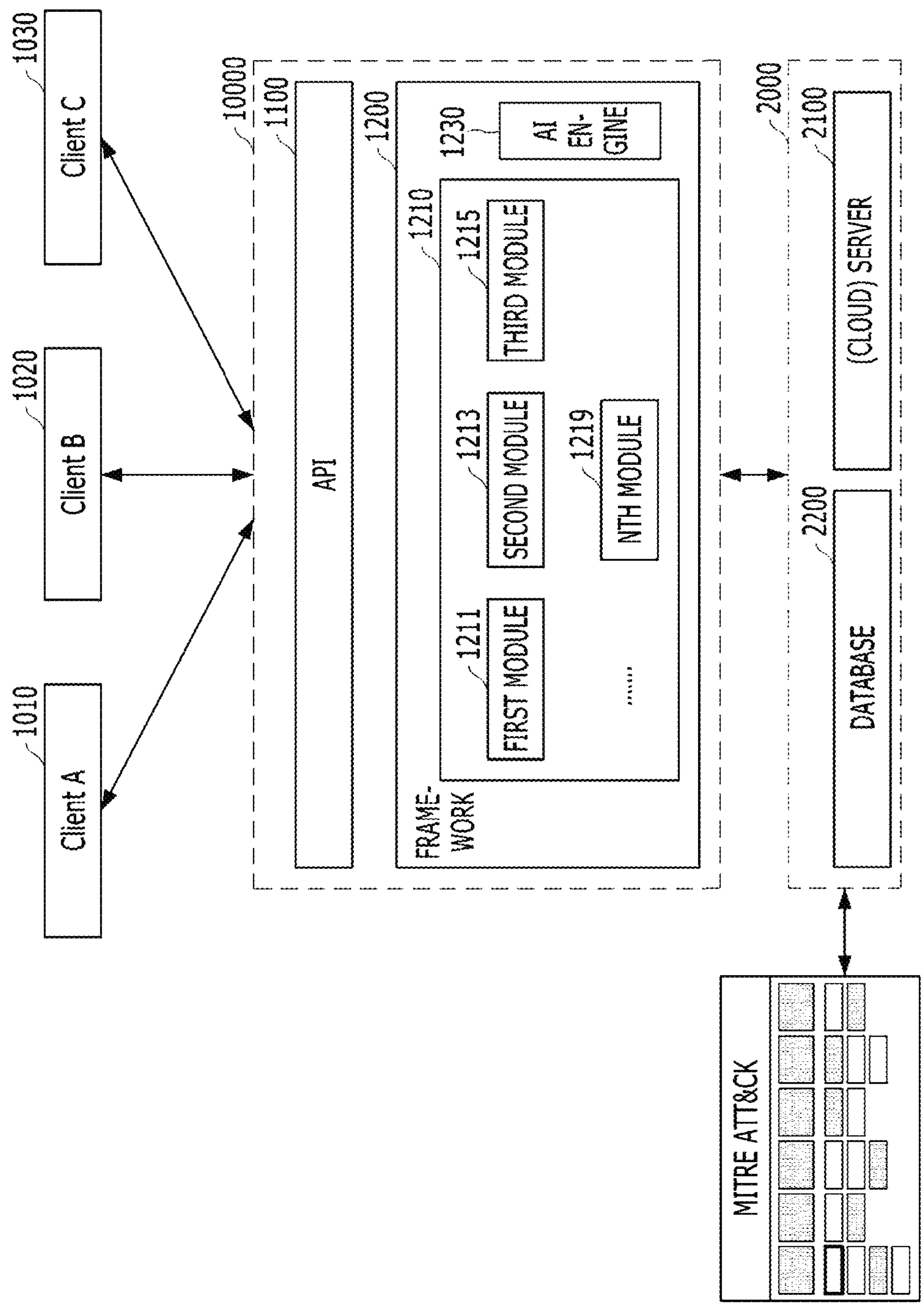
FIG. 2 is a diagram illustrating an embodiment of a cyber threat information processing apparatus.

FIG. 2 is a diagram illustrating an embodiment of a cyber threat information processing apparatus. The embodiment of this figure conceptually illustrates the cyber threat information processing apparatus, and the embodiment of the cyber threat information processing apparatus will be described below with reference to this figure.

The disclosed cyber threat information processing apparatus includes a server 2100 and a database 2200, which are physical devices 2000, and a platform 10000 including an API running on the physical devices 2000. Hereinafter, the platform 10000 is referred to as a cyber threat intelligence platform (CTIP) or simply an intelligence platform 10000.

The server 2100 may include an arithmetic unit such as a central processing unit (CPU) or a processor, and may store or read data in the database 2200.

The server 2100 calculates and processes input security-related data, and executes a file to generate various security events and process related data. In addition, the server 2100 may control input/output of various cybersecurity-related data and store data processed by the intelligence platform 10000 in the database 2200.

The server 2100 may include a network device for data input or a network security device. The central processing unit, processor, or arithmetic unit of the server 2100 may execute a framework illustrated in the following drawings or a module within the framework.

The intelligence platform 10000 according to an embodiment provides an API for processing cyber threat information. For example, the intelligence platform 10000 may receive a file or data input from a network security device connected to a network or cyber malicious activity prevention programming software that scans for and detects malicious activity.

For example, the intelligence platform 10000 according to the embodiment may provide functions such as a security information and event management (SIEM) API that provides a security event, an environmental data retrieval (EDR) API that provides data about an execution environment, and a firewall API that monitors and controls network traffic according to a defined security policy. In addition, the intelligence platform 10000 may provide a function of an API of intrusion prevention systems (IPS) that perform a function similar to that of a firewall between internal and external networks.

An API 1100 of the intelligence platform 10000 according to an embodiment may receive files including malware that perform cybersecurity attack activities from various client devices 1010, 1020, and 1030.

The intelligence platform 10000 according to an embodiment may include a preprocessor (not illustrated), an analysis framework 1210, a prediction framework 1220, an AI engine 1230, and a postprocessor (not illustrated).

The preprocessor of the intelligence platform 10000 performs preprocessing to analyze cyber threat information on various files received from the client devices 1010, 1020, and 1030.

For example, the preprocessor may process a received file to obtain various types of meta information from the received file, including source information of the file, collection information for obtaining the file, and user information of the file. For example, when the file includes a URL or is included in an e-mail, it is possible to obtain collection information for the file. The user information may include information about a user generating, uploading, or finally saving the file, etc. In a preprocessing process, as meta information of the file, it is possible to obtain IP information, country information based thereon, API key information, etc.

The preprocessor (not illustrated) of the intelligence platform 10000 may extract a hash value of the input file. When the hash value is previously known to the cyber threat information processing apparatus, the file type may be identified based thereon.

When the file is not previously known, analysis information for identifying the file type may be obtained by inquiring about the hash value and file information from reference Internet sites for cyber threat information such as operating C-TAS, an operating system of CTA, and Virus Total.

As described above, the hash value of the input file may be a hash value of a hash function such as MD5, SHA1, or SHA 256.

The framework 1210 may generate analysis information on the malware from the input file. The framework 1210 includes N modules (N is a natural number) (1211, 1213, 1215, . . . , 1219) exemplarily illustrated in this drawing, which respectively analyze cyber threat information in various ways, such as static analysis, dynamic analysis, in-depth analysis, and correlation analysis.

Here, these various modules analyze cyber threat information included in the input files or predict cyber threat information.

The static analysis module included in the framework 1210 may analyze malware-related information on the file itself for the analysis information of the malicious activity related to the input file.

The dynamic analysis module included in the framework 1210 may analyze malware-related information by performing various activities based on various types of information obtained from the input file.

The in-depth analysis module included in the framework 1210 may analyze malware-related information by using information obtained by processing an executable file related to the input file or by performing memory analysis related to an executable file. The in-depth analysis module may include AI analysis to accurately identify malicious activity.

The correlation analysis module included in the framework 1210 may include correlation analysis information capable of estimating a correlation with attack activity or an attacker by correlating the previously stored analysis information or the generated analysis information in relation to the input file.

The framework 1210 may mutually combine the information analyzed from the static analysis module, the dynamic analysis module, the in-depth analysis module, and the correlation analysis module with analysis results for the characteristics and activities of the malware, and provide the combined final information to the user.

For example, the framework 1210 may perform integrated analysis of static analysis information, dynamic analysis information, in-depth analysis information, correlation analysis information, etc. for a single file to accurately identify the attack technique and attacker. The framework 1210 removes an overlap between pieces of analysis information and uses information common to pieces of analysis information to increase accuracy.

The framework 1210 may standardize the information provided, for example, by normalizing or enriching cyber threat infringement information (IoC) collected through various analyses and paths. In addition, it is possible to generate analysis information on the final standardized malware or malicious activity.

The static analysis module, the dynamic analysis module, the in-depth analysis module, and the correlation analysis module of the framework 1210 may perform machine learning or deep learning techniques according to AI analysis on analysis target data to increase accuracy of the analyzed data.

The AI engine 1230 may perform an AI analysis algorithm to generate analysis information of the framework 1210.

Such information may be stored in the database 2200, and the server 2100 may provide analysis information on malware or malicious activity stored in the database 2200 as cyber threat intelligence information according to a user or client request.

The framework 1210 may include a plurality of prediction information generation modules according to prediction information, such as a first prediction information generation module and a second prediction information generation module. The framework 1210 may generate prediction information about whether malicious activity occurs, an attack technique, an attacker group, etc. by using the data set of the various types of information analyzed above in order to increase analysis accuracy.

The framework 1210 may generate prediction information for malicious activity related to the input file by performing an AI analysis algorithm using the AI engine 1230 based on the data set for the analysis information analyzed by the framework 1210.

The AI engine 1230 generates additional analysis information by learning the data set for the analysis information through AI-based machine learning, and the additionally generated analysis information may be used again as AI input data as new training data.

The prediction information generated by the framework 1210 may include malware creator information, malware tactic information, malware attack group prediction, malware similarity prediction information, and malware spread degree prediction information.

As described above, the framework 1210 generating prediction information related to various malware or attack activities may store the generated prediction information in the database 2200. In addition, the generated predicted information may be provided to the user according to a user request or attack symptom.

As described above, the server 2100 may provide the cyber threat information related to the input file after post-processing the analysis information or prediction information stored in the database 2200.

The processor of the server 2100 determines the type of malware and the risk level of the malware based on the generated analysis information or prediction information.

The processor of the server 2100 may generate profiling information about the malware. The database 2200 may store a result of performing self-analysis on a file through file analysis or a result of performing additional and predictive analysis.

The cyber threat information provided to the user by the server 2100 may include information on which the preprocessing is performed, generated or identified analysis information, generated prediction information, aggregate information of these pieces of information, or information determined based on these pieces of information.

As for the provided cyber threat information, analysis information stored in a database in relation to the input file may be used, or the analyzed or predicted information may be included.

According to an embodiment, when a user inquires about not only malicious activity for an input file but also cyber threat information for a previously stored file or malicious activity, information thereon may be provided.

Such integrated analysis information may be stored in a standardized format in a server or database in response to the corresponding file. Such integrated analysis information may be stored in a standardized format and used for searching for or inquiring about cyber threat information.

An embodiment may analyze an input file and identify an attack activity from the analyzed file. The embodiment can identify the attacking activity in the file by matching the malicious code of the file with the detailed elements of the attacking activity commonly recognized by cyber security expert groups.

According to an embodiment, it is possible to identify the attack activity or attack technique (TTP) based on the database storing cyber threat information in the file and the matching relation for each attack activity or attack technique (TTP).

As an example of a database storing the attack activity of such a security expert group, a database storing information of MITRE ATT&CK, etc. may be exemplified. MITRE ATT&CK is a database on an actual security attack technique or activity, and by displaying specific security attack techniques or activities as components in a matrix format, attack techniques and activities may be identified in a specific data set format.

MITRE ATT&CK classifies content of attack techniques of hackers or malware for each attack stage and expresses the content as a matrix of common vulnerabilities and exposures (CVE) code.

The embodiment identifies specific attack activity among various attack activities by analyzing cyber threat information in the file, and allows an identified type of attack activity to be matched with attack code recognized by expert groups and actually performed, so that attack activity identification may be expressed by professional and commonly recognized elements.

In this embodiment, the server 2100 and the intelligence platform 10000 are described as different elements for convenience in describing the embodiment, but the intelligence platform 10000 may be performed by at least one processor in the server 2100.

Meanwhile, the embodiments of processing cyber threat information may be included as hardware or software in various types of high-performance computing servers or distributed cloud servers and function as a part of the servers.

In this case, cyber threat information can be processed and provided from data or files included not only in communication between user clients and servers, but also in communication between servers or communication between servers and devices such as small terminals and vehicles according to the disclosed embodiments.

Since the embodiments disclosed below can be implemented with a miniaturized computing device or software, they are not limited to a specific location and may even be included in space vehicles such as satellites.

For example, it is possible to process data according to the embodiment below to determine what kind of cyber threat information is contained in data or files received by a satellite or a spacecraft.

In the following embodiments, when a device or software receives data, files, or information received from the outside, the embodiments in which cyber threat information is processed from the received data, files, or information and the result is provided to the user are disclosed in detail.

Figure 3:
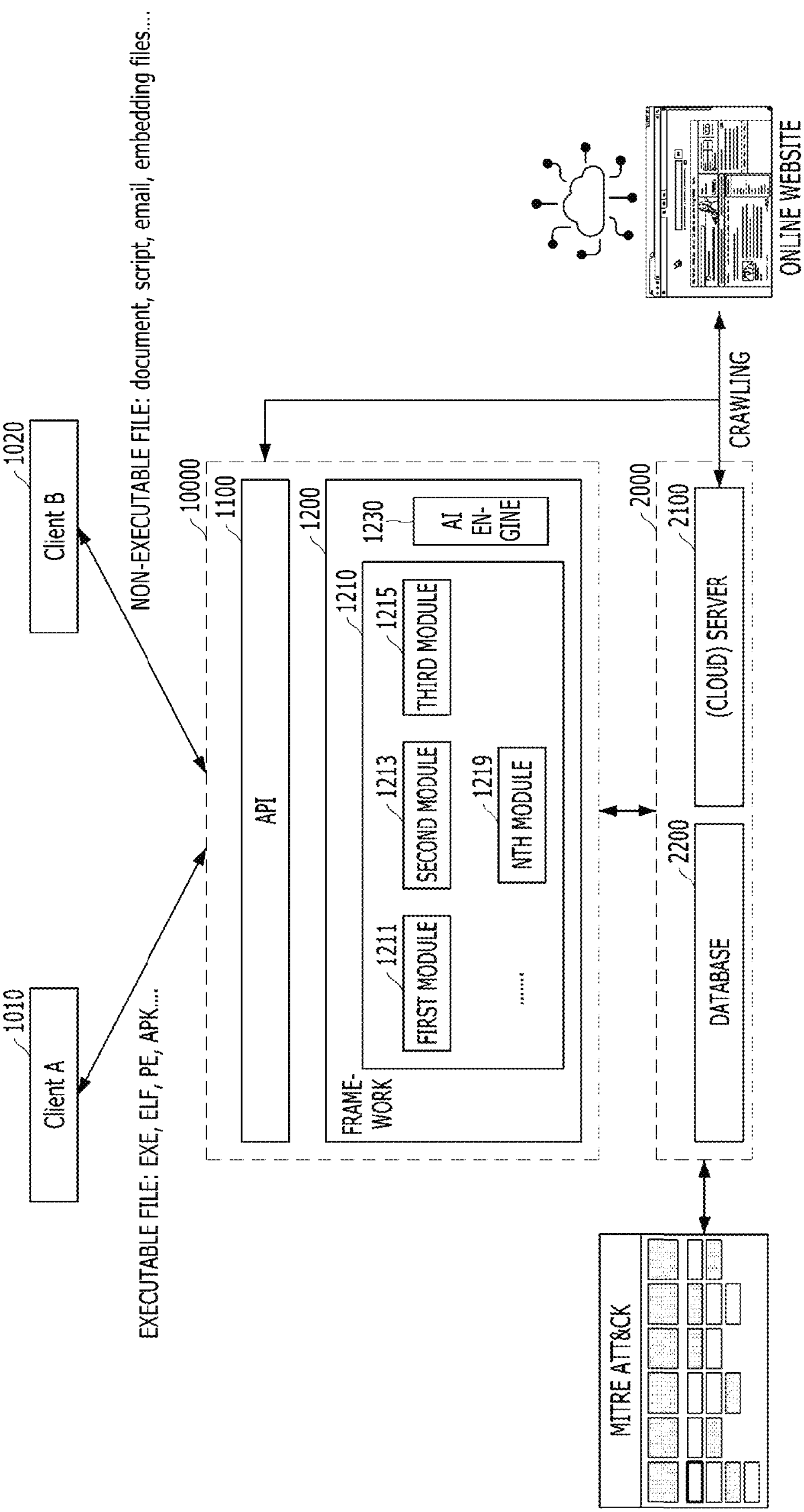
FIG. 3 is a diagram illustrating another embodiment of a cyber threat information processing apparatus.

FIG. 3 is a diagram illustrating another embodiment of a cyber threat information processing apparatus.

The intelligence platform 10000 may include an API 1100, a framework 18000, an analysis and prediction module 18100 that executes various algorithms and execution modules, and an AI engine 1230.

Here, an embodiment in which the intelligence platform 10000 analyzes and provides cyber threat information by receiving or collecting files is disclosed.

The intelligence platform 10000 may receive executable files from the client 1010 of a specific user. Here, the executable files such as EXE, ELF (Executable and Linkable Format), PE (Portable Executable), APK (Android Application Package), and the like are illustrated.

The intelligence platform 10000 may receive a non-executable file from the client 1020 of a specific user. Here, non-executable files are document files, script files, e-mails, etc. other than executable files that are directly executed. The non-executable files may also refer to embedded files that may include malicious codes or executable files.

Meanwhile, the server 2100 that operates the intelligence platform 10000 may itself directly collect various executable files or non-executable files such as external websites through internet.

The intelligence platform 10000 or the server 2100 running the intelligence platform 10000 analyzes cyber threat information from files received from users or directly collected, and provides various information so that the users can efficiently recognize attack activities or attack techniques (TTPs).

Hereinafter, embodiments in which cyber threat information processing devices such as the intelligence platform 10000 or server 2100 analyze executable files or non-executable files, and provide cyber threat information to users are sequentially disclosed.

Here, an embodiment in which a cyber threat information processing device such as the intelligence platform 10000 or the server 2100 analyzes an executable file is disclosed.

Figure 4:
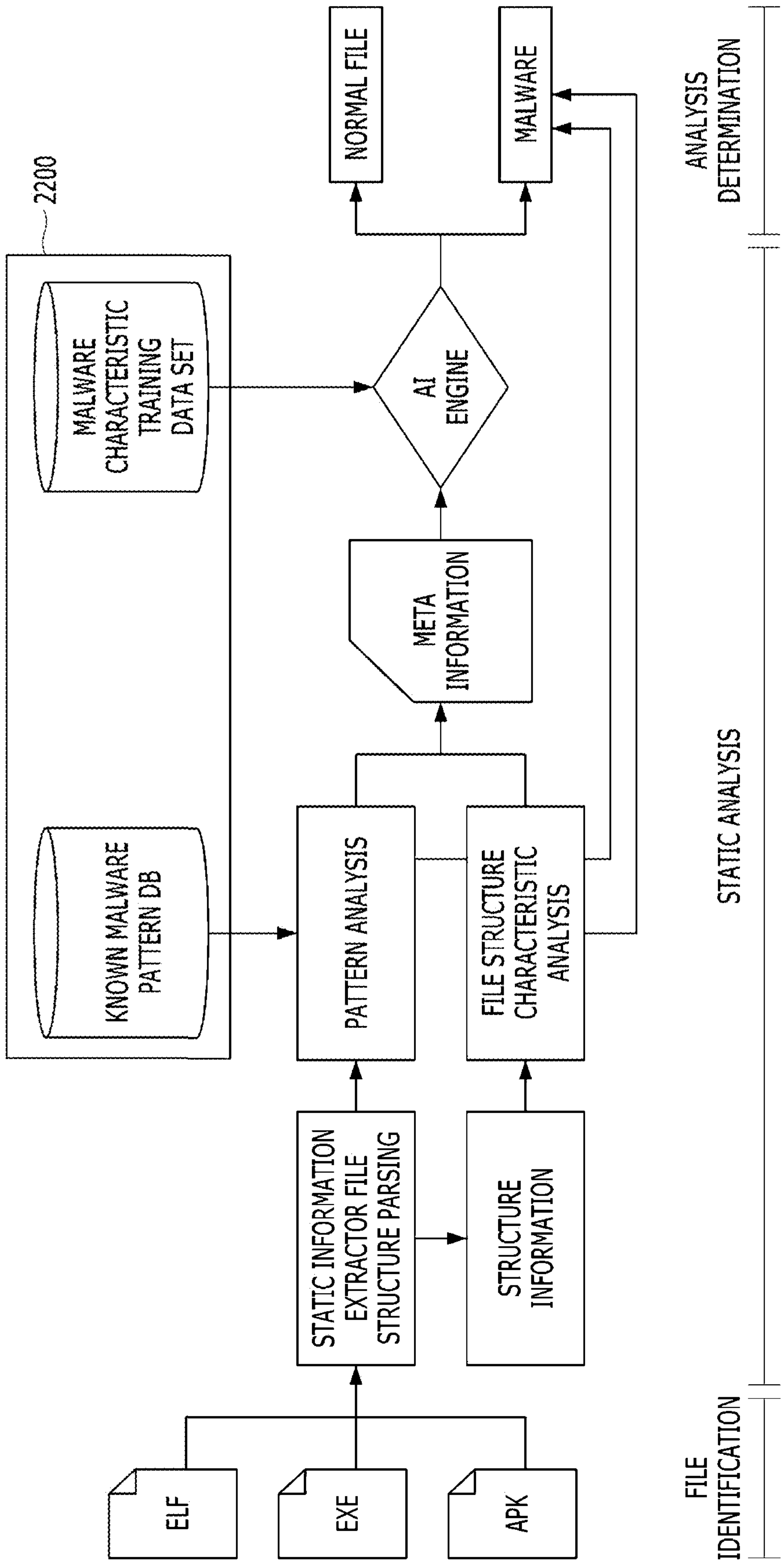
FIG. 4 is a diagram illustrating an example of performing static analysis according to a disclosed embodiment.

FIG. 4 illustrates an example of performing static analysis according to a disclosed embodiment. An example of a static analysis method for processing executable files according to an embodiment will be described with reference to the drawings.

As described, the type of file may be identified in a preprocessing step before performing static analysis or in an initial step of static analysis. This figure illustrates the case in which ELF, EXE, and ARK files are identified as types of files for convenience. However, application of the embodiment is not limited thereto.

Static analysis or detection of malware may be performed based on a process of comparing the characteristics of the file itself with a previously identified pattern database.

A static information extractor may obtain structure information by parsing a structure of the input file.

A pattern in the structure of the parsed file may be compared with a pattern of malware previously stored in the database (DB) 2200.

The structure characteristics and patterns of the parsed file may be meta information of the parsed file.

Although not illustrated in the example disclosed above, a machine learning engine may be used in the static analysis of the disclosed embodiment. The database 2200 may store a data set including the learned characteristics of the previously stored malware.

The AI engine may learn meta information obtained from the parsed file through machine learning, and compare the meta information with a data set previously stored in the database 2200 to determine whether the file is malware.

Structural characteristics of a file analyzed as malware through static analysis may be saved again as a data set related to the malware.

Figure 5:
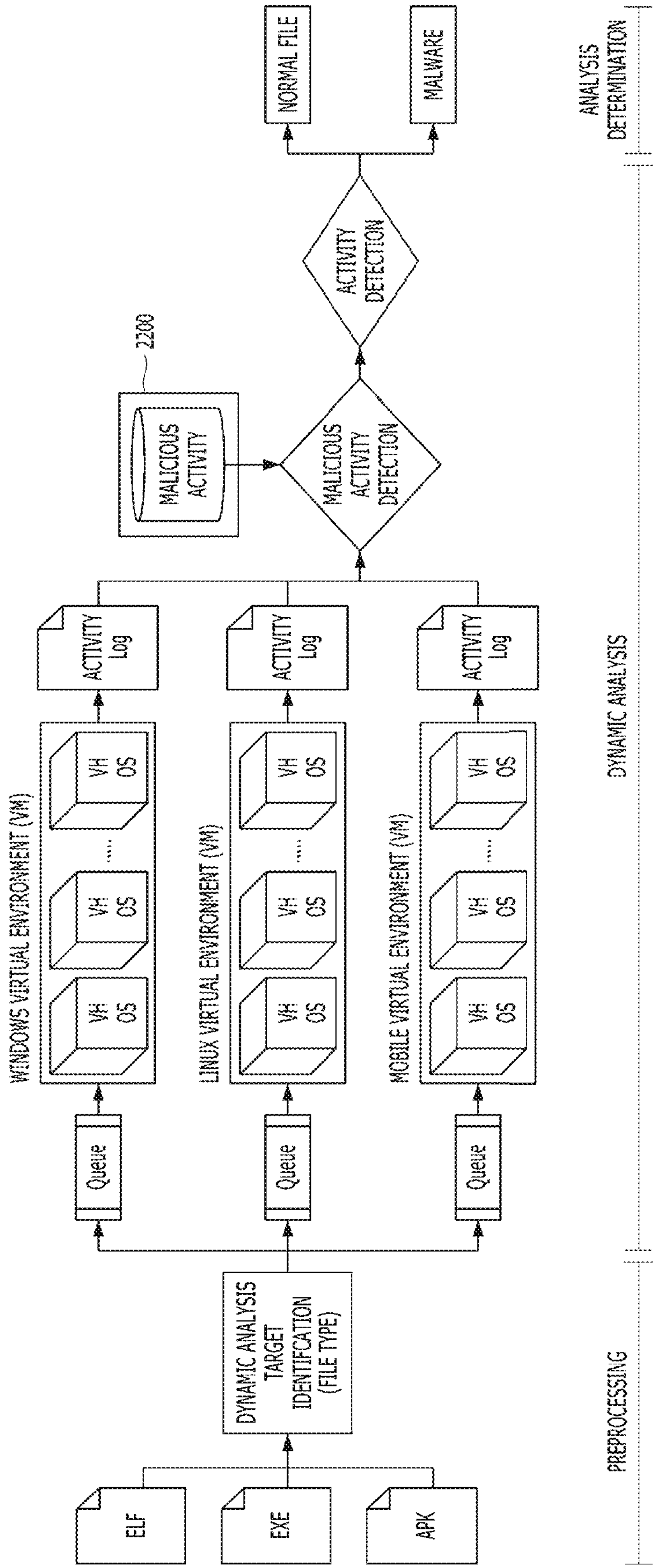
FIG. 5 is a diagram illustrating an example of performing dynamic analysis according to a disclosed embodiment.

FIG. 5 illustrates an example of performing dynamic analysis according to a disclosed embodiment. An example of a dynamic analysis method for processing executable files according to an embodiment will be described with reference to the drawings.

As described, the type of file may be identified in a preprocessing step before performing dynamic analysis or in an initial step of the dynamic analysis. Similarly, in this example, the case where ELF, EXE, and ARK files are identified as types of files is illustrated for convenience.

Through preprocessing, a type of file subjected to dynamic analysis may be identified. The identified file may be executed in a virtual environment according to a sort and type of each file.

For example, when the identified file is an ELF file, the file may be executed in an operating system of a Linux virtual environment (virtual machine, VM) through a queue.

An event that occurs when the ELF file is executed may be recorded in an activity log.

In this way, Windows, Linux, and mobile operating systems are virtually built for each type of identification file, and then an execution event of a virtual system is recorded.

In addition, execution events of the malware previously stored in the database 2200 may be compared with recorded execution events. Although not illustrated above, in the case of dynamic analysis, execution events recorded through machine learning may be learned, and it may be determined whether the learned data is similar to execution events of previously stored malware.

In the case of dynamic analysis, a virtual environment needs to be constructed according to the file, which can increase the size of the analysis and detection system.

FIG. 6 illustrates an example of disassembling malware to determine that a file includes malicious activity as an example of the in-depth analysis.

As described above, when the executable file is disassembled, opcode and ASM code, which are assembly language code types, may be obtained.

For example, a specific function A in an EXE executable file may be converted into disassembled code including opcode or disassembled code through a disassembler.

When the EXE executable file is malware causing malicious activity, disassembled code set causing the malicious activity may be obtained by disassembling a function or code segment that causes such activity.

The disassembled code set may include opcode set or a set combining opcode and ASM code corresponding to the malicious activity or malware.

Even when the malicious activity is the same, since a disassembly result of the executable file or an algorithm of the malware causing the activity to be performed is not exactly the same, whether the input malware corresponds to a specific disassembled code set may be identified through AI-based similarity analysis.

This malicious activity corresponding to a specific disassembled code set may be used to identify an attack technique (TTP) by being matched with a professional and public tactic or attack technique such as MITRE ATT&CK.

Alternatively, an opcode set or a set combining opcode and ASM code in a specific disassembled code may be used to determine an attack technique by being matched with the attack technique elements defined in MITRE ATT&CK.

This figure illustrates an example in which the executable file, the disassembled code set of the executable file, and the attack technique corresponding to the attack technique elements in the MITRE ATT&CK correspond to each other.

Figure 7:
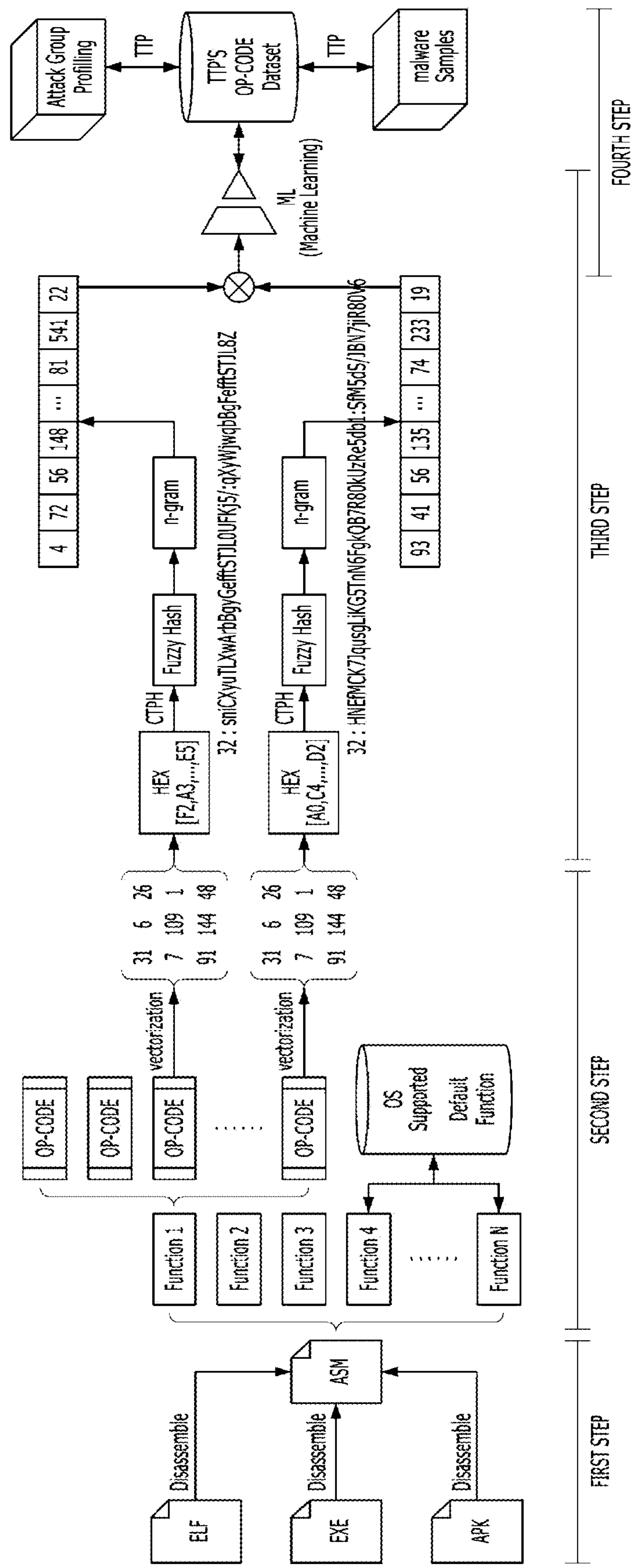
FIG. 7 is a diagram illustrating a flow of processing cyber threat information according to a disclosed embodiment.

FIG. 7 is a diagram illustrating a flow of processing cyber threat information according to a disclosed embodiment.

A case where the file identified in this figure is an executable binary file of ELF, EXE, and ARK will be described as an example. The processing of this step is related to the in-depth analysis described above.

First, a detailed example of a process of extracting the disassembled code including the opcode code as a first step will be described as follows.

When source code is complied, an executable file is created.

The raw source code is generated as new data in a form suitable for processing by a machine by a compiler in each executable OS environment. The newly constructed binary data is in a form that is not suitable for human reading, and thus it is impossible for a human to understand the internal logic by interpreting the file created in the form of an executable file.

However, a reverse process is performed for vulnerability analysis of the security system and for various purposes to perform interpretation or analysis of machine language, which is referred to as a disassembly process as described above. The disassembly process may be performed according to a CPU of a specific operating system and the number of processing bits (32-bit, 64-bit, etc.).

Disassembled assembly code may be obtained by disassembling each of the illustrated ELF, EXE, and ARK executable files.

The disassembled code may include code in which opcode and ASM code are combined.

The embodiment may extract the opcode and ASM code from an executable file by analyzing the executable file based on a disassembly tool.

The disclosed embodiment does not use the extracted opcode and ASM code without change, and reconstructs the opcode array by reconstruction for each function. When the opcode array is rearranged, the data may be reconstructed so that the data may be sufficiently interpreted by including the original binary data. Through this rearrangement, the new combination of the opcode and the ASM code provides basic data that can identify the attacker as well as the attack technique.

A process (ASM) of processing assembly data as a second step will be described in detail as follows.

Assembly data processing is a process of analyzing similarity and extracting information based on data reconstructed in a human or computer-readable form after separating only the opcode and the necessary ASM code.

In this step, the disassembled assembly data may be converted into a certain data format.

Such conversion of the data format may be selectively applied without needing to apply all of the conversion methods described below to increase data processing speed and accurately analyze data.

Various functions may be extracted from the assembly data of the rearranged opcode and ASM code combination.

When one executable file is dissembled, it is possible to include, on average, about 7,000 to 12,000 functions, depending on the size of the program. Some of these functions are implemented by a programmer as needed, and some of the functions are provided by default in the operating system.

When the actual ASM code is analyzed, about 87% to 91% of the functions are basically provided by the operating system (OS supported), and the ASM code actually implemented by the programmer for the program logic is about 10%. The functions provided by the operating system are functions included in various DLL and SO files basically installed when the operating system is installed along with function names (default functions). These operating system-provided functions may be previously analyzed and stored to be filtered from analysis target data. By separating only code to be analyzed in this way, processing speed and performance may be increased.

In the embodiment, in order to accurately perform functional analysis of a program, the opcode may be processed by being separated into function units. The embodiment may perform the minimum unit of all semantic analysis based on a function included in assembly code.

In order to increase analysis performance and processing speed, the embodiment may filter out operator-level functions having inaccurate meaning, and remove functions having the information amount smaller than a threshold value from analysis. Whether or not to filter the functions and a degree of filtering may be set differently depending on the embodiment.

The embodiment may remove annotation data provided by the disassembler during output from the opcode organized according to the function. In addition, the embodiment may rearrange the disassembled code.

For example, the disassembled code output by the disassembler may have the order of [ASM code, opcode, and parameter].

The embodiment may remove parameter data from the assembly data and rearrange or reconstruct the disassembled code of the above order in the order of [opcode and ASM code]. The reassembled disassembled code is easy to process by being normalized or vectorized. In addition, the processing speed may be significantly increased.

In particular, in disassembled code having a combination of [opcode and ASM code], an ASM code segment has different data lengths, making comparison difficult. Therefore, in order to check uniqueness of the corresponding assembly data, the data may be normalized into a data format of a specific size. For example, in order to check uniqueness of the disassembled code of the [opcode and ASM code] combination, the embodiment may convert a data part into a data set of a specific length that is easy to normalize, for example, cyclic redundancy check (CRC) data.

As an example, in the disassembled code of the [opcode and ASM code] combination, it is possible to convert an opcode segment into CRC data of a first length and an ASM code segment into CRC data of a second length, respectively.

Normalized data converted from the opcode and the ASM code may maintain uniqueness of each code before the corresponding conversion, respectively. Vectorization may be performed on the normalized data in order to increase similarity determination speed of the normalized data converted with uniqueness.

As described above, normalization or vectorization processes as a data conversion process may increase data processing speed and selectively apply accurate data analysis.

Detailed examples of the normalization process and the vectorization process are again described in detail below.

As a third step, a process of analyzing data for analyzing the disassembled code will be described in detail as follows.

In this process, conversion of various data formats may be used to increase data processing speed and to accurately analyze data. Some of the conversion methods described below may be selectively applied without the need to apply all the methods.

This step is a step of analyzing the malware and similarity based on a data set for each function in converted disassembled code based on the converted data.

The embodiment may convert vectorized opcode and ASM code data sets back into byte data in order to perform code-to-code similarity operation.

Based on the byte data converted again, a block-unit hash value may be extracted, and a hash value of the entire data may be generated based on the block-unit unique value.

The hash value may be compared by extracting a hash value of a unit designated to extract a unique value of each block unit in order to efficiently perform block-unit comparison, which is a part of byte data.

A fuzzy hashing technique may be used to extract the hash value of the designated unit and compare similarity of two or more pieces of data. For example, the embodiment may determine similarity by comparing a hash value extracted in block units with a hash value in some units in a pre-stored malware using the CTPH method in fuzzy hashing.

In summary, the embodiment generates a unique value of disassembled code of the opcode and the ASM code in order to confirm uniqueness of each specific function based on the fact that the combination code of the opcode and the ASM code implements specific functions in units of functions. In addition, it is possible to perform a similarity operation by extracting a unique value in block units in the opcode and the ASM code of the disassembled code based on this unique value.

A detailed example of extracting a block-unit hash value will be disclosed with reference to the drawings below.

As described above, the embodiment may use a block-unit hash value when performing a similarity operation.

The extracted block-unit hash value includes String Data (Byte Data), and String Data (Byte Data) is numerical values enabling comparison of similarity between codes. When comparing bytes of billions of disassembled code data sets, a significantly long time may be consumed to obtain a single similarity result.

Therefore, according to the embodiment, String Data (Byte Data) may be converted into a numerical value. Based on the numerical value, similarity analysis can be rapidly performed using AI technology.

The embodiment may vectorize String Data (Byte Data) of the hash value of the extracted block unit based on N-gram data. The embodiment of this figure illustrates the case in which a block-unit hash value is vectorized into 2-gram data in order to increase the operation speed. However, in the embodiment, it may be unnecessary to convert the block-unit hash value into 2-gram data, and the block-unit hash value may be vectorized and converted into 3-gram, 4-gram, . . . , N-gram data. In N-gram data, as N increases, the characteristics of the data may be accurately reflected. However, the data processing time increases.

As described above, in order to increase the data processing speed and to accurately analyze data, byte conversion, hash conversion, and N-gram conversion below may be selectively applied.

The illustrated 2-gram conversion data has a maximum of 65,536 dimensions. As the dimension of the training data increases, a distribution of the data becomes sparse, which may adversely affect classification performance. In addition, as the dimension of the training data increases, temporal complexity and spatial complexity for learning the data increase.

The embodiment may address this problem by various natural language processing algorithms based on various text expressions. In this embodiment, Term Frequency-Inverse Document Frequency (TF-IDF) technique will be described as an example of such an algorithm.

As an example for processing the similarity of the training data in this step, when determining an attack identifier or class (T-ID) from high-dimensional data, the TF-IDF technique may be used to select a meaningful feature (pattern). In general, the TF-IDF technique is used to find documents having high similarity in a search engine, and equations for calculating this value are as follows.

$$tf(t, d) = \frac{f_{t,d}}{\sum_{t \in d} f_{t,d}} \quad \text{[Equation 1]}$$

Here, tf(t,d) denotes a frequency of a specific word t in a specific document d, and has a higher value as the word repeatedly appears.

$$idf(t, D) = \log\frac{N}{|\{d \in D: t \in d\}|} \quad \text{[Equation 2]}$$

idf(t,D) denotes a reciprocal value of a proportion of the document d including the specific word t, and has a lower value as the word appears more frequently in several documents.

$$tf - idf(t, d, D) = tf(t, d) \times idf(t, D) \quad \text{[Equation 3]}$$

tf–idf(t,d, D) is a value obtained by multiplying tf(t,d) by idf(t,D), and may quantify which word is more suitable for which document.

The TF-IDF method is a method of using a word frequency according to Equation 1 and an inverse document frequency (inverse number specific to the frequency of the document) according to Equation 2 to reflect a weight according to an importance of a word in a document word matrix as in Equation 3.

In an embodiment, a document including a corresponding word may be inferred as an attack identifier (T-ID) based on a characteristic or pattern of a word in block-unit code. Therefore, when the TF-IDF is calculated with respect to a pattern extracted from the block-unit code, a pattern that appears frequently within a specific attack identifier (T-ID) may be extracted, or code having a pattern unrelated to the specific attack identifier (T-ID) may be removed.

For example, assuming that a specific pattern A is a pattern expressed in all attack identifiers (T-IDs), a TF-IDF value for the specific pattern A may be measured low. In addition, it may be determined that such a pattern is an unnecessary pattern to distinguish an actual attack identifier (T-ID). An algorithm for determining similarity of natural language, such as TF-IDF, may be performed through learning of a machine learning algorithm.

The embodiment may reduce unnecessary calculations and shorten inference time by removing such an unnecessary pattern.

In detail, the embodiment may perform a similarity algorithm based on text representation of various types of natural language processing on the converted block-unit code data. Through the similarity algorithm, by removing the code of the pattern unrelated to the attack identifier, execution of the algorithm performed below and execution of the classification process according to machine learning may be greatly shortened.

The embodiment may perform classification modeling to classify a pattern of an attack identifier based on a feature or pattern on block-unit code. The embodiment may learn whether a vectorized block-unit code feature or pattern is a pattern of a known attack identifier, and classify the code feature or pattern by an accurate attack technique or implementation method. The embodiment uses various ensemble machine learning models to categorize an accurate attack implementation method, that is, an attack identifier and an attacker, for code determined to have a code pattern similar to that of malware.

The ensemble machine learning models are techniques that generate several classification nodes from prepared data, and combine node predictions for each classification node, thereby performing accurate prediction. As described above, the ensemble machine learning models that classify the attack implementation method of the word feature or pattern in the block-unit code, that is, the attack identifier or the attacker, are performed.

When applying the ensemble machine learning models, a threshold value for classification of prepared data may be set to prevent excessive detection and erroneous detection. Only data above the set detection threshold value may be classified, and data that does not reach the set detection threshold value may not be classified.

As described, conversion of several data formats may be used to increase the data processing speed and to accurately analyze the data. A specific embodiment in which the above-described data conversion method is applied to ensemble machine learning models will be described in detail below.

As a fourth step, a profiling process for identifying and labeling an attack technique (TTP) will be described as follows.

An example of vectorizing through extraction of a feature of disassembled code including opcode and ASM code of input binary data based on an previously analyzed attack code or malware has been described above.

The vectorized data is classified as a specific attack technique after being learned through machine learning modeling, and the classified data is labeled in a profiling process for classified code.

Labeling may be largely performed in two parts. One is to attach a unique index to an attack identifier defined in a standardized model, and the other is to write information about a user creating attack code.

Labeling is assigned according to an attack identifier (T-ID) reflected in a standardized model, for example, MITRE ATT&CK, so that accurate information may be delivered to the user without additional work.

In addition, labeling is assigned to distinguish not only an attack identifier but also an attacker implementing the attack identifier. Therefore, labeling may be provided so that it is possible to identify not only an attack identifier, but also an attacker and an implementation method accordingly.

In an embodiment, advanced profiling is possible based on data learned from a data set of disassembled code (opcode, ASM code, or a combination thereof) previously classified. In an embodiment, data of the static analysis, dynamic analysis, or correlation analysis disclosed above may be utilized as reference data for performing labeling. Therefore, even when a data set has not been previously analyzed, profiling data may be obtained significantly rapidly and efficiently by considering results of static, dynamic, and correlation analysis together.

The process of learning code having a pattern similar to that of the malware and classifying the learned data in the third step and the profiling process of the classified data in the fourth step may be performed together by an algorithm in machine learning.

A detailed example thereof is disclosed below. In addition, an actual example of the profiled data set is illustrated with reference to the drawings below.

FIG. 8 is a diagram illustrating values obtained by converting opcode and ASM code of disassembled code into normalized code according to a disclosed embodiment.

As described above, when the executable file is disassembled, data, in which opcode and ASM code are combined, is output.

The embodiment may remove annotation data output for each function from the disassembled data and change the arrangement order of the opcode, ASM code, and corresponding parameter to facilitate processing.

The reconstructed opcode and ASM code are changed to normalized code data, and the example of this figure illustrates CRC data as normalized code data.

For example, the opcode may be converted into CRC-16 and the ASM code may be converted into CRC-32.

In a first row of an illustrated table, a push function of the opcode is changed to CRC-16 data of 0x45E9, and 55 of the ASM code is changed to CRC-32 data of 0xC9034AF6.

In a second row, a mov function of the opcode is changed to CRC-16 data of 0x10E3, and 8B EC of the ASM code is changed to CRC-32 data of 0x3012FD2C. In a third row, a lea function of the opcode is changed to CRC-16 data of 0xAACE, and 8D 45 0C of the ASM code is changed to CRC-32 data of 0x9214A6AA.

In a fourth row, a push function of the opcode is changed to CRC-16 data of 0x45E9, and 50 of the ASM code is changed to CRC-32 data of 0xB969BE79.

Unlike this example, it is possible to use normalized code data different from CRC data or code data having a different length.

When the disassembled code is changed to a normalized code in this way, it is possible to easily and rapidly perform subsequent calculation, similarity calculation, and vectorization while ensuring uniqueness of each code.

FIG. 9 is a diagram illustrating vectorized values of opcode and ASM code of disassembled code as an example of data conversion of a disclosed embodiment.

This figure illustrates results of vectorizing code of a normalized opcode (CRC-16 according to the example) and a normalized ASM code (CRC-32 according to the example), respectively.

A vectorized value of the code of the normalized opcode (opcode Vector) and a vectorized value of the code of the normalized ASM code (ASM code Vector) are illustrated in a table format in this figure.

The T opcode vector value and the ASM code vector value of each row of this figure correspond to the normalized value of the opcode and the normalized value of the ASM code of each row illustrated above, respectively.

For example, vectorized values of CRC data 0x45E9 and 0xB969BE79 in the fourth row of the table are 17897 and 185 105 121 44 in a fourth row of the table of this figure, respectively.

When vectorization is performed on the normalized data in this way, the disassembled opcode function and ASM code are changed to vectorized values while each including unique features.

FIG. 10 is a diagram illustrating an example of converting a block unit of code into a hash value as an example of data conversion of a disclosed embodiment.

In order to perform similarity analysis, the vectorized data set of each of the opcode and the ASM code is reconverted into a byte data format. The reconverted byte data may be converted into a block-unit hash value. Further, based on the hash values in the block unit, a hash value of the entire reconverted byte data is generated again.

In an embodiment, to calculate the reconverted hash value, hash values such as MD5 (Message-Digest algorithm 5), SHA1 (Secure Hash Algorithm 1), and SHA 256 may be used, and a fuzzy hash function for determining similarity between pieces of data may be used.

The first row of the table in this figure represents human-readable characters that may be included in the data. In the reconverted byte data, a value included in a block unit may include such readable characters.

The characters may each correspond to 97, 98, 99, 100, . . . , 48, 49, which are ASCII values (ascii val) in a second row.

Data including character values in a first row may be segmented and separated into blocks in which ASCII values can be summed.

A third row of the table shows the sum of ASCII values corresponding to respective character values within a block unit having 4 characters.

The first block may have a value of 394, which is the sum (ascii sum) of ASCII values (ascii val) 97, 98, 99, and 100 corresponding to the characters in the block.

In addition, the last row shows the case where the sum of ASCII values in block units is converted into base-64 expression. The letter K is the sum of the first block.

In this way, a signature referred to as Kaq6KaU may be obtained for the corresponding data.

Based on such a signature, it is possible to calculate similarity of two pieces of block-unit data.

In this embodiment, a hash value may be calculated using a fuzzy hash function for determining similarity for block units included in code in reconverted byte data, and similarity may be determined based on the calculated hash value. Even though context triggered piecewise hashing (CTPH) is illustrated as a fuzzy hash function for determining similarity, it is possible to use other fuzzy hash functions that can calculate similarity of data.

Figure 11:
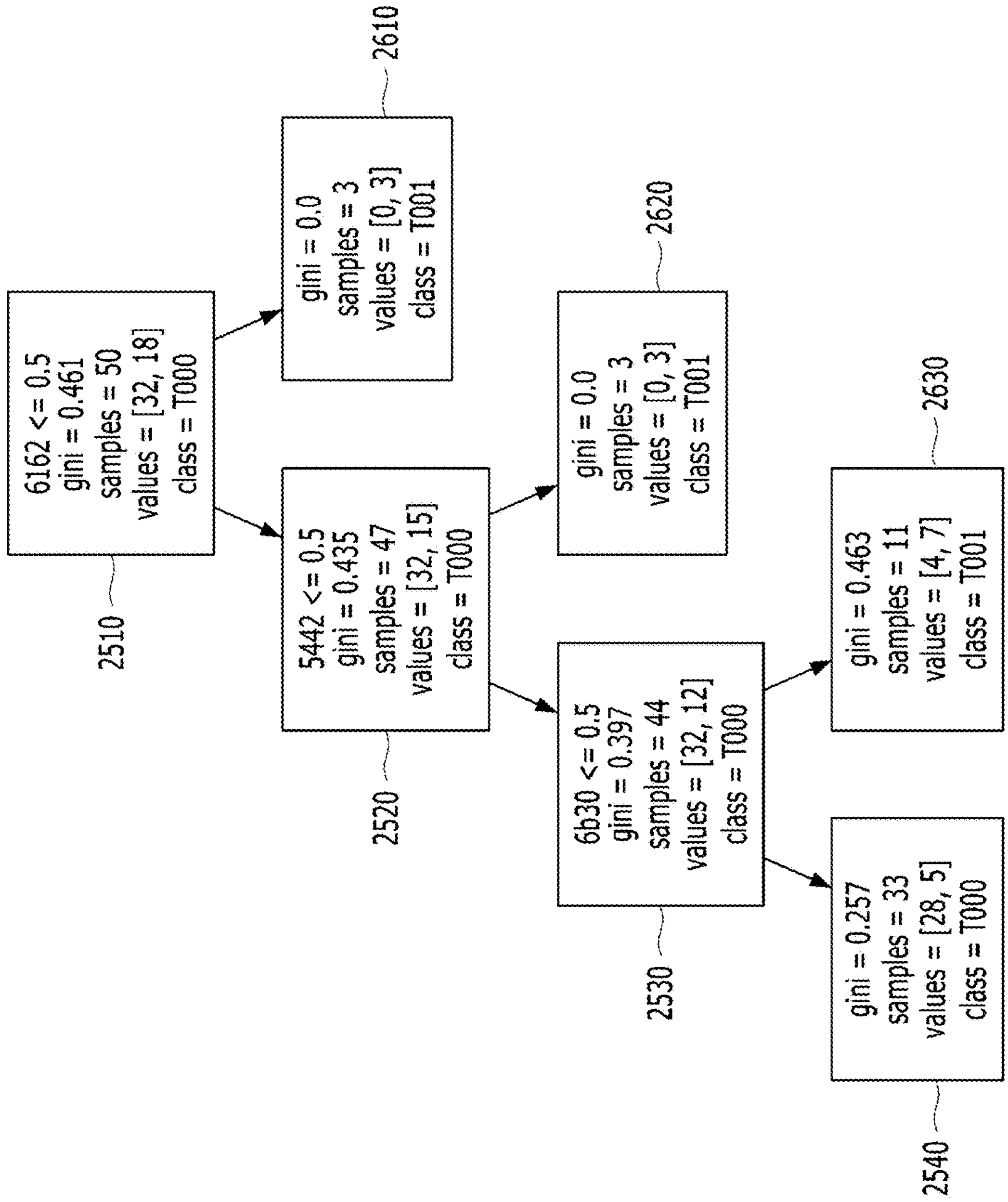
FIG. 11 is a diagram illustrating an example of an ensemble machine learning model according to a disclosed embodiment.

FIG. 11 is a diagram illustrating an example of an ensemble machine learning model according to a disclosed embodiment.

An embodiment may accurately classify an attack identifier (T-ID) of a file determined to be malware by using an ensemble machine learning model.

The hash value of the block unit including String Data (Byte Data) may be digitized based on N-gram characteristic information, and then similarity may be calculated using a technique such as TF-IDF to determine whether the value is an attack identifier (T-ID) or a class to be classified.

In order to increase performance of identifying an attack technique by reducing unnecessary operations, the embodiment may remove unnecessary patterns based on similarity among the hash values.

In addition, attack identifiers may be classified by modeling data, from which unnecessary patterns are removed, through ensemble machine learning.

There are methods such as voting, bagging, and boosting as a method of combining learning results of several classification nodes of an ensemble machine learning model. An ensemble machine learning model that properly combines these methods may contribute to increasing classification accuracy of training data.

Here, a method of more accurately classifying an attack identifier will be described by taking the case of applying the random forest method of the bagging method as an example.

The random forest method is a method of generating a large number of decision trees to reduce classification errors due to a single decision tree and obtaining a generalized classification result. An embodiment may apply a random forest learning algorithm using at least one decision tree for prepared data. Here, the prepared data refers to data from which unnecessary patterns are removed from the fuzzy hash value in block units.

A decision tree model having at least one node is performed to determine similarity of a block-unit hash value. It is possible to optimize a comparison condition for a feature value (here, the number of expressions of classification patterns based on block-unit hash values) capable of distinguishing one or more classes (attack identifier; T-ID) according to a degree of information gain of a decision tree.

To this end, a decision tree illustrated in the figure may be generated.

In this figure, upper quadrilaterals 2510, 2520, 2530, and 2540 are terminal nodes indicating conditions for classifying classes, and the lower quadrants 2610, 2620, and 2630 indicate classes classified as terminal nodes.

For example, when a random forest model is applied as an ensemble machine learning model, the model is a classification model that uses an ensemble technique using one or more decision trees. Various decision trees are constructed by varying characteristics of input data of a decision tree included in the random forest model. Classification is performed on several generated decision tree models, and a final classification class is determined using a majority vote technique. A test of each node may be performed in parallel, resulting in high computational efficiency.

When classifying a class, threshold values are set to prevent excessive detection and erroneous detection, a value less than a lower threshold value is discarded, and classification may be performed for data of a detection threshold value or more.

Figure 12:
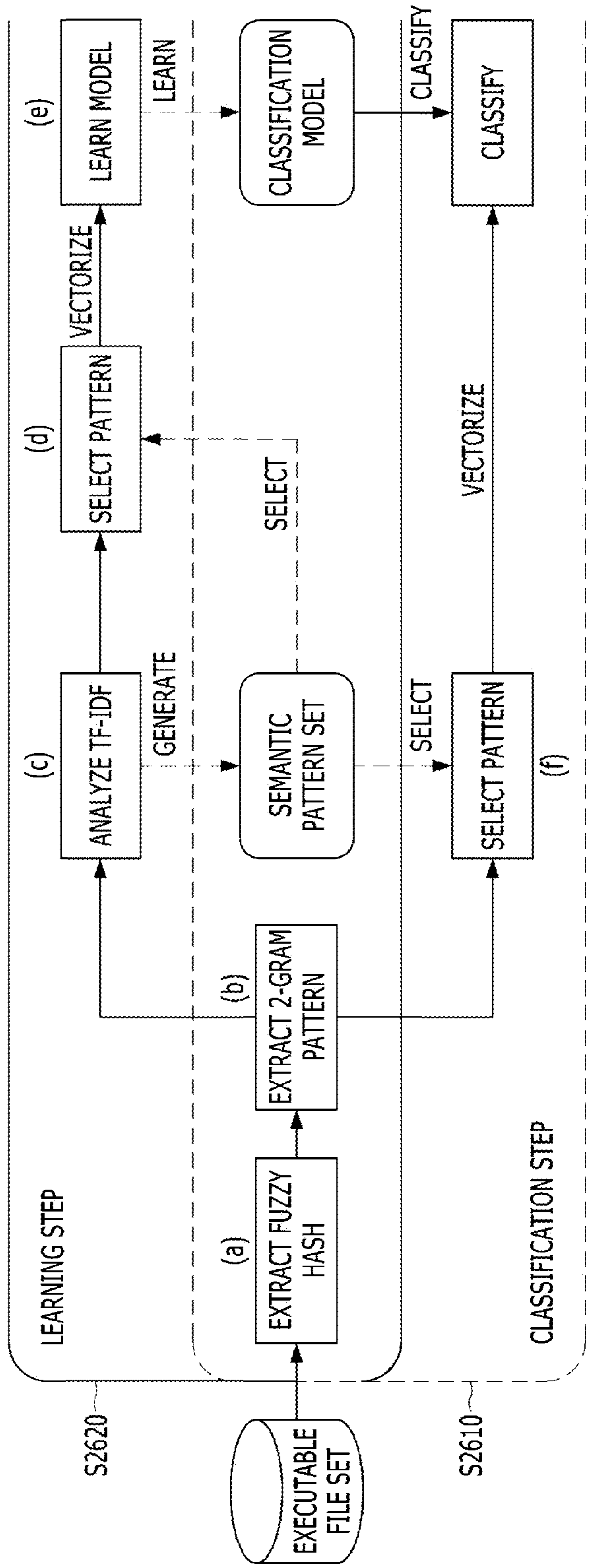
FIG. 12 is a diagram illustrating a flow of learning and classifying data by machine learning according to a disclosed embodiment.

FIG. 12 is a diagram illustrating a flow of learning and classifying data by machine learning according to a disclosed embodiment.

Profiling of input data may include a classification step (S2610) and a learning step (S2620).

In an embodiment, the learning step (S2620) may include (a) a hash value extraction process, (b) an N-gram pattern extraction process, (c) a natural language processing analysis (TF-IDF analysis) process, (d) a pattern selection process, (e) a model learning process, etc.

Further, in an embodiment, the classification step (S2610) may include (a) a hash value extraction process, (b) an N-gram pattern extraction process, (f) a pattern selection process, (g) a classification process by vectorization, etc.

The classification step (S2610) in a profiling step according to the embodiment will be first described as follows.

Input data is received from an executable file set or processed files.

Input data is received from executable file sets stored in the database, or input data including an executable file delivered from the processing process illustrated above is received. The input data may be data obtained by converting disassembled code including opcode and ASM code, and may be vectorized data.

A fuzzy hash value is extracted from the disassembled code, which is the input data, (a), and N-gram pattern data for a specific function is extracted (b). In this case, 2-gram pattern data including patterns determined to be similar to malware among the existing semantic pattern sets may be selected (f).

The N-gram data of the selected pattern may be converted into vectorized data, and the vectorized data may be classified as a function, a semantic pattern of which is determined, (g).

The learning step (S2620) in the profiling step according to the embodiment is performed as follows.

When input data is a new file, a fuzzy hash value is extracted from disassembled code that is the input data (a).

The extracted fuzzy hash value is vectorized into N-gram data (2-gram in this example) (b).

Natural language processing analysis such as TF-IDF is performed on an extracted specific pattern (c).

A data set having high similarity is selected among data sets having patterns related to an existing attack identifier (T-ID), and the remaining data sets are filtered (d). In this instance, it is possible to select sample data sets including some or all features of the data sets having patterns related to the attack identifier (T-ID) by comparing with data sets stored in an existing semantic pattern set.

It is possible to learn vectorized N-gram data based on the extracted sample data set (e).

A probability is obtained for each attack identifier (T-ID) by inputting the vectorized N-gram data into the classification model. For example, it is possible to obtain A % as a probability that vectorized data of an N-gram structure is a specific attack identifier (T-ID) T1027, and obtain (100-A) % as a probability that vectorized data of an N-gram structure is an attack identifier T1055.

An ensemble machine learning model such as a random forest including at least one decision tree may be used as the classification model.

Here, it is possible to determine an attack technique or attacker of the vectorized N-gram data based on the classification model.

Labeling is performed by classifying input data according to a classification result of the classification model (e) or a selection (f) result of the existing stored pattern (g).

A result of final labeling is illustrated with reference to the following drawings.

FIG. 13 is a diagram illustrating an example in which an attack identifier and an attacker are labeled by learning and classifying input data according to a disclosed embodiment.

This figure is a diagram illustrating each of an attack identifier, an attacker or an attack group, a fuzzy hash value corresponding to assembly code, and an N-gram corresponding thereto (indicated as 2-gram data here) in tabular form as a result of the profiler.

According to an embodiment, when profiling is completed, it is possible to obtain classified data in relation to implementation of the following tactic.

According to profiling according to the embodiment, it is possible to perform labeling with an attack identifier (T-ID) and an attacker or an attacker group (Attacker or Group).

Here, the attack identifier (T-ID) may follow the standardized model as described. In this example, a result of assigning the attack identifier (T-ID) provided by MITRE ATT&CK® is exemplified.

Labeling may be added to the identified attacker or attacker group (Attacker or Group) as described above. This figure illustrates an example in which the attacker TA504 is identified by labeling of the attacker or attacker group (Attacker or Group).

SHA-256 (size) indicates a fuzzy hash value and data size of malware corresponding to each attack identifier (T-ID) or attacker group (Attacker or Group). As described above, such malware may correspond to the rearrangement and combination of opcode and ASM code.

In addition, a value of a section marked with N-gram is N-gram pattern data corresponding to the attack identifier (T-ID) or the attacker group and a fuzzy hash value of malware, and is displayed as a part of 2-gram data in this example.

As illustrated in this figure, fuzzy hash values of malware (opcode and ASM code) and attack identifiers (T-IDs) or attacker groups corresponding to N-gram pattern data may be labeled and stored.

The illustrated labeled data may be used as reference data for ensemble machine learning, and may be used as reference data for a classification model.

Figure 14:
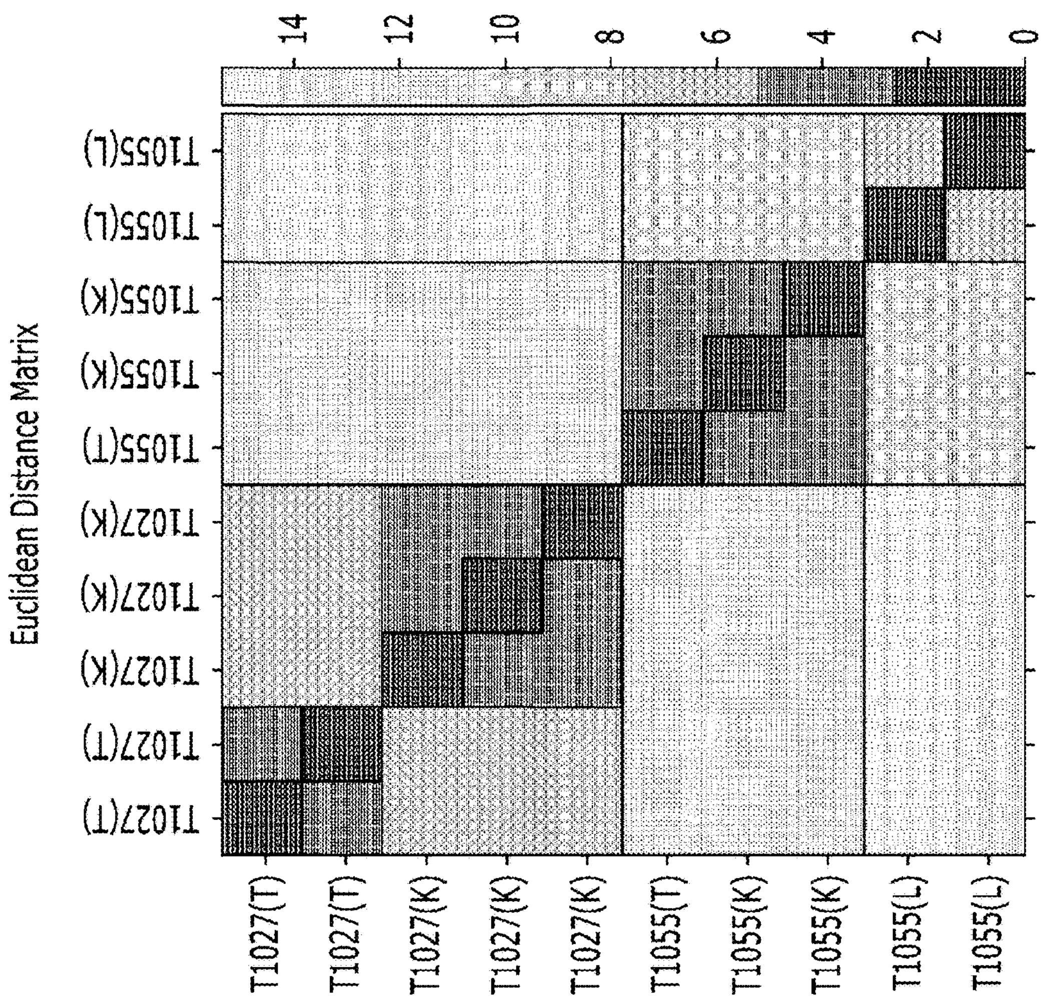
FIG. 14 is a diagram illustrating a result of identifying an attack identifier according to an embodiment.

FIG. 14 is a diagram illustrating a result of identifying an attack identifier according to an embodiment.

This figure illustrates a Euclidean distance matrix, which may represent similarity between two data sets.

In this figure, a bright part indicates that the similarity between the two data sets is low, and the dark part indicates that the similarity between the two data sets is high.

In this figure, T10XX denotes an attack identifier (T-ID), and characters T, K, and L in parentheses denote an attacker group creating an attack technique according to the corresponding attack identifier (T-ID).

That is, the row and column indicate attack identifiers (T-IDs) generated by respective attacker groups (T, K, and L), and row and column have the same meaning. For example, T1055 (K) indicates an attack T1055 created by the attacker group L, and T1055 (K) indicates the same tactic T1055 created by the attacker group K.

Since samples of each data set include the samples, when distances from other samples are calculated respectively, a distribution, in which uniformity is high in a diagonal direction from the top left to the bottom right, is obtained.

Referring to this figure, it can be seen that the same attack identifier (T-ID) exhibits similar characteristics even when the attacker groups are different. For example, even when the attack group is T or K, the attack identifier of T1027 may have high similarity when the attack technique is similar.

Therefore, when learning is carried out based on the extracted data set as in the above embodiment, it can be found that the characteristics of the same attack technique (T-ID) implemented by the same attacker are clearly identified (darkest part), and similarity of the same attack technique (T-ID) implemented by other attackers is high (middle dark part).

Therefore, when the attack technique is classified by extracting and applying the sample data based on the combination of the opcode and the ASM code in this way, even if the attacker is different, a specific attack technique or identifier (T-ID) may be reliably classified. Conversely, by the combination of the opcode and the ASM code, it is possible to clearly identify specific code implemented inside malware, as well as identify an attack implementation method including an attacker and an attack identifier.

Figure 15:
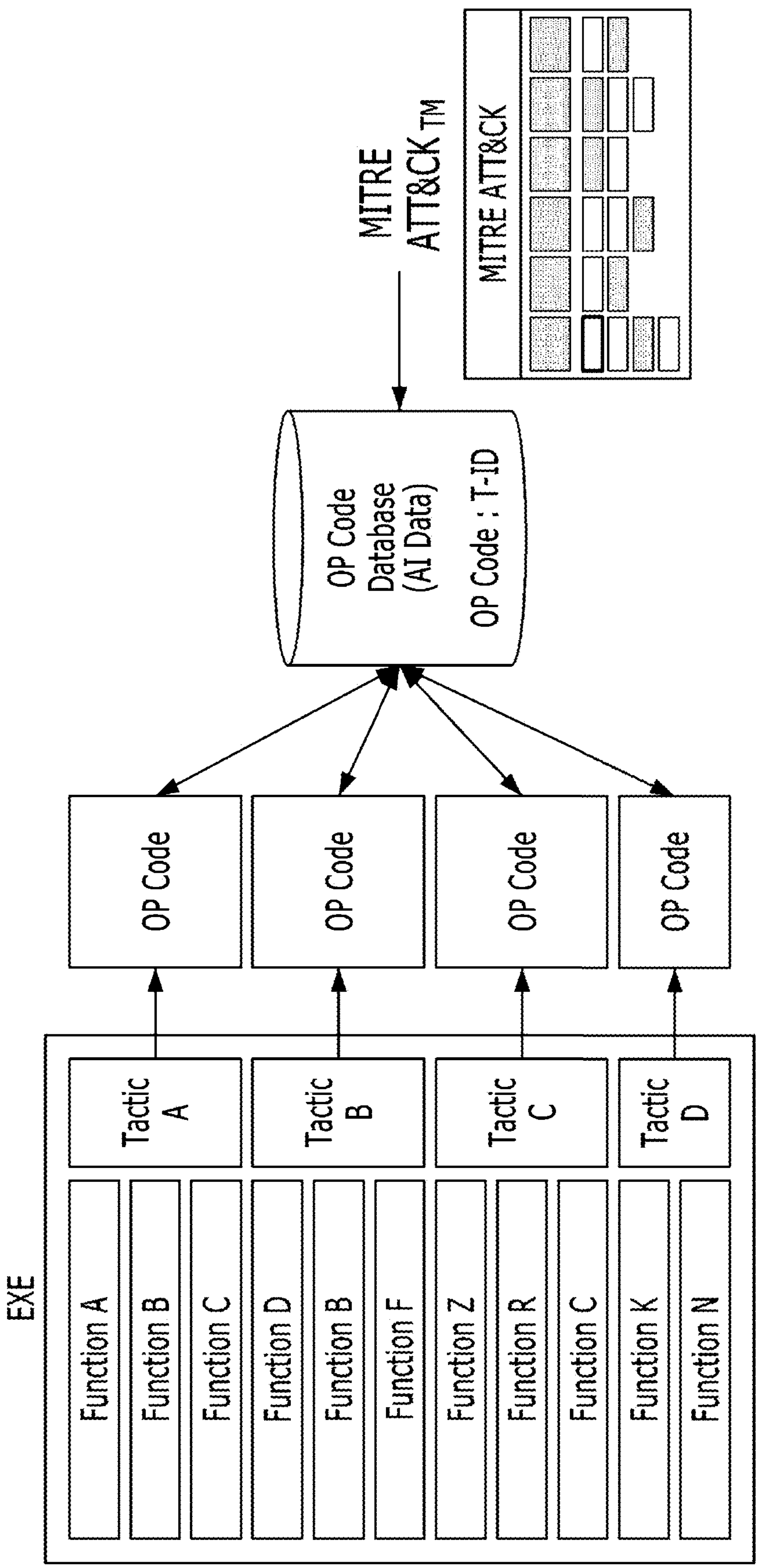
FIG. 15 is a diagram illustrating an example of matching an attack technique with code extracted from binary code according to a disclosed embodiment.

FIG. 15 illustrates an example of matching an attack technique with code extracted from binary code according to a disclosed embodiment. Here, an example of using a standardized model as an example of matching an attack technique is disclosed.

Here, MITRE ATT&CK® Framework is exemplified as a standardized model.

For example, in terms of cybersecurity, "malicious activity" is interpreted differently depending on the analyst, and is interpreted differently depending on the insight of each person in many cases.

Internationally, many efforts are being made among experts to standardize "malicious activity" that occurs on the system and to ensure that everyone makes the same interpretation. MITRE (https://attack.mitre.org), a non-profit R&D organization that performs national security-related tasks with support from the US federal government, studied the definition of "malicious activity" and created and announced the ATT&CK® Framework. This framework was defined so that everyone can define the same "malicious activity" for cyber threats or malware.

MITRE ATT&CK® Framework (hereinafter referred to as MITRE ATT&CK®) is an abbreviation of Adversarial Tactics, Techniques, and Common Knowledge, which summarizes latest attack technology information of attackers. MITRE ATT&CK® is standardized data obtained by analyzing tactics and techniques of adversary behaviors of an attacker after observing actual cyberattack cases to classify and list information on the attack techniques of various attack groups.

MITRE ATT&CK® is a systematization (patterning) of threatening tactics and techniques to improve detection of advanced attacks with a slightly different point of view from the concept of the traditional Cyber Kill Chain. Originally, ATT&CK started by documenting TTP, which are methods (Tactics), techniques, and procedures, for hacking attacks used in corporate environments using Windows operating systems in MITRE. Since then, ATT&CK has developed into a framework that may identify activity of the attacker by mapping TTP information based on analysis of a consistent attack activity pattern generated by the attacker.

The malicious activity mentioned in the disclosed embodiment may be expressed by matching the malware to the attack technique based on a standardized model such as MITRE ATT&CK®, and the malware may be identified and classified for each element and matched to an attack identifier regardless of the standardized model.

The example of this figure conceptually illustrates a scheme of matching the malicious activity of the malware to the attack technique based on the MITRE ATT&CK model.

An executable file EXE may include various functions (Function A, B, C, D, E, . . . , N, . . . , Z) executed when the file is executed. A function group including at least one of the functions may perform one tactic.

In the example of this figure, functions A, B, and C correspond to tactic A, and functions D, B, and F correspond to tactic B. Similarly, functions Z, R and C correspond to tactic C, and functions K and F correspond to tactic D.

The embodiment may match a set of functions corresponding to each tactic and a specific disassembled code segment. The database stores attack identifiers (T-IDs) of tactics, techniques, and procedures (TTP) that can correspond to disassembled code previously learned by AI.

Attack identifiers (T-IDs) of tactics, techniques, and procedures (TTP) follow a standardized model, and the example in this figure illustrates MITRE ATT&CK® as a standardized model of cyber threat information.

Accordingly, the embodiment may match result data extracted from the disassembled code in the binary file with the standardized attack identifier. A more specific scheme of matching an attack identifier is disclosed below.

Figure 16:
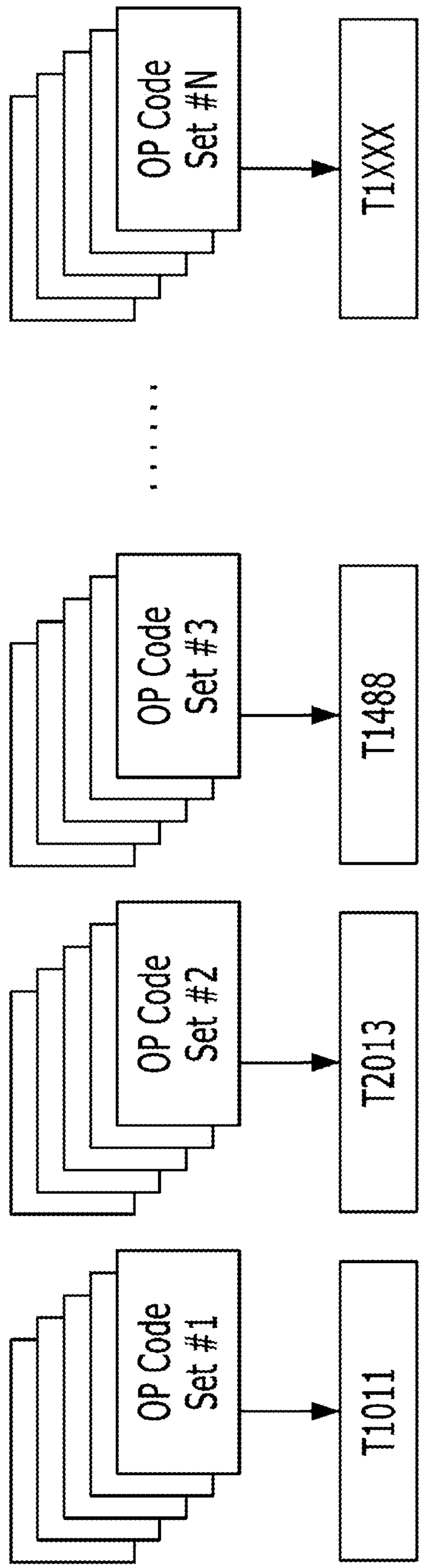
FIG. 16 is a diagram illustrating an example of matching an attack technique with a code set including opcode according to a disclosed embodiment.

FIG. 16 is a diagram illustrating an example of matching an attack technique with a code set including opcode according to a disclosed embodiment.

Most AI engines use a data set learned based on various characteristic information of malware to identify the malware. Then, whether the malware is malicious is determined. However, in this way, it is difficult to describe a reason why the malware is malware. However, as illustrated, when the standardized tactic (TTP) identifier is matched, it is possible to identify a type of threat included in the malware. Accordingly, the embodiment may accurately deliver cyber threat information to a security administrator and enable the security administrator to systematically manage cyber threat information over the long term.

When generating a dataset for AI learning to identify a tactic (TTP) based on the disassembled code, the embodiment not only distinguishes only the identifier or labeling of the tactic (TTP), but also can reflect characteristics of a scheme of implementing the tactic (TTP) as an important factor.

Even malware that implements the same tactic (TTP) is impossible to generate with the same code depending on the developer. That is, even though the tactic (TTP) is described in the form of human oral language, an implementation method and a code writing method are not the same depending on the developer.

Such a difference in coding depends on the ability of the developer or scheme or habit of implementing the program logic, and this difference is expressed as a difference between binary code or opcode and ASM code obtained by disassembling the binary code.

Therefore, when an attack identifier is simply assigned or matched according to the type of the resulting tactic (TTP), it is difficult to accurately identify an attacker or a group of attackers generating the malware.

Conversely, when modeling is performed by reflecting the characteristics of the disassembled opcode and ASM code as important variables, it is possible to identify a developer developing specific malware or a specific attack tool, or even an automatically created tool itself.

The disclosed embodiment may generate threat intelligence, which is significantly important in modern cyber warfare, according to the unique characteristics of the disassembled opcode and ASM code combined code. That is, based on these unique characteristics, the embodiment may identify a scheme of operating the attack code or malware, a person developing the attack code or malware, and the development purpose.

In the future, based on characteristic information about continuous attacks by the attacker, it will be possible to supplement a vulnerable system and to enable an active and preemptive response to cybersecurity threats.

Based on this concept, the embodiment provides a completely different result from that in the method and performance of simply identifying an attack technique according to an attack result based on the opcode.

The embodiment may generate a data set of disassembled code based on the characteristics of the combination of the disassembled opcode and ASM code to accurately identify and classify the coding technique used to implement the tactic (TTP). When modeling is performed to identify unique characteristics from this generated data set, it is possible to identify not only the tactic (TTP) but also characteristic information of the developer, that is, the developer (or automated creation tool).

This figure illustrates an example of matching an opcode data set modeled in the manner described above to an attack identifier.

This example illustrates that a first opcode set (opcode set #1) matches an attack technique identifier T1011, and a second opcode set (opcode set #2) matches an attack technique identifier T2013. Further, a third opcode set (opcode set #3) may match an attack technique identifier T1488, and an Nth opcode set (opcode set #N) matches an arbitrary attack technique identifier T1XXX. While the standardized model, MITRE ATT&CK®, expresses the identifier of the attack technique in a matrix format for each element, the embodiment may additionally identify an attacker or an attack tool in addition to the identifier of the attack technique.

This figure is illustrated as an opcode data set for convenience. However, when an attack technique is identified by a data set of disassembled code including opcode and ASM code, it is possible to identify a more subdivided attack technique comparing to identifying an attack technique only by an opcode data set.

According to an embodiment, by analyzing a combination of disassembled code data sets, it is possible to identify not only the attack technique identifier but also the attacker or the attack group.

Accordingly, the embodiment may provide a more advanced technology in terms of acquiring intelligence information when compared to the conventional technology, and solve problems that have not been solved in the conventional security area.

Fast data processing and algorithms are required to ensure accurate intelligence information in the complex environment as described above. Hereinafter, additional embodiments related thereto and performance thereof will be disclosed.

Figure 17:
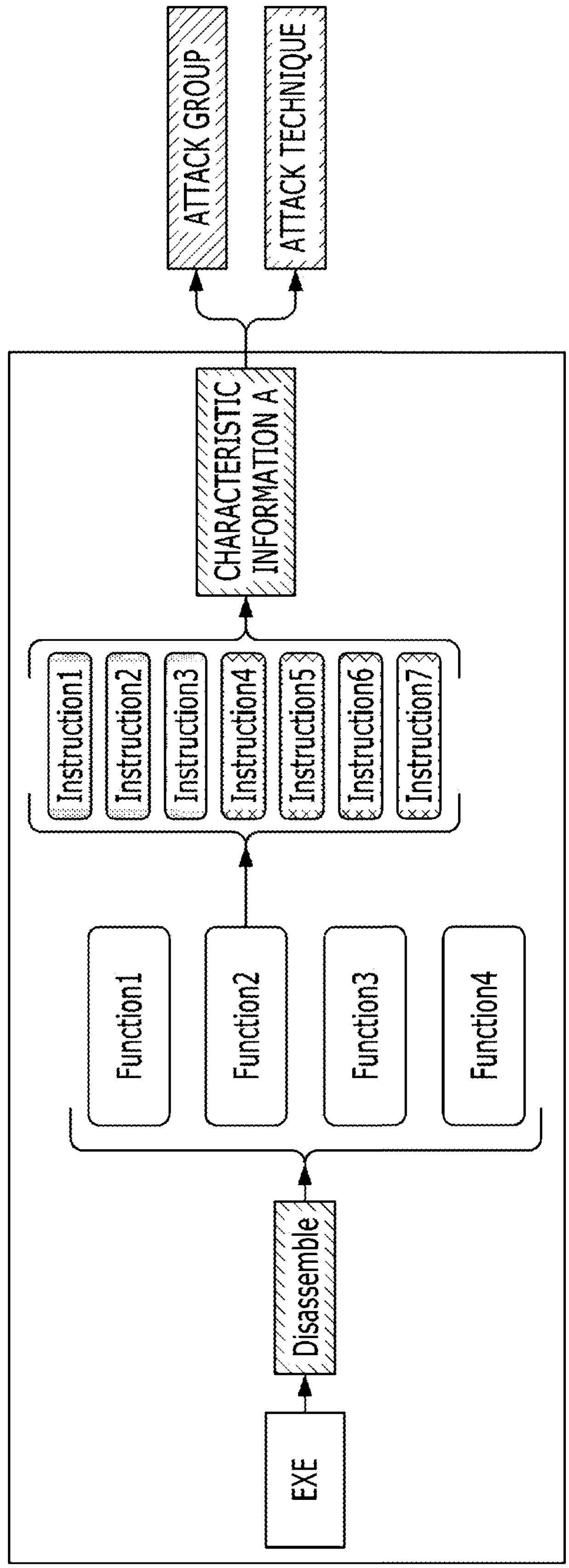
FIG. 17 is a diagram for describing an example of identifying an attack technique and an attack group in units of functions.

FIG. 17 is a diagram for describing an example of identifying an attack technique and an attack group in units of functions.

In this example, it is assumed that an executable file (for example, EXE) has been disassembled and functions included in the executable file have been identified. The functions identified here are illustrated as Function 1, Function 2, Function 3, and Function 4.

Among the identified functions, Function 2 may include instructions for performing a function operation. Here, the instructions included in Function 2 are indicated as Instruction 1, Instruction 2, Instruction 3, Instruction 4, Instruction 5, Instruction 6, and Instruction 7.

However, one function in a program may be separated and executed according to several subfunctions during execution. In this example, it is assumed that Function 2 is separated into two subfunctions and executed. Then, the two subfunctions included in Function 2 may be separated into instructions.

Here, for convenience of description, the case where Instruction 1, Instruction 2, and Instruction 3 are included in one subfunction included in Function 2, and Instruction 4, Instruction 5, Instruction 6, and Instruction 7 are included in the other subfunction is illustrated.

However, subfunctions may be included in one function, namely Function 2 in the program.

When characteristic information related to cyber threats is extracted in units of functions, one piece of characteristic information corresponding to Function 2 (cyber threat characteristic information A, simply indicated as characteristic information A) may be identified.

When the characteristic information related to the cyber threat in units of functions disclosed above is analyzed according to the above-described embodiment, an attack technique and an attack group may be identified.

Figure 18:
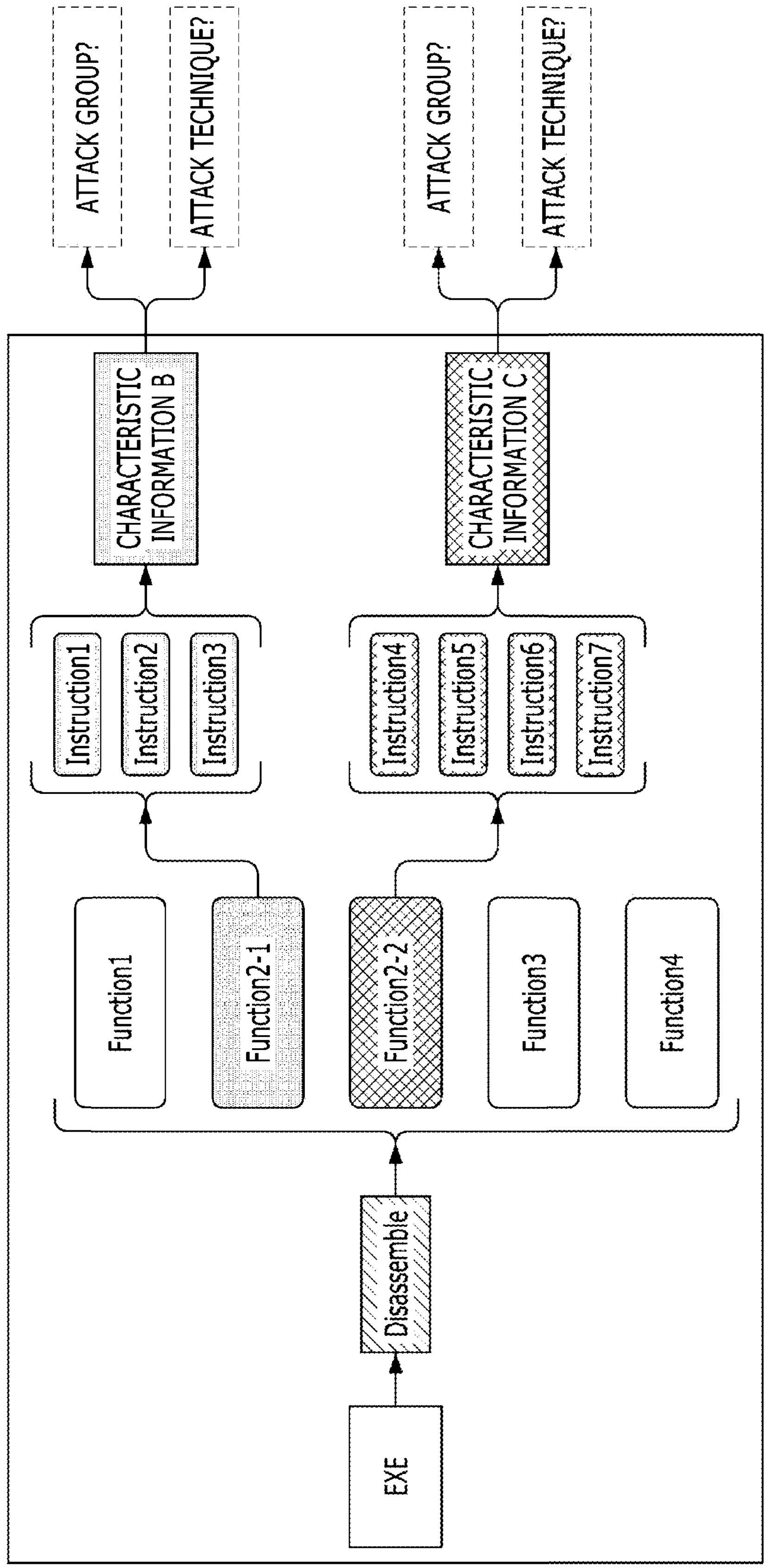
FIG. 18 is a diagram for describing an example of identifying an attack technique and an attack group when a function is separated.

FIG. 18 is a diagram for describing an example of identifying an attack technique and an attack group when a function is separated.

This embodiment is an embodiment showing the same result as that in the example disclosed above. However, here, the case in which one of the functions is clearly separated into subfunctions in the program is illustrated.

That is, the case in which Function 2 among the functions identified from the executable file is separated into Function 2-1 and Function 2-2 in the program is illustrated. Here, even when Function 2 is separated into Function 2-1 and Function 2-2, there is no change in program logic when compared to the case in which one function of Function 2 is executed.

When Function 2 is simply separated into two functions (Function 2-1 and Function 2-2) even though the program logic is the same, characteristic information (characteristic information B and characteristic information C) corresponding to each function is changed, and thus identification results of the attack technique and the attack group based on the characteristic information may be changed.

Therefore, even when the attack technique or the attack group is identified based on several functions executing the same logic in the program as that of execution of one function in this way, the attack technique and the attack group may be identified as the same attack technique and attack group.

The following embodiments disclose examples of identifying an attack technique and an attack group based on characteristic information considering a control flow and order according to instructions executed by several functions in a program.

When characteristic information is used based on a flow and order of instructions in functions of a program, characteristic information may be obtained by implementing substantially the same logic even when the functions in the program are different.

Even when a format of a program causing a cyber threat is slightly modified or even in the case of a variant, an attack technique and an attack group may be clearly identified based on this characteristic information.

Hereinafter, an example of profiling a control flow and identifying orders according to instructions in a function will be disclosed.

Figure 19:
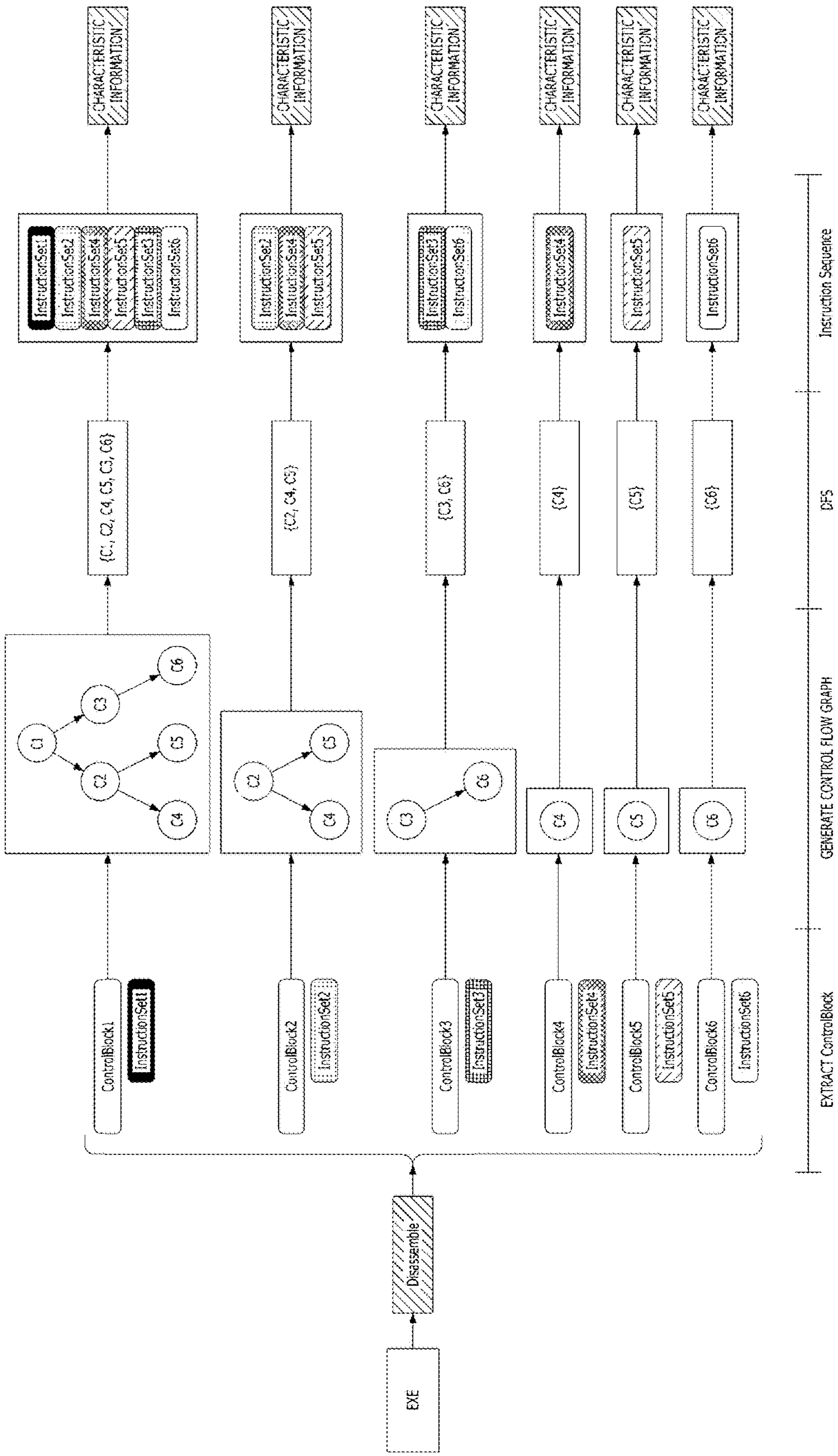
FIG. 19 is a diagram disclosing an example of obtaining characteristic information related to a cyber threat according to an embodiment.

FIG. 19 discloses an example of obtaining characteristic information related to a cyber threat according to an embodiment.

Here, ControlBlocks including various functions may be obtained by disassembling an execution function represented by EXE.

After obtaining a control flow in relation to instructions in the obtained ControlBlocks, it is possible to check the order of the ControlBlocks according to the control flow and obtain an instruction sequence based thereon.

Further, cyber threat characteristic information may be identified according to the obtained instruction sequence.

Detailed embodiments of obtaining a ControlBlock or a code block corresponding thereto have been disclosed above.

In this example, ControlBlocks obtained by disassembling the execution function EXE are represented by ControlBlock1, ControlBlock2, ControlBlock3, . . . , ControlBlock6.

Here, each of the ControlBlocks, namely ControlBlock1, ControlBlock2, ControlBlock3, . . . , ControlBlock6, may correspond to each instruction set. As described above, even though instruction sets described above are different, execution logic in each instruction set may be the same.

Therefore, the control flow is analyzed for the ControlBlocks to identify whether the ControlBlocks perform the same logic.

For example, here, in order to easily describe the embodiment, a graph analyzing a control flow of code blocks according to program execution is created and described.

For example, in an instruction set included in ControlBlock1, instructions according to an execution order are denoted by C1, C2, C3, . . . , C6. For easier understanding, in the instruction set, the instructions according to the execution order are indicated as a control flow graph (CFG).

An instruction order may be obtained in the CFG of the instructions shown in this example. Here, the obtained order is shown using a depth first search (DFS) method. The DFS method is an iterative method in which an instruction is selected as an addition node for one search tree, an applicable instruction is applied to this node, and an instruction is added as one child node of a next level to the search tree.

Then, it is possible to obtain an instruction order applied according to the instruction control flow in the instruction set corresponding to the ControlBlock.

In this example, an order according to a control flow of instructions included in instruction set 1 corresponding to ControlBlock1 may be (C1, C2, C4, C5, C3, C6).

An order according to a control flow of instructions included in instruction set 2 corresponding to ControlBlock2 may be (C2, C4, C5).

An order according to a control flow of instructions included in instruction set 3 corresponding to ControlBlock3 may be (C3, C6).

An instruction sequence according to the obtained instruction order may be generated, and characteristic information on a cyber threat may be distinguished according to the instruction sequence.

Here, an example is disclosed in which six instruction sequences are obtained by classifying instruction set 1 corresponding to ControlBlock1 according to an order according to a control flow, and one piece of characteristic information is extracted for each of the six instruction sequences.

In this way, even when one function in the program is separated or changed to functions performed with substantially the same logic, cyber threat information according to the same logic may be distinguished.

Hereinafter, various examples of obtaining instruction sequences using various control flows in ControlBlocks including various functions are disclosed.

First, an example of obtaining various control flows within included ControlBlocks is disclosed.

ControlBlocks are obtained by disassembling an executable file.

It is possible to identify an instruction referring to a specific block in the ControlBlocks or a ControlBlock outside the corresponding ControlBlocks among instructions inside the ControlBlocks. An instruction diverging in the code in this way is referred to herein as a branch instruction type.

Examples of the branch instruction type may include a call function, a jump function, etc. These functions may refer to a specific block in the ControlBlocks or a ControlBlock outside the corresponding ControlBlocks.

Accordingly, when a reference address according to such a branch instruction is identified, a control flow of instructions may be obtained.

Figure 20:
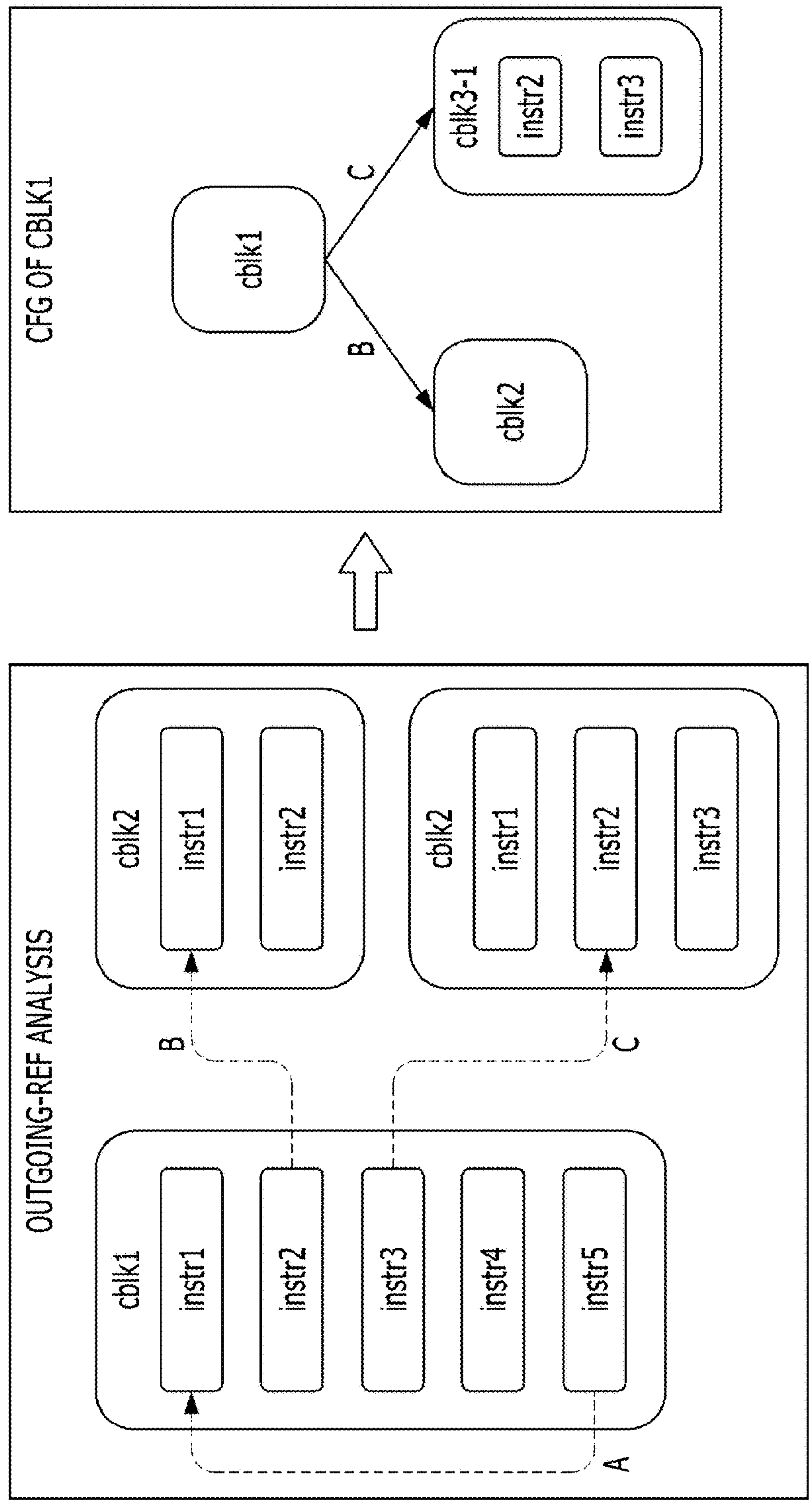
FIG. 20 illustrates a process of obtaining a control flow using a branch instruction series according to an embodiment.

FIG. 20 illustrates a process of obtaining a control flow using a branch instruction series according to an embodiment.

A disassembled ControlBlock cblk1 is extracted, and an instruction of a branch instruction type is identified inside the extracted ControlBlock cblk1.

A reference (outgoing reference, indicated as outgoing-ref) indicating an external location of the ControlBlock cblk1 among reference addresses indicating instructions of the branch instruction type diverging in code is checked.

A left side of this figure is an example for describing an example of specific outgoing reference analysis.

In this example, a reference (reference A) indicating an internal location of the ControlBlock cblk1, which is not an outgoing reference, may be ignored. That is, reference A indicates the inside of the ControlBlock cblk1, and thus may not be considered when generating a control flow.

Further, a control flow may be generated separately for the case where an outgoing reference of the ControlBlock cblk1 indicates a start address or a start instruction of another ControlBlock cblk2 (reference B) and the case where the outgoing reference of the ControlBlock cblk1 indicates an internal address or an internal instruction of another ControlBlock cblk3 (reference C).

In this example, since reference B indicates the start address or instruction of the target ControlBlock cblk2, the target ControlBlock cblk2 may be included in control flow generation without change.

Meanwhile, since reference C indicates instruction 2 (instr2) on the inside of the target ControlBlock, a new third ControlBlock cblk3-2 including instruction 2 (instr2) to a last instruction of the corresponding ControlBlock cblk3 may be included in control flow generation during ControlBlock generation.

A right side of this figure is an example of generating a control flow for a specific ControlBlock cblk1 according to the example described above.

As a result of analyzing the control flow of the ControlBlock cblk1 according to the outgoing reference analysis on the left, the control flow for the ControlBlock cblk1 may be generated.

The control flow generated according to this example may include the second ControlBlock cblk2 as a vertex within the control flow when the first ControlBlock cblk1 refers to a start address or instruction of the second ControlBlock cblk2.

Further, when the first ControlBlock cblk1 indicates an internal or intermediate location or instruction of the third ControlBlock cblk3, the generated control flow may separate the third ControlBlock cblk3 from the instruction at the indicated location, and include, as a vertex, a new ControlBlock cblk3-2 having the instruction at the indicated location as a start instruction.

According to an embodiment, when a branch instruction of a specific ControlBlock is an outgoing reference, a control flow may be generated according to a location or instruction indicated by the outgoing reference.

A control flow generated for a specific ControlBlock includes the second ControlBlock as a vertex when an outgoing reference thereof indicates a start point of the second ControlBlock. Further, when the outgoing reference indicates an intermediate location of the third ControlBlock, the generated control flow includes, as a vertex, a new ControlBlock with an instruction of the indicated location as a start instruction.

In the example of this figure, reference A of the first ControlBlock cblk1 is a reference indicating the inside of the first ControlBlock cblk1, and thus is ignored, and reference B of the first ControlBlock cblk1 indicates a start address of the second ControlBlock cblk2, and thus the second ControlBlock cblk2 is included as a vertex. Reference C of the first ControlBlock cblk1 indicates the inside of the second ControlBlock cblk2, and thus a new ControlBlock may be generated from instruction 2 of the second ControlBlock cblk2 and included as a vertex.

The example of this figure is an example in which the generated control flow is displayed as a CFG, and lower vertices are located on the left side of the graph in ascending order based on a start address of a ControlBlock cblk.

Hereinafter, an example will be disclosed below in which cyber threat characteristic information of an executable file is obtained according to an instruction sequence generated by searching for a reference relationship between ControlBlocks in which the executable file is disassembled as described above.

Instruction sequences generated according to the reference relationship may represent characteristics of cyber threat information.

The control flow generation disclosed above may generate instruction sequences by merging instructions of a ControlBlock according to an order based on a specific principle when the DFS method is used.

Hereinafter, a method of combining instruction sequences capable of obtaining characteristics of cyber threat information will be illustrated.

As a first example of combining instruction sequences, when instruction sequences are generated according to a reference relationship between instructions in a ControlBlock, an instruction sequence may be generated by performing DFS on meaningful instructions of a control flow.

Here, the meaningful instructions of the control flow mean that NOP (non-operation) or RET (return)-type functions or branch-type functions such as JUMP functions or CALL functions among instructions called in a ControlBlock are removed.

When a CFG is generated, these types of functions merely generate edges of the graph, and are not included in an actual instruction sequence. Therefore, when instructions are sequentially combined using DFS in the CFG, these types of functions do not contribute to generating an instruction sequence.

In the first example of generating instruction sequences according to a reference relationship of instructions in a ControlBlock, meaningful instructions that may be included in an actual instruction sequence are combined, and branch or simply referenced instructions are not included.

In the CFG, instructions are combined using the DFS method, and thus an instruction sequence is generated without using a branch-type instruction or a simply referenced instruction.

As a second example of generating instruction sequences according to a reference relationship between instructions in a ControlBlock, a stack frame may be adjusted when the ControlBlock is called by a CALL-type function among instructions in the ControlBlock.

The stack frame refers to a space created to distinguish functions in a stack area. For example, the stack frame may include parameters, return addresses, local variables, etc., and is created when a function is called and destroyed when the function is terminated.

In general, the stack frame includes a stack pointer sp indicating a stack start point and a base pointer bp, which is a pointer indicating specific data on a stack. When the stack frame is changed, the stack pointer sp and the base pointer bp may be changed.

Such instructions related to pointers on a stack frame serve as logic noise in a control flow, and thus are not used to combine instruction sequences, for example, using DFS. Similar to not using branch-type instructions to combine instruction sequences as illustrated above, instructions related to a stack frame are not used.

Figure 21:
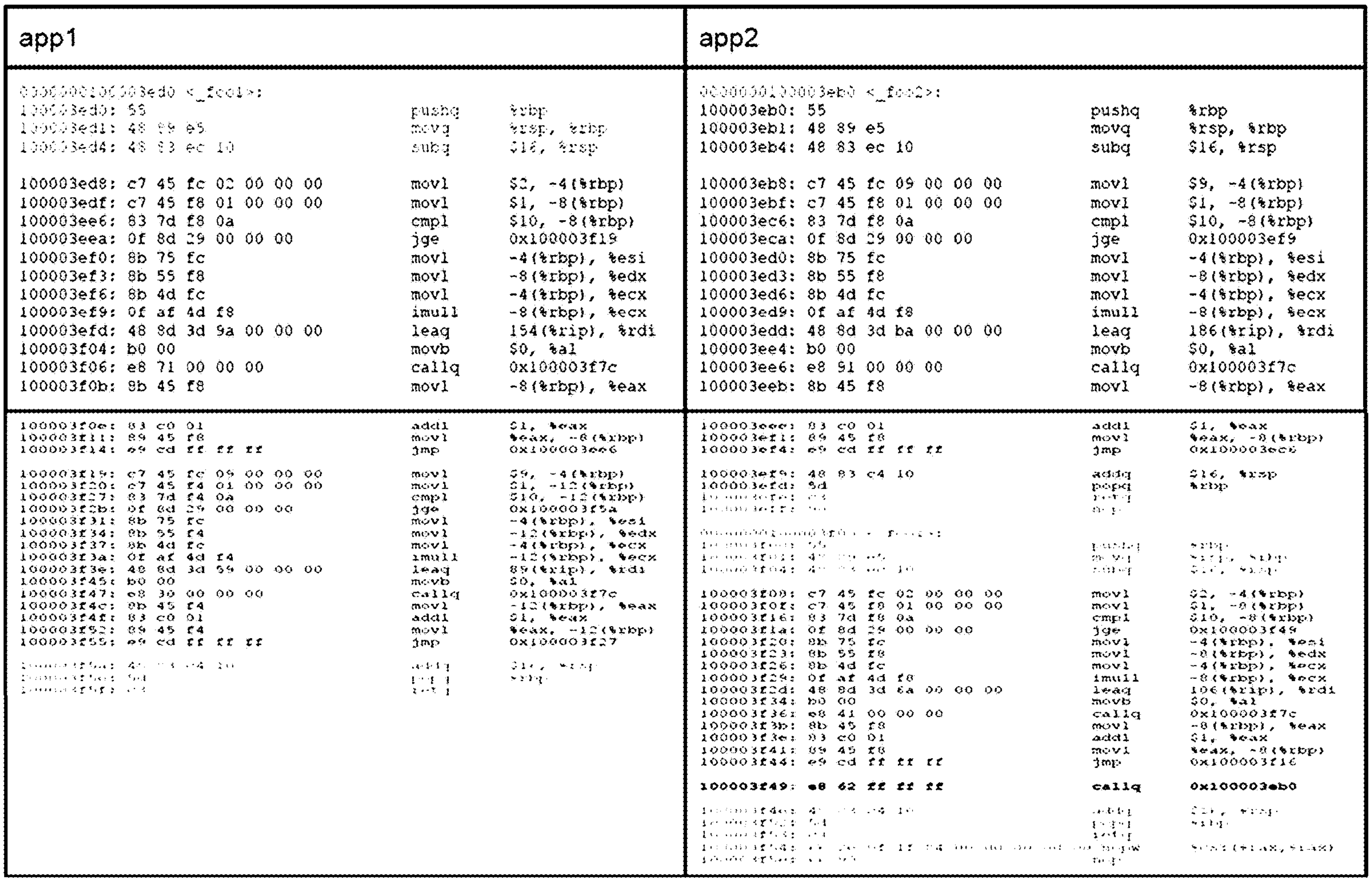
FIG. 21 is a diagram illustrating the case of generating an instruction sequence by combining instructions of a ControlBlock according to an instruction combining principle illustrated according to a second example.

FIG. 21 is a diagram illustrating the case of generating an instruction sequence by combining instructions of a ControlBlock according to an instruction combining principle illustrated according to a second example.

When a ControlBlock is called by a CALL-type function, since instructions related to a stack frame are not related to logic by a control flow, an instruction sequence may be generated without using the instructions during combination.

This figure illustrates a ControlBlock of sample code indicated by app1 and a ControlBlock of sample code indicated by app2. Sample code app1 and sample code app2 yield the same result. However, in this example, while sample code app1 repeats the same code, sample code app2 does not repeat the same code and causes a function fool1 to call fool2 so that the same execution is performed.

When the ControlBlock of sample code app2 is taken as an example for description, a stack frame may be initialized before start of the ControlBlock of sample code app2 (0x100003eb0 to 0x100003cb4).

Here, in the code, (pushq % rbp) indicates storing the base pointer, and (movq % rsp, % rbp) indicates storing the stack pointer in the base pointer.

Further, (subq % 16, % rsp) in the code indicates moving a stack pointer location to a top of a stack, and the stack has a smaller address at the top than at a base.

The stack may be arranged before return of the ControlBlock in sample code app2 (0x100003cf9 to 0x100003efd).

(addq $16, 9% rsp) in the code here indicates moving the stack pointer to the base (bottom), resulting in an effect of removing all values of the stack.

Further, (popq % rbp) in the code indicates restoring a previous base pointer that has been saved.

Therefore, when app1 is called thereafter, since instructions related to a previous stack frame are not related to a control flow, the instructions are combined by the call and are not considered during generation of an instruction sequence.

In this way, when a stack frame is adjusted by separation of a function related to the stack frame, that is, when instructions related to the stack frame are not related to logic by a control flow, an instruction sequence is generated without considering the instructions in generating the instruction sequence.

Another example of generating instruction sequences including characteristic information using instructions in a ControlBlock will be disclosed.

When instruction sequences including characteristic information are generated using instructions in a ControlBlock, the instruction sequences may be generated by reflecting an edge weight of a graph according to control flow analysis.

A graph reflecting the edge weight of the graph according to control flow analysis will be compared and illustrated in a figure below.

FIG. 22 is a diagram for describing another example of generating instruction sequences including characteristic information using instructions in a ControlBlock.

Here, sample codes app1 and app3 yielding the same result are illustrated.

In this example, a ControlBlock indicated by sample code app1 on the left side has a structure in which code having the same logic and different variables is repeated twice.

Sample code app3 on the right side is an example in which the same code is changed to a function without being repeated, and then is called twice (NET supplements-6-110).

Results of the two sample codes in this figure are the same. However, when an instruction sequence is generated based on sample code app3, an instruction of ControlBlock 0x100003ef0 called twice may be added twice to a graph analyzing a control flow to generate an instruction sequence.

In this way, when instruction sequences are generated using the instructions in the ControlBlock, a repeatedly called instruction may generate an instruction sequence by reflecting an edge weight in the CFG. Therefore, an instruction that is called a plurality of times in a generated instruction sequence may be reflected as a weight.

A graph reflecting the edge weight of the graph according to control flow analysis will be compared and illustrated in a figure below.

Figure 23:
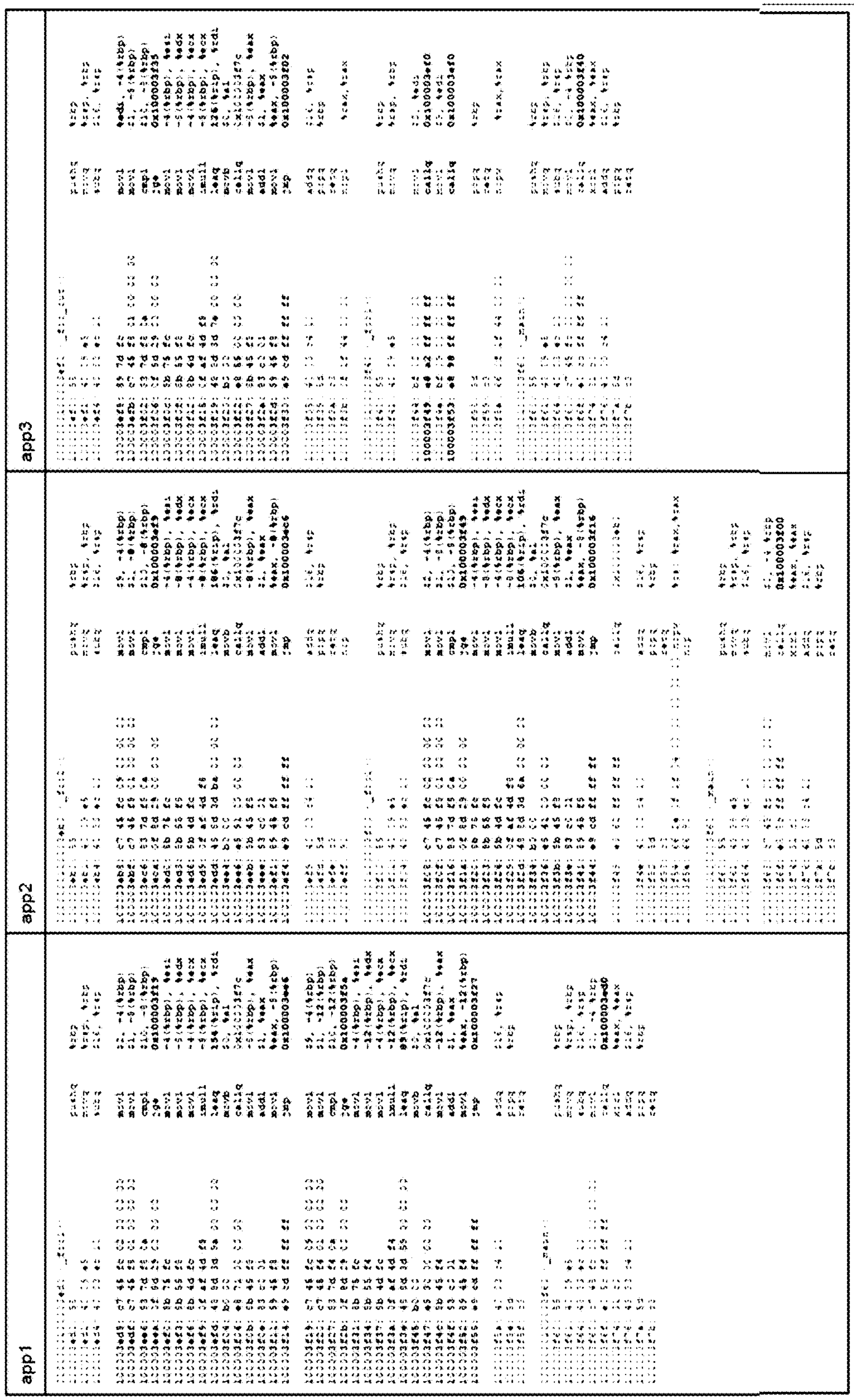
FIG. 23 is a diagram for describing still another example of generating instruction sequences including characteristic information using instructions in a ControlBlock.

FIG. 23 is a diagram for describing still another example of generating instruction sequences including characteristic information using instructions in a ControlBlock.

A fourth embodiment of generating instruction sequences including characteristic information using instructions in a ControlBlock is as follows.

Sample codes app1, app2, and app3 illustrated in this figure have been described above.

Sample code app1 is code in which the same code is repeated, sample code app2 is code in which the same code is not repeated and a function fool1 calls fool2 so that the same execution is performed, and sample code app3 is code in which the function fool2 is called twice.

Even when an instruction sequence is generated based on codes performing the same logic, since an offset is different for each file, the instruction sequence may vary according to an operand of a function in the file.

As illustrated in this figure, operands, which are operators of functions, are all different for the same function.

An instruction sequence capable of representing characteristics of cyber threat information may be affected due to operands that are values in boxes of this figure.

Accordingly, when instruction sequences including characteristic information are generated using instructions in the ControlBlock, function operands may be removed, and the instruction sequences may be generated using only opcode.

FIG. 24 is a diagram for describing yet another example of generating instruction sequences including characteristic information using instructions in a ControlBlock.

As a fifth embodiment of generating instruction sequences including characteristic information using instructions in a ControlBlock, when the instruction sequences are generated based on instructions in the ControlBlock, instructions that simply transmit parameters may act as noise in a logic flow.

In the ControlBlock of the sample code illustrated in this figure, a function 0x100003ef0 is called twice, and each performs a process of transferring a parameter.

An instruction simply related to parameter transfer in this way only generates noise when a control flow is generated, does not significantly contribute to actual characteristic information or an instruction sequence corresponding thereto, and thus is excluded.

Examples of generating an instruction sequence corresponding to characteristic information of cyber threat information based on instructions included in a ControlBlock when an executable file is disassembled to generate assembly code have been described above.

The examples illustrated above may be repeatedly applied, and thus an instruction sequence may be generated according to at least one of the five examples described above.

FIG. 25 discloses an example of generating an instruction sequence according to the above-described examples.

An instruction sequence including characteristic information such as cyber threat information may be generated by considering and combining characteristics, order, and reference of instructions in a ControlBlock.

In the case of generating an instruction sequence in this way, as an example, it is possible to remove a branch-type function diverging in code such as a JUMP function or a CALL function according to a reference relationship of instructions in a ControlBlock, and to generate an instruction sequence according to a control flow.

As another example of generating an instruction sequence, when a stack frame is adjusted by separating a function related to the stack frame, an instruction unrelated to logic by a control flow may be removed, and an instruction sequence may be generated.

Still another example of generating an instruction sequence is generating an instruction sequence by reflecting an edge weight in a CFG of an instruction. An instruction sequence may be generated by reflecting a weight on a graph of control flow analysis for an instruction called a plurality of times in the instruction sequence generated using the same.

As yet another example of generating an instruction sequence, since an offset may vary by an operand in disassembled code, an operand of a function may be removed, and an instruction sequence may be generated using only opcode.

As yet another example of generating an instruction sequence, an instruction related only to parameter transfer does not significantly contribute to an instruction sequence, and thus an instruction sequence may be generated by excluding the instruction when the instruction sequence is generated.

When at least one of these examples is applied, an instruction sequence capable of including characteristic information of cyber threat information may be generated based on a control flow in a disassembled ControlBlock.

An instruction sequence may be generated based on main code (0000000100003f60<_main>) included in sample codes app1, app2, and app3 illustrated above.

Code of the generated instruction sequence may be normalized and vectorized as described above. Further, vectorized content may be converted into hash code. The converted hash code may include unique characteristic information of cyber threat information. The cyber threat characteristic information included in the hash code may identify an attack technique and an attack group using the converted hash code using the AI technique described above.

In this figure, a row corresponding to "CFG" represents graphs according to control flow analysis for sample codes app1, app2, and app3, respectively.

In this example, a graph according to control flow analysis of sample code app1 is expressed as 0:100003f60→1:100003ed0, and a graph according to control flow analysis of sample code app2 is expressed as 0:100003f60→1:100003f00→2:100003ed0.

In addition, a graph according to control flow analysis of sample code app3 is expressed as 0:100003f60→1:100003f40→2:100003ef0. Here, edge weight 2 is reflected in a control flow of 1:100003f40→2:100003ef0.

A graph according to each control flow analysis is generated by applying at least one of the five examples illustrated above.

A row corresponding to "instruction sequence" represents instruction sequences for sample codes app1, app2, and app3, respectively. Therefore, even when sample codes app1, app2, and app3 are not exactly the same, since the codes yield the same result, it can be confirmed that all the instruction sequences according to the methods illustrated above appear the same.

In a row corresponding to "fuzzy hash," which is a last row, the instruction sequences for sample codes app1, app2, and app3 are converted into hash codes. Hash information of a ControlBlock of each sample code may be characteristic information.

As can be seen from this example, sample codes app1, app2, and app3 have the same meaning in terms of cyber threat information even though the codes are slightly different from each other. That is, it can be seen that the hash codes of sample codes app1, app2, and app3 are the same, and the corresponding codes have the same characteristic information.

Figure 26:
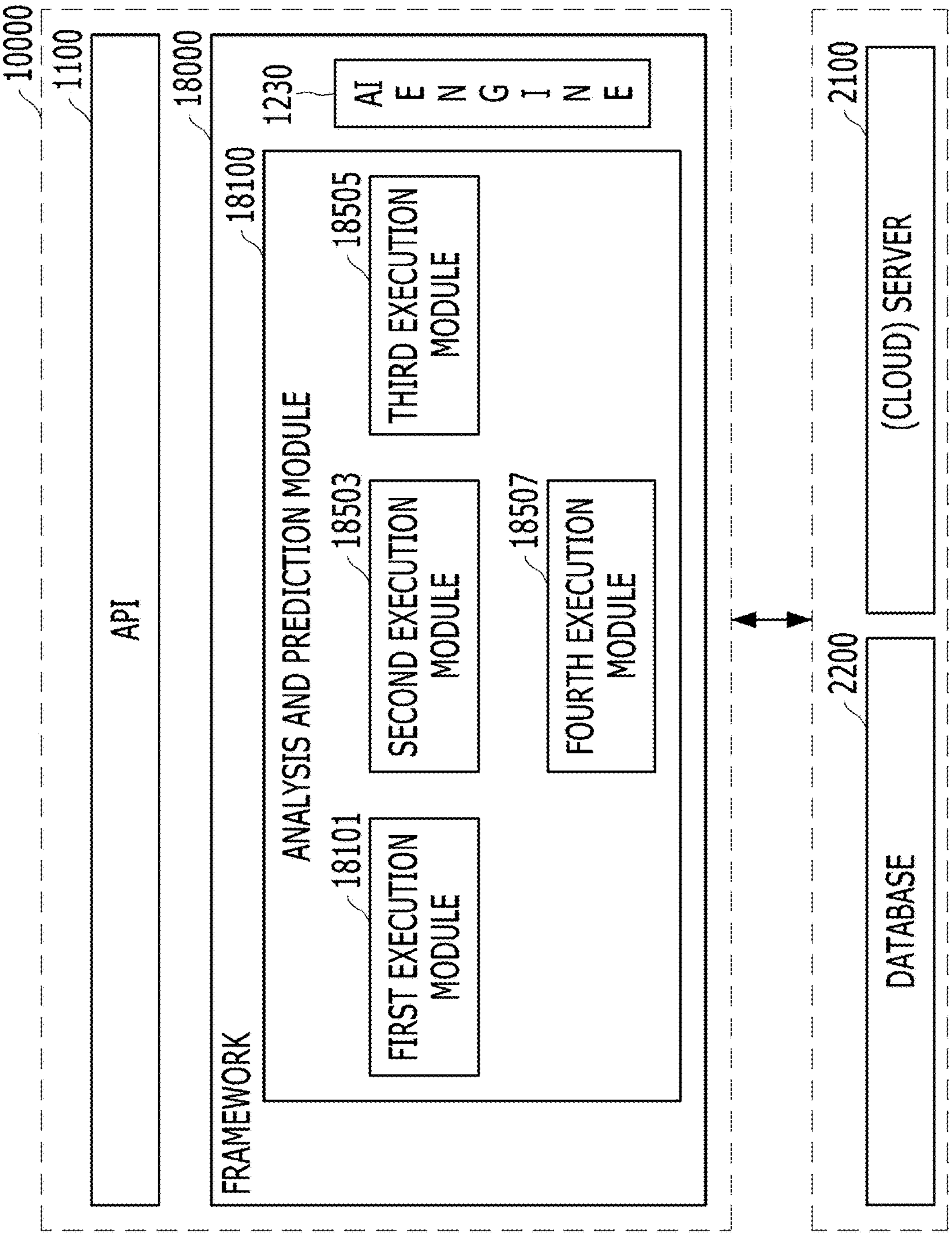
FIG. 26 is a diagram illustrating another embodiment of the disclosed cyber threat information processing apparatus.

FIG. 26 is a diagram illustrating another embodiment of the disclosed cyber threat information processing apparatus.

Another embodiment of the cyber threat information processing apparatus may include a server 2100 including a processor, a database 2200, and an intelligence platform 10000.

The database 2200 may store previously classified malware or pattern codes of malware.

The processor of the server 2100 may execute a first execution module 18501 for obtaining disassembled code by disassembling an executable file received from the API 1100.

In addition, the processor of the server 2100 may execute a second execution module 18503 for generating an instruction sequence based on a control flow according to a relationship between instructions in the disassembled code.

Examples of a process of executing the second execution module 18103 are illustrated in FIGS. 19 to 25.

In addition, the processor of the server 2100 may execute a third execution module 18505 for converting the generated instruction sequence into a feature data set related to cyber threat information. The feature data set may be feature vector data and a hash function.

In addition, the processor of the server 2100 may execute a fourth execution module 18507 for implementing an AI engine 1230, determining the presence or absence of similarity with the stored malware based on the converted data set having a specific format, and classifying the converted data set having the specific format as at least one standardized attack identifier according to the determination.

An example of a process of executing the fourth execution module 18507 has been described with reference to FIGS. 11 to 12.

Figure 27:
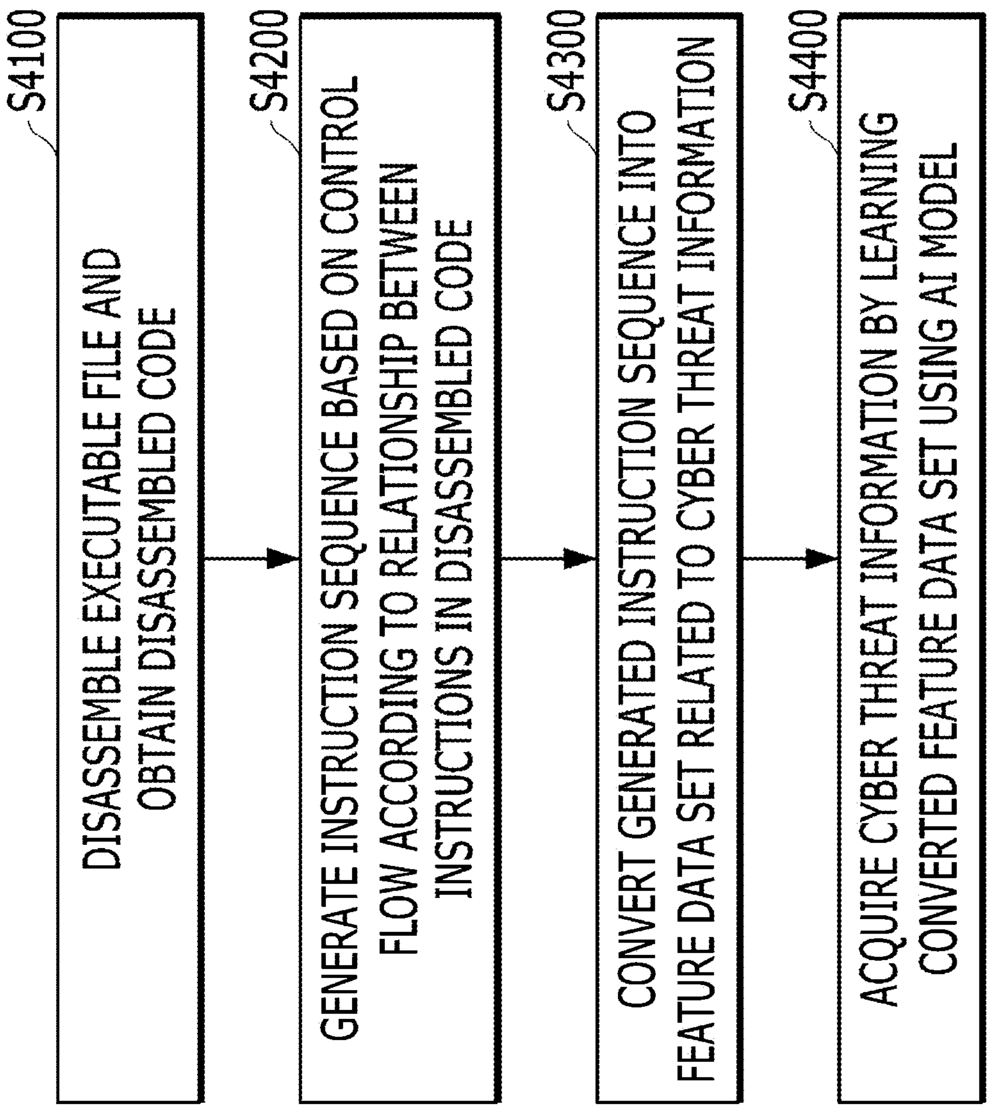
FIG. 27 is a diagram illustrating another embodiment of the disclosed cyber threat information processing method.

FIG. 27 is a diagram illustrating another embodiment of the disclosed cyber threat information processing method.

Disassembled code is obtained by disassembling an executable file (S4100).

An instruction sequence is generated based on a control flow according to a relationship between instructions in the disassembled code (S4200).

Examples of obtaining an instruction sequence based on a control flow according to a relationship between instructions in code are illustrated in detail in FIGS. 19 to 25.

The generated instruction sequence is converted into a feature data set related to cyber threat information (S4300).

The generated instruction sequences may be converted into feature vector data and then converted into hash function values. An example of converting a CodeBlock including an instruction sequence into vector data and a hash function value has been described in detail above. For example, the embodiments of FIGS. 21 to 24 may be used for data conversion. The example of converting a CodeBlock including an instruction sequence into vector data and a hash function value is understood with reference to this embodiment.

Cyber threat information is acquired by learning a feature data set related to the cyber threat information using an AI model (S4400). An example of classifying an attack technique or an attack group by learning data including characteristic information related to a cyber threat based on an AI model has been disclosed in detail above. For example, the embodiments of FIGS. 12 to 13 may be applied to a learning model and a classification model.

Accordingly, a pattern related to a specific attack identifier may be identified from a CodeBlock generated by extracting only instruction sequences related only to a cyber threat. In addition, an accurate attack identifier may be determined based on a probability based on data according to the selected attack identifier. As illustrated above, an attack group may be identified.

The acquired cyber threat information may be provided to a user again by the server. The user may obtain specific cyber threat information related to an executable file, for example, detailed information on an attack technique, an attack group, etc., by inquiring about information on the executable file or inputting the executable file on the API.

In the above, embodiments of processing cyber threat information by analyzing executable files for the system in the assembly language domain have been disclosed.

Hereinafter, an embodiment of identifying and processing cyber threat information from a non-executable file is disclosed. Recently, especially due to the COVID-19 pandemic, all activities such as economy, society, and education have been changed to non-face-to-face, and tens of thousands of online platforms including online commercial activities, telecommuting, and remote educations are expanding. Therefore, the number of non-executable files shared online has increased, and attackers are increasingly using this advantage to carry out phishing attacks or advanced persistent threat (APT) attacks through various non-executable files.

However, general users are still not aware of non-executable malicious codes, and existing anti-virus products are developed for executable files, so they cannot detect non-executable malicious files well. In addition, even if a non-executable malicious file is detected, the reason for detection is often insufficient. Therefore, it is necessary to detect non-executable malicious files and to provide the reasonings for the detection. Considering this point, an embodiment of identifying and obtaining cyber threat information from a non-executable file will be described in detail below.

For reference, the non-executable file here means a non-executable file whose external format is a file that requires a separate execution program to execute the file. In order to accurately describe the non-executable file, it will be described with reference to drawings.

Figure 28:
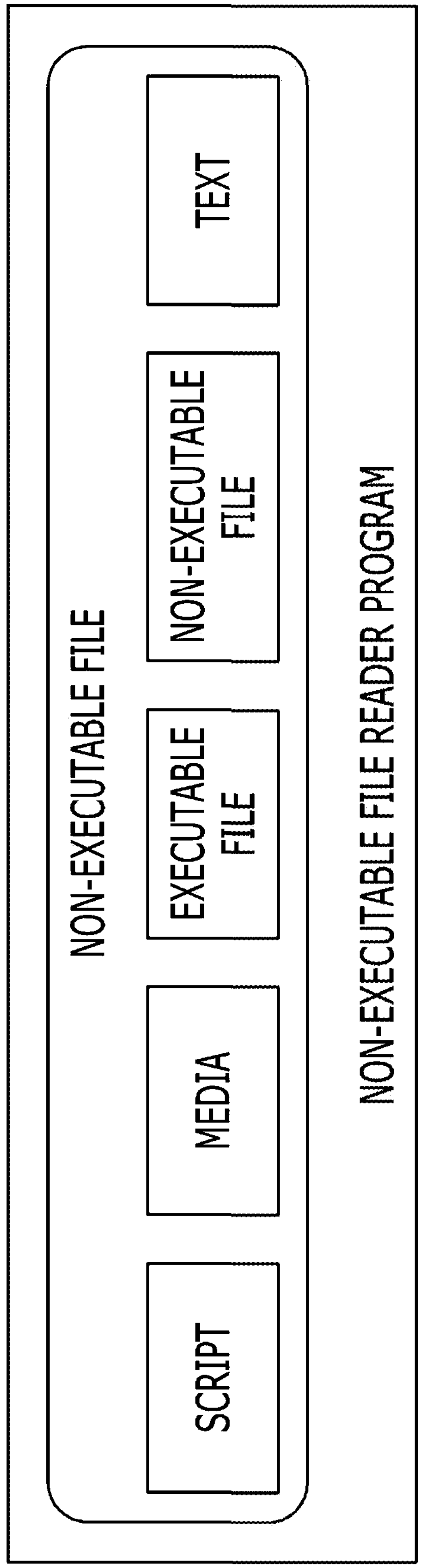
FIG. 28 is a diagram conceptually illustrating a structure of a non-executable file and a reader program for the non-executable file.

FIG. 28 is a diagram conceptually illustrating a structure of a non-executable file and a reader program for the non-executable file.

Non-executable files whose file extensions may be represented by document-type files such as PDF or DOC may embed media files such as text, scripts, and images, and another executable file or non-executable file inside the file as illustrated in the figure.

As in the example of this figure, a script, text or media may be embedded in a non-executable file. An executable file or another non-executable file may be embedded in a non-executable file.

A non-executable file may be loaded and content thereof may be checked while an executable file (non-executable file reader program) capable of reading the corresponding file is executed. A malicious non-executable file may induce a reader program to perform the following task while being loaded by the reader program (while the reader program is executed).

When a malicious non-executable file is executed, for example, a script containing a malicious action may be executed. Alternatively, due to execution of the script, a malware distribution server may be connected to download and then execute malware, or an executable file in which a malicious action is contained and embedded may be extracted and then executed.

In addition, when a malicious non-executable file is executed, a non-executable file in which a malicious action is contained or embedded may be extracted and then opened, or a media file containing a malicious action may be extracted and then opened.

Hereinafter, embodiments capable of detecting non-executable malicious files and identifying attack techniques and attack groups accordingly are disclosed. The disclosed embodiments may classify non-executable files as normal or malicious, identify attack groups of the non-executable files, or identify attack actions of the non-executable files by utilizing an AI model.

Figure 29:
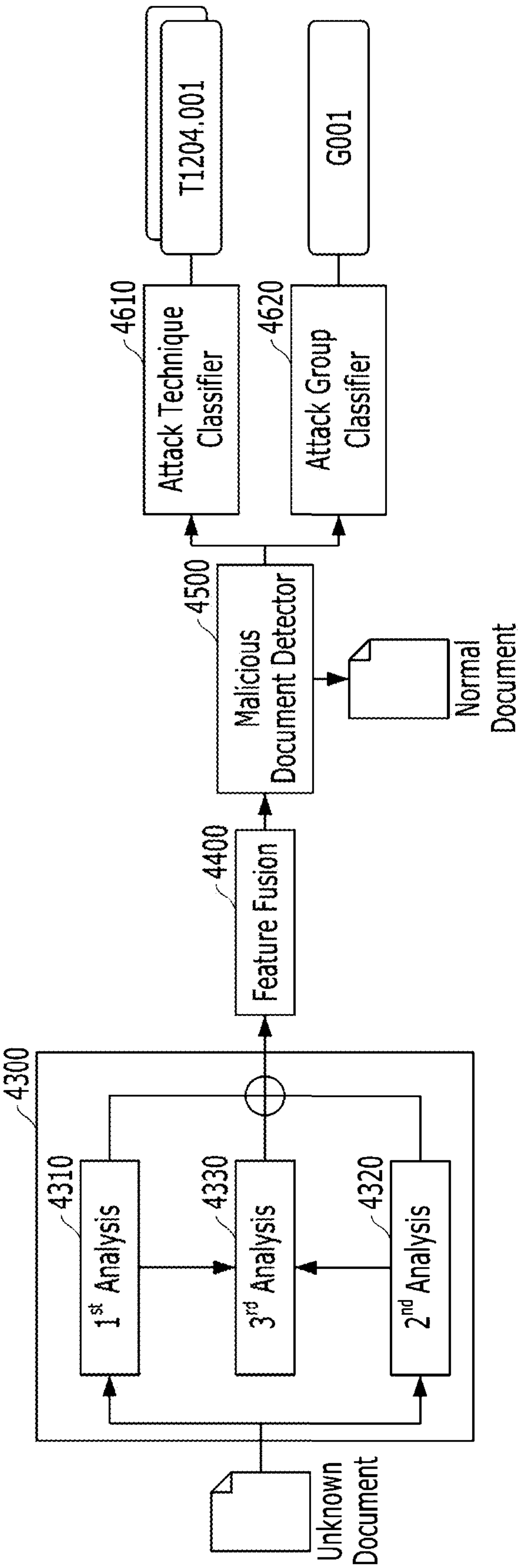
FIG. 29 is a diagram disclosing a block diagram of an embodiment capable of obtaining cyber threat information of a non-executable file.

FIG. 29 discloses a block diagram of an embodiment capable of obtaining cyber threat information of a non-executable file.

This embodiment includes a file analysis unit 4300, a feature processing unit (feature fusion) 4400, a malignancy detector (malicious document detector) 4500, an attack technique classifier 4610, and an attack group classifier 4620.

The file analysis unit 4300 may receive a non-executable file (unknown document) and analyze various cyber threat information of the non-executable file.

The file analysis unit 4300 may include a first analysis unit 4310, a second analysis unit 4320, and a third analysis unit 4330, and analyze feature information of a non-executable file input from each analysis unit.

The feature processing unit 4400 extracts a feature vector from feature information analyzed by the file analysis unit 4300, and the extracted vector is converted into an appropriate form so that the malignancy detector 4500 may determine whether the vector is malicious.

The malignancy detector 4500 may detect whether a malicious action is included in data obtained by converting the feature vector based on an AI technique. When the malignancy detector 4500 determines that cyber threat information is not included in the input data, the data is determined to be a normal file (normal document).

The attack technique classifier 4610 and the attack group classifier 4620 may classify an attack technique (for example, T1204.001) and an attack group (for example, G001), respectively, according to a cyber threat information system based on an AI technique for data detected as malicious by the malignancy detector 4500.

Here, as an example, according to a cyber threat information system, an attack action included in a non-executable file corresponds to an attack technique T1204.001, and a group generating the attack action is an attack group G001.

The illustrated blocks may be implemented as hardware or may be implemented as software and each executed by a processor of a server, respectively. Detailed examples of each part of the illustrated block diagram are disclosed below.

Figure 30:
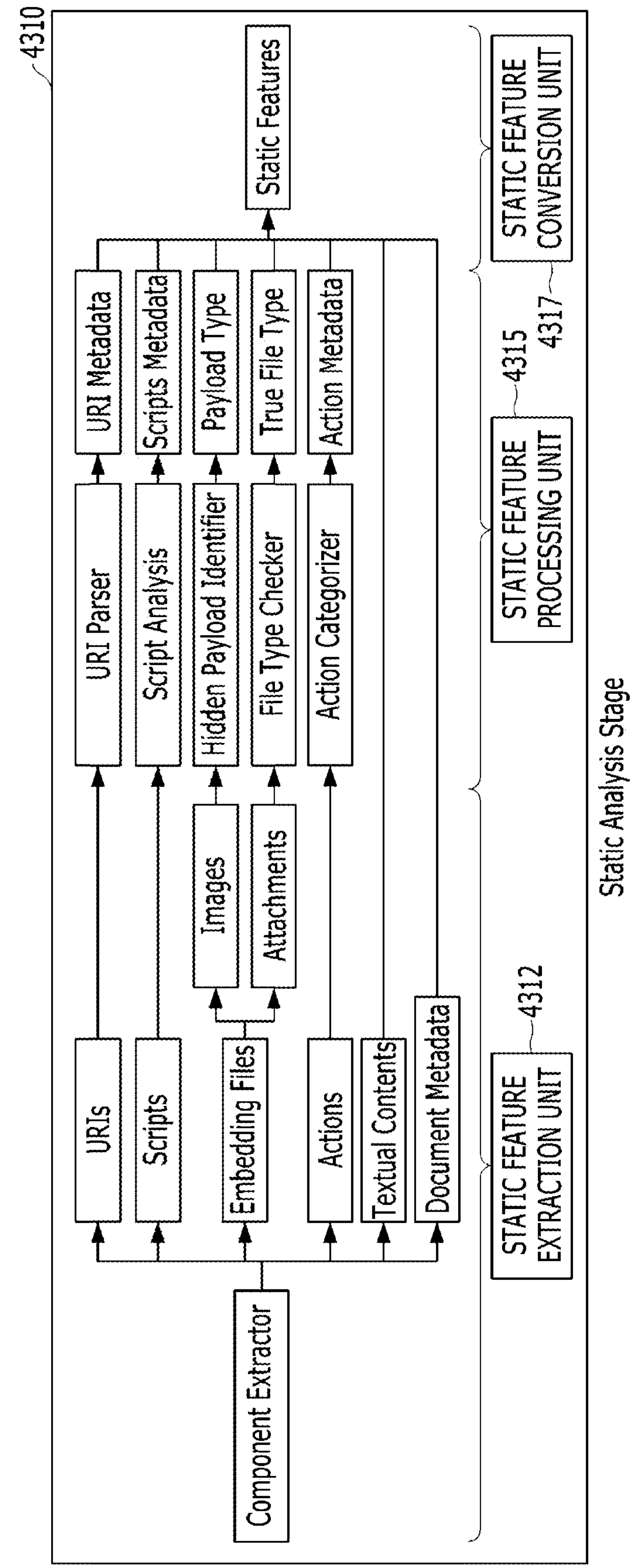
FIG. 30 is a diagram disclosing an example of performing a first type of analysis of a file by being included in a file analysis unit in an exemplary diagram capable of obtaining cyber threat information of the file.

FIG. 30 is a diagram disclosing an example of performing a first type of analysis of a file by being included in the file analysis unit in an exemplary diagram capable of obtaining cyber threat information of the file.

The first analysis unit 4310, which is described here as performing a type of static analysis for convenience, analyzes an input file.

The first analysis unit 4310 performs static analysis such as extracting and analyzing a malicious payload, a script, etc. included in a document of a non-executable file, and identifying a hidden attachment or malicious data disguised as another file.

The first analysis unit 4310 performs a static feature extraction step, a static feature processing step, and a static feature conversion step. When the first analysis unit 4310 is implemented as hardware, the first analysis unit 4310 may include a static feature extraction unit 4312, a static feature processing unit 4315, and a static feature conversion unit 4317.

The first analysis unit 4310 may separate a non-executable file, for example, a file inside a document, based on static analysis, and analyze the separated file. The first analysis unit 4310 may extract a hidden malicious payload in a non-executable file, a script capable of executing the malicious payload, etc. based on static analysis, and extract information about a format of a document.

For example, the static feature extraction unit 4312 may extract URI information (URIs), scripts, embedded files, action-related information (actions), textual contents, document metadata, etc. in a non-executable file.

The static feature extraction unit 4312 may extract, for example, image files (images) or various other formats of attachments for embedded files.

The static feature processing unit 4315 may process static feature information (URIs, scripts, embedded files, actions, etc.) extracted by the static feature extraction unit 4312 to perform additional analysis and processing according to the static feature information.

The static feature processing unit 4315 may subdivide and process the extracted information so that intention information of an attacker may be reflected in feature information capable of distinguishing identification of an attack technique and an attack group.

For example, the static feature processing unit 4315 may obtain URI meta information by parsing a URI using a URI parser, and confirm attacker's intention of inducing download of a malicious file for secondary infection or inducing access to an external phishing website from a document.

The static feature processing unit 4315 may obtain script metadata through analysis of an extracted script, and obtain information about a language script preferred by an attacker for attacking vulnerabilities or performing a malicious action based thereon.

The static feature processing unit 4315 may check a hidden payload identifier from an embedded file and obtain a payload type of the embedded file. Based thereon, it is possible to obtain information about a technique employed by an attacker to hide a malicious payload.

In addition, the static feature processing unit 4315 may check a true file type by checking a type of attachment from an embedded file, and obtain information about what data is included and what is disguised as the attachment by an attacker in a document.

The static feature processing unit 4315 may classify various actions included in a non-executable file and obtain action metadata. Based thereon, it is possible to obtain information on which action or technique is used to induce a malicious action.

In this way, the static feature processing unit 4315 may obtain attacker intention information from various extracted static analysis information. In addition, the static feature processing unit 4315 may obtain information on which file is included in a non-executable file in an abnormal form and whether the file is in the form of a script.

The static feature conversion unit 4317 converts static feature information extracted by the static feature processing unit 4315. For example, the static feature conversion unit 4317 performs a normalization or vectorization process as described above so that cyber threat information may be processed based on static feature information extracted by the feature processing unit 4400.

Figure 31:
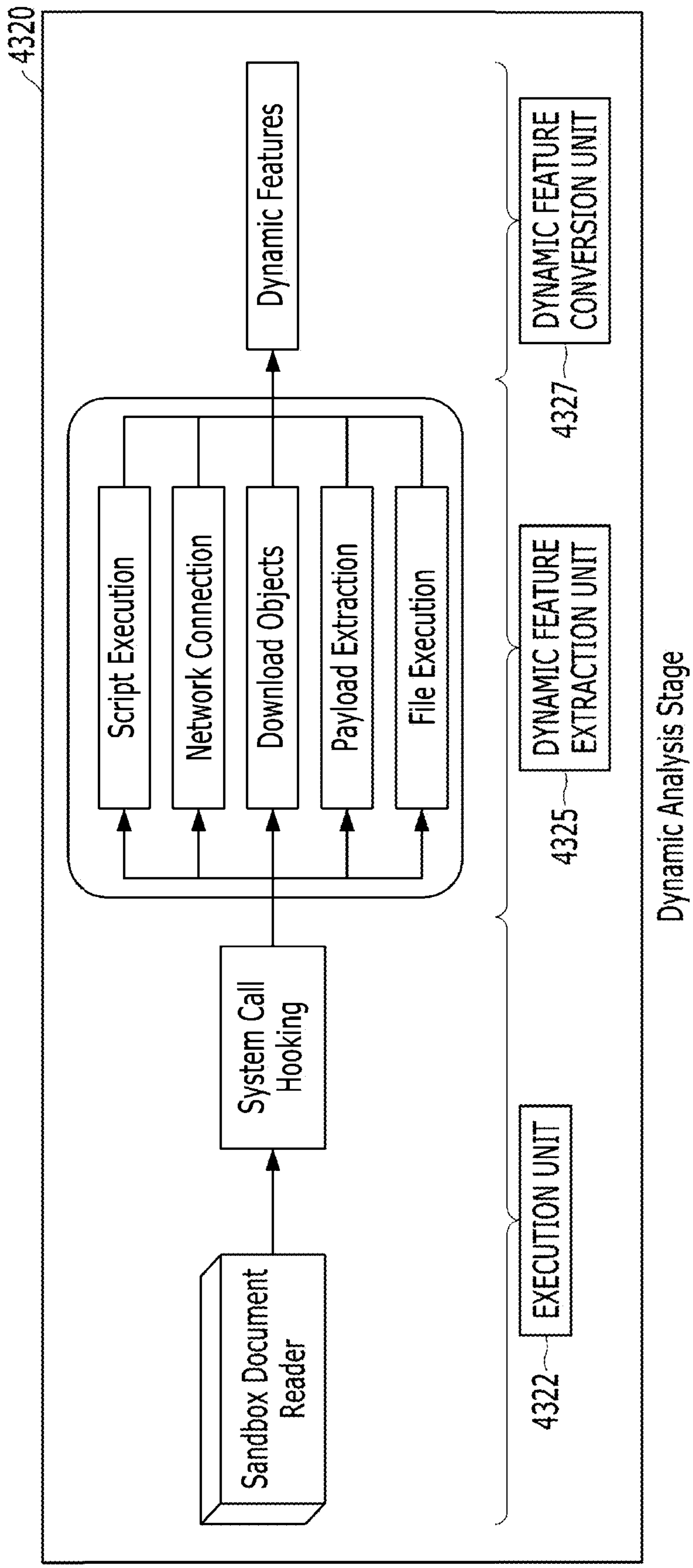
FIG. 31 is a diagram disclosing an example of performing a second type of analysis of a file by being included in the file analysis unit in an exemplary diagram capable of obtaining cyber threat information of the file.

FIG. 31 is a diagram disclosing an example of performing a second type of analysis of a file by being included in the file analysis unit in an exemplary diagram capable of obtaining cyber threat information of the file.

The second analysis unit 4320 may extract cyber threat information by analyzing a non-executable file based on dynamic analysis. The second analysis unit 4320 may execute the non-executable file in a corresponding program, such as a reader program, and extract action information that actually occurs during actual execution.

Hereinafter, for convenience, the second analysis unit 4320 is expressed as performing a dynamic analysis step.

The second analysis unit 4320 constructs a safely separated virtual environment for dynamic analysis of a non-executable file and executes a corresponding program suitable for the non-executable file in the virtual environment.

The second analysis unit 4320 may analyze which parameter is used to perform an action when a system call is called in a process that occurs when a non-executable file is executed in a corresponding program.

The second analysis unit 4320 performs an execution step, a dynamic feature extraction step, and a feature conversion step. When the second analysis unit 4320 is implemented as hardware, the second analysis unit 4320 may include an execution unit 4322, a dynamic feature extraction unit 4325, and a dynamic feature conversion unit 4327.

A sandbox reader (sandbox document reader) of the execution unit 4322 executes an entered non-executable file as a corresponding program in a virtual environment.

A system call analysis unit (system call hooking) of the execution unit 4322 may monitor whether a specific system call is called in a process derived from the executed corresponding program, and analyze which parameter is used for an execution action in this way.

The system call analysis unit (system call hooking) of the execution unit 4322 may obtain a system call to be monitored based on dynamic analysis and correspondingly extractable parameter data.

For example, when Send API is called while a program is executed, the system call analysis unit (system call hooking) of the execution unit 4322 may analyze packet data corresponding thereto, and obtain system call parameter information about transmitted packet data and the amount of transmission through a network.

The system call analysis unit (system call hooking) of the execution unit 4322 may trace back to a stack of the system call executed by the reader program of the non-executable file and analyze trace information. This trace information includes an execution order of functions according to the system call and used variable information of the functions.

A detailed embodiment of the system call analysis unit (system call hooking) will be described in detail again below.

The dynamic feature extraction unit 4325 may extract and collect result of execution by the execution unit 4322 in a virtual environment. For example, the dynamic feature extraction unit 4325 may collect various command information generated while a script is executed, and a communication type, an IP address, port number information, etc. generated through network connection according to execution of a reader program.

The dynamic feature extraction unit 4325 may collect various packet data downloaded while a reader program is executed, or collect information about a path of a target file or packet content from a payload of a packet thereof.

As another example, the dynamic feature extraction unit 4325 may obtain information about a program executed while a file is executed or opened and the target file.

The dynamic feature conversion unit 4327 converts information collected or extracted by the dynamic feature extraction unit 4325. For example, the dynamic feature conversion unit 4327 performs a normalization or vectorization process so that cyber threat information may be processed based on feature information extracted by the dynamic feature extraction unit 4325.

FIG. 32 is a diagram illustrating an object extracted by dynamic execution of a non-executable file and extracted information by a second type of analysis for a file according to an embodiment.

When a non-executable file is executed as a reader program, various actions may be performed on the program. This figure illustrates categories such as script execution/opening, server connection, download, file extraction, and file execution/opening as categories of the performed actions. However, there may be numerous other actions.

When a script is executed by executing a reader program of a non-executable file, functions such as WinExec and System may be executed through a system call API. Command line commands may be executed by executing these functions. Here, powershell.exe is executed as an example.

When another server is connected to by executing a reader program of a non-executable file, Socket may be executed through a system call API. Here, AF_INFT is illustrated as a parameter of a communication type that occurs accordingly. In addition, when Connect is executed through a system call API, a port number may be obtained as a parameter.

As in the other examples, when a non-executable file is executed as a reader program, functions such as Send, SendTo, Recv, RecvFrom, Fopen, Fwrite, CreateFile, WriteFile, CreateProcess, and ShellExecute may be executed through a system call API depending on the categories of actions performed. Examples of parameters that may be extracted according to the functions of each system call API are illustrated in a right section.

Figure 33:
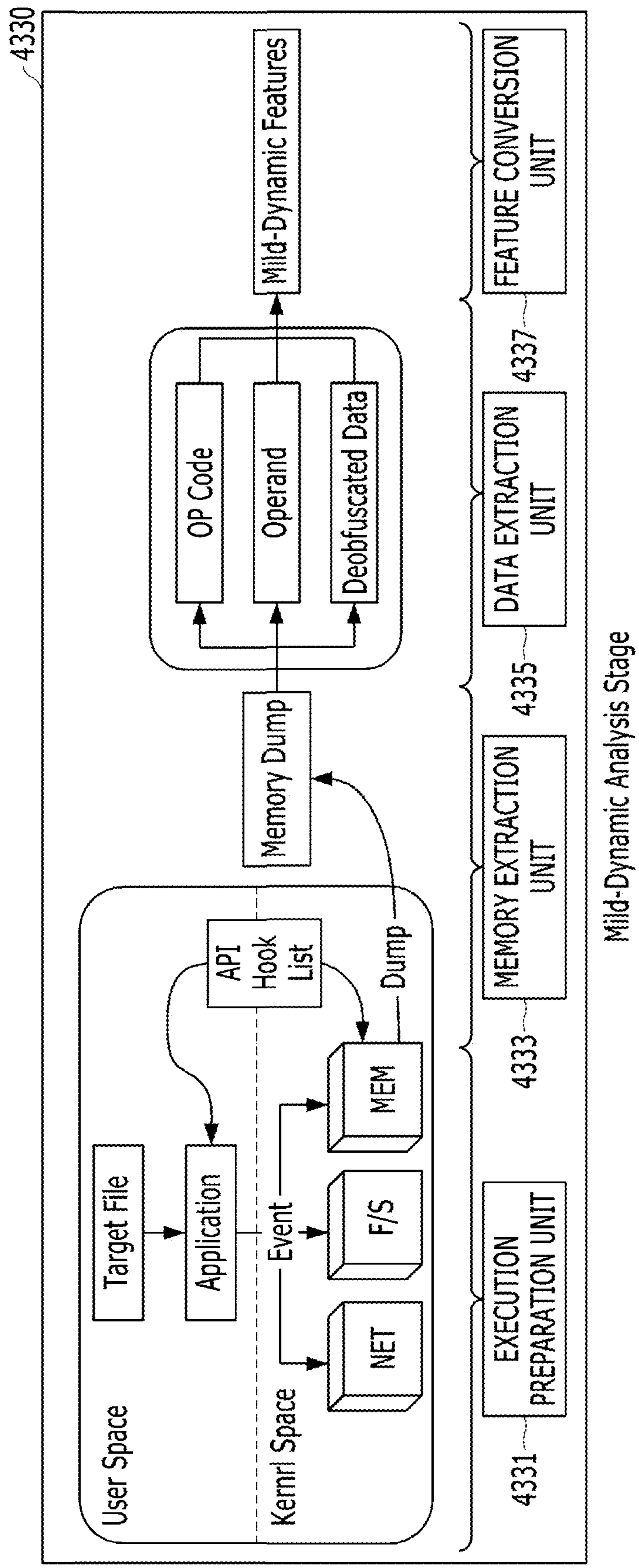
FIG. 33 is a diagram disclosing an example of performing a third type of analysis of a file by being included in the file analysis unit in an exemplary diagram capable of obtaining cyber threat information of the file.

FIG. 33 is a diagram disclosing an example of performing a third type of analysis of a file by being included in the file analysis unit in an exemplary diagram capable of obtaining cyber threat information of the file.

The third analysis unit 4330 obtains characteristics of cyber threat information based on information stored in a memory in an execution preparation step for a non-executable file. Since data in the memory immediately before dynamic execution in a virtual environment is analyzed, hereinafter, for convenience, the third analysis unit 4330 is described as performing a mild-dynamic analysis step.

When the third analysis unit 4330 performs the mild-dynamic analysis step, the third analysis unit 4330 may extract and analyze opcode and operator information included in the memory or malicious payload data which has been de-obfuscated in a malicious action preparation step according to file analysis.

The third analysis unit 4330 does not extract parameters generated while executing the dynamic analysis described above. The third analysis unit 4330 performs so-called API hooking on main functions of the system inevitably involved with a malicious action immediately before dynamic execution in a virtual environment to put the process in a suspended state when the corresponding function is called, and extracts (dumps) information loaded in the memory at this time.

To this end, the third analysis unit 4330 performs an execution preparation step, a memory extraction step, a data extraction step, and a feature conversion step. When the third analysis unit 4330 is hardware-separated, the third analysis unit 4330 may include an execution preparation unit 4331, a memory extraction unit 4333, a data extraction unit 4335, and a feature conversion unit 4337.

The third analysis unit 4330 may obtain and analyze data of a malicious payload from the memory based on information of a step of preparing a malicious action.

In the execution preparation step, the execution preparation unit 4331 prepares a non-executable file (target file) and a reader program (application) in a user area. The execution preparation unit 4331 may prepare various file systems, network systems, or memories in preparation for an event to be executed when the application, which is the corresponding reader program, is executed in a kernel area.

In addition, the execution preparation unit 4331 prepares for execution with API hooking list information so that the corresponding application performs API hooking on the main functions of the system immediately before execution. Detailed API hooking list information is illustrated in the following figure.

When a function is called on an API hooking list, the memory extraction unit 4333 puts the process in a suspended state and extracts information by dumping data stored in the memory at that time. The memory extraction unit 4333 may obtain analysis information that may be cyber threat information from data immediately before the process execution of the function.

The data extraction unit 4335 may obtain opcode, operator (operand) data, and de-obfuscated data from data obtained by memory dumping by the memory extraction unit 4333.

For example, the data extraction unit 4335 may disassemble data obtained by memory dumping by the memory extraction unit 4333, and classify opcode, operator (operand) data, de-obfuscated data, etc. from the disassembled data.

Here, the data extraction unit 4335 may obtain analysis target data as conversion data for opcode, operator (operand) data, de-obfuscated data, etc. corresponding to functions on the API hooking list rather than the entire executable file.

The data extraction unit 4335 performs a normalization or vectorization process so that cyber threat information may be processed based on opcode, operator (operand) data, de-obfuscated data, etc.

FIG. 34 is a diagram illustrating API hooking list information when the third analysis unit performs mild-dynamic analysis according to an embodiment.

In the illustrated API hooking list information, categories of APIs are illustrated in a left column, and APIs included in each API category and thus may be included in an API hooking list are illustrated in a right column.

Window OS Native API, HTML DOM Parser API, and VBS Script Engine API are illustrated as categories of APIs.

APIs that may be used for API hooking are illustrated for the Window OS Native API category, seven APIs are illustrated for the HTML DOM Parser API category, and 11 APIs are illustrated for the VBS Script Engine API category.

Figure 35:
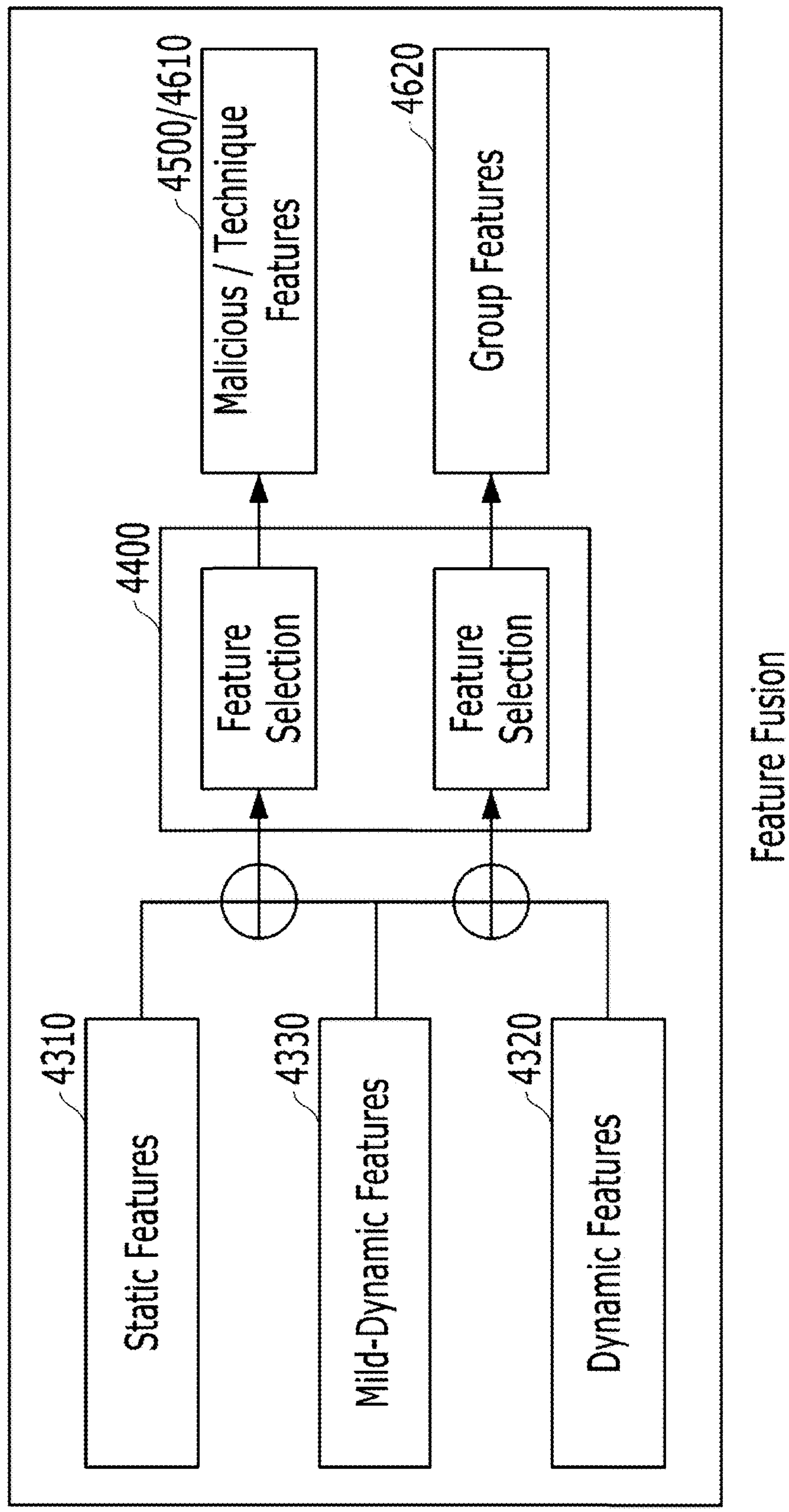
FIG. 35 is a diagram for describing a feature processing unit in an embodiment capable of obtaining cyber threat information of a non-executable file.

FIG. 35 is a diagram for describing the feature processing unit in an embodiment capable of obtaining cyber threat information of a non-executable file.

As described above, the first analysis unit 4310 and the second analysis unit 4320 may acquire and analyze static feature information and dynamic feature information, respectively, for each non-executable file.

Meanwhile, the third analysis unit 4330 may perform API hooking of an application executed in relation to a non-executable file in a virtual environment, thereby acquiring and analyzing cyber threat information by the non-executable file from memory information at that time. In the disclosed embodiment, analysis by the third analysis unit 4330 is referred to as mild-dynamic analysis.

The feature processing unit 4400 may selectively collect and process static feature information, dynamic feature information, and mild-dynamic feature information extracted by the first analysis unit 4310, the second analysis unit 4320, and the third analysis unit 4330, respectively.

The malignancy detector 4500 may determine whether a non-executable file includes cyber threat information based on information processed by the feature processing unit 4400.

Further, the attack technique classifier 4610 may specifically classify an attack action or an attack technique of the cyber threat information detected by the malignancy detector 4500 according to a specific system.

The attack group classifier 4620 may classify a person who plans or executes an attack action of the cyber threat information detected by the malignancy detector 4500.

The feature processing unit 4400 may generate feature information by using one of static feature information, dynamic feature information, and mild-dynamic feature information, or combining at least two thereof.

The feature processing unit 4400 generates feature information by selectively combining extracted information according to characteristics of each of the extracted static feature information, dynamic feature information, and mild-dynamic feature information or based on a classification model of an attack technique or an attack group.

For example, in the extracted feature information, feature information different from feature information for classifying an attack technique and feature information for classifying an attack group may be combined, or feature information may be combined by differently evaluating importance of each piece of feature information, which will be described in detail in the following drawings.

Therefore, the feature processing unit 4400 may use at least one of the extracted static feature information, dynamic feature information, and mild-dynamic feature information selectively or in combination.

For example, when only the mild-dynamic feature information has assembly code level information unlike the static feature information and the dynamic feature information, the mild-dynamic feature information may not be used in an attack group classification model.

In this case, the malignancy detector 4500 or the attack technique classifier 4610 detects malignancy or classifies an attack technique using all of the static feature information, the dynamic feature information, and the mild-dynamic feature information, and the attack group classifier 4620 may separately classify an attack group by selectively using the static feature information and the dynamic feature information.

Since all the feature information extracted in this way has different importance and characteristics, each of malignancy detection, attack technique classification, and attack group classification may be performed based on the feature information selected or combined accordingly.

Meanwhile, the malignancy detector 4500 determines whether a non-executable file is malicious based on a machine learning model. For example, when the feature processing unit 4400 processes at least one of the static feature information, the dynamic feature information, and the mild-dynamic feature information, the malignancy detector 4500 may detect whether there is malignancy based on feature vector data corresponding to the feature information.

An example of determining whether there is malignancy based on feature vector data has been described in detail above.

Figure 36:
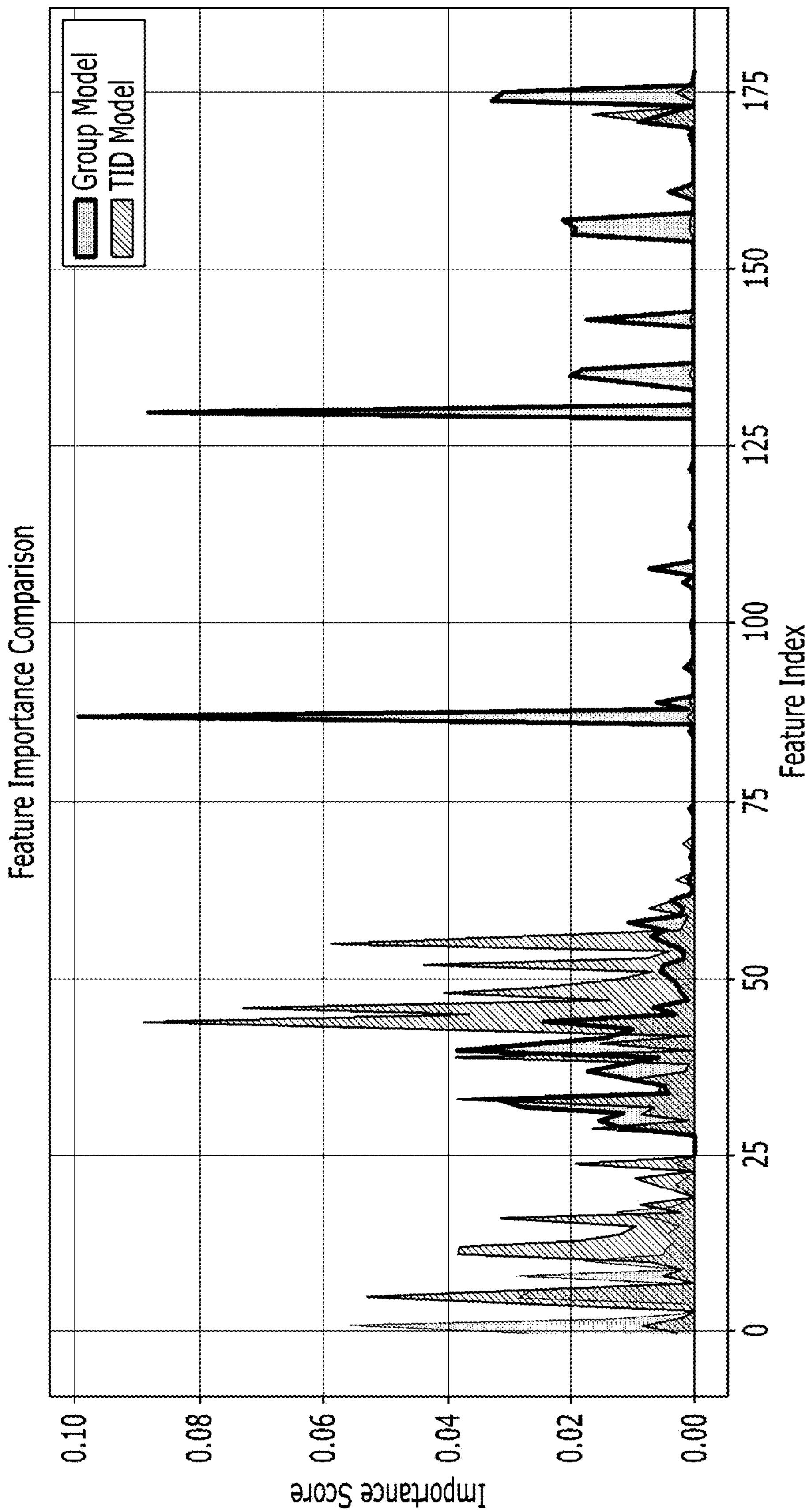
FIG. 36 is an exemplary diagram comparing importance of feature information extracted from a non-executable file according to a disclosed embodiment.

FIG. 36 is an exemplary diagram comparing importance of feature information extracted from a non-executable file according to a disclosed embodiment.

In the example of this graph, a horizontal axis represents an index according to feature information, and a vertical axis represents an importance score. An index of feature information according to an attack group model and an index of feature information according to a TID model have peak values at different feature indexes.

This means that characteristics of feature information representing an attack technique and feature information representing an attack group are different from each other as described above.

Therefore, the feature processing unit 4400 may differently select or selectively combine the static feature information, the dynamic feature information, and the mild-dynamic feature information at the time of each of malignancy detection, attack technique classification, and attack group classification according to the characteristics of the feature information, so that a detection model or a classification model may be performed.

FIG. 37 is an exemplary diagram for describing a classification model of the attack technique classifier according to a disclosed embodiment.

This figure illustrates an example in which the attack technique classifier according to an embodiment classifies and outputs an attack technique.

As disclosed, when a non-executable file includes cyber threat information, and thus is determined to be malicious, the attack technique classifier classifies an attack technique of the non-executable file by performing a machine learning model based on feature vector data for a cyber threat output by the feature processing unit.

When the attack technique classifier classifies an attack technique using the machine learning model, a class label of training data may be used as a correct answer and learning may be performed based thereon. Such training data includes an independent variable, which is the feature vector data, and a dependent variable, which is the class label.

In general, a dependent variable may have an integer value (single label) indicating one index number by a class label.

However, since one file may include several attack techniques, the attack technique classifier may use a multi-label technique that defines a dependent variable as T vectors rather than one integer value. That is, the attack technique classifier may receive input of feature vector data and classify the feature vector data as a binary vector corresponding to an attack technique as multi-labeling classification.

The attack technique classifier may learn a binary classification model for each class label as a multi-output classification model and generate T classification models, the number of which is the number of classifiable attack techniques.

When the above description is expressed as a simple equation, a prediction value y, which is a T-dimensional vector, and a prediction value oi for an input vector x of an ith attack technique classification model fi may be defined as follows.

$$\hat{y} = (o_0, o_1, o_2, \ldots, o_T)$$

$$o_i = \begin{cases} 1, & \text{if } f_i(x) > 0.5 \\ 0, & \text{otherwise} \end{cases}$$

The class label, which is a dependent variable, is an attack technique identified by T1059.005 when classified as a single label, and may be indicated as a multi-dimensional vector such as [1, 1, 0] for attack technique identifiers T1059.005, T1564.007, and T1204.002 when classified as the above-described multi-labeling.

In addition, the attack technique classifier may output probabilities for three attack techniques as displayed at the bottom of the figure.

FIG. 38 is a diagram illustrating an attack technique identified by selectively combining various analytical techniques for a non-executable file according to a disclosed embodiment.

This figure illustrates an identifier (technique ID) of each attack technique, a name of each attack technique, and a description of each attack technique.

For example, a name of an attack technique identifier T1059.001 is Command and Scripting Interpreter: PowerShell, and this attack technique refers to an attack technique of a non-executable file that performs a malicious action using a PowerShell script.

A name of an attack technique identifier T1059.005 illustrated above is Command and Scripting Interpreter: Visual Basic, and this attack technique refers to an attack technique of a non-executable file that performs a malicious action using the Visual Basic programming language.

Figure 39:
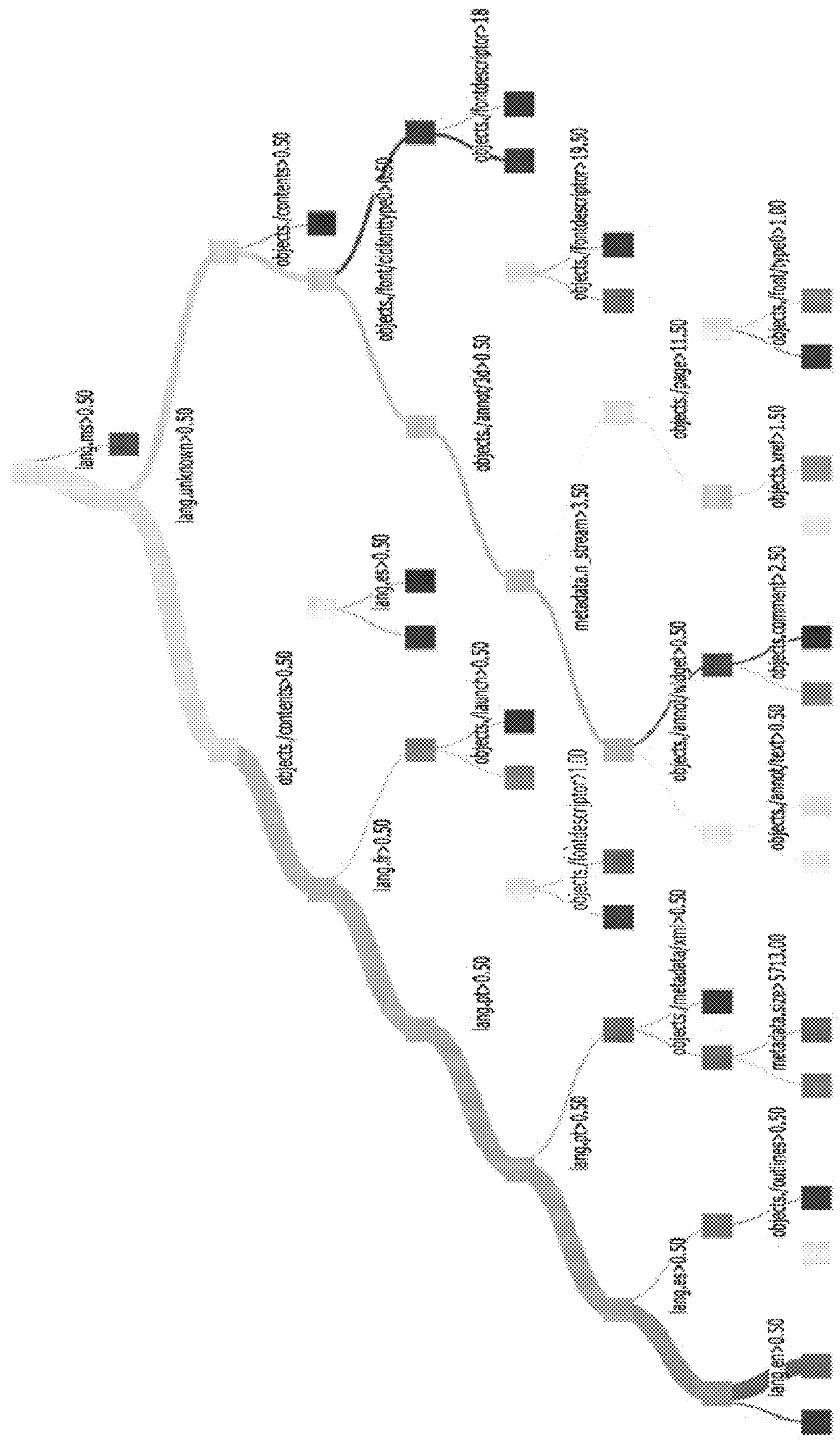
FIG. 39 is an exemplary diagram for describing a classification model of an attack group classifier according to a disclosed embodiment.

FIG. 39 is an exemplary diagram for describing a classification model of the attack group classifier according to a disclosed embodiment.

The attack group classifier may classify an attack group based on a classification model.

The attack group classifier may classify an attack group intending an attack action based on feature vector data output by the feature processing unit.

As an example of such clustering, the attack group classifier may perform clustering analysis based on feature vector data, and group data including similar characteristics into one group.

The attack group classifier may assign clustering identification information to groups clustered according to a structure and content of a document extracted from a non-executable file, an attack action attachment, a type of malicious data, etc.

Further, the attack group classifier may be trained using training data using a decision tree model and classify clustered groups according to the assigned clustering identification information (or grouping identification information).

An example of this figure illustrates a decision tree performing classification to indicate characteristics dividing groups according to clustering identification information (or grouping identification information).

An uppermost box represents a root node. The root node having a degree of clustering identification is sequentially split at a decision node into sub-nodes according to various characteristics included in a non-executable or executable file, so that a tree structure of a trained decision tree model may be obtained.

Here, the decision node and the sub-nodes are each shown in a box form.

When the attack group classifier classifies an attack group, group profiling information according to clustering and group may be obtained. For example, the attack group classifier may provide language of text in a document, a type of content in a document, and group profiling analysis information including various requirements such as whether a specific script is included in a document, or whether an automatically performed action is included when a document is executed.

The example of this figure is an example in which the attack group classifier classifies groups based on a tree structure, and illustrates a classification model in which last leaf nodes may distinguish groups from each other through a sixth branch.

The last leaf nodes of this tree node may be group profiling information for classifying groups. For example, the last leaf nodes may be profiling information for classifying groups, such as whether text of a document is in English, whether metadata is included and a length thereof, or whether content is included.

For example, the group profiling information may include information such as (1) text in a document is in English, (2) there is no media content in a document, (3) JavaScript is included in a document, and (4) there is an action function automatically performed when a document is executed.

Hereinafter, a detailed embodiment of the system call analysis unit (system call hooking) of the dynamic analysis disclosed above will be disclosed. As described above, there may be cases in which it is determined whether a non-executable file is malicious based on the static analysis characteristics.

However, in many cases, it is difficult to provide a detailed description of whether a file is a non-executable file containing a malicious action or how a malicious action occurs with only static analysis characteristics. Therefore, when a reader program is executed to load a non-executable file, a process in which a malicious action occurs may be accurately identified, and a description thereof may be provided.

When a reader program related to a non-executable file is executed, the reader program performs an operation according to a combination of system calls provided by an operating system.

When the reader program is executed in the Windows operating system, the following system calls, etc. may be used.

Figure 40:
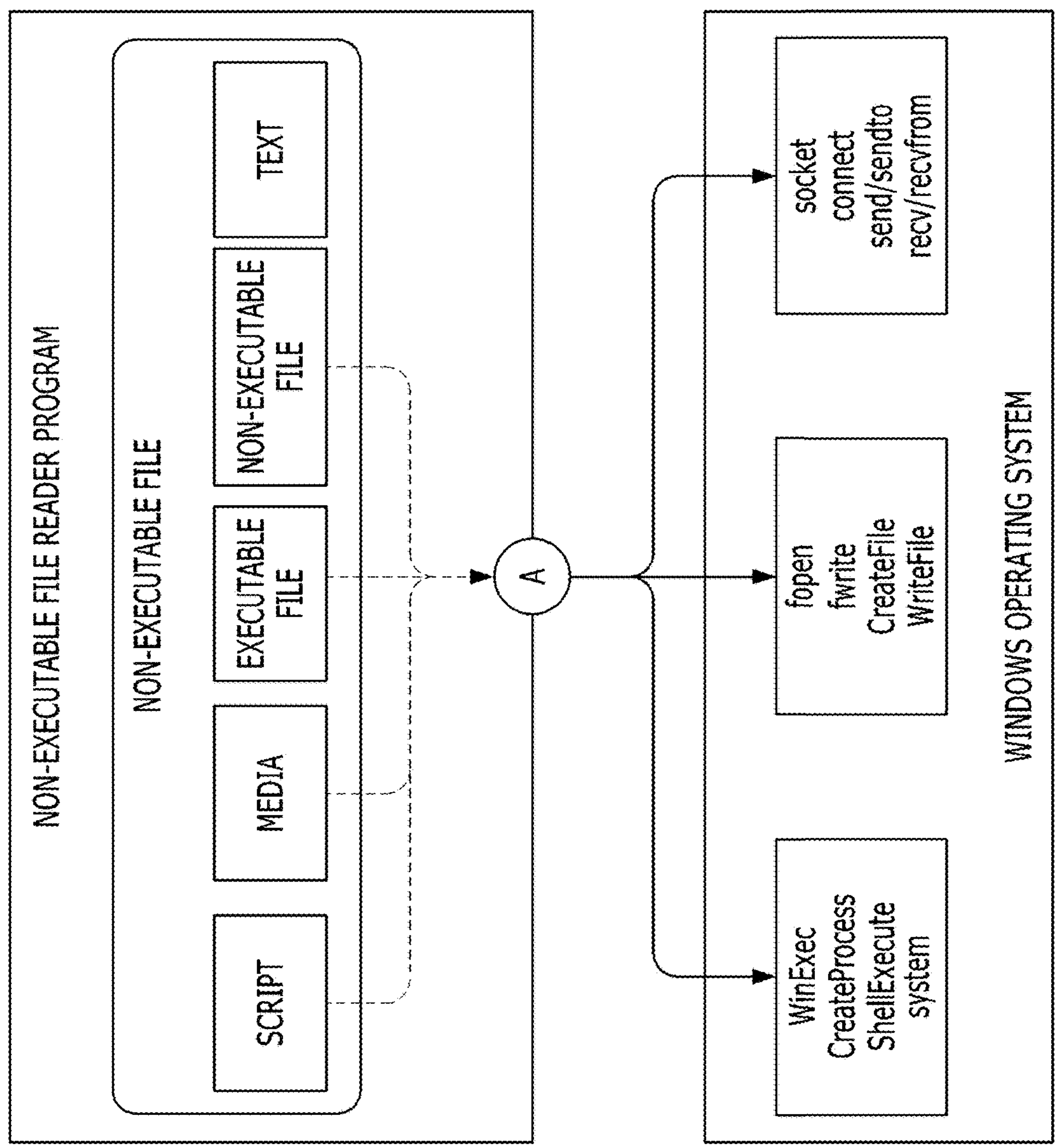
FIG. 40 is a diagram illustrating execution of the reader program of the non-executable file described above and system calls.

FIG. 40 is a diagram illustrating execution of the reader program of the non-executable file described above and system calls.

A non-executable file may include a script, a media file, an executable file, other non-executable files, text, etc. This non-executable file may be executed by a corresponding reader program. When the reader program is executed in the Windows operating system, as described above, various system calls illustrated in this figure may be used depending on the file included in the non-executable file.

For example, when a script is executed in a non-executable file, system calls such as WinExec, CreateProcess, and ShellExecute are used, and when a server is connected to, system calls such as Socket and connect are used. When a download action is performed by executing a non-executable file, system calls such as send, sendto, recv, and recvfrom may be used. System calls such as fopen, fwrite, CreateFile, and WriteFile may be used when a file is extracted by execution of a non-executable file, system calls such as WinExec, CreateProcess, and system may be used when a file is executed, and system calls such as ShellExecute and system may be used when a file open operation is performed.

However, these system calls called by the reader program may be hooked (indicated by point A on the figure) when the system calls are called.

When hooking a system call at point A, data may be obtained by dumping parameter values or memory values transmitted to each system call.

Even though illustrated here only in the Windows operating system, the same embodiment may be applied to another operating system such as a mobile operating system or a Linux operating system.

FIG. 41 is a diagram for describing an example of hooking a system call on program code according to an embodiment.

A command "send" in this figure may include a function signature as illustrated.

Information transmitted according to the above command on this program code may be confirmed by dumping memory data of [buf] and [len].

In this way, by dumping a parameter value and a memory value thereof transmitted according to a system call performed by the reader program of the non-executable file, it is possible to determine what type of operation is caused by a malicious action and what type of information is used.

Figure 42:
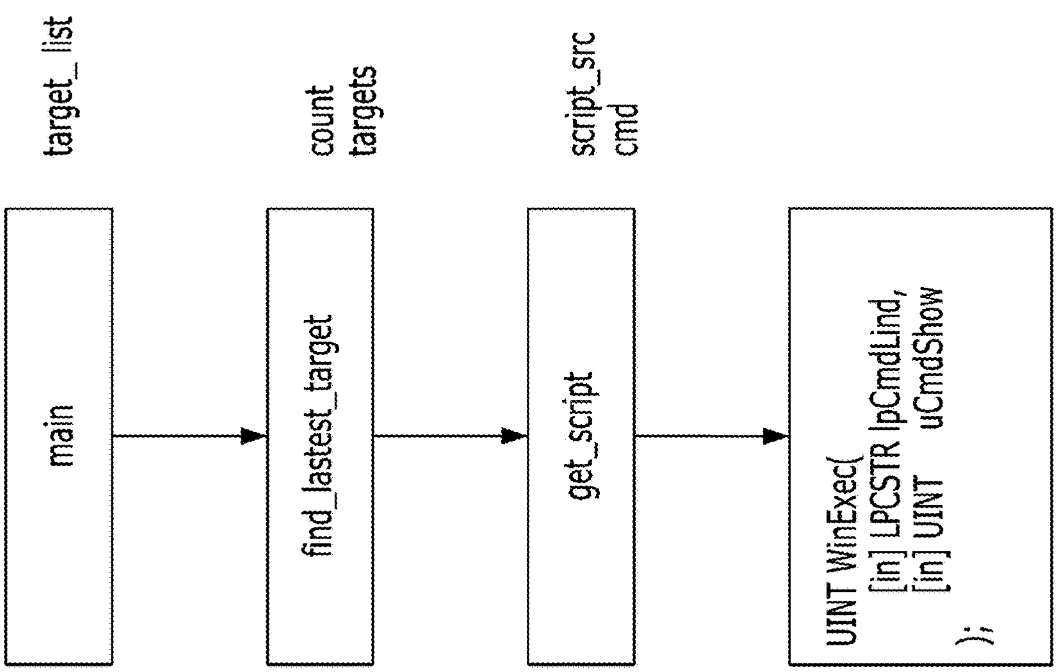
FIG. 42 is a diagram disclosing an example capable of tracing cyber threat information through dynamic analysis according to an embodiment.

FIG. 42 discloses an example capable of tracing cyber threat information through dynamic analysis according to an embodiment.

In the embodiment, when a reader program on a specific operating system uses a system call, stack trace information of the reader program may be generated at a hooking time point.

The example of this figure illustrates a process of obtaining malicious action content according to the order of malicious actions and related variables through stack trace information generated after hooking the system call WinExec in the Windows operating system.

An example of a stack trace at the time when the system call WinExec, which is a last step, is hooked is as follows. According to the generated stack trace information, it can be seen that functions main→find_lastest_target→get_script have previously been called in this order with regard to the system call WinExec.

Local variables used by each function are shown on the right side of the boxes each including the function on this figure. For example, the function find_lastest_target uses count and targets as local variables.

Finally, the system call WinExec is called in the function get_script. Accordingly, when a malicious action occurs, a specific mechanism therefor may be described using the stack trace information.

That is, the following description may be provided according to the reverse order of the calling functions related to the system call on the stack trace information.

(1) Attempt to execute a suspicious command lpCmdLine through the system call WinExec.

(2) Execute functions in the order of main→find_lastest-_target→get_script through the reader program.

(3) The local variable of each function is set as follows, and description of the local variable is as follows.

(a) main:

target_list—description of local variable (b) find_lastest_target:

count—description of local variable targets—description of local variable (c) get_script:

script_src—description of local variable cmd—description of local variable

According to the embodiment, when a non-executable file is executed in a reader program, and a malicious action occurs, after the reader program hooks a system call on the operating system, a specific mechanism for the malicious action may be provided using the order of functions related to the system call and variables of the functions.

The processor may execute a reader program that receives and executes a non-executable file. In this case, when the reader program executing the non-executable file executes a system call of the operating system, stack trace information of the reader program may be generated at the time of hooking the system call. In addition, the processor may obtain a calling function for calling the system call and a variable corresponding to the calling function from the generated stack trace information, and provide description information about the obtained calling function and the obtained variable corresponding to the calling function.

The description information may indicate that a command inducing cyber threat information is executed by the system call. The description information may include a calling order of the calling functions prior to the hooking point of the system call. In addition, the description information may include a description corresponding to a variable corresponding to the calling function.

Figure 43:
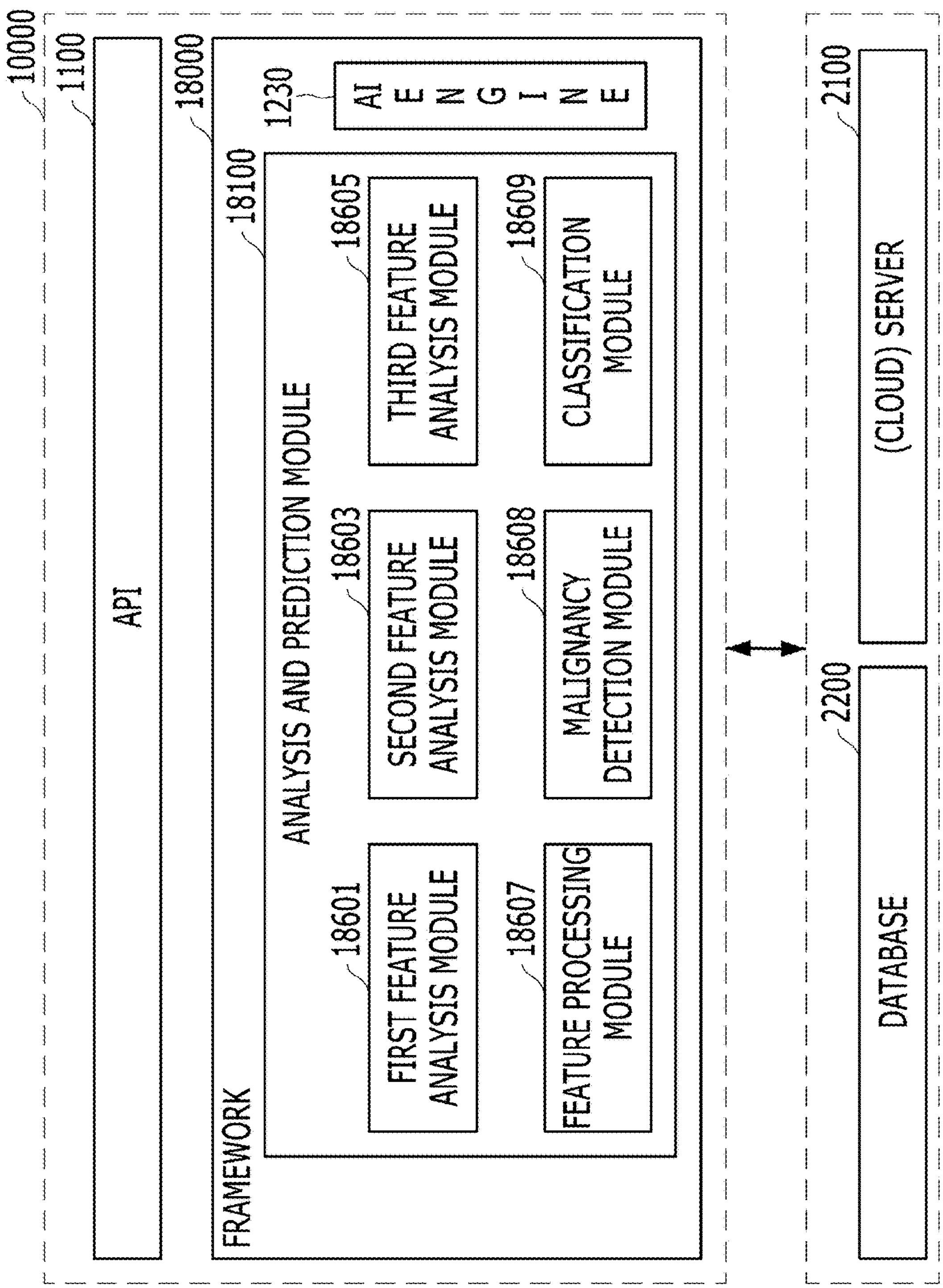
FIG. 43 is a diagram illustrating another embodiment of the disclosed cyber threat information processing apparatus.

FIG. 43 is a diagram illustrating another embodiment of the disclosed cyber threat information processing apparatus.

Another embodiment of the cyber threat information processing apparatus may include a server 2100 including a processor, a database 2200, and an intelligence platform 10000.

The database 2200 may store previously classified malware or pattern code of malware.

The processor of the server 2100 may receive a non-executable file received through the API 1100.

The processor of the server 2100 may execute a first feature analysis module 18601 for analyzing and extracting static feature information related to a cyber threat of the non-executable file received through the API.

A detailed example of analysis of the static feature information performed by the first feature analysis module 18601 has been described in FIG. 30, etc.

The processor of the server 2100 may execute a second feature analysis module 18603 for analyzing and extracting static feature information related to the cyber threat of the non-executable file received through the API.

Detailed examples of analysis of the dynamic feature information performed by the second feature analysis module 18603 are disclosed in detail in FIGS. 47, 48, and 56 to 58.

When the second feature analysis module 18603 analyzes the dynamic feature information, by hooking a system call requested by the reader program of the non-executable file from the operating system, cyber threat information may be obtained by dumping memory data generated at that time.

The second feature analysis module 18603 may obtain mechanism information on the malicious action from the order of functions called immediately before hooking the system call and parameters corresponding to the functions.

The processor of the server 2100 may execute a third feature analysis module 18605 for analyzing and extracting mild-dynamic feature information related to the cyber threat of the non-executable file received through the API.

Figure 49:
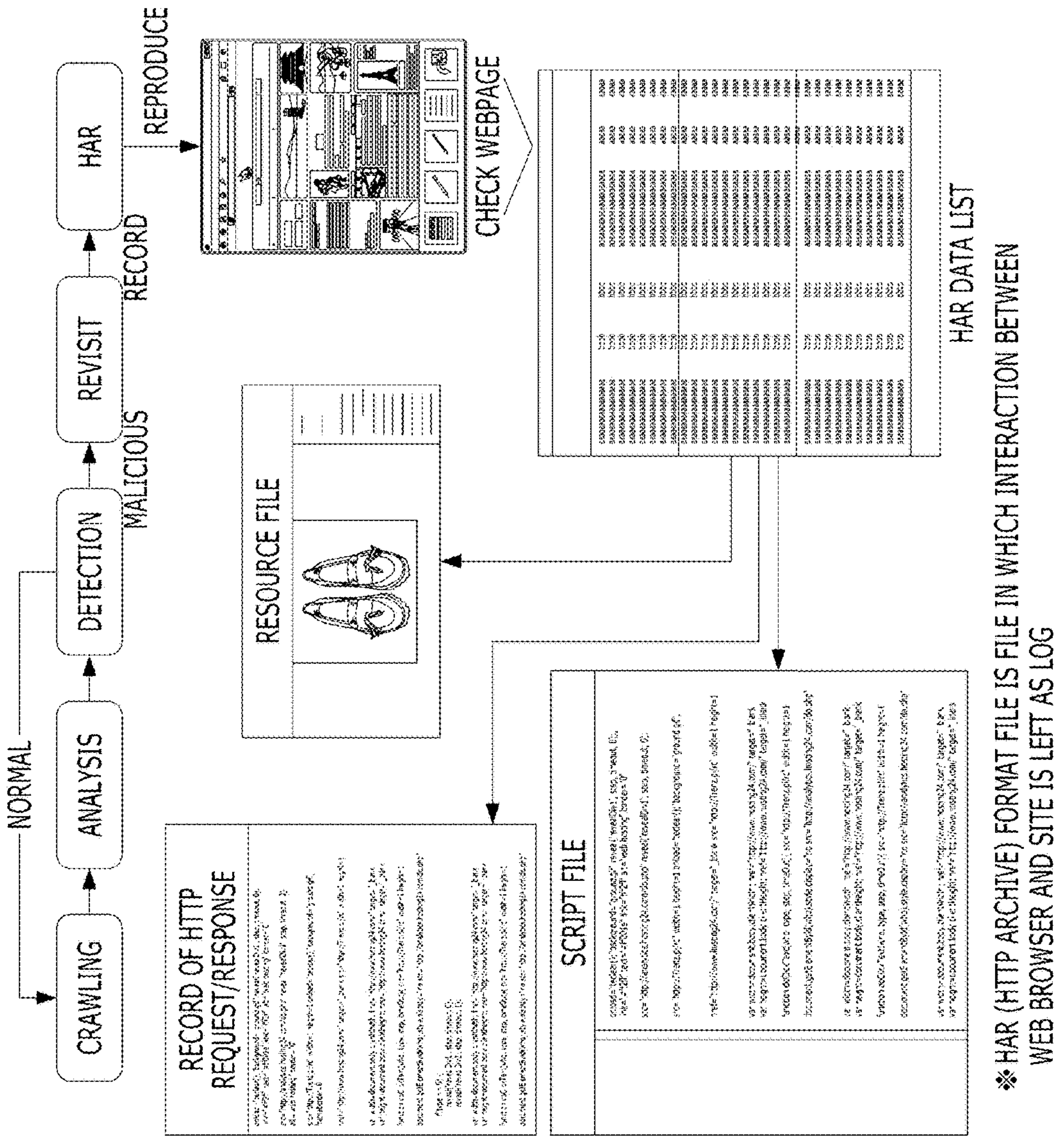
FIG. 49 is a diagram illustrating a concept of analyzing webpage data and providing detected information according to an embodiment.
Figure 50:
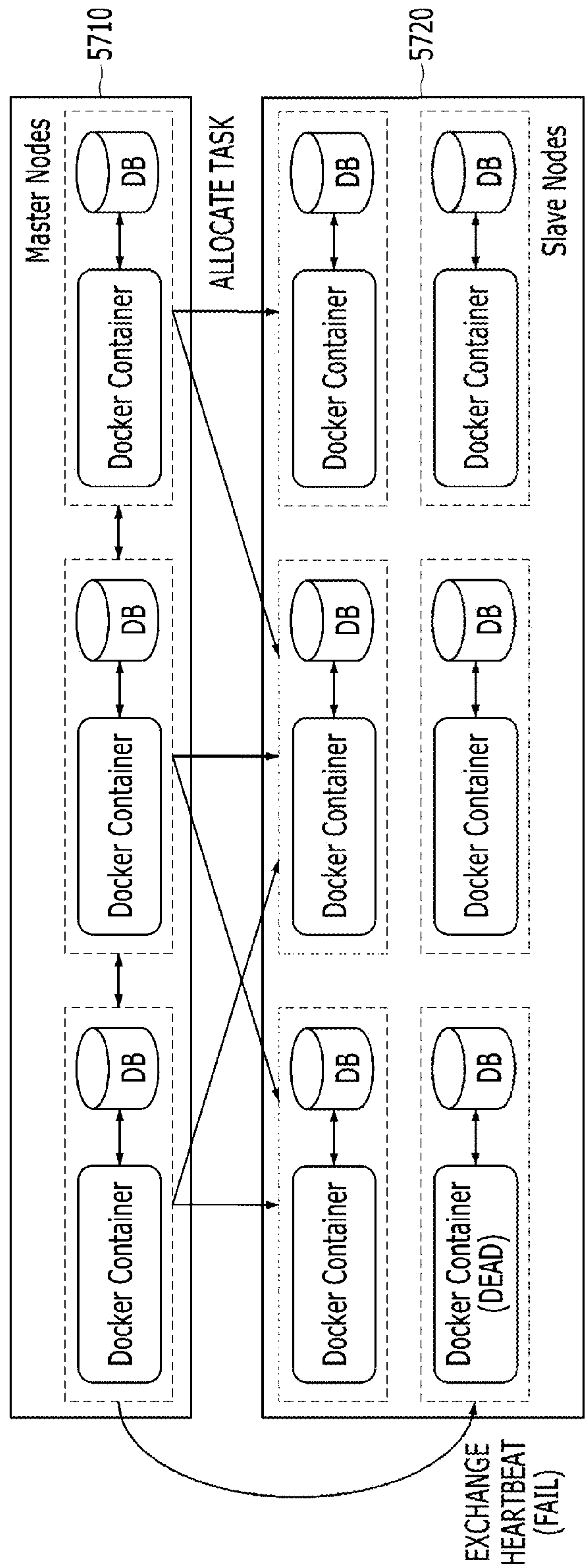
FIG. 50 is a diagram disclosing an example in which the above-disclosed embodiment operates on a computer.

Detailed examples of analysis of the mild-dynamic feature information performed by the third feature analysis module 18605 are disclosed in detail in FIGS. 49 and 50.

The third feature analysis module 18605 performs API hooking for main functions of an application system executing non-executable files, so that when a corresponding function is called, the process may be suspended, and information loaded in the memory at that time may be extracted (dumped).

The third feature analysis module 18605 may disassemble data of the memory to obtain opcode, operator (operand) data, and de-obfuscated data, and obtain feature information related to the cyber threat information based on the obtained data.

The processor of the server 2100 may execute a feature processing module 18607 for selectively combining feature information related to the cyber threat analyzed by the first feature analysis module 18601, the second feature analysis module 18603, and the third feature analysis module 18605 to generate feature data related to the cyber threat information.

A detailed embodiment of the feature processing module 18607 is disclosed in detail in FIG. 35.

The processor of the server 2100 may execute a malignancy detection module 18608 for detecting whether a malicious action is included in the non-executable file received through the API based on the feature information of the cyber threat information processed by the feature processing module 18607.

The processor of the server 2100 may execute a classification module 18609 for classifying an attack technique and an attack group of a malicious action by performing the AI engine 1230 when the non-executable file includes the malicious action according to a result yielded by the malignancy detection module 18608.

Detailed examples of generating information on the attack technique and the attack group of non-executable files classified by the classification module 18609 are disclosed above in detail.

Figure 44:
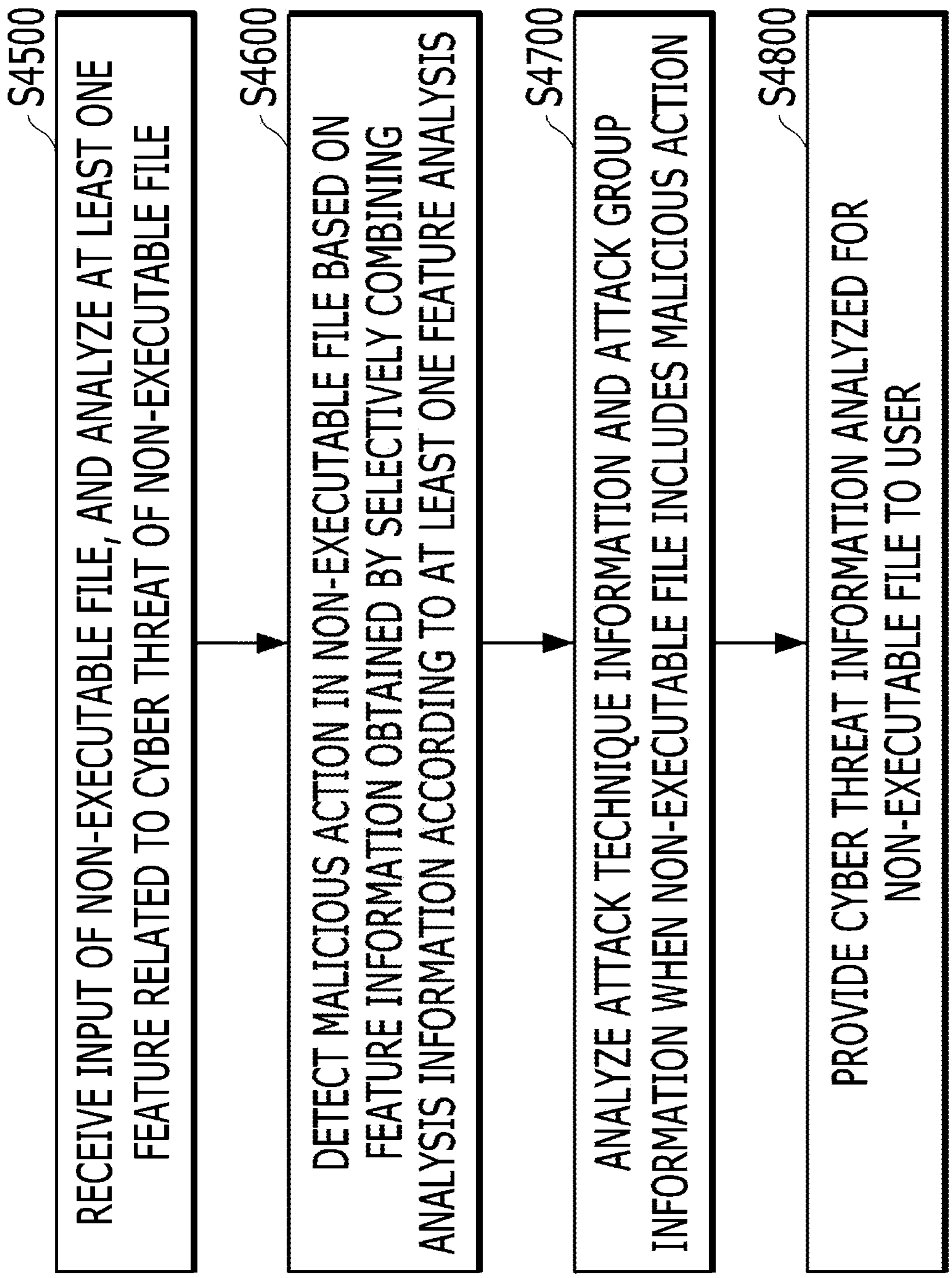
FIG. 44 is a diagram illustrating another embodiment of the disclosed cyber threat information processing method.

FIG. 44 is a diagram illustrating another embodiment of the disclosed cyber threat information processing method.

Input of a non-executable file is received, and at least one feature related to a cyber threat of the input non-executable file is analyzed (S4500).

Examples of analyzing static feature information, dynamic feature information, and mild-dynamic feature information, respectively, related to the cyber threat of the non-executable files are disclosed.

A detailed example of analysis of the static feature information is illustrated in FIG. 30, and detailed examples of analysis of the dynamic feature information are illustrated in FIG. 31. In addition, detailed examples of analysis of the mild-dynamic feature information are illustrated in FIGS. 33 and 34.

It is possible to detect whether a malicious action is included in the non-executable file based on feature information obtained by selectively combining analysis information according to at least one feature analysis (S4600).

When the non-executable file includes a malicious action, it is possible to generate classification information on an attack technique and classification information on an attack group (S4700). Detailed examples of generating information on the attack technique and the attack group of the non-executable file are disclosed in detail in FIGS. 36 to 39.

Cyber threat information of the non-executable file analyzed as above is provided to a user (S4800).

Therefore, according to the disclosed embodiments, depending on the logic of a program including functions even in a program yielding the same result, or when functions are differently used such as being separated even if there is no change in the logic of the program, it is possible to accurately provide cyber threat information for an attack technique and an attack group, and respond to a variant of malware.

According to the embodiments, even when a malicious action is included in a non-executable file, it is possible to accurately detect the malicious action, and to provide cyber threat information about an attack technique and an attack group accordingly.

Hereinafter, disclosed are examples capable of monitoring a webpage, identifying a webpage including a malicious action or information, and identifying whether a component included in a webpage includes a malicious action or information according to embodiments of a cyber threat information processing apparatus and a method thereof.

Figure 45:
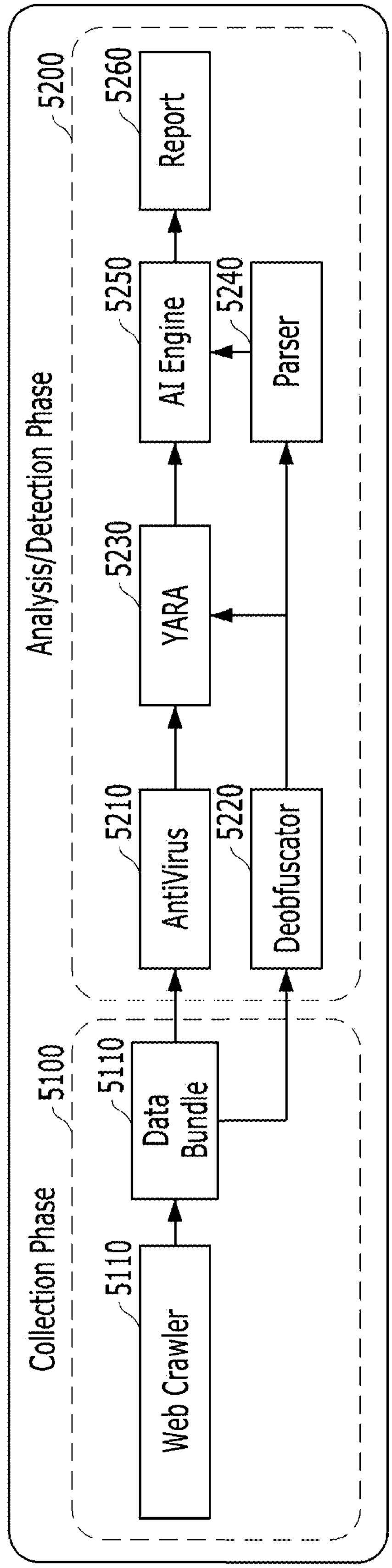
FIG. 45 is a diagram disclosing an example of receiving input of or collecting webpage information and identifying malicious information based thereon in an embodiment.

FIG. 45 discloses an example of receiving input of or collecting webpage information and identifying malicious information based thereon in an embodiment.

The cyber threat information processing apparatus or a method thereof according to an embodiment receives input of or collects world wide web page (hereinafter simply described as a webpage). An embodiment may search a collected webpage, analyze whether the webpage generates a specific malicious action, and provide an analysis result as cyber threat information for a user.

An embodiment of the cyber threat information processing apparatus disclosed in this figure includes a data collection unit 5100 and an analysis detection unit 5200. When described as an embodiment of the cyber threat information processing method, the embodiment includes a data collection step and an analysis and detection step.

The data collection unit 5100 may include a web collection unit (Web Crawler) 5110 and a data bundle unit (Data Bundle) 5120.

The web collection unit 5110 may collect information associated with a URL of a webpage input through web crawling.

The web collection unit 5110 collects all information related to a URL of a webpage, and generates a copy of the page or indexes the created page to rapidly perform processing.

The web collection unit 5110 of the embodiment may rapidly process a large amount of URL input data through parallel processing. For example, the web collection unit 5110 may rapidly and simultaneously process, in parallel, HTML information related to a URL input through one thread, JavaScript information in a webpage, media file information such as an image, and information about various files to be distributed by a webpage. A detailed example thereof will be disclosed below.

The data bundle unit 5120 may group and output various pieces of information processed in parallel by the web collection unit 5110.

The analysis detection unit 5200 may analyze and detect data including a malicious action in a data bundle collected and processed by the data bundle unit 5120. To this end, the analysis detection unit 5200 may include an antivirus unit (AntiVirus) 5210, a de-obfuscator 5220, a malware detection unit (YARA) 5230, a data parser 5240, an AI engine 5250, and a data provision unit (Report) 5260.

For example, the antivirus unit 5210 may analyze collected web data, and perform antivirus-based malware identification, for example, HTML code identification, in the collected data.

When data output by the data bundle unit 5120 is obfuscated, the de-obfuscator 5220 may de-obfuscate the data.

The malware detection unit 5230 may search for malware including a pattern or signature according to a certain rule, that is, a signature pattern of an attack tool or an attacker for malware analyzed and identified by the antivirus unit 5210 or data output by the de-obfuscator 5220.

For example, the malware detection unit 5230 may detect and classify malware according to a rule such as YARA for input data.

The data parser 5240 may parse data according to de-obfuscation of the de-obfuscator 5220.

The AI engine 5250 may determine whether data output by the malware detection unit 5230 or the data parser 5240 is malicious or normal based on a machine learning model.

The web collection unit 5110 of the disclosed embodiment may collect and process data related to webpages in parallel. Further, the analysis detection unit 5200 may identify whether or not data included in or related to a webpage is malicious by using a detection engine according to three detection steps (antivirus detection, signature-based malware detection, and AI-based detection) as described above.

Therefore, the embodiment may rapidly monitor webpage data and accurately identify whether or not the webpage data is malicious.

Figure 46:
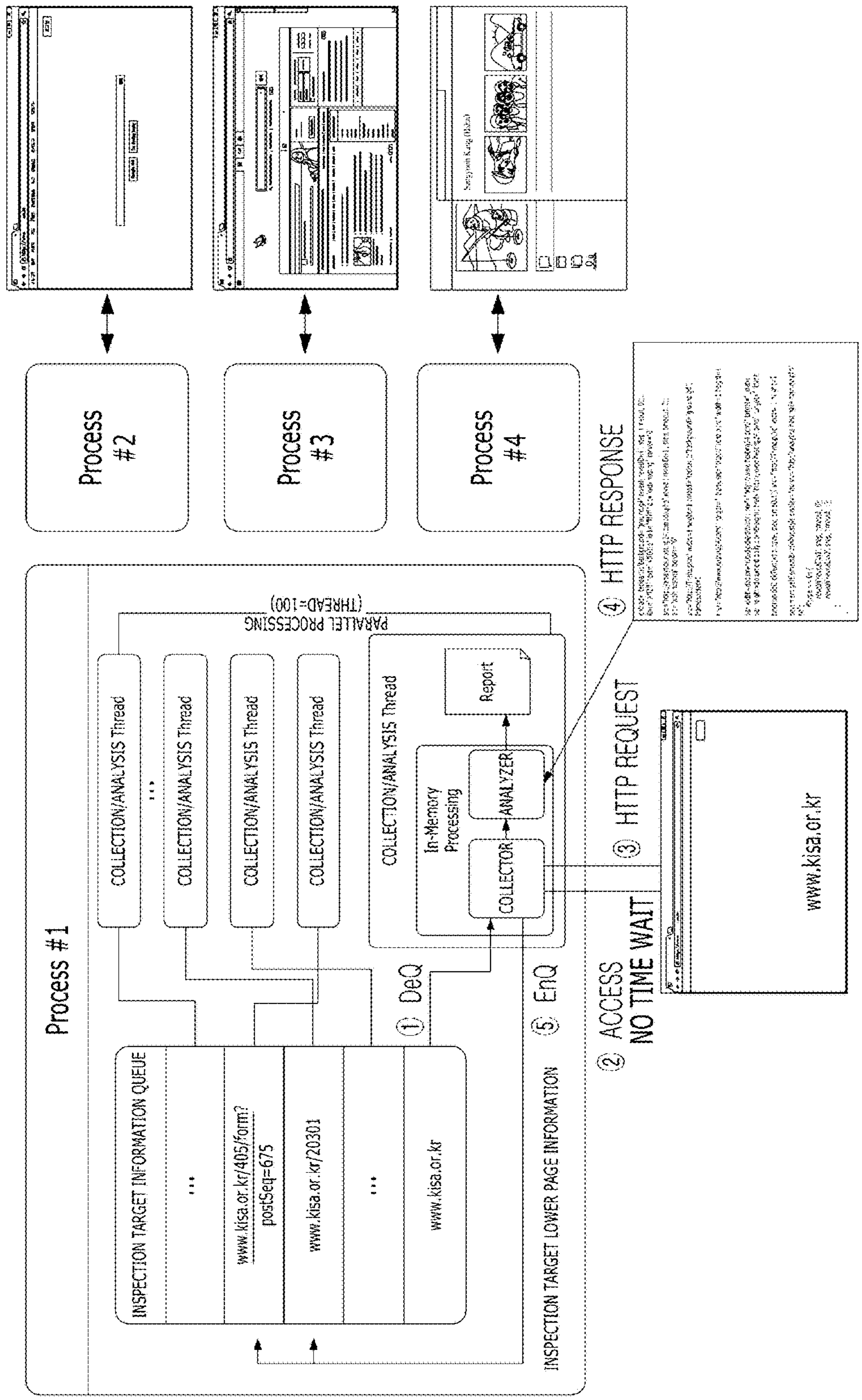
FIG. 46 is a diagram illustrating an operation of a web collection unit (Web Crawler) according to an embodiment.

FIG. 46 is a diagram illustrating an operation of the web collection unit according to an embodiment.

As shown in an example of this figure, the web collection unit may collect webpage data while processing several threads in parallel in one processor.

The example of this figure represents an example in which the web collection unit collects data related to different webpages in parallel while performing four processes.

Process #1, process #2, process #3, and process #4 may each receive address information of a different webpage, for example, URL information.

In the example of this figure, when process #1 receives input of address information of a specific webpage (in this example, www.kisa.or.kr), a first collection/analysis thread of process #1 may distribute the addressed information of the input webpage and webpage address information according to lower depths of the webpage to other collection/analysis threads.

The example of this figure illustrates the case where 100 collection/analysis threads simultaneously collect information on a webpage and lower webpages thereof. A plurality of collection/analysis threads operating in parallel may perform in-memory processing of collecting and analyzing each piece of webpage data within a corresponding thread.

For example, each thread may sequentially receive and process data according to a webpage and depth using a dequeue (DeQ) and enqueue (EnQ) method, which is a circular queue method.

Therefore, among a plurality of collection/analysis threads that operates in parallel, a master or first thread may assign webpage analysis tasks to other threads according to depth information of the input webpage.

A collector of a collection/analysis thread may immediately access a webpage according to a queue request, load webpage data in an in-memory collector, and make an HTTP request for the webpage data. In addition, when the collection/analysis thread receives an HTTP response of the corresponding webpage data, the HTTP response may be analyzed by an analyzer in the in-memory processing.

In this case, when the HTTP response received by the analyzer of the collection/analysis thread includes information on a lower webpage, similar webpage data analysis may be performed by immediately distributing the information on the lower webpage to another thread.

The URL of the webpage input in this way may include another URL therein, and analysis may be performed by visiting an additional page according to included depth information.

Process #2, process #3, and process #4 are illustrated in this example. However, similarly, other processes may perform operations in a similar manner.

Figure 47:
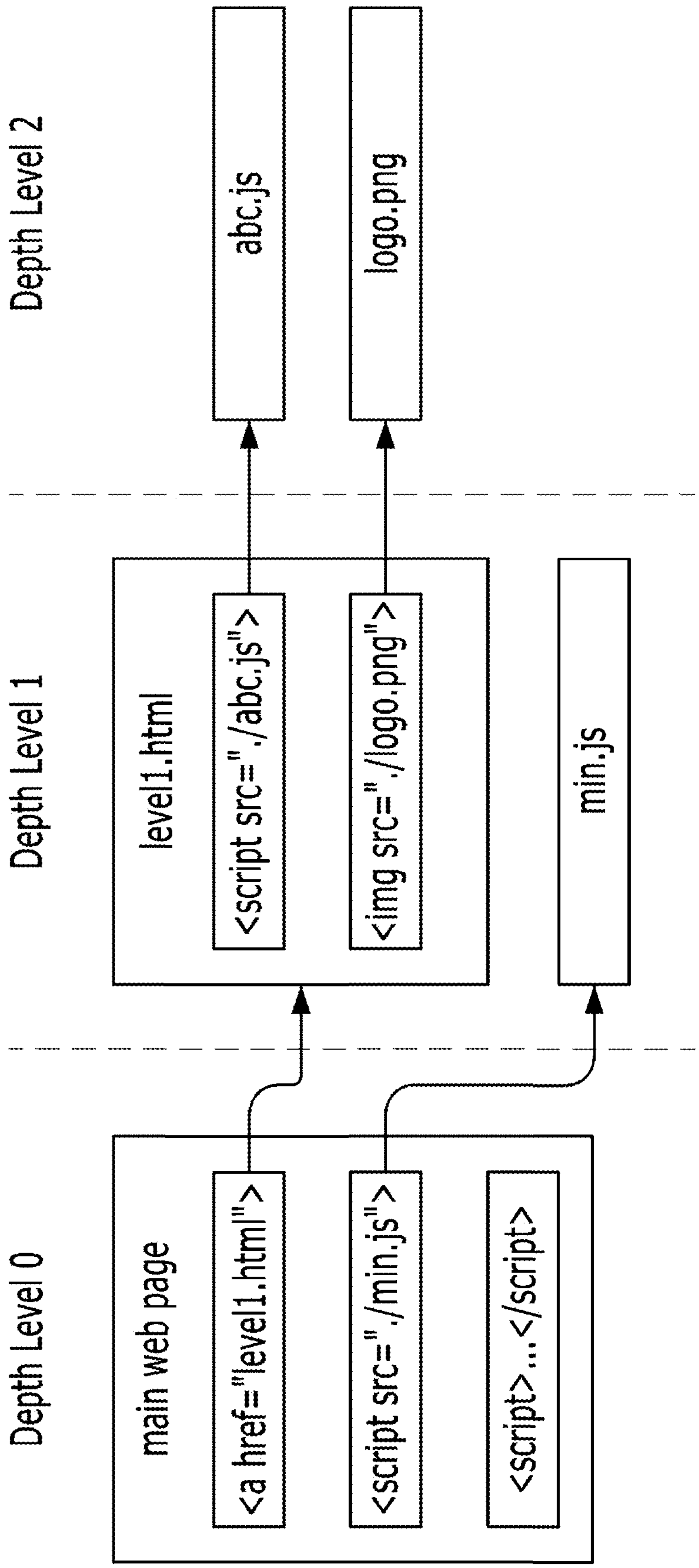
FIG. 47 is a diagram disclosing an example of storing and managing webpage data according to depth information of a disclosed embodiment.

FIG. 47 discloses an example of storing and managing webpage data according to depth information of a disclosed embodiment.

In this figure, a relationship between a webpage according to an input URL and a webpage linked according to depth is illustrated.

Depth levels for a main webpage and lower webpages thereof are indicated as 0, 1, and 2, respectively. In this example, the main webpage of depth level 0 may include various links, references, script files, etc. therein.

A webpage of depth level 1 may be an HTML file connected to the link of the main webpage or files linked by the script files, respectively.

In this example, the HTML file of depth level 1 is connected to the link of the main webpage and includes link information of a first Java (JS) script file and link information of an image file (for example, logo.png). In addition, in this example, the Java script file of depth level 1 is linked to the script file of the main webpage.

Again, a webpage of depth level 2 includes a first Java (JS) script file and an image file linked to the HTML file of depth level 1.

In this way, when the URL information of the main webpage is input, URL information of depth information according to the number of links connected thereto may be stored and managed. In this case, the embodiment may normalize the URL information.

The embodiment may normalize, store, and manage a webpage and a linked webpage according to a link using a scheme of encoding only allowed characters in a host name of a Unicode string using a Punycode technique according to RFC 3492, etc.

Figure 48:
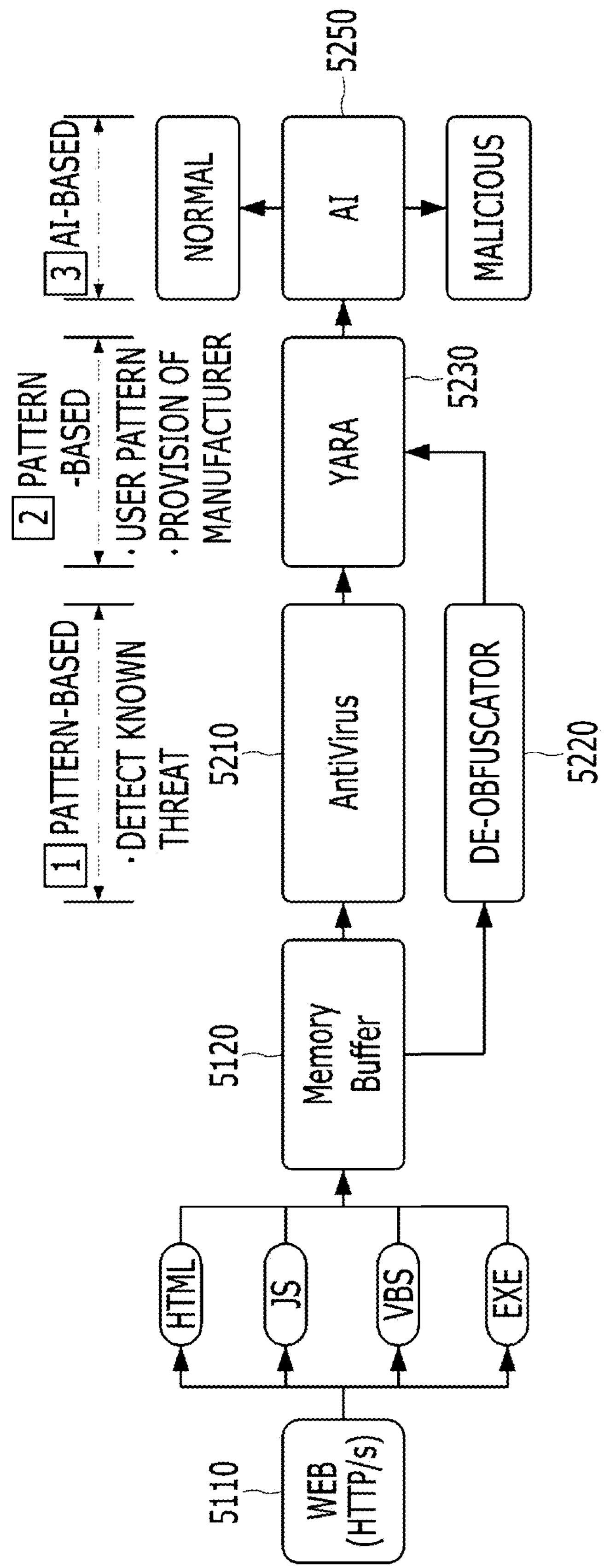
FIG. 48 is a diagram disclosing an example of determining whether webpage data is malicious according to analysis of a plurality of steps or layers according to an embodiment.

FIG. 48 discloses an example of determining whether webpage data is malicious according to analysis of a plurality of steps or layers according to an embodiment.

According to an embodiment, data of a webpage collected by the web collection unit is temporarily stored in the data bundle unit 5120, and then it is determined whether or not the data is malicious according to analysis of several steps or layers of the analysis detection unit 5200.

In the example of this figure, the web collection unit 5110 may analyze and collect various types of data within a webpage. This example illustrates the case of collecting an HTML file, a JavaScript (JS) file, a VB script (VBS) file, an EXE executable file, etc. among various file types.

Various types of data in the webpage collected by the web collection unit 5110 may be stored in the data bundle unit 5120, and the memory buffer 5120 is illustrated as a type of data bundle unit 5120 in the example disclosed above.

Whether the various types of data stored in the memory buffer 5120 are malicious may be determined in several layers.

For example, the antivirus unit 5210 may detect previously known cyber threat information based on a data pattern. The antivirus unit 5210 may identify known web data, for example, HTML malware, based on a previously known antivirus engine.

The de-obfuscator 5220 de-obfuscates obfuscated data among data stored in the memory buffer 5120. For example, when obfuscated JavaScript is present in webpage data, the obfuscated JavaScript may be de-obfuscated.

The malware detection unit 5230 performs pattern-based malicious action detection on data that is stored in the memory buffer 5120 and de-obfuscated or transmitted from the antivirus unit 5210. The malware detection unit 5230 may detect data in a webpage based on a pattern according to, for example, a YARA rule, identify malicious and attacking tools in the data, and identify a signature pattern of an attacker.

The AI engine 5250 may determine whether data transmitted by the malware detection unit 5230 is malicious or normal based on an AI algorithm.

As in the disclosed example, by analyzing collected webpage data through several steps and layers, it is possible to more accurately detect and analyze cybersecurity threats for the webpage data.

Meanwhile, in the case of an executable file such as an EXE file included in a webpage, it is possible to identify whether the file is malicious, an attack technique, and an attack group in the manner described in FIGS. 5 to 17.

In the case of a non-executable file included in a webpage, it is possible to identify whether the file is malicious, an attack technique, and an attack group in the manner described in FIGS. 28 to 39.

In an embodiment, when a malicious action is detected in a collected webpage, record data of the corresponding webpage may be provided to a user or administrator and stored in order to secure data.

For example, in an embodiment, when malicious data is detected in a specific webpage, an HAR format file of the webpage may be stored. Then, the administrator or security officer may perform additional analysis by including log data from the HAR format file of the stored webpage and ensure evidence for malicious detection.

An example of providing a monitoring result of a webpage to a user based on an HAR format file is illustrated below.

FIG. 49 illustrates a concept of analyzing webpage data and providing detected information according to an embodiment.

As disclosed above, webpage crawling of the web collection unit, and data analysis and malignancy detection of a webpage of the analysis detection unit may be sequentially performed.

When data of the webpage is determined to be normal as a result of malignancy detection, webpage data is collected by continuously crawling other webpages. In addition, when the data is determined to be malicious as a result of detection, relevant webpage data may be stored in a HAR format file by revisiting the corresponding webpage.

The HAR format file is a file that records, as log data, an interaction between a web browser and a site. Therefore, a data list recorded in the HAR format file includes all types of resource files of the webpage, records of HTTP requests and responses, and records of script files related to the webpage.

In an embodiment, a user or a cybersecurity officer may obtain record information such as a transaction related to a webpage as a result of webpage monitoring.

The user may reproduce record information of a webpage such as an HAR format file to check the record information of the webpage, and additionally analyze a malicious action or obtain basis data.

FIG. 50 discloses an example in which the above-disclosed embodiment operates on a computer.

As described above, the cyber security threat information processing apparatus including the data collection unit 5100 and the analysis detection unit 5200 may be driven in parallel in several computer nodes.

The figure illustrates the cyber threat information processing apparatus including a master node and a plurality of slave nodes.

A docker container may operate on an operating system of a cloud system of one master node 5710. Even though the data collection unit and the analysis detection unit illustrated above may be implemented as separate pieces of hardware, the data collection unit and the analysis detection unit may operate on the docker container in the example of this figure.

In such a case, applications operating on each docker container may perform the above-disclosed embodiment using resources of the cloud system.

The master node 5710 may include one or more docker containers and databases capable of performing the above-disclosed embodiment.

When operating in one docker container of the master node 5710, the data collection unit operating in a specific docker container may transfer webpage link information related to a collected webpage to other docker containers operating in the master node 5710 or slave nodes 5720. In addition, the master node 5710 may allocate tasks related to monitoring of malignancy detection of a webpage to slave nodes in consideration of load balancing.

Based on the illustrated docker swarm, webpage monitoring systems operating in several hosts may be grouped and managed as one master-slave cluster system.

In this case, the master node 5710 of the cluster system may periodically transmit a heartbeat packet to the slave nodes 5720 to determine whether a server has failed.

The master node 5710 of the cluster system may check the status of the slave nodes 5720 to determine whether there is a failure of the server. Conversely, when the master node 5710 of the cluster system desires to expand the processing capacity of webpage monitoring, a docker image may be distributed to a new node and included in the cluster system.

As such, the master node 5710 of the cluster system may perform scale-out for webpage monitoring by performing registration and release of nodes in the cluster as in the disclosed example.

Figure 51:
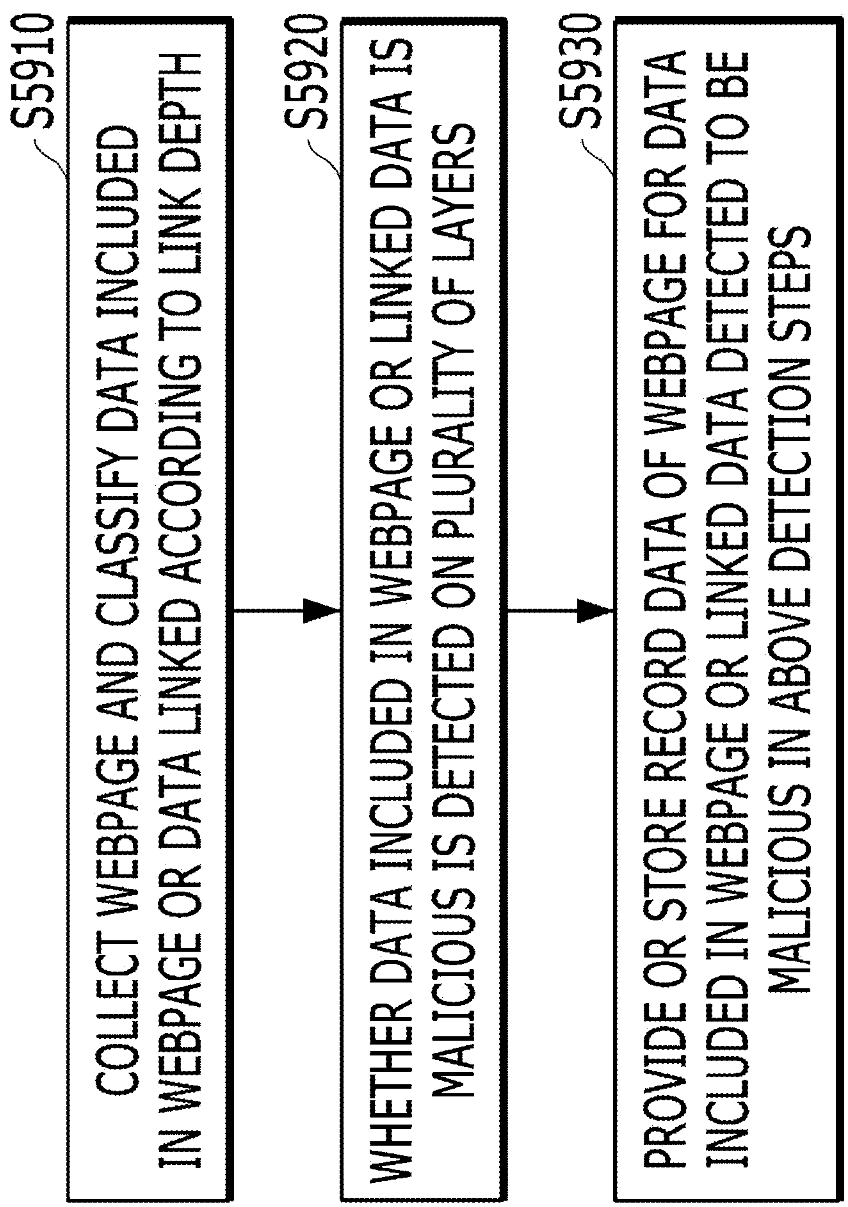
FIG. 51 is a diagram disclosing an embodiment of a method of processing cyber threat information included in a webpage.

FIG. 51 discloses an embodiment of a method of processing cyber threat information included in a webpage.

A webpage is collected, and data included in the webpage or data linked according to link depth is classified (S5910). When webpages are collected and classified, the webpages may be processed in a parallel process according to several computer nodes, and may be performed in a docker container of each node according to scale-out of the computer nodes. Detailed examples thereof are disclosed in FIGS. 46, 47 and 50.

Whether the data included in the webpage or the linked data is malicious is detected on a plurality of layers (S5920).

The data included in the webpage refers to various data or files distributed by the webpage, such as HTML data, JavaScript data, and media files such as images and audio. The data linked to the webpage includes various types of data or files linked to the webpage. A detailed example thereof is disclosed in FIG. 48.

For example, in a first layer, cyber threat information may be detected according to the antivirus-based HTML data pattern for the data included in the webpage or the linked data.

For example, in a second layer, malware including a pattern or signature according to a certain rule, that is, cyber threat information according to a signature pattern of an attack tool or an attacker may be detected for the data included in the webpage or the linked data. When the data included in the webpage or the linked data is obfuscated, the data may be de-obfuscated. For example, in the case of obfuscated JavaScript, a de-obfuscation tool may be applied, and a signature pattern may be found according to a YARA rule, etc.

For example, in a third layer, whether cyber threat information such as malicious action data is included may be detected based on an AI algorithm for the data included in the webpage or the linked data.

Three detection steps for the data included in the webpage or the linked data may be performed in parallel or sequentially.

In the detection steps, in the case of the data included in the webpage or the linked data detected to be malicious, record data of the corresponding webpage is provided or stored (S5930).

Record data of a webpage may include record information of the webpage by reproducing webpage record information such as a HAR format file. Based on the recorded data, the user may additionally analyze the malicious action or obtain basis data.

Therefore, according to the disclosed embodiments, it is possible to detect and address malware not exactly matching data learned by machine learning and address a variant of malware.

According to the embodiments, it is possible to identify malware, an attack technique, and an attacker in a significantly short time even for a variant of malware, and furthermore to predict an attack technique of a specific attacker in the future.

According to the embodiments, it is possible to accurately identify a cyberattack implementation method based on whether such malware exists, an attack technique, an attack identifier, and an attacker, and provide the cyberattack implementation method as a standardized model. According to the embodiments, it is possible to provide information about malware, for which malware detection names, etc. are not unified or a cyberattack technique cannot be accurately described, using a normalized and standardized scheme.

In addition, it is possible to provide a means capable of predicting a possibility of generating previously unknown malware and attackers who can develop the malware, and predicting a cyber threat attack occurring in the future.

According to the embodiments, it is possible to more clearly detect and recognize different attack techniques or different attack groups generated according to differences in an execution process even when execution results of executed files are the same.

According to the embodiments, it is possible to identify cyber threat information, attack techniques, and attack groups for various file types included in a file even when the file is a non-executable file, not an executable file.

According to the embodiments, it is possible to monitor a webpage, identify a webpage including a malicious action or information, and furthermore, identify cyber threat information, an attack technique, and an attack group included in the webpage.

Therefore, according to the disclosed embodiments, it is possible to detect and address malware not exactly matching data learned by machine learning and address a variant of malware.

According to the embodiments, it is possible to identify malware, an attack technique, and an attacker in a significantly short time even for a variant of malware, and furthermore to predict an attack technique of a specific attacker in the future.

According to the embodiments, it is possible to accurately identify a cyberattack implementation method based on whether such malware exists, an attack technique, an attack identifier, and an attacker, and provide the cyberattack implementation method as a standardized model. According to the embodiments, it is possible to provide information about malware, for which malware detection names, etc. are not unified or a cyberattack technique cannot be accurately described, in a normalized and standardized scheme.

In addition, it is possible to provide a means capable of predicting a possibility of generating previously unknown malware and attackers who can develop the malware, and predicting a cyber threat attack occurring in the future.

According to the embodiments, it is possible to more clearly detect and recognize different attack techniques or different attack groups generated according to differences in an execution process even when execution results of executed files are the same.

According to the embodiments, it is possible to identify cyber threat information, attack techniques, and attack groups for various file types included in a file even when the file is a non-executable file, not an executable file.

Hereinafter, a more specific embodiment of determining whether collected webpage data is malicious will be disclosed.

When reference information providing a website, for example, URL information is acquired, HTML data may be obtained from webpage data of the URL.

In previous malignancy detection or analysis of HTML, the entire HTML data has been simply learned based on machine learning, and malignancy has been determined according to a frequency of a specific tag or a frequency of a specific character in HTML. Therefore, it has been difficult to verify a cause in HTML and a person inducing a specific malicious action.

The disclosed embodiment is capable of identifying a specific attack action and even identifying an attack group in HTML data in order to overcome this problem.

Webpage data includes HTML data describing the webpage, and the HTML data may describe content of the webpage using tags, which are various command sets.

For example, HTML data includes a bundle of tags including opening and closing of each tag in the data, and in this way, a tag bundle may constitute part of the HTML data.

Even though HTML supports slightly different tags for each web browser, HTML generally supports similar tags. Accordingly, the embodiment may detect and identify an attack action of an attacker with respect to described content included in a tag set.

For example, an attacker may perform an attack action by exploiting a function of an HTML tag of a webpage. When an attacker uses the same attack technique in the webpage, data described in the HTML tag of the webpage may appear similarly when analyzing cyber threat information.

An embodiment may identify whether a tag is a malicious tag or a malicious tag similar to the malicious tag based on similarity of a partial region in tag units of HTML data.

Hereinafter, a detailed embodiment thereof is disclosed.

Figure 52:
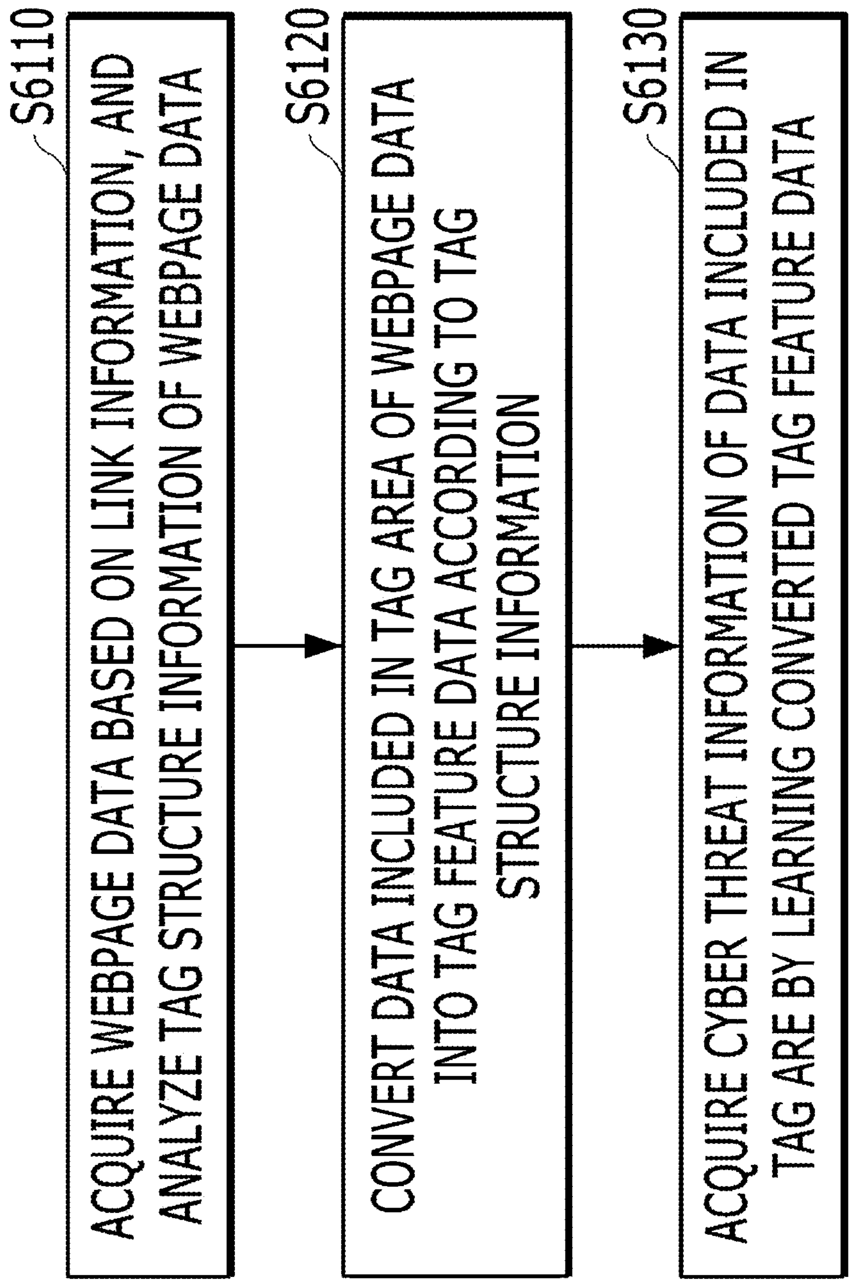
FIG. 52 is a diagram disclosing an embodiment of a method of processing cyber threat information.

FIG. 52 discloses an embodiment of a method of processing cyber threat information.

Webpage data is acquired based on link information, and tag structure information of the webpage data is analyzed (S6110). As an example of the tag structure information of the webpage data, a document object model (DOM) tree structure is illustrated below.

Data included in a tag area of the webpage data is converted into tag feature data according to the tag structure information (S6120). Depending on the tag structure information, in HTML data, data in tag units that may be modified by an attacker may be converted into tag feature data. A detailed embodiment of the tag feature data will be disclosed below.

Cyber threat information of data included in the tag area is acquired by learning the converted tag feature data (S6130). The tag feature data may be classified by a classification model of an AI model to identify an attack technique and an attack group for a malicious action in each tag part.

Figure 53:
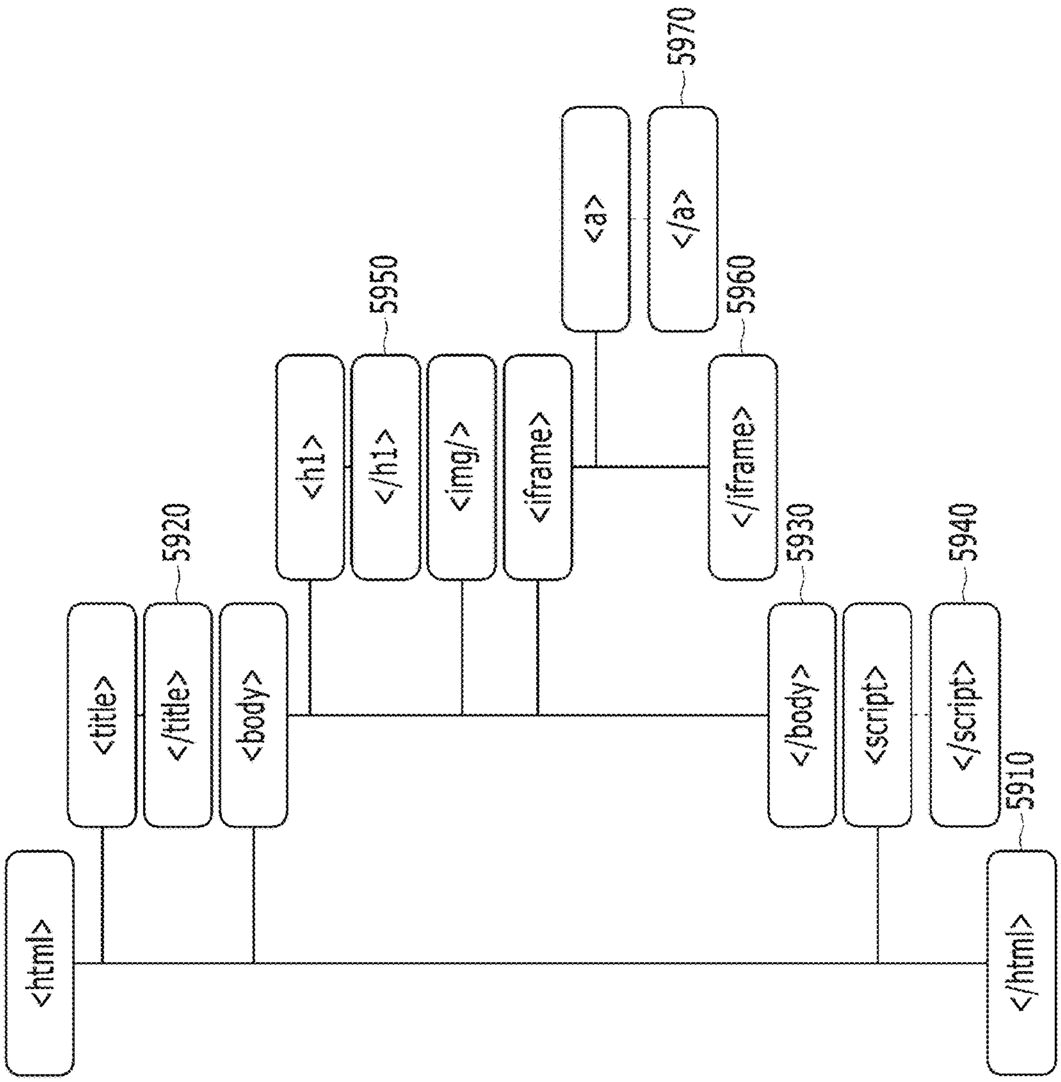
FIG. 53 is a diagram illustrating structure information based on tags of hypertext markup language (HTML) data as a method of processing cyber threat information according to an embodiment.

FIG. 53 illustrates structure information based on tags of HTML data as a method of processing cyber threat information according to an embodiment.

HTML data may be analyzed in tag units, and this figure is an example of a DOM Tree in tag units of HTML data. The Dom Tree is associated with depth according to the sequential order of tags, and may be an object or a node in units of tags. Therefore, when the DOM tree of the HTML data is obtained, an HTML structure thereof may be easily understood.

The example of this figure is an example of analyzing HTML data, and illustrates a DOM tree structure according to positions and depths of tags.

In the example of this figure, a tag </html> 5910 representing an end of a tag part surrounding the entire HTML document, an end </title> 5920 of a tag representing a name of the HTML document, an end </body> 5930 of a tag area representing a body of the HTML document, and an end </script> 5940 of a tag bundle representing a script in the HTML document are illustrated together with respective identification numbers.

In addition, each of an end </h1> 5950 of a tag bundle representing a heading of content, an end </iframe> 5960 of a bundle of tags for inserting content of nested browsing, that is, another HTML page into the document, and an end </a> 5970 of a tag area for generating hyperlink is illustrated in the body of the HTML document.

In this way, HTML data may be analyzed as information of a hierarchical structure, and separated into tag units allowing characteristics of the HTML data to be identified.

Here, an example of classifying HTML data according to a DOM tree is disclosed as an example of separating HTML data into tag areas allowing characteristics of the HTML data to be identified.

FIG. 54 discloses an example of obtaining feature information related to a cyber security threat from structure information based on a tag of HTML data as a method of processing cyber threat information according to an embodiment.

First, in order to facilitate the embodiment, an example of using a webpage having tag structure information in the figure disclosed above to obtain feature information related to a cybersecurity threat of the webpage is disclosed.

As in the example disclosed above, tag structure information of HTML data may be obtained according to DOM tree analysis.

Tag data obtained here is illustrated in a left section, and webpage data corresponding to each piece of tag data is illustrated in a right section.

According to the example disclosed above, <body>, <image>, <iframe>, <a>, <script>, or </script> is illustrated as a tag area or tag data included in the tag structure information of the HTML data.

In the example of this figure, text 5980 included in the tag <body> in the tag structure information is as follows as described in the figure.

onload="teclear( );"
Background="ground.gif"
Link="#ff2ff"
Text="#ff0001e"
Link="fff2ff"

Further, in this example, in the tag structure information, content included in a tag image <image> area may be a URL address where an image source is provided (http://analytics.hosting24.com/do.php in the example of this figure).

A user or an attacker may arbitrarily modify or add cyber threat information to the HTML data corresponding to each tag area included in the tag structure information.

Accordingly, in this case, data modified or arbitrarily modified by an attacker may be replaced with data for detection or analysis of cyber threat information.

Here, the data arbitrarily modifiable by a user or an attacker refers to values arbitrarily modifiable by the user except for HTML grammar, among HTML data, and refers to a URL address, a string value, etc. within a tag area.

According to the above example, the arbitrarily modifiable values among the HTML data may correspond to data in which a function (teclear ( ) in the example of this figure), a URL address (http://analytics.hosting24.com/do.php in the example of this figure), a string (web hosting, etc. in the example of this figure), a variable name (weight in the example of this figure), etc. are modifiable by an attacker.

In the above example, the function teclear ( ) may be replaced with data (for example, <func>) indicating the data is a function among the HTML data, and the URL address may be replaced with data (for example, <http><url><ext:php>) indicating that the data is a URL address among the HTML data.

Further, in the above example, the string (for example, web hosting) may be converted into or replaced with data (for example, <string>, etc.) indicating that the data is a specific character string among the HTML data, and the variable name (for example, height or width) may be converted into or replaced with data (for example, <name>, etc.) indicating that the data is a variable name among the HTML data.

In this way, when a replaceable part of HTML data is replaced according to a certain rule as described above, converted tag information may be converted into vectorized data as information representing cyber threat information.

FIG. 55 illustrates a process of processing and converting a part that may include cyber threat information, except for HTML grammar, in the HTML document illustrated above according to an embodiment.

According to an embodiment, HTML data according to URL information may be analyzed according to a tag area or tag data according to tag structure information.

In this example, when HTML data of a specific webpage is analyzed by a tag area or tag data according to tag structure information, each piece of tag data is located in a left column.

In this example, each piece of tag data 6110 may be sorted as <body>, <image>, <iframe>, <a>, <script>, or </script>.

Data corresponding to each piece of tag data in the HTML document is processed according to a certain rule as described above, which is shown in each preprocessing section 6120.

For example, data of a body part is processed as follows according to a conversion rule.

onload="<func>( );"
Background="<name>.gif"
Link="<hex>"
Text="<hex>"
Link="<hex>"

As in the example disclosed above, among the HTML data, a function included in the tag area may be converted into <func>( ), a name of an image may be converted into <name>, and hexadecimal code included in a link or text may be converted into <hex>.

Further, a string is converted into <string>, a URL address is converted into <http><url>, and a variable name is converted into <name>. In this way, parts other than a part necessarily used in HTML grammar may be changed according to a certain format or principle, and rules converted here may be sufficiently changed by those skilled in the art.

Data of the preprocessing section 6120 is converted into normalized data of a certain length, and the normalized data may be converted into a fuzzy hash value.

In the example of this figure, a fuzzy hash section 6130 represents the result of converting the data of the preprocessing section 6120 processed according to a certain rule into a fuzzy hash value.

That is, a first row of the fuzzy hash section 6130 illustrates a fuzzy hash value obtained by converting data in the preprocessing section 6120 processed from the data in the <body> tag area among the HTML data.

A second row of the fuzzy hash section 6130 illustrates a fuzzy hash value obtained by converting data in the preprocessing section 6120 processed from the data in the <image> tag area among the HTML data.

In addition, a third row of the fuzzy hash section 6130 illustrates a fuzzy hash value obtained by converting data in the preprocessing section 6120 processed from the data in the <iframe> tag area among the HTML data.

In this way, each piece of data processed from data in a tag area among the HTML data may be normalized and then converted into a hash value applied to a fuzzy-based hash function.

As illustrated above, an extracted hash value may be converted into N-gram data and converted into tag feature data 61400 using a frequency count according to an M-byte pattern. Here, an example is disclosed in which a 2-gram technique is applied to an extracted hash value to perform conversion into tag feature data using a frequency count according to a 2-byte pattern.

Hereinafter, data capable of representing cyber threat information by converting each tag area according to tag structure information is referred to as tag feature data. That is, the tag feature data may be cyber threat feature information corresponding to a tag unit classified according to tag structure information.

Therefore, when a classification model is trained based on tag vector data, it is possible to determine malignancy therefor.

Figure 56:
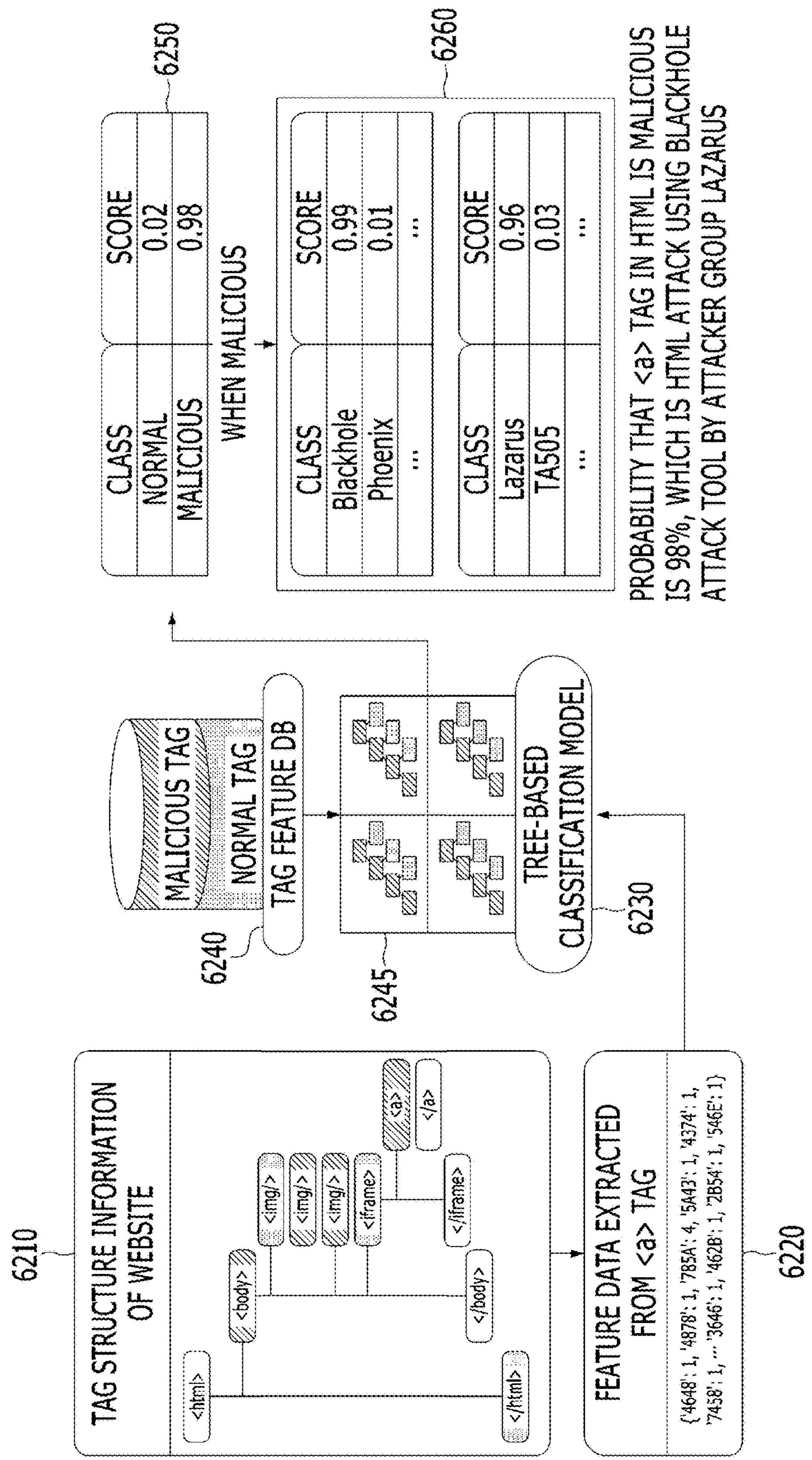
FIG. 56 is a diagram conceptually illustrating an example of a cyber threat information processing method according to an embodiment.

FIG. 56 is a diagram conceptually illustrating an example of a cyber threat information processing method according to an embodiment.

The embodiment may acquire webpage data, separate the webpage data according to tag structure information 6210 of the webpage data, and process the webpage data. The webpage data may be received as URL information or may be collected through web crawling.

In this example, a result of analysis based on tag structure information 6210 of input webpage data when the webpage data is input is conceptually displayed. For convenience of description, the same example as the above example is used as the tag structure information 6210.

According to the tag structure information 6210, HTML data may be converted according to a certain rule for each tag area or each piece of tag data, and the converted data may be normalized and converted into a hash value. HTML data converted into the hash value may be converted into tag feature data, which is N-gram data.

In this example, a result of converting HTML data corresponding to the tag area <a> of the tag structure information 6210 into tag feature data 6220 is illustrated.

The tag feature data 6220 may include data related to an attack action or pattern data thereof, except for grammar essential for HTML. Accordingly, the tag feature data 6220 may include data capable of identifying an attack action identifier or an attack group in cyber threat information.

The embodiment may train a tree-based classification model 6230 based on the tag feature data 6220. For example, whether the tag feature data 6220 is malicious may be classified by applying a random forest learning algorithm using at least one decision tree 6245 to the input tag feature data 6220 based on a prepared tag feature database (DB) 6240.

The tag feature DB 6240 stores data of a tag area included in HTML data as malicious or normal tag feature data according to malicious label information of a webpage. That is, data of a tag area in HTML including a malicious action is stored as malicious tag data in the DB, and data of a tag area in normal HTML is stored as normal tag data in the DB.

That is, according to a classification result of the tree-based classification model 6230 according to the embodiment, whether the tag feature data 6220 is malicious may be probabilistically determined (6250). Here, an example in which a probability that the data of the tag area <a> in the HTML document is malicious is determined to be 98% is disclosed.

Further, when the corresponding tag feature data 6220 is malicious, an attack technique identifier and an attacker group included in the tag feature data 6220 may be identified. In this example, an example of identifying an attack technique identifier referred to as Blackhole and an attacker group Lazarus for the tag feature data 6220 is disclosed.

Therefore, according to the embodiment, it is possible to identify which tag area in HTML is malicious as well as whether the HTML document included in the webpage data is malicious. In addition, rather than simply detecting or classifying HTML data as malicious based on machine learning or determining malignancy based on a frequency of a specific tag or a frequency of a specific character in HTML, it is possible to identify an attack technique and an attack group of specific tag data of HTML data. Therefore, accurate malicious detection and analysis are possible.

Figure 57:
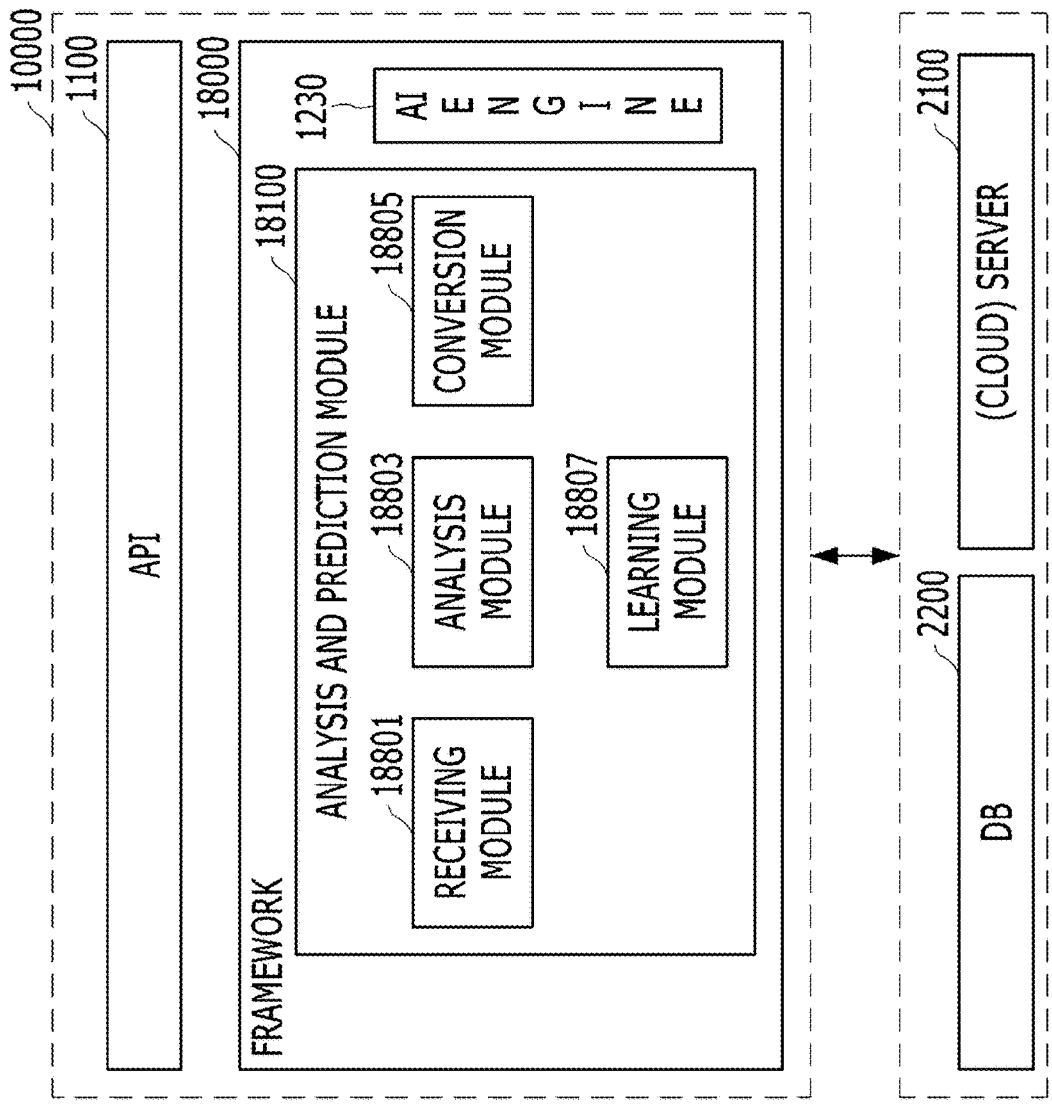
FIG. 57 is a diagram illustrating an example of an apparatus for processing cyber threat information included in a tag of a webpage according to an embodiment.

FIG. 57 is a diagram illustrating an example of an apparatus for processing cyber threat information included in a tag of a webpage according to an embodiment.

Another embodiment of the cyber threat information processing apparatus may include a server 2100 including a processor, a database 2200, and an intelligence platform 10000.

The database 2200 may store previously classified malware or a pattern code of malware.

The processor of the server 2100 may receive location information such as link information of a webpage through an application programming interface (API) 1100.

A receiving module 18801 of a framework 18000 may receive the webpage data using the link information of the webpage received through the API according to an instruction of the processor of the server 2100.

An analysis module 18803 may analyze the received webpage data based on link information of the webpage to obtain tag structure information for the webpage data. As an example of the tag structure information, a DOM tree structure is illustrated.

A conversion module 18805 may convert data included in the tag area of the webpage data into tag feature data according to the tag structure information of the webpage data. The conversion module 18805 may convert data of a part modifiable by the user, in addition to a part for an essential structure included in the webpage, into tag feature data in tag units according to the tag structure information.

A learning module 18807 acquires cyber threat information of data included in the tag area according to the tag structure information by applying a classification model to the tag feature data using the AI engine 1230.

The learning module 18807 may classify the tag feature data by the classification model according to an algorithm of the AI engine 1230 to identify an attack technique and an attack group for a malicious action in each tag part.

When the learning module 18807 classifies feature data such as the tag feature data, examples of the classification model are disclosed in detail in FIGS. 25 to 28 and 52 to 55.

The intelligence platform that provides information on an APT attack in the above-described manner may further provide a real-time intelligence line feed service.

More specifically, the intelligence platform may perform natural language processing on cyber threat information in real time, and provide the processed cyber threat information to the user. In this way, the user may provide cyber threat information automatically collected and analyzed for each time and processed through the intelligence platform. Here, cyber threat information can be provided through an API-based on-demand method, or alerts can be provided through applications that deliver messages or emails.

A specific embodiment will be described below.

Referring to cyber security information, a method and format of displaying CTI differ depending on the level of understanding and ability of cyber security experts in many cases.

Therefore, even when detection ability of malware increases as AI analysis increases, there is a problem in that effectiveness of such detection capability is significantly low when detected malware is not properly described and information thereon is not provided.

Since identification and delivery of the same malware are not accurately performed, experts inaccurately respond thereto in some cases, and accurate delivery and description to the general public is more difficult.

MITRE ATT&CK, a standardized model, may solve these difficulties to some extent. However, the following will disclose embodiments of cyber threat intelligence enabling ordinary people or cyber security managers to easily and efficiently respond to detection and management of malware.

In particular, the following will disclose embodiments capable of maximizing efficacy of the disclosed cyber threat intelligence in connection with a natural language model NLP or a large language model LLM.

Figure 58:
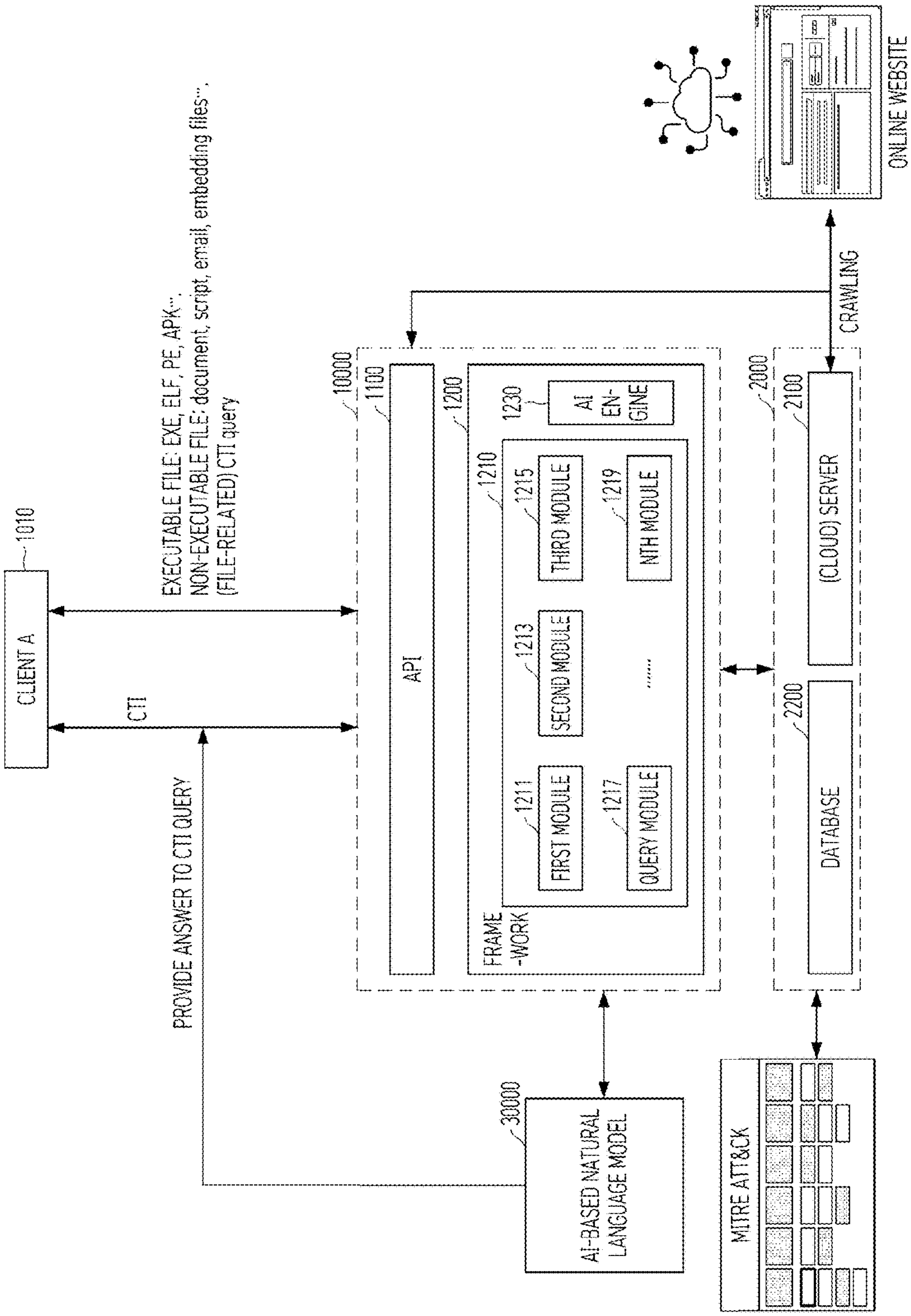
FIG. 58 discloses an embodiment in which cyber threat intelligence and an AI-based natural language model are linked with each other.

FIG. 58 discloses an embodiment in which cyber threat intelligence and an AI-based natural language model are linked with each other.

The disclosed embodiment includes an intelligence platform 10000, a physical device 2000 that is a computing device, and a natural language model 30000.

The intelligence platform 10000 includes an API 1100 configured to receive various requests for CTI from the client A 1010 and a framework 1200 configured to process CTI.

The framework 1200 includes various modules 1211, 1213, 1215, 1217, . . . , 1219 configured to process CTI based on the physical device 2000 and an AI engine 1230. Several examples thereof have been disclosed above.

For example, the client A 1010 may request, from the intelligence platform 10000, determination as to whether executable files such as EXE, ELF, PE, APK, etc., a text file, a script file, an e-mail, etc., or non-executable files in which executable files may be included are malicious, may query the intelligence platform 10000 about the determination, or may query about CTI related to the files.

The API 1100 receives files requested by the client A 1010 or CTI. The framework 1200 uses the modules 1211, 1213, 1215, . . . configured to perform various analyses such as static analysis, dynamic analysis, in-depth analysis, and AI engine 1230 to provide received files or analyzed or predicted CTI to the user.

The physical device 2000 includes an on-premise or cloud server 2100 including a processor and a database 2200 configured to store various types of data related to CTI.

The server 2100 may use the processor to perform processes of the modules 1211, 1213, 1215, . . . in the framework 1200, or to collect various CTI data on the Internet through crawling.

The database 2200 may store analyzed or collected CTI, or store CTI based on MITRE ATT&CK.

Meanwhile, the AI-based natural language model 30000 may receive a file queried by a client or a query about CTI (hereinafter simply referred to as CTI query) directly or through the intelligence platform 10000. The AI-based natural language model 30000 may provide a natural language description of data related to the queried file or CTI as an answer to the CTI query.

In this figure, the query module 1217 of the intelligence platform 10000 may generate, convert, or provide a file or CTI requested by the client into a query that may be processed by the natural language model 30000.

The AI-based natural language model 30000 may be a simple language model LM or a large language model LLM. In addition, the AI-based natural language model 30000 may be included in the intelligence platform 10000, or may be a separate model, which is not included in the intelligence platform 10000, configured to process CTI in conjunction therewith through mutual transmission and reception of data or provide description information on a query for CTI.

The disclosed embodiment of the intelligence platform 10000 may be performed by at least one processor within the server 2100. The intelligence platform 10000 may be implemented by a miniaturized computing device or software, and thus is not limited to a specific location and may even be included in a space vehicle such as a satellite. For example, processing may be performed according to an embodiment below to determine what type of CTI is included in data or files received by the satellite or the space vehicle, and a result thereof may be provided.

Conversely, the intelligence platform 10000, which is the disclosed embodiment, may process a file or an answer to a CTI query received from the space vehicle such as the satellite.

The following description discloses examples in which the intelligence platform 10000 and the AI-based natural language model 30000 are linked with each other to process CTI requested by the user and provide description information therefor.

Figure 59:
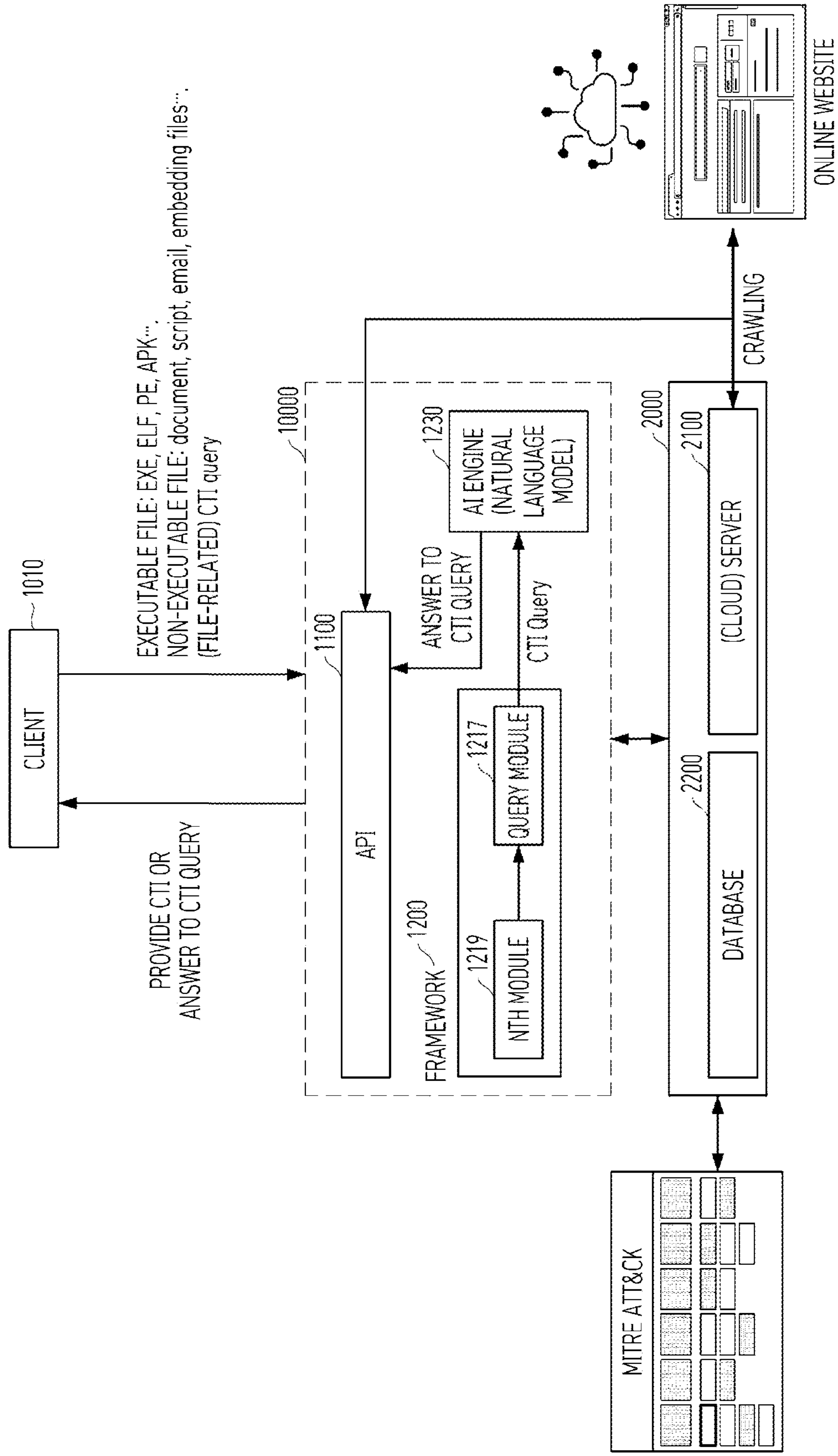
FIG. 59 discloses an embodiment in which the intelligence platform including a natural language model provides CTI in natural language.

FIG. 59 discloses an embodiment in which the intelligence platform including a natural language model provides CTI in natural language.

In this example, the AI engine 1230 of the intelligence platform 10000 may include a natural language model 30000.

Regardless of whether input data is an executable file or a non-executable file, a client 1010 may query about CTI related to the file or deliver a related CTI query to the intelligence platform 10000.

Here, the CTI queried by the user or the CTI query may include, for example, maliciousness, a hash value of the file, assembly code or function information included in the assembly code, and information related to other files.

The intelligence platform 10000 may receive the delivered executable file or non-executable file and analyze the executable file or non-executable files in the modules of the framework 1200. An example of performing malicious behavior analysis on executable files, non-executable files, or collected web data by the modules of the framework 1200 has been described above. Here, the various analysis modules illustrated above are indicated as an arbitrary Nth module 1217.

Meanwhile, the query module 1217 of the framework 1200 delivers CTI or query related to a file submitted by the client 1010 to the AI engine 1230 including the natural language model.

The Nth module 1217 may deliver analysis information of a file related to CTI or a CTI query queried by the user to the query module 1217. For example, the Nth module 1217 may deliver information about whether the analyzed file is malicious, an attack action, an attack technique, an attack group, or an attack campaign associated with various attack actions to the query module 1217.

The query module 1217 delivers the CTI or query submitted by the user to the AI engine 1230, or generates a CTI supplementary query based on the information analyzed by the Nth module 1217 in relation to the user CTI query and delivers the CTI supplementary query to the engine 1230.

For example, the CTI supplementary query may be a keyword or an analysis value of the analyzed CTI or may include the analysis value. For example, the CTI query may be a hash value, an attack ID of MITRE & ATT&CK, an identifier for an attack group, attack techniques related to an attack campaign, etc. or may include these values or identifiers.

Then, the natural language model of the AI engine 1230 may generate a natural language answer to the CTI query or the CTI supplementary query of the user based on the various CTI analyzed by the Nth module 1217.

The intelligence platform 10000 provides an answer to a CTI query by providing the user with a natural language answer generated by the natural language model of the AI engine 1230 together with CTI analysis information generated by the framework 1200. The answer to the CTI query includes a natural language description of whether the CTI is malicious, an attack action, an attack technique, an attack group, an attack campaign in which several attack actions are linked, etc. queried by the user in relation to the file. In addition, it is possible to provide description information on whether an inquiry about a binary file such assembly language code or a function included in the file is related to maliciousness based on an analysis result of the intelligence platform 10000.

The framework 1200 of the intelligence platform 10000 may provide various analysis information about a file or previously analyzed information stored in the database 2200, and generate various CTI supplementary queries related to a CTI query of the user or propose the CTI supplementary queries to the user.

In addition, the AI engine 1230 of the intelligence platform 10000 generates a natural language description for user CTI queries and CTI supplementary queries based on the analyzed or stored CTI, and provides CTI-related natural language answers to the user.

The embodiment provides information analyzed by the intelligence platform 10000 or previously analyzed for the user CTI query together with natural language. Thus, according to the embodiment, even when the user is a non-expert, it is possible to easily and accurately deliver and respond to CTI.

Figure 60:
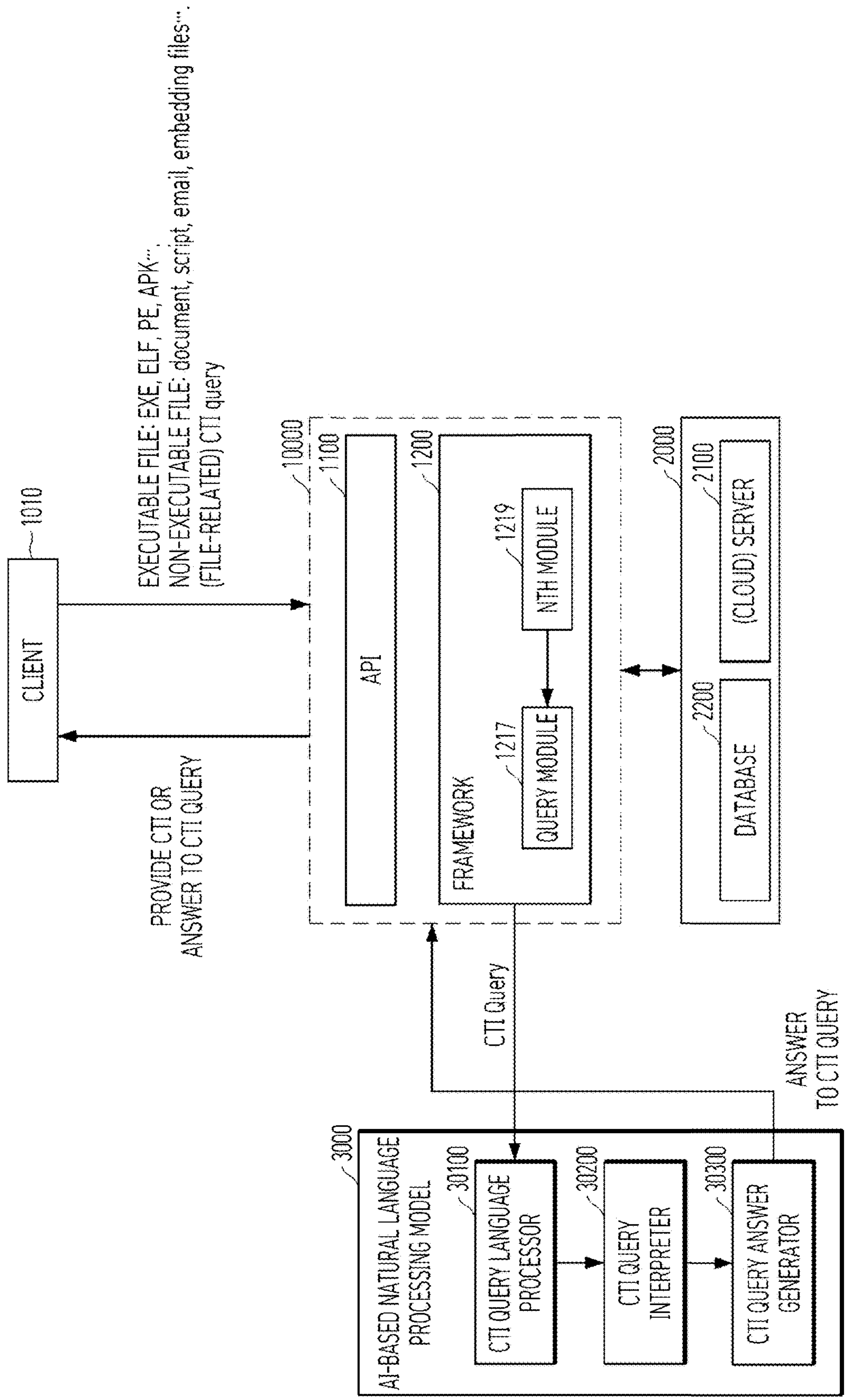
FIG. 60 discloses another embodiment in which the intelligence platform uses a natural language model to provide CTI in natural language.

FIG. 60 discloses another embodiment in which the intelligence platform uses a natural language model to provide CTI in natural language.

An example has been disclosed in which an AI-based model (for example, an AI engine) provided in the intelligence platform 10000 disclosed above is used to provide a simple natural language description for real-time line feed or CTI.

The embodiment of this figure discloses an example in which the disclosed intelligence platform 10000 analyzes CTI in association with the large-scale natural language model 30000 and provides description information thereof.

This example is similar to the example disclosed above except for the case where the AI-based model (for example, the AI engine) provided in the intelligence platform 10000 is replaced with the large-scale natural language model 30000.

When the intelligence platform 10000 receives the CTI or CTI query of the user, the query module 1217 may deliver the CTI or CTI query to the large-scale natural language model 30000.

The query module 1217 of the intelligence platform 10000 may generate a CTI query or generate a CTI supplementary query corresponding to CTI analyzed by the Nth module 1219 or previously analyzed and stored in the database 2200 or CTI submitted by the user based on the CTI, and deliver the CTI query or the CTI supplementary query to the large-scale natural language model 30000.

The large-scale natural language model 30000 may receive a CTI query or a CTI supplementary query from the query module 1217 and generate a natural language description as an answer to the CTI query. In addition, the large-scale natural language model 30000 may receive at least one of a CTI query or CTI analysis information generated by the framework 1200 of the intelligence platform 10000 from the query module 1217, and generate a natural language description as part of an answer to the CTI or CTI query made by the user based on the CTI analysis information.

The large-scale natural language model 30000 may deliver the generated natural language description to the intelligence platform 10000, and the intelligence platform 10000 may provide the natural language description, which is an answer to the CTI query delivered by the large-scale natural language model 30000, to the user as part of an answer.

The answer to the CTI query includes a natural language description of whether or not the CTI is malicious, an attack action, an attack technique, an attack group, or an attack campaign in which several attack actions are linked queried by the user in relation to a file. In addition, the large-scale natural language model 30000 may generate description information on whether a query about a binary file such as assembly code or a function included in the file is related to maliciousness based on a result analyzed by the intelligence platform 10000.

An example in which the large-scale natural language model 30000 generates the natural language description that is an answer to a CTI query is as follows.

The large-scale natural language model 30000 may include a CTI query language processor 30100, a CTI query interpreter 30200, and a CTI query answer generator 30300.

The CTI query language processor 30100 may analyze a user query for knowledge extraction using techniques for analyzing semantics and syntax included in the CTI query. For example, it is possible to perform tasks such as part-of-speech analysis, named entity analysis, dependency analysis, semantic recognition, and ellipsis recovery in the user CTI query. For example, dependency analysis may analyze a dependency relationship between words according to a sentence structure of the user CTI query, and semantic recognition may recognize a semantic relationship between words included in the user CTI query.

The CTI query interpreter 30200 may analyze questions included in the CTI query to determine the intention of the user and recognize various information on an answer to be presented as an output of an intelligent question answering system. For example, the CTI query interpreter 30200 may classify questions based on the sentence structure and semantics of the CTI query and recognize sub-question types and a relationship between sub-questions.

The CTI query answer generator 30300 may infer an answer to the CTI query and determine and generate a best answer. The CTI query answer generator 30300 generates candidate answers, and may generate all possible answer candidates from structured or unstructured resources based on CTI questions and question classification information. Although not shown in the figure, the structured or unstructured resources used by the CTI query answer generator 30300 may be previously analyzed CTI stored in the database 2200. For example, the structured or unstructured resources may include information on whether the analyzed file is malicious, an attack action, an attack technique, an attack group, an attack campaign in which several attack actions are linked, etc.

Further, the structured or unstructured resource may be assembly code analyzed by the framework 1200 of the intelligence platform 10000, a binary file, a function included in the file, or a result of CFG instruction sequence analysis.

The CTI query answer generator 30300 may generate a candidate answer for an evidence collection target from structured or unstructured resources including previously analyzed CTI stored in the database 2200.

Further, the CTI query answer generator 30300 may infer an answer based on evidence including previously analyzed CTI stored in the database 2200 and add the best answer as a description to generate a CTI query answer.

Although not shown here, when the large-scale natural language model 30000 has the form of a platform having a separate user interface, a CTI-related inquiry or CTI query may be received from the user separately from the intelligence platform 10000. In such a case, the large-scale natural language model 30000 may receive previously analyzed CTI stored in the database 2200 of the intelligence platform 10000 or analyzed CTI directly from the intelligence platform 10000.

In addition, the large-scale natural language model 30000 may infer the above answer based on the CTI provided by the intelligence platform 10000, generate a CTI query answer, and provide natural language description information for the CTI query to the user.

Hereinafter, an example of providing the CTI outlined above in natural language will be described in detail.

Figure 61:
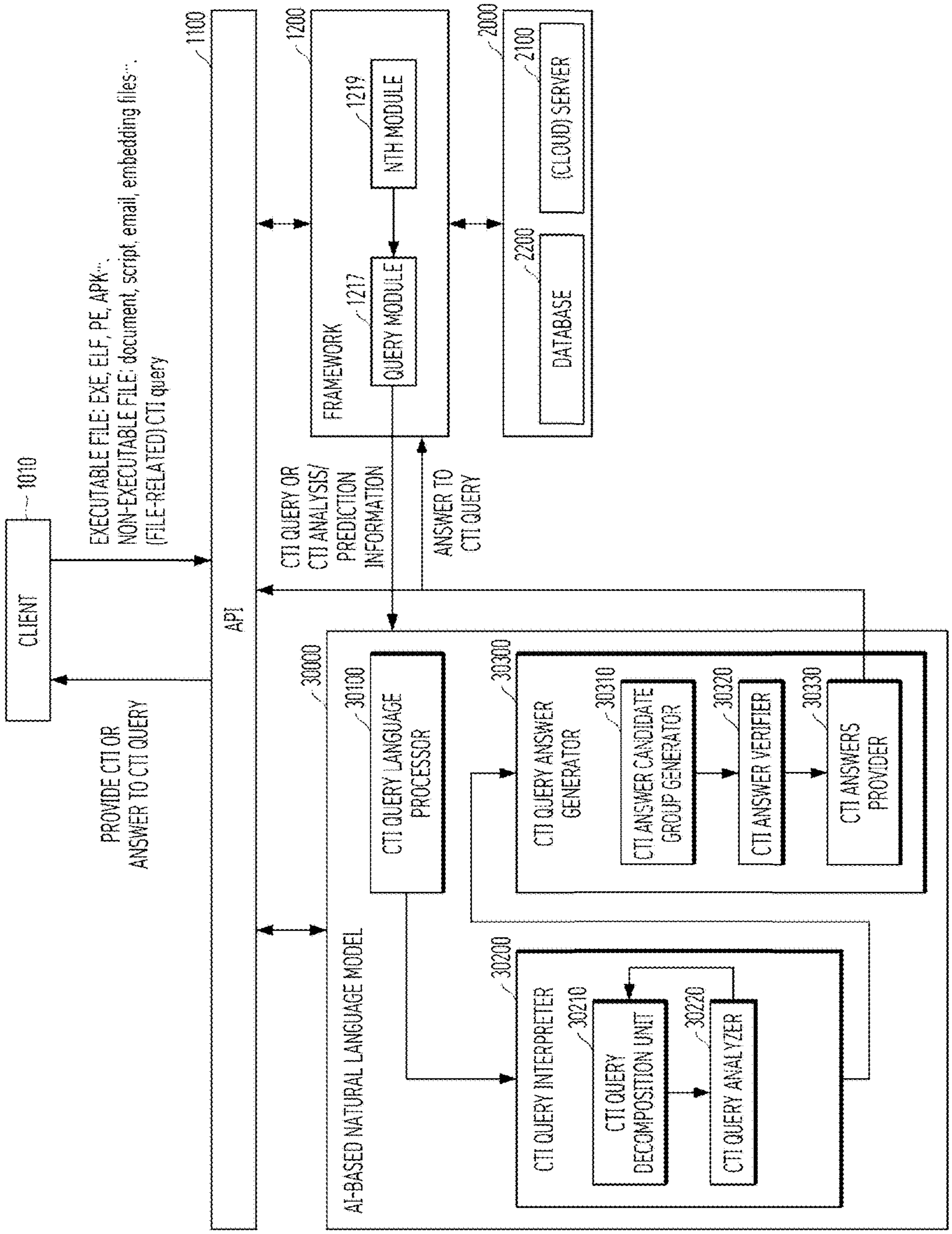
FIG. 61 discloses another embodiment in which the disclosed intelligence platform provides CTI in natural language using a natural language model.

FIG. 61 discloses another embodiment in which the disclosed intelligence platform provides CTI in natural language using a natural language model.

The API 1100 of the intelligence platform may receive a file, a file-related CTI analysis request, or a CTI-related query from the client 1010.

The framework 1100 of the API 1100 may include several analysis modules or prediction modules. For example, it has been disclosed above that the framework 1100 may perform static analysis, dynamic analysis, in-depth analysis, mild-dynamic analysis, etc. according to an input file using an AI engine. Here, an arbitrary module that performs such analysis or prediction is indicated as the Nth module 1219.

When a file is received from the client 1010, the framework 1100 may obtain assembly language level binary data through disassembly. Based thereon, the framework 1100 may analyze functions related to maliciousness, analyze an attack action or an attack technique, and attack group (see FIGS. 1 to 16), and analyze CFG instruction sequences of functions (see FIGS. 17 to 27).

When the input file is a non-executable file such as a document file, the framework 1100 may analyze whether the file is malicious, an attack action or an attack technique, and an attack group (see FIGS. 28 to 44).

The server 2100 collects webpages on the Internet by performing crawling, regardless of whether the server is an on-premise server or a cloud server, and the framework 1100 may analyze whether the collected webpages are malicious, attack actions or attack techniques, and attack groups (see FIGS. 45 to 57).

The database 2200 may classify and store results analyzed by the framework 1100 of the intelligence platform, for example, functions of assembly code generated in a process of file analysis, maliciousness of functions, hash code, CFG instruction sequences, static analysis, dynamic analysis, mild-dynamic analysis, predictive analysis results, maliciousness included in partial tags of webpages, attack techniques corresponding to MITRE ATT&CK, information on attack actions and attack groups, attack campaigns related to files, attack nations, attack industries, etc.

Meanwhile, when the client 1010 makes a CTI natural language query together with a request for analysis of CTI for a specific file, a webpage, etc., the query module 1217 of the framework 1100 delivers the query and the request to the AI-based natural language processing model 30000. The natural language processing model 30000 may be a natural language model NLP or a large language model LLM.

CTI analysis or prediction related to a file of the client 1010 may be requested, or a general natural language CTI query unrelated to a file may be requested. Accordingly, the query module 1217 generates a CTI query or supplementary query based on the CTI analyzed by the framework 1100 and delivers the CTI query or supplementary query to the natural language processing model 30000.

When the client 1010 requests a CTI query regardless of a file, the query module 1217 delivers the CTI query to the natural language processing model 30000.

The CTI query language processor 30100 may analyze the CTI query using an analysis technique for syntax included in the CTI query. An example of the CTI query language processor 30100 has been illustrated above.

The CTI query processed by the CTI query language processor 30100 is delivered to the CTI query interpreter 30200.

The CTI query interpreter 30200 may perform functions of classifying questions based on the sentence structure and semantics of the CTI query processed by the CTI query language processor 30100 and recognizing sub-question types and a relationship between sub-questions.

The CTI query interpreter 30200 may include a CTI query decomposition unit 30210 and a CTI query analyzer 30220.

The CTI query decomposition unit 30210 may perform functions of classifying questions based on the sentence structure and semantics included in the CTI query, classifying sub-question types, and recognizing a relationship between the classified sub-questions.

The CTI query analyzer 30220 may classify sub-question types. Further, the CTI query analyzer 30220 may recognize the core of the question based on reliability of a word or phrase that may be replaced by a candidate answer according to the classified sub-question types.

When the CTI query analyzer 30220 has reliability not allowing recognition of the core of the question, the CTI query decomposition unit 30210 may reclassify sub-question types.

According to the repeated processing of the CTI query decomposition unit 30210 and the CTI query analyzer 30220, the CTI query analyzer 30220 may detect and check a subject of a CTI-related question.

The CTI query answer generator 30300 may generate all possible answer candidates from structured or unstructured resources based on CTI questions and question classification information. The CTI query answer generator 30300 may include a CTI answer candidate group generator 30310, a CTI answer verifier 30320, and a CTI answers provider 30330.

The CTI answer candidate group generator 30310 may perform index and search functions from a database including CTI and generate candidate answers based on search results. The CTI answer candidate group generator 30310 generates all possible answer candidates from the database including the CTI based on questions and question classification information. Here, the database including the CTI includes the database 2200 of the intelligence platform. The CTI answer candidate group generator 30310 may collect evidence of answer candidates from the database including the CTI, which will be described below.

The CTI answer verifier 30320 may perform functions of answer inference and generation modules, and determine and generate the best answer. The CTI answer verifier 30320 measures reliability of the answer candidates by characterizing filtered answer candidates and inferred answer candidates to determine ranks of the answer candidates.

The CTI answer verifier 30320 may filter answer candidates using inductive, deductive, or abductive reasoning based on similarity between a query and answer candidates. In addition, the CTI answer verifier 30320 compares a reliability ratio of the answer candidates and a threshold value to readjust the ranks of the answer candidates, thereby selecting the optimal CTI answer.

The CT answer provider 30330 delivers the CTI answer verified by the CTI answer verifier 30320 to the intelligence platform to provide natural language description information to the CTI query answer.

When the client 1010 queries about the CTI together with or separately from the CTI request related to the file, the intelligence platform may provide information on the CTI file (maliciousness, a hash value, an attack technique, an attack group, an attack campaign, etc.), a natural language description thereof, and evidence collected as a basis thereof.

For example, when the client 1010 makes a query related to an analysis request result of a specific file, information on an attack group and MITRE ATT&CK attack technique related to a malicious action by the file, and an attack campaign (a series of mechanisms of one or more attacks) connected thereto may be provided as visualization information illustrated above. Further, the intelligence platform may provide the natural language description generated by the natural language model together with the visualization information, and may provide valid digital analysis evidence for the analysis result and natural language description analysis evidence for the digital analysis evidence.

When the client 1010 queries CTI regardless of files, it is possible to provide an answer to the CTI query, a natural language description of the CTI query generated by the natural language model, and evidence collected as a basis thereof.

The intelligence platform may provide the client 1010 with CTI analyzed or predicted by the framework 1100 and a natural language answer to or description information of a query of the CTI provided by the natural language processing model 30000.

The physical device 2000, which is a computing device providing the intelligence platform, may include the database 2200 and the server 2100 including a processor.

The processor may receive a CTI analysis request for data related to a file from a client, analyze the requested CTI, and transmit a first CTI query generated based on the analyzed CTI to a natural language model.

Further, the processor may provide the analyzed CTI and description information of the analyzed CTI generated by the natural language model.

Upon receiving a second CTI query from a client, the processor of the server may deliver the second CTI query to a natural language model and provide description information on the CTI query generated by the natural language model.

Calculation performed by the above physical device may be executed by a program implementing the embodiment as software.

Figure 62:
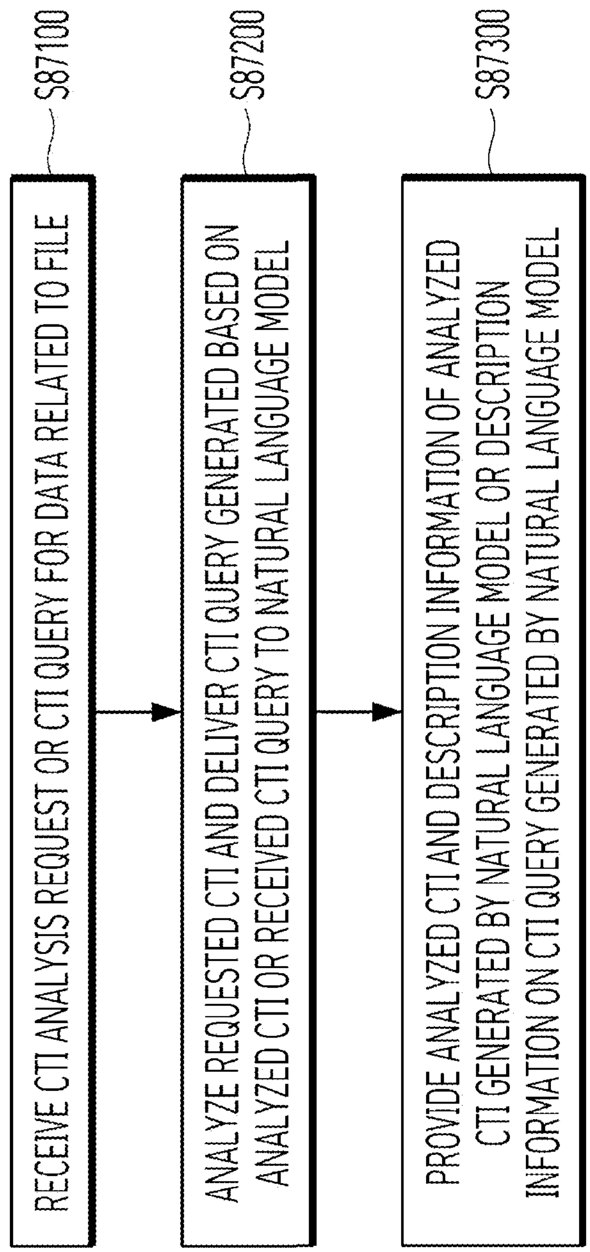
FIG. 62 illustrates an example of a flowchart in which the disclosed intelligence platform provides CTI in natural language using a natural language model.

FIG. 62 illustrates an example of a flowchart in which the disclosed intelligence platform provides CTI in natural language using a natural language model.

A CTI analysis request or CTI query for data related to a file may be received (S87100).

The data related to the file may include a document or a script included in the document, an executable or non-executable file, assembly code converted from the file, function information in the code, etc.

An information analysis request of the CTI may include a request for information on whether data included in the file is malicious, an attack technique, an attack group, and an attack campaign according to the data, or a request for visualization information of the information.

It is possible to receive only the CTI query from the client regardless of the CTI file input.

The requested CTI may be analyzed, and the CTI query generated based on the analyzed CTI or the received CTI query may be delivered to the natural language model (S87200).

Here, the analyzed CTI includes a document or a script included in the document, an executable or non-executable file, assembly code converted from the file, function information in the code, or maliciousness according to a CFG instruction sequence, a hash value indicating maliciousness, an attack technique, an attack group, an attack campaign, an attack nation, an attack industry, etc. The analyzed CTI includes visualization information of the above analysis information.

When the CTI requested by the client is analyzed, the intelligence platform may generate a CTI query based on the analyzed CTI and provide the CTI query to the natural language model. When the client requests a CTI query regardless of a file, the intelligence platform may provide the CTI query requested by the client to the natural language model.

It is possible to provide the analyzed CTI and description information of the analyzed CTI generated by the natural language model or description information on the CTI query generated by the natural language model (S87300). The description information of the analyzed CTI means a natural language description of the analyzed CTI. A detailed description thereof will be given in detail below.

Figure 63:
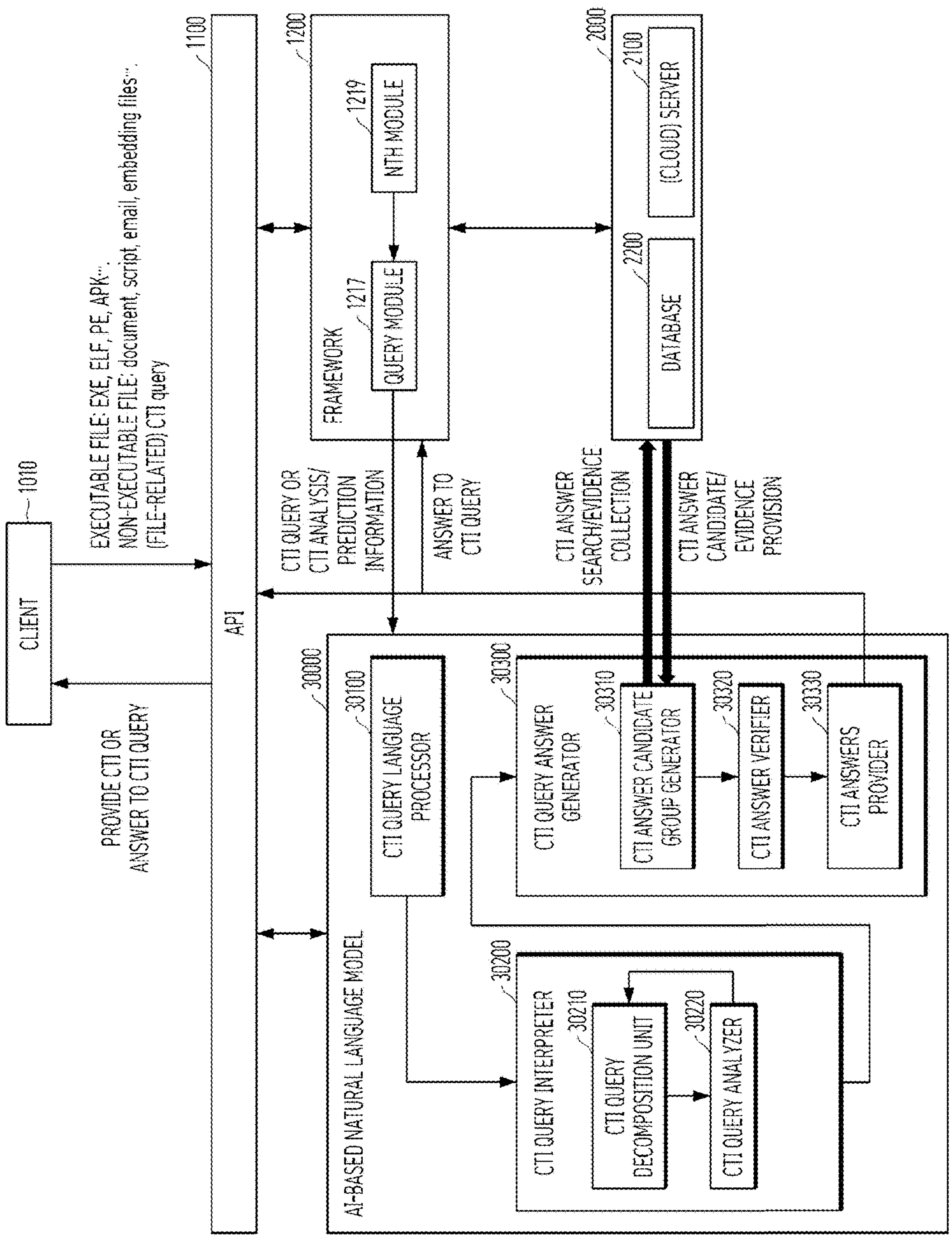
FIG. 63 illustrates another example in which the disclosed intelligence platform provides CTI in natural language using a natural language model.

FIG. 63 illustrates another example in which the disclosed intelligence platform provides CTI in natural language using a natural language model.

The API 1100 of the intelligence platform may receive a file, a file-related CTI analysis request, or a CTI-related query from the client 1010.

The functions of the modules in the framework 1100 of the API 1100 and the crawling function of the server 2100 have been described above.

The database 2200 may classify and store results analyzed by the framework 1100 of the intelligence platform, for example, functions of assembly code generated in a process of file analysis, maliciousness of functions, hash code, CFG instruction sequences, static analysis, dynamic analysis, mild-dynamic analysis, predictive analysis results, maliciousness included in partial tags of webpages, attack techniques corresponding to MITRE ATT&CK, information on attack actions and attack groups, attack campaigns related to files, attack nations, attack industries, etc.

Meanwhile, when the client 1010 makes a CTI natural language query together with a request for analysis of CTI, the query module 1217 of the framework 1100 delivers the query and the request to the AI-based natural language processing model 30000. The natural language processing model 30000 may be a natural language model NLP or a large language model LLM.

CTI analysis or prediction related to a file of the client 1010 may be requested, or a general natural language CTI query unrelated to a file may be requested. Accordingly, the query module 1217 generates a CTI query or supplementary query based on the CTI analyzed by the framework 1100 and delivers the CTI query or supplementary query to the natural language processing model 30000.

When the client 1010 requests a CTI query regardless of a file, the query module 1217 delivers the CTI query to the natural language processing model 30000.

The CTI query language processor 30100 may analyze the CTI query using technique for analyzing syntax included in the CTI query.

An example in which the CTI query analyzer 30220 detects and checks subjects of CTI-related questions according to iterative processing of the CTI query decomposition unit 30210 and the CTI query analyzer 30220 has been illustrated above.

The CTI query answer generator 30300 may generate all possible answer candidates from structured or unstructured resources based on CTI questions and question classification information. The CTI query answer generator 30300 may include the CTI answer candidate group generator 30310, the CTI answer verifier 30320, and the CTI answers provider 30330.

The CTI answer candidate group generator 30310 may perform index and search functions from a database including CTI and generate candidate answers based on search results. The CTI answer candidate group generator 30310 generates all possible answer candidates from the database including the CTI based on questions and question classification information.

Here, the database including the CTI includes the database 2200 of the intelligence platform.

The CTI answer candidate group generator 30310 may collect evidence of answer candidates from the database 2200 storing the CTI.

The CTI answer candidate group generator 30310 may collect evidence of answer candidates from the database 2200 storing the CTI.

The CTI answer candidate group generator 30310 performs index and search functions for various document files. The CTI answer candidate group generator 30310 generates candidate answers from an input query using search results of various knowledge databases including the database 2200.

The CTI answer candidate group generator 30310 generates all possible answer candidates from various resources including the database 2200 based on questions and question classification information. Further, the CTI answer candidate group generator 30310 selects a candidate answer using deductive or inductive evidence of answer type or/and self-evident logic capable of constraining the answer based on the evidence collected from the resource. That is, the CTI answer candidate group generator 30310 may generate an answer by collecting evidence for an answer from a resource including the database 2200 and verifying an obvious reason for a context to verify an answer candidate. In this way, the CTI answer candidate group generator 30310 may search the database 2200 for an answer to a CTI query and collect digital evidence or grounds for the CTI query answer.

Since the database 2200 classifies and stores previously analyzed CTI, when the CTI answer candidate group generator 30310 generates an answer candidate group, search data for generating the candidate group may be provided. Further, when the CTI answer candidate group generator 30310 selects an answer candidate from the answer candidate group, the database 2200 may provide evidence or grounds for the answer candidate based on the stored CTI.

The CTI answer verifier 30320 may perform functions of answer inference and generation modules, and determine and generate the best answer. The CTI answer verifier 30320 measures reliability of the answer candidates by characterizing filtered answer candidates and inferred answer candidates to determine ranks of the answer candidates.

The CTI answer verifier 30320 may filter answer candidates using inductive, deductive, or abductive reasoning based on similarity between a query and answer candidates. In addition, the CTI answer verifier 30320 compares a reliability ratio of the answer candidates and a threshold value to readjust the ranks of the answer candidates, thereby selecting the optimal CTI answer.

The CT answer provider 30330 delivers the CTI answer verified by the CTI answer verifier 30320 to the intelligence platform to provide natural language description information to the CTI query answer.

An example in which the intelligence platform provides natural language description information for the requested CTI analysis result and CTI query answer or provides natural language description information for the CTI query has been described above.

The physical device 2000, which is a computing device providing an intelligence platform, may include the database 2200 and the server 2100 including a processor.

The processor may receive a CTI analysis request for data related to a file.

The processor may analyze the requested CTI and search the CTI database for an answer candidate group for a first CTI query generated based on the analyzed CTI.

Based on a search result, the processor may determine a candidate group for the answer and provide a natural language description for the first CTI query based on a first candidate (best candidate) in the determined candidate group.

Upon receiving a second CTI query from the client, the processor may search the CTI database for an answer candidate group for the CTI query. Further, the processor may provide description information on the CTI query generated by the natural language model.

Calculation performed by the above physical device may be executed by a program implementing the embodiment as software.

Figure 64:
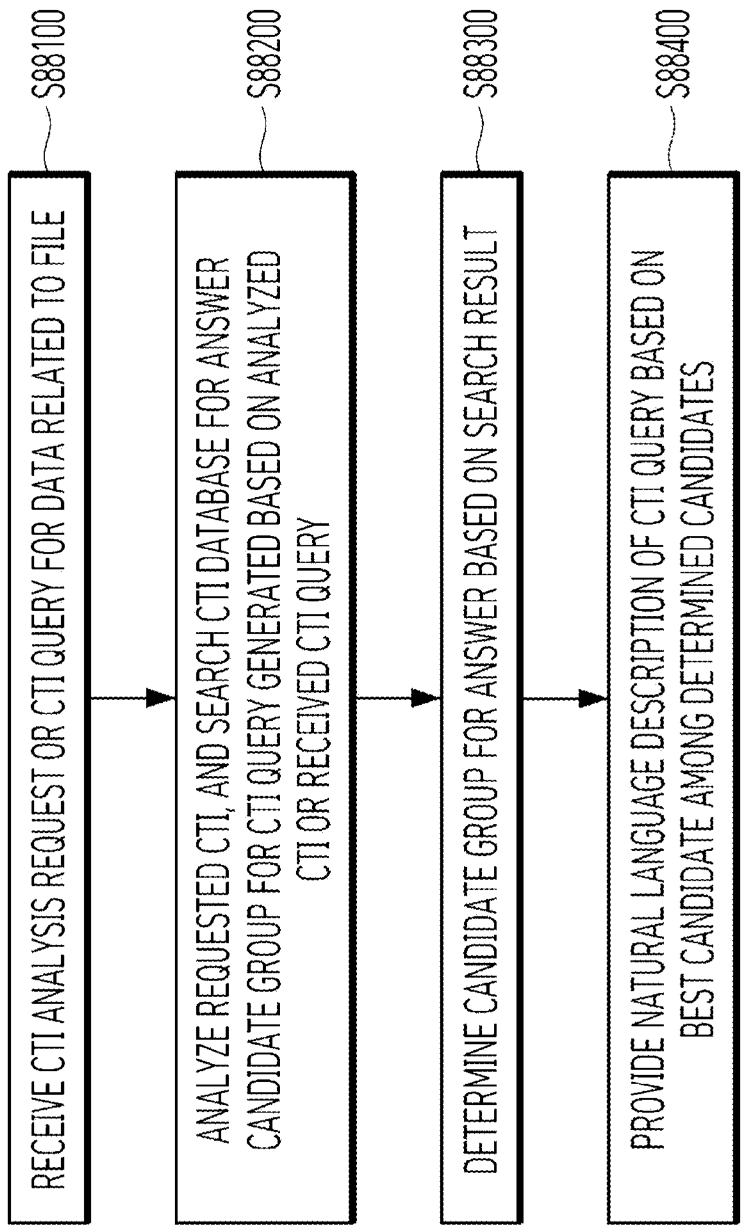
FIG. 64 illustrates an example of a flowchart in which the disclosed intelligence platform provides CTI in natural language using a natural language model.

FIG. 64 illustrates an example of a flowchart in which the disclosed intelligence platform provides CTI in natural language using a natural language model.

A CTI analysis request or CTI query for data related to a file may be received (S88100).

The data related to the file may include a document or a script included in the document, an executable or non-executable file, assembly code converted from the file, function information in the code, etc.

An information analysis request of the CTI may include a request for information on whether data included in the file is malicious, an attack technique, an attack group, and an attack campaign according to the data, or a request for visualization information of the information.

It is possible to receive only the CTI-related query from the client regardless of the CTI file input.

The requested CTI is analyzed, and the CTI database is searched for an answer candidate group for a CTI query generated based on the analyzed CTI or the received CTI query (S88200).

Evidence of answer candidates may be collected from the database 2200 in which CTI is stored.

In this case, index and search functions for several document files are performed. Candidate answers are generated from an input query using search results of various knowledge databases including the database of the disclosed intelligence platform.

All possible answer candidates are generated from various resources including the database of the intelligence platform based on questions and question classification information. Further, a candidate answer is selected using deductive or inductive evidence of answer type or/and self-evident logic capable of constraining the answer based on the evidence collected from the resource. An answer may be generated by collecting evidence for an answer from a resource including the database of the intelligence platform and verifying self-evident logic of context to verify an answer candidate.

The database of the intelligence platform classifies and stores previously analyzed CTI. Therefore, when generating a candidate group for the answer, search data from the database of the intelligence platform may be used to generate the candidate group.

Therefore, evidence or grounds for the answer candidate may be provided based on the CTI stored in the database of the intelligence platform.

The candidate group for the answer is determined based on the search result (S88300). A detailed example of determining the CTI answer candidate has been disclosed above.

A natural language description of the CTI query based on the best candidate in the determined candidate group is provided (S88400).

When a natural language description of the CTI query is provided, CTI-analyzed information of a file requested to be analyzed may be provided. An example of providing a CTI analysis result of a file when the client requests CTI analysis of the file has been described above.

For example, the analyzed CTI may include at least one of a document or a script included in the document, an executable or non-executable file, assembly code converted from the file, function information in the code, or maliciousness according to a CFG instruction sequence, a hash value indicating maliciousness, an attack technique, an attack group, an attack campaign, an attack nation, an attack industry, etc. The analyzed CTI may include visualization information of the included CTI analysis information.

When a natural language description of the CTI query is provided, evidence searched from the CTI database may be provided. When the CTI database is an external resource, it is possible to provide a nearby source, such as a link to the external resource.

Figure 65:
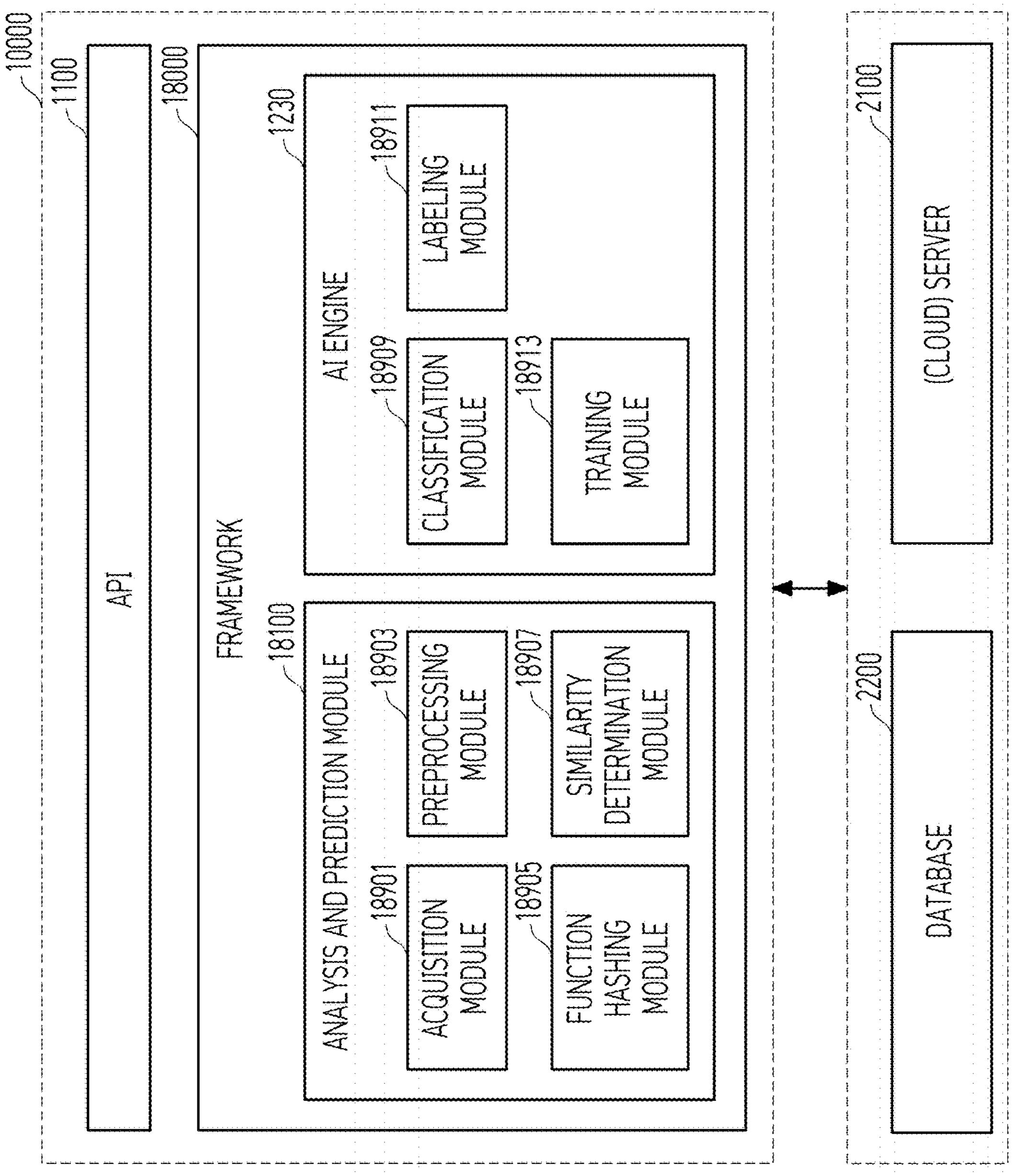
FIG. 65 is a drawing disclosing another embodiment of an apparatus for processing cyber threat information according to an embodiment.

FIG. 65 is a drawing disclosing another embodiment of an apparatus for processing cyber threat information according to an embodiment.

In the illustrated example, the apparatus for processing cyber threat information may include a server 2100 including a processor, a database 2200, and an intelligence platform 10000.

The database 2200 may store previously classified malware or pattern codes of malware. In an embodiment, the database 2200 may store sample data, a function, or result information. In addition, in an embodiment, the database 2200 may store an ASM file and a JSON file transformed from input files.

In an embodiment, the intelligence platform 10000 may include an API 1100 and a framework 18000. The framework 18000 may include an analysis and prediction module 18100 and an AI engine 1230.

In an embodiment, the analysis and prediction module 18100 may include an acquisition module 18901, a preprocessing module 18903, a function hashing module 18905, and a similarity determination module 18907. The AI engine 1230 may include a classification module 18909, a labeling module 18911, and a training module 18913. Here, a detailed embodiment of the AI engine 1230 for classifying and labeling cyber threat information and learning the labeled information is disclosed in detail in FIG. 12.

The processor of the server 2100 may execute the acquisition module 18901 that receives an input file from the API 1100.

The processor of the server 2100 may execute the preprocessing module 18903 that disassembles the received file to acquire an analysis target function in assembly code.

The processor of the server 2100 may execute the function hashing module 18905 that calculates a function hash value for each quantized function vector of analysis target functions.

The processor of the server 2100 may execute the similarity determination module 18907 that determines at least one candidate function from pre-stored comparison target functions based on the calculated function hash value, executes the AI engine 1230, and calculates similarity for the at least one candidate function.

That is, in the conventional case, to determine identity and similarity of functions, it is necessary to compare all of M comparison target functions stored. However, for N analysis target functions configured in one piece of malware, it is necessary to calculate similarities of the M comparison target functions stored in the database, which causes problems such as high computational costs and inability to provide real-time services.

Accordingly, according to the present invention, the apparatus for processing cyber threat information may generate representative vectors for several function vectors based on vector quantization and transform the representative vectors into function hash values. Therefore, according to the present invention, a candidate group of comparison target functions to be compared may be reduced based on the function hash values.

In other words, according to the present invention, since function vectors of similar functions produce the same function hash value, the candidate group may be efficiently reduced by comparing only comparison target functions having the same function hash value as that of the function hash value of the analysis target function.

The processor of the server 2100 may execute the classification module 18909 that executes the AI engine 1230 and classifies cyber threat information for the analysis target functions based on similarity for at least one candidate function.

In addition, according to the present invention, by calculating similarity with an assembly function of malware analyzed in the past, it is possible to track the reuse of the same function.

The processor of the server 2100 may execute the labeling module 18911 that labels cyber threat information for an analysis target function according to a classification result.

The processor of the server 2100 may execute the training module 18913 that tokenizes and normalizes an instruction in an analysis target function to train an embedding model.

Figure 66:
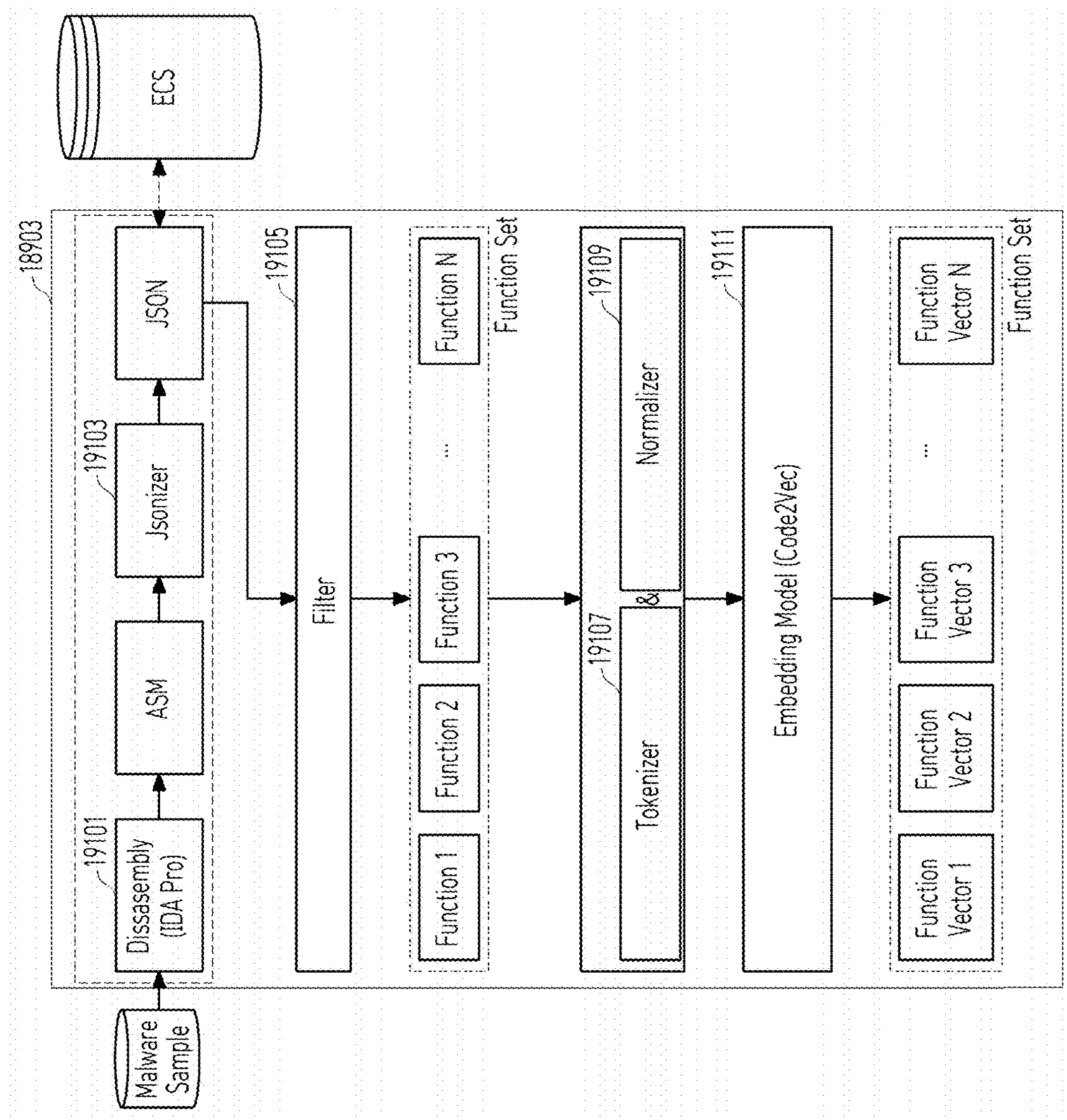
FIG. 66 is a drawing disclosing an example of performing preprocessing of an input file according to an embodiment.

FIG. 66 is a drawing disclosing an example of performing preprocessing of an input file according to an embodiment.

In an embodiment, the preprocessing module 18903 of the apparatus for processing cyber threat information may perform preprocessing on an input file, that is, raw data. In an embodiment, the preprocessing module 18903 may include a disassembly module 19101, a format conversion module 19103, a filtering module 19105, a tokenization module 19107, a normalization module 19109, and an embedding module 19111.

The disassembly module 19101 may acquire analysis target functions in disassembled assembly code by performing disassembly on an input file. In an embodiment, the disassembled code may include code in which OP-CODE and ASM-CODE are combined. In an embodiment, the disassembly module 19101 may acquire an ASM file by performing disassembly on the file.

The format conversion module 19103 may reconstruct an ASM file into a text format (for example, JSON format) by dividing the ASM file in units of functions.

In an embodiment, many functions included in an executable file do not all have significant meanings, and analysis is performed in units of functions, so that analyzing functions having small meanings may be a burden on resources.

Accordingly, in an embodiment, the filtering module 19105 may perform filtering based on a function length for the analysis target function. For example, the N analysis target functions (Function 1 to Function N) may be filtered.

Functions whose lengths are shorter than a critical length mostly include logic such as memory allocation/object creation and may not include unique logic. On the other hand, functions whose lengths are longer than the critical length mostly include obfuscated code and embedding results may be inaccurate.

In an embodiment, the filtering module 19105 may filter and output analysis target functions each having a function length greater than or equal to a first threshold length and less than or equal to a second threshold length.

For example, analysis target functions each having a minimum function length of 20 or more and a maximum function length of 5,000 or less may be filtered.

Further, in an embodiment, the apparatus for processing cyber threat information may additionally filter only functions having nameless functions (sub_prefix), branch statements, and function call syntax.

The tokenization module 19107 may perform tokenization that divides one instruction into one opcode and at least one operator. In this way, one instruction may be input to an embedding model. In an embodiment, the tokenization module 19107 may generate a token for the one opcode and a token for each of the at least one operator.

The normalization module 19109 may integrate and transform words having different expressions included in an instruction into words having the same meaning.

Tokens not undergoing a normalization process include words serving as noise, and thus may be defined as different tokens even though the tokens have the same or similar meanings. In this case, the number of tokens may increase more than necessary, which may have a negative effect on training of the embedding model. Therefore, a result of tokenization may be input to the embedding model through a normalization process. For example, the normalization module 19109 may perform normalization on instructions including variable names, block addresses, data type suffixes, constants, etc. so that the instructions become the same token.

In addition, the apparatus for processing cyber threat information may maintain information without normalizing the instruction in the case of a number smaller than a specific value other than functionally important function call syntax and an offset. Therefore, according to the present invention, detailed information, for example, important API information or small number information, may be maintained without being lost through a normalization process.

In an embodiment, the embedding module 19111 may transform an analysis target function into a function vector using an embedding model. For example, N function vectors (Function Vector 1 to Function Vector N) corresponding to the respective N analysis target functions may be transformed.

Figure 67:
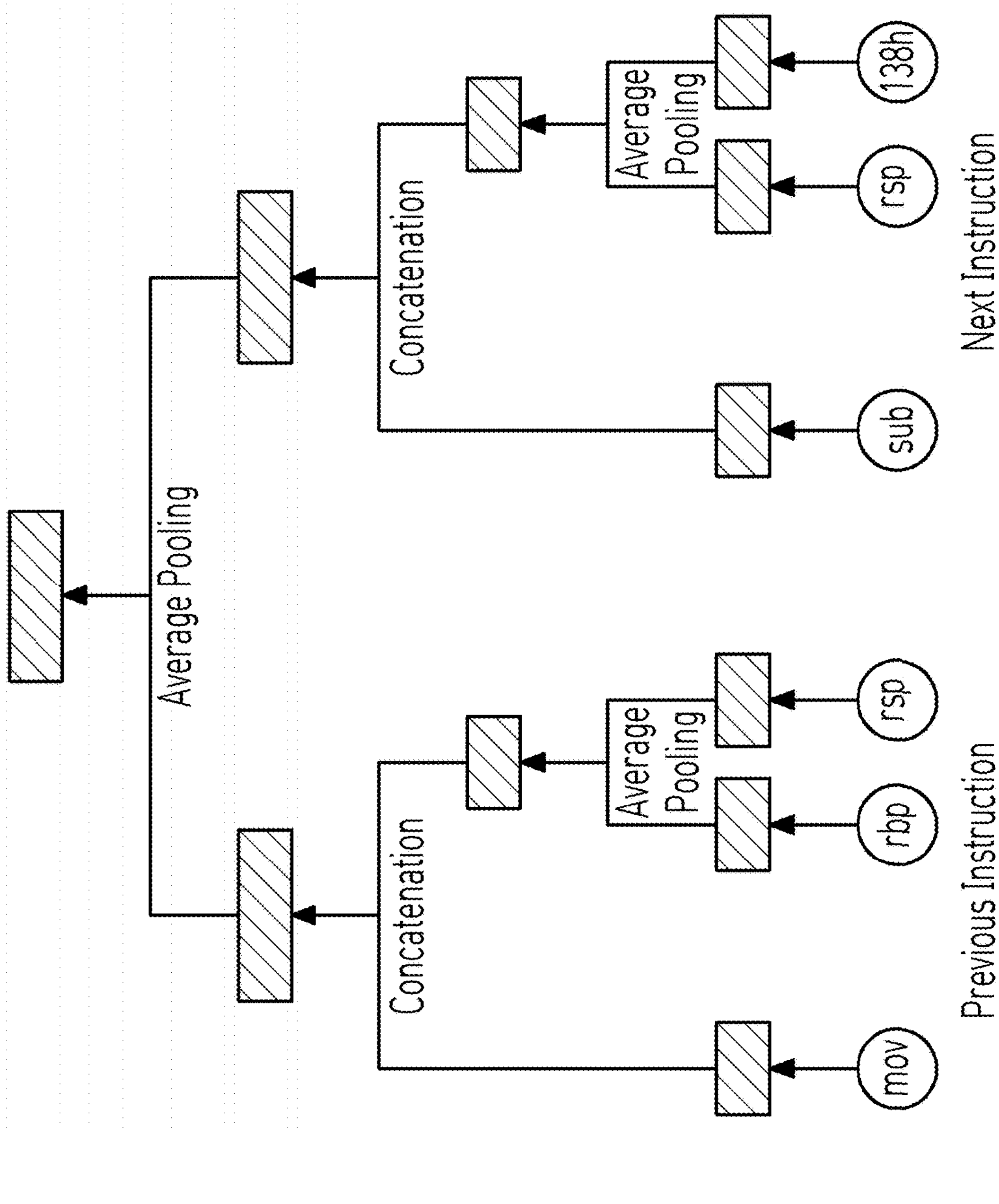
FIG. 67 is a drawing disclosing an example of an embedding model according to an embodiment.

FIG. 67 is a drawing disclosing an example of an embedding model according to an embodiment.

In an embodiment, the apparatus for processing cyber threat information may tokenize a previous instruction and a next instruction included in a function, input the tokenized instructions to an embedding model, and output a function vector of the corresponding function, which is an output value of the embedding model.

For example, mov, which is a token for an opcode generated by tokenizing and normalizing the previous instruction, and rbp and rsp, which are tokens for two operators, may be input to the embedding model. In addition, sub, which is a token for an opcode generated by tokenizing and normalizing the next instruction, and rsp and 138h, which are tokens for two operators, may be input to the embedding model.

In this case, average pooling may be performed on operator vectors of rbp and rsp, which are tokens for two operators of the previous instruction. Then, concatenation may be performed on an average pooled operator vector and an opcode vector of mov, which is a token for the opcode, so that a vector for the previous instruction may be calculated.

In addition, average pooling may be performed on operator vectors of rsp and 138h, which are tokens for two operators of the subsequent instance. Then, concatenation may be performed on an average pooled operator vector and an opcode vector of sub, which is a token for the opcode, so that an instruction vector for the next instruction may be calculated.

Further, average pooling may be performed on all instruction vectors in a function, including previous and next instructions, so that a function vector of the corresponding function may be output as the output of the embedding model.

In an embodiment, the embedding model may include code2vec, Asm2Vec, or FastText, and may include various embedding models without being limited thereto. Here, Asm2Vec may refer to a model for generating a vector for an assembly function by learning assembly code with reference to a Doc2Vec method of generating a function vector in units of existing sentences, paragraphs, or documents. FastText may refer to a model for performing word embedding by extracting a substring (n-gram) for a word in a natural language sentence.

In an embodiment, the apparatus for processing cyber threat information may calculate a loss value for an output value of the embedding model and a current instruction, and train the embedding model while optimizing the calculated loss.

The apparatus for processing cyber threat information may transform analysis target functions in assembly code into function vectors using the embedding model. For example, performance comparison by embedding model is as shown in <Table 1>, and it can be confirmed a loading time and a transform time are shortest in code2vec. For example, referring to <Table 1>, in the case of a loading time, Code2Vec has 0.04, while Asm2Vec and FastText have 34.95 and 0.68, respectively, so that it can been confirmed that the loading time is shorted in Code2Vec. In addition, in the case of a transform time, Code2Vec has 136.74, while Asm2Vec and FastText have 2,283.10 and 254, respectively, so that it can been confirmed that the transform time is shortest in Code2Vec.

TABLE 1

| Models | Asm2Vec | Code2Vec | FastText |
|---|---|---|---|
| Training Time | 13,675.33 (1367/epoch) | 9,830.84 (990/epoch) | 1,530 |
| Loading Time | 34.95 | 0.04 | 0.68 |
| Transform Time | 2,283.10 | 136.74 | 254 |
| Transform TPS | 19.0258/sample 0.2308/function | 1.1395/sample 0.0138/function | 2.1166/sample 0.0256/function |

In an embodiment, for the entire ensured training data set, an embedding model may be constructed by performing training for a certain period of time (for example, about 7 days). In an embodiment, function vector transformation of the embedding model may be performed by calculating an average of function vectors for each token in the analysis target function.

Accordingly, the function vector input to the embedding model according to the present invention may include information about the function length. For example, the function vector input to the embedding model may be configured as a 401-dimensional function vector by adding the information about the function length to a 400-dimensional function vector input to code2vec. Therefore, according to the present invention, by utilizing the information about the function length, it is possible to avoid derivation as a similar function vector when a configuration of an operator is similar to that of opcode regardless of the function length. In other words, it is possible to avoid a problem in that a difference in function length is significantly large even when the configuration is determined to be similar.

Figure 68:
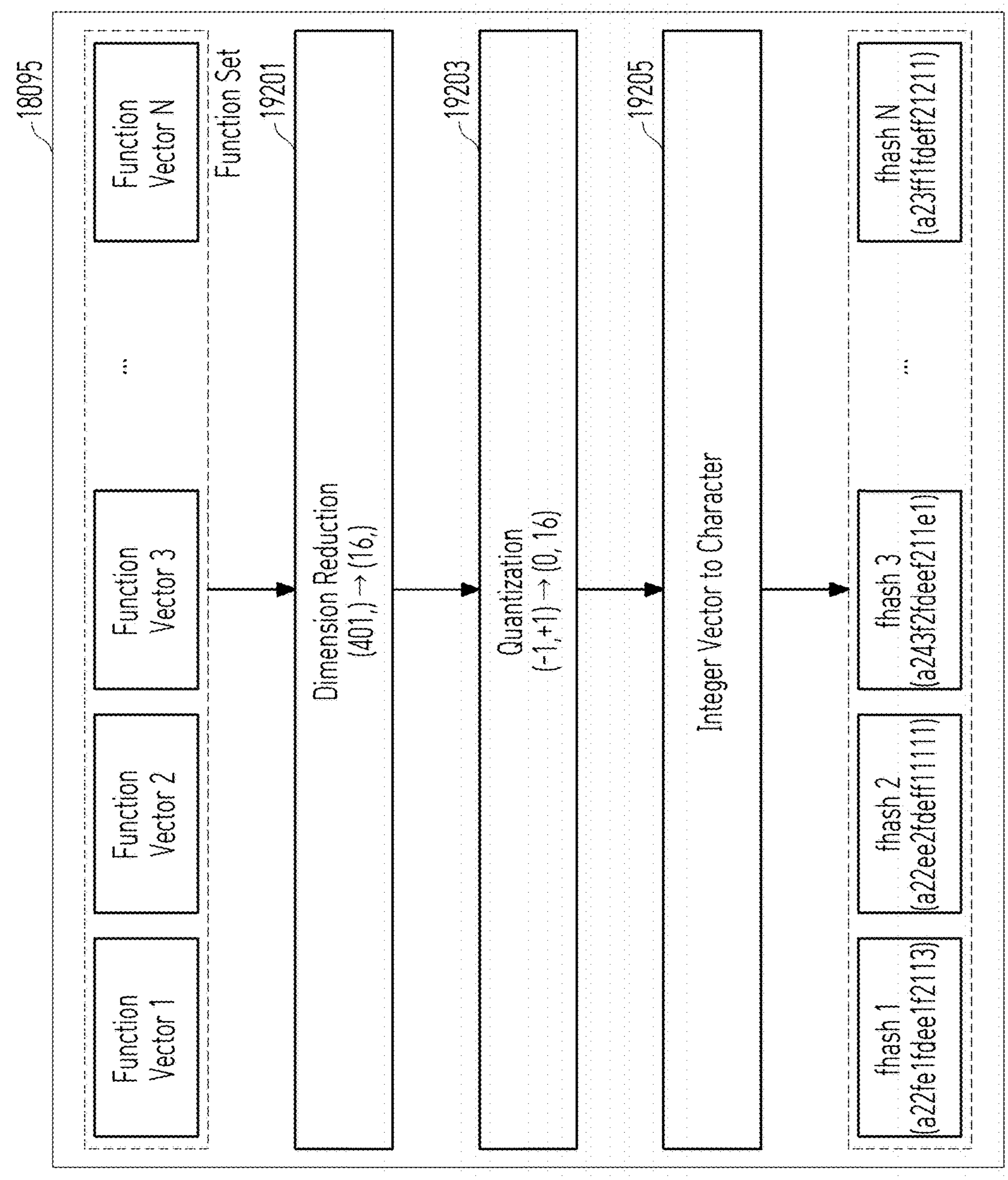
FIG. 68 is a drawing disclosing an example of calculating a function hash value according to an embodiment.

FIG. 68 is a drawing disclosing an example of calculating a function hash value according to an embodiment.

In an embodiment, the function hashing module 18905 of the apparatus for processing cyber threat information may include a dimension adjustment module 19201, a quantization module 19203, and a function hash generation module 19205.

The dimension adjustment module 19201 may reduce the dimensionality of the function vector in the analysis target function acquired through PCA (Principal Component Analysis). Here, PCA may mean a dimension reduction technique that transforms high-dimensional data into low-dimensional data. Specifically, PCA may mean a dimension reduction technique that finds mutually orthogonal axes and transforms a sample in a high-dimensional space into a low-dimensional one.

For example, a 401-dimensional function vector embedded in each function may be reduced to 16 dimensions through PCA. In this case, the reduced 16-dimensional function vector may include real numbers (floating numbers) since feature value representation of each dimension is normalized to a normal distribution (mean 0, standard deviation 1).

The quantization module 19203 may perform vector quantization to transform a function vector including continuous features having reduced dimensionality into a function vector including discrete features. For example, a function vector including real-valued feature values may be transformed into a function vector including integer feature values.

In addition, the function hash generation module 19205 may generate a function hash value for a quantized function vector. For example, a function hash value may be generated for each function by replacement with a hexadecimal character.

That is, according to the present invention, by transforming similar function vectors into the same string, a candidate group for similar search may be reduced. In other words, since embedding vectors of similar functions are located close to each other, the similar vectors may produce the same function hash value. For example, N function hash values (fhash 1 to fhash N) corresponding to N function vectors (Function Vector 1 to Function Vector N), respectively, may be transformed. For example, fhash 1 may represent a value a22fe1fdee1f2113.

Figure 69:
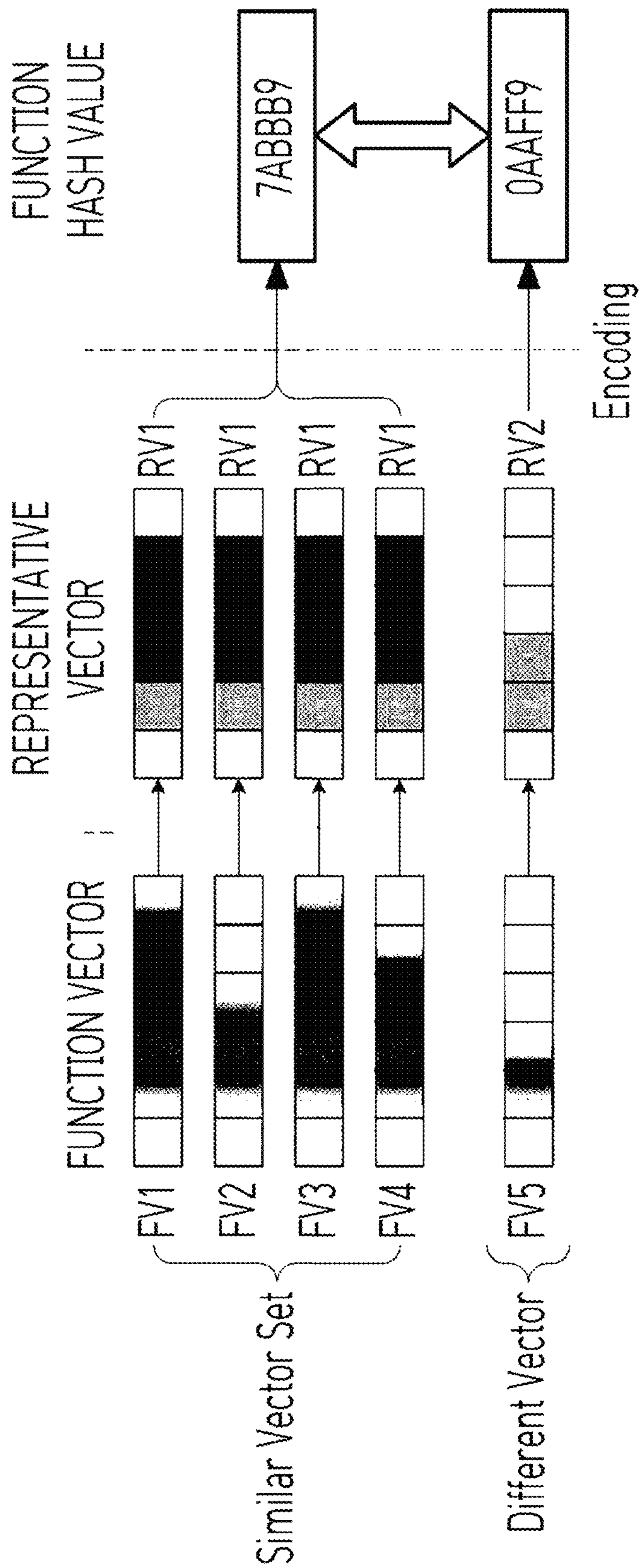
FIG. 69 is a drawing disclosing an example of performing vector quantization on a function vector according to an embodiment.

FIG. 69 is a drawing disclosing an example of performing vector quantization on a function vector according to an embodiment.

In an embodiment, the apparatus for processing cyber threat information may perform vector quantization on a function vector. In an embodiment, the apparatus for processing cyber threat information may perform vector quantization to transform a function vector including continuous feature values (for example, real numbers) into a function vector including discrete feature values (for example, integers). Here, the function vector including discrete feature values undergoing vector quantization may mean a representative vector.

In an embodiment, the apparatus for processing cyber threat information may perform encoding to transform a feature value of a function vector including discrete feature values into a function hash value.

For example, similar function vectors (for example, FV1 to FV4) included in a similar function vector set may be transformed into the same representative vector (for example, RV1) by performing vector quantization, and the same function hash value, 7ABBB9, may be produced. On the other hand, a different function vector (for example, FV5) may be transformed into a representative vector (for example, RV2) by performing vector quantization, and a function hash value, 0AAFF9, may be produced.

That is, it can be confirmed that the representative vector of the different function vector is different from the representative vector of the similar function vectors, and the function hash values accordingly are also different from each other. In other words, the apparatus for processing cyber threat information may transform similar function vectors into the same representative vector through vector quantization. In this case, the same representative vector may have the same function hash value.

In other words, the apparatus for processing cyber threat information may quantize a continuous function vector into a representative vector of a finite set through vector quantization. That is, the representative vector may mean a quantized function vector of functions (that is, analysis target function and comparison target function).

Quantized function vectors are codebook vectors or centroids, which are representative vectors among function vectors and allow for compressed representation of data while expressing a certain amount of information.

Therefore, there is no need for a model training/update process, and a search query may be defined to retrieve only functions having the same representative vector. Finally, a function hash value may be defined.

A method of performing tagging based on labels using the existing classification model and fining candidate functions having the same tag has high computational complexity since there is a significantly large number of comparison target candidate groups. However, the method according to the present invention has low computational complexity since only function candidate groups having similar vectors need to be compared, and thus may efficiently perform similarity search.

Figure 70:
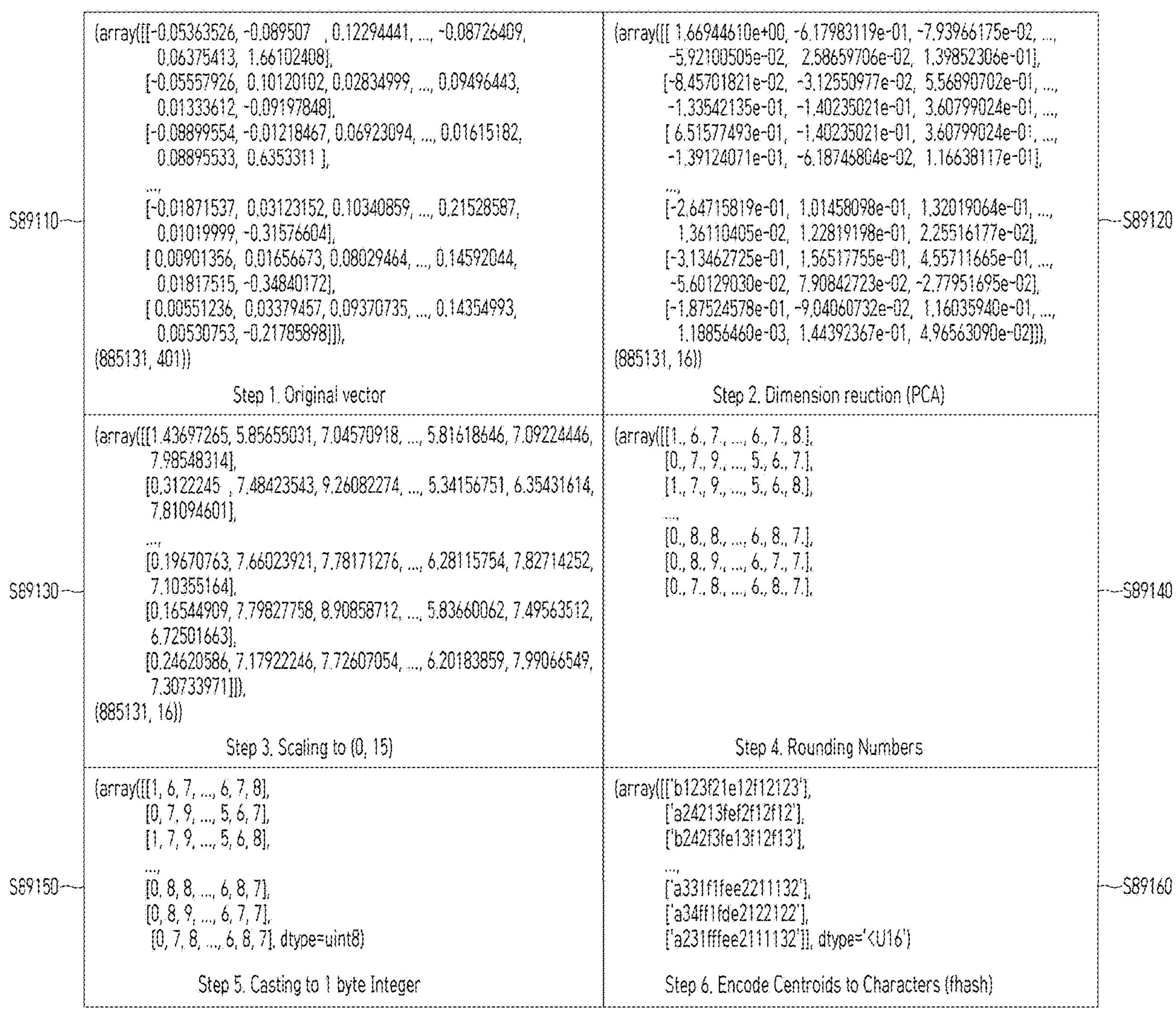
FIG. 70 is a drawing disclosing another example of performing vector quantization on a function vector according to an embodiment.

FIG. 70 is a drawing disclosing another example of performing vector quantization on a function vector according to an embodiment.

In an embodiment, the apparatus for processing cyber threat information may perform vector quantization on a function vector. Specifically, the apparatus for processing cyber threat information may acquire a function vector including continuous feature values (S89110).

The apparatus for processing cyber threat information may perform dimension reduction to reduce the dimensionality of a multidimensional data set including continuous feature values included in a function vector and reconstruct the data set into a function vector having reduced dimensionality (S89120). For example, a 401-dimensional function vector may be reduced to a 16-dimensional function vector through PCA.

In addition, the apparatus for processing cyber threat information may perform scaling to expand each feature value of a dimensionally reduced function vector to a certain range (S89130). For example, each feature value may be expanded to a range [0,15] (16 intervals).

In addition, the apparatus for processing cyber threat information may perform rounding on each feature value of a function vector undergoing scaling (S89140). For example, a feature value 1.43697265 may be rounded and transformed to 1.

In addition, the apparatus for processing cyber threat information may transform a feature value of the rounded function vector from a continuous type to a discrete type (S89150). For example, a feature value of a real number type may be transformed into a feature value of a 1-byte integer type.

In addition, the apparatus for processing cyber threat information may transform each feature value of a function vector transformed into an integer type into a function hash value (S89160). In an embodiment, the function hash value may be expressed as a string. For example, the function hash value may include b123f21e12f12123.

In an experimental data set, 274,572 function hash values may be derived from a total number of 885,131 functions. Accordingly, a reduction rate of 68.97% may be confirmed.

In an embodiment, in a cluster having the most identical function hash values, similarity between function vectors may be computed and statistics may be extracted. For example, the similarity may include a cosine distance between the function vectors.

In an embodiment, referring to Table 2, minimum, maximum, and quartile values are all the same, which may mean the same function. Accordingly, for example, when search is performed based on a function hash value according to vector quantization according to the present invention, it can be confirmed that the number of comparison target functions is reduced from 6,567 to 17 (0.259%).

TABLE 2

| Stat. | 0% | 25% | 50% | 75% | 100% | Mean | Std. |
|---|---|---|---|---|---|---|---|
| Value | 6.66e−16 | 6.66e−16 | 6.66e−16 | 6.66e−16 | 6.66e−16 | 6.66e−16 | 0.0 |

Figure 71:
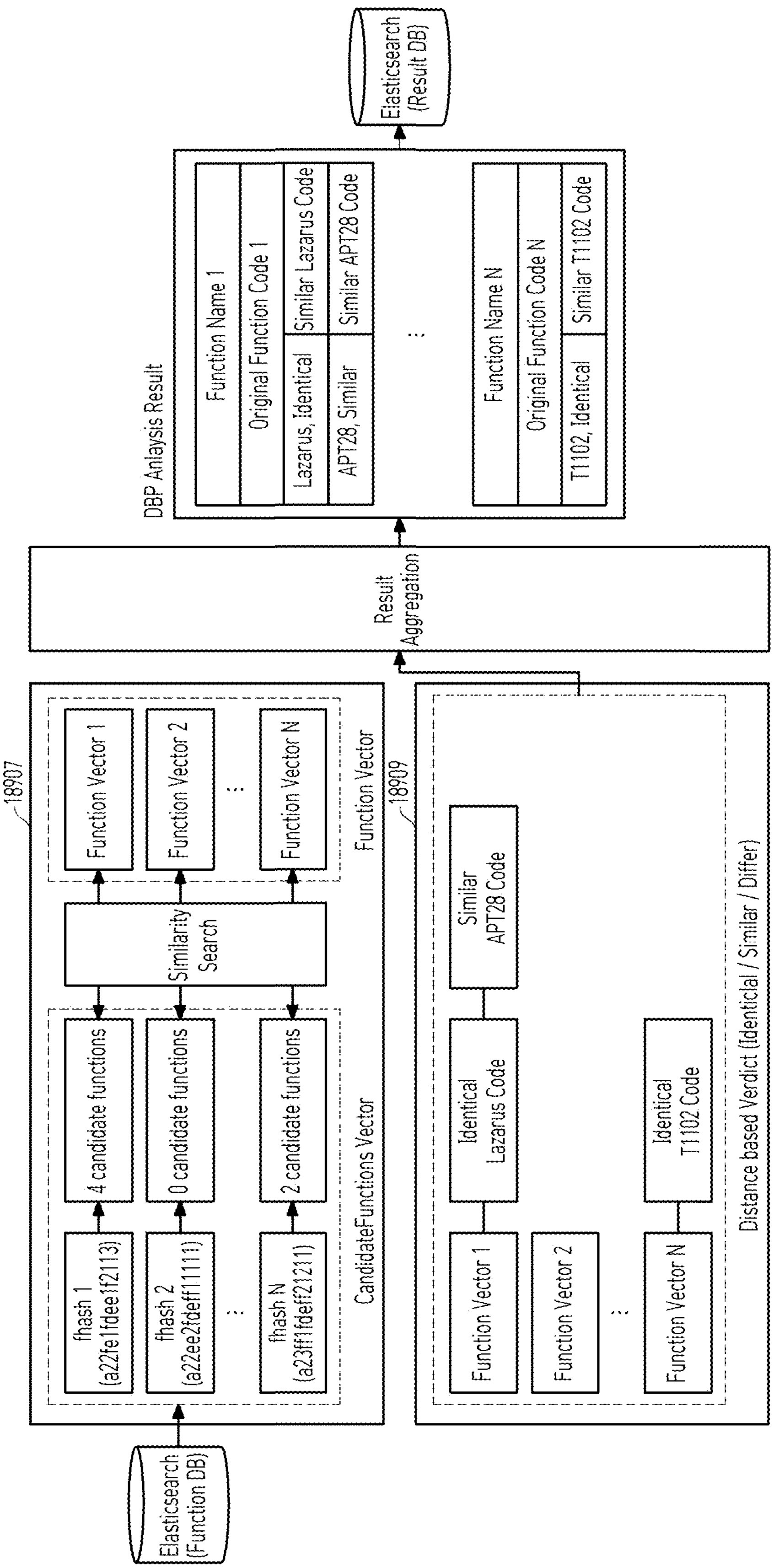
FIG. 71 is a drawing disclosing an example of classifying cyber threat information based on similarity according to an embodiment.

FIG. 71 is a drawing disclosing an example of classifying cyber threat information based on similarity according to an embodiment.

In an embodiment, the similarity determination module 18907 of the apparatus for processing cyber threat information may determine at least one candidate function having the same function hash value as a function hash value for each of the analysis target functions among the pre-stored comparison target functions. For example, it is possible to determine four candidate functions having the same function hash value as fhash 1 (a22fe1fdee1f2113), which is a function hash value for Function Vector 1 that is a function vector of the analysis target function, among the M pre-stored comparison target functions.

In addition, the similarity determination module 18907 may calculate similarity between at least one candidate function having the same function hash value and an analysis target function corresponding to the at least one candidate function. For example, it is possible to calculate similarity between each function vector of four candidate functions having the same function hash value, which is fhash 1 (a22fe1fdee1f2113), and a function vector, Function Vector 1, of an analysis target function corresponding to the candidate functions.

That is, in the conventional case, similarity needs to be calculated by comparing the function vector of each of the M comparison target functions with Function Vector 1, which is a function vector of the analysis target function. However, according to the present invention, the number of comparison target functions to be compared may be reduced by determining candidate functions, thereby enabling efficient processing of operation.

In an embodiment, the similarity determination module 18907 may retrieve a group of candidate functions from a function database based on a label (tag) identified in each function.

In an embodiment, conditions of a reference query for reference may include that a candidate function is not a function of a current analysis target sample, is a function within a range of ±10 of a length of the analysis target function, and is a function having the same function hash value as that of the analysis target function.

For example, the query condition may be a function whose function hash value is a8ffccdd12d2111d among functions having function lengths of 45 to 65, and not a function of samples whose function SHA256 is ABCDE.

The classification module 18909 may classify cyber threat information for an analysis target function based on similarity between at least one candidate function and an analysis target function corresponding to the at least one candidate function.

For example, Function Vector 1, which is a function vector of the analysis target function, may be classified as being identical to Lazarus Code for a first candidate function among the four candidate functions determined in advance, and similar to APT28 Code for a second candidate function, based on similarity.

In an embodiment, the similarity determination module 18907 may retrieve vector values for candidate functions through a query, and calculate a cosine distance, which is similarity between the analysis target function and each candidate function.

In an embodiment, the cosine distance may be compared with a threshold value to determine whether the analysis target function and the candidate function are identical, similar, or different. For example, classification of cyber threat information based on similarity may be expressed as in Table 3.

TABLE 3

| Distance Threshold | Verdict | Description |
|---|---|---|
| $0.0 \le s < 0.005$ | Identical | The same function, and label of candidate function may be transferred to analysis target function |
| $0.005 \le s < 0.12$ | Similar | Structure is similar, but logic of function may be different |
| $0.12 \le s \le \infty$ | Differ | Different function |

Figure 72:
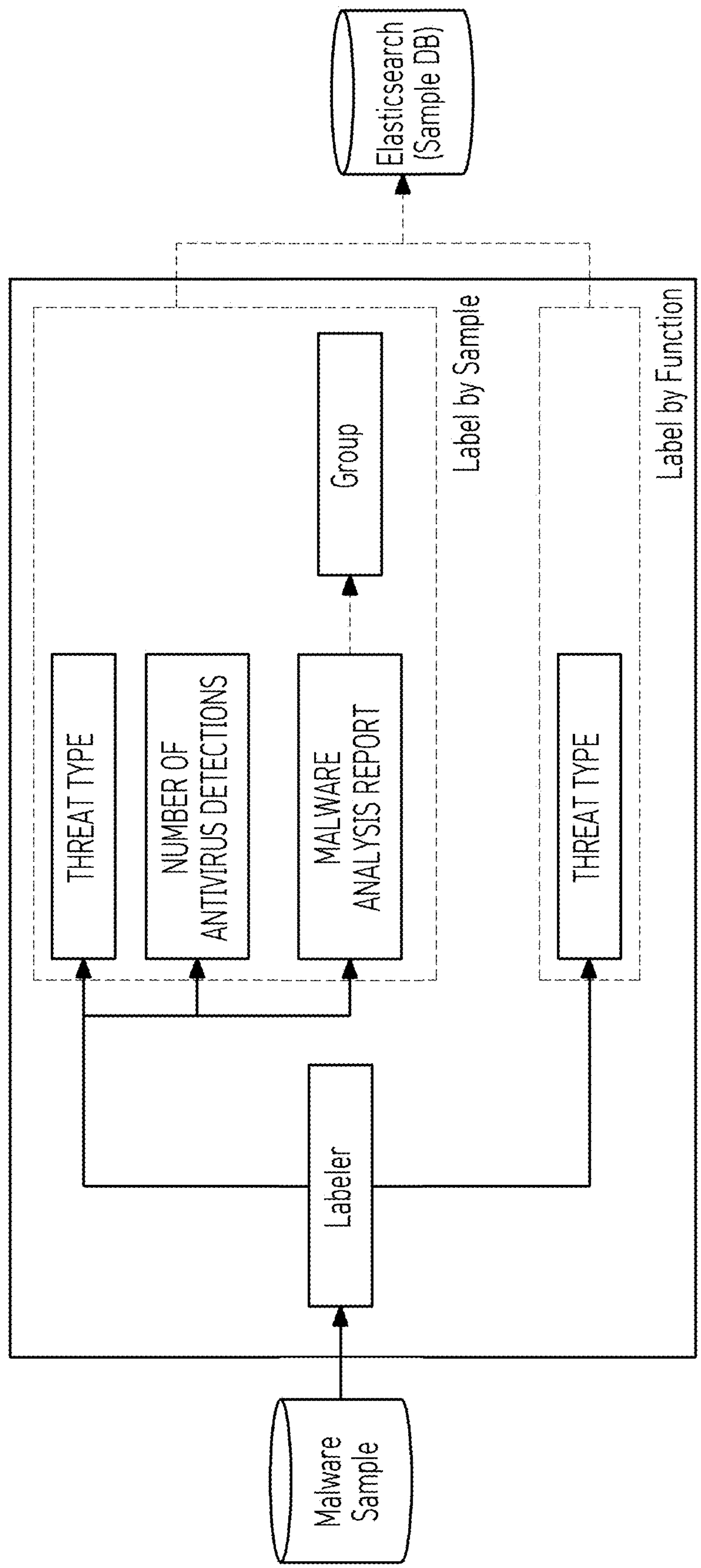
FIG. 72 is a drawing disclosing an example of performing labeling by identifying an attack identifier and an attacker according to an embodiment.

FIG. 72 is a drawing disclosing an example of performing labeling by identifying an attack identifier and an attacker according to an embodiment.

In an embodiment, label information and function information for a comparison target function may be labeled by input of a user (for example, a code analysis expert) and stored in a database.

Further, in an embodiment, when label information and function information for an analysis target function of an input file is labeled by input of a user, N analysis target functions may be added to the M comparison target functions pre-stored in the database.

In an embodiment, the label information may include at least one of a threat type of malware, the number of antivirus detections, a malware analysis report (reference), or an attacker group creating the malware. In an embodiment, the function information may include an attack identifier (T-ID).

According to the present invention, labeling is provided to distinguish not only the attack identifier but also the attacker implementing the attack identifier. Accordingly, labeling may be provided to identify not only the attack identifier but also the attacker and the corresponding implementation method.

Figure 73:
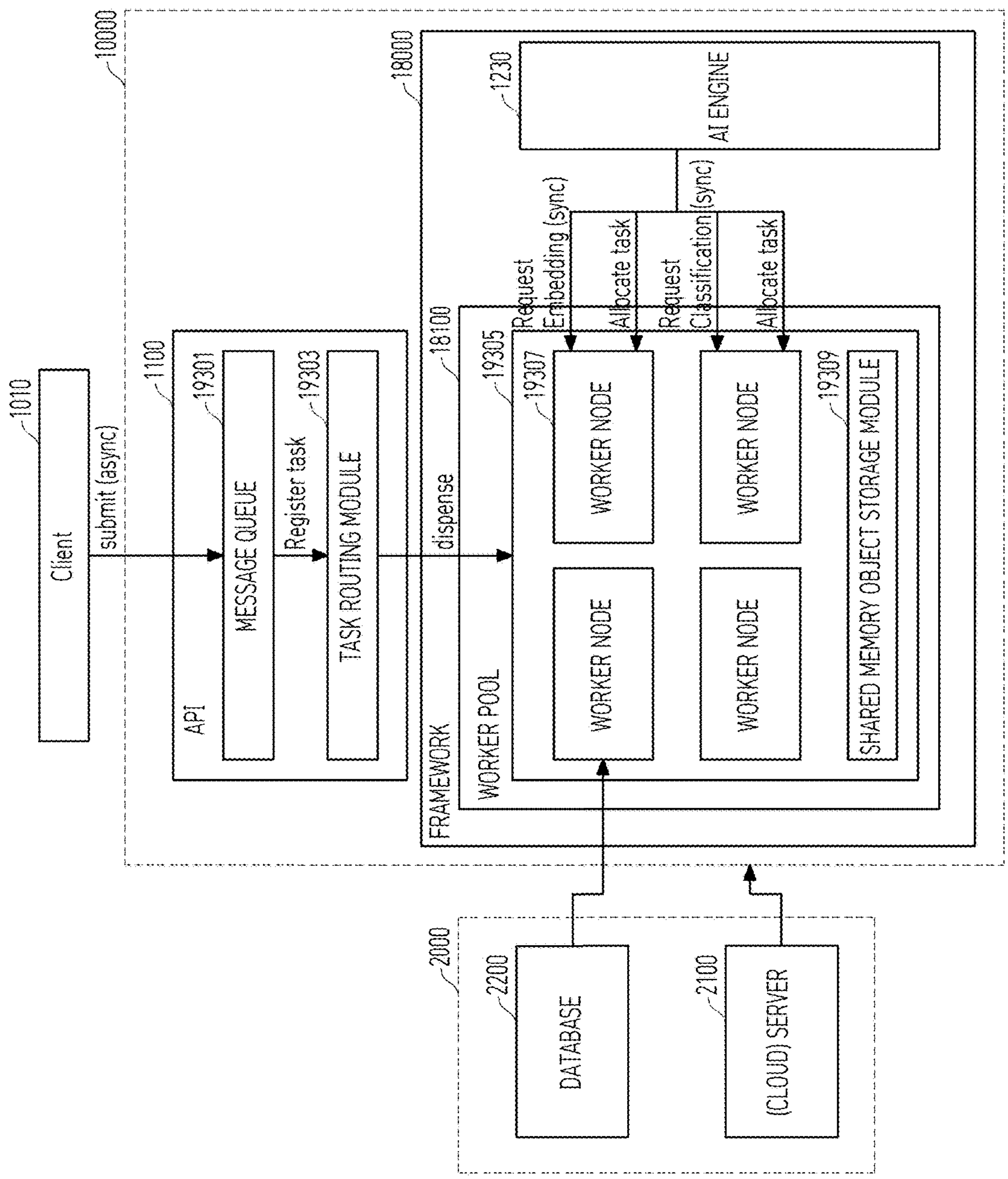
FIG. 73 is a drawing disclosing an example of a system architecture for processing cyber threat information according to an embodiment.

FIG. 73 is a drawing disclosing an example of a system architecture for processing cyber threat information according to an embodiment.

In an embodiment, the system architecture of the apparatus for processing cyber threat information may include a server 2100 and a database 2200 which are a physical device 2000, and a platform 10000 including an API 1100 and a framework 18100 driven on the physical device 2000.

The API 1100 may include a message queue 19301 and a task routing module 19303. In an embodiment, the message queue 19301 may queue a message for a request task. The task routing module 19303 may assign a task to a worker process registered in a worker pool 19305 through the message queue.

The framework 18100 may include a worker pool 19305 including a plurality of worker nodes 19307 and a shared memory object storage module 19309. In an embodiment, each module included in the framework 18100 may be executed by the processor of the server 2100.

In an embodiment, the worker pool 19305 may manage the registered worker process. In addition, the AI engine 1230 may be constructed through a separate API server for a deep learning service and may assign a task to the worker process upon request.

In an embodiment, the AI engine 1230 may request embedding from a first worker node included in the worker pool 19305 and may request classification of cyber threat information from a second worker node. In addition, the AI engine 1230 may assign a task to an embedding model included in the first worker node included in the worker pool 19305 according to an embedding request and may assign a task to a classification model included in the second worker node according to a classification request.

The system architecture according to the present invention may analyze malware in real time and store a result through a distributed processing structure. That is, according to the present invention, a scalable system may be constructed by basically implementing distributed processing based on the framework 18100. In an embodiment, the database 2200 may include a storage for storing an intermediate analysis file and a query database for storing samples, functions, and result information. In an embodiment, all tasks not using a GPU may operate on the worker nodes 19307.

Figure 74:
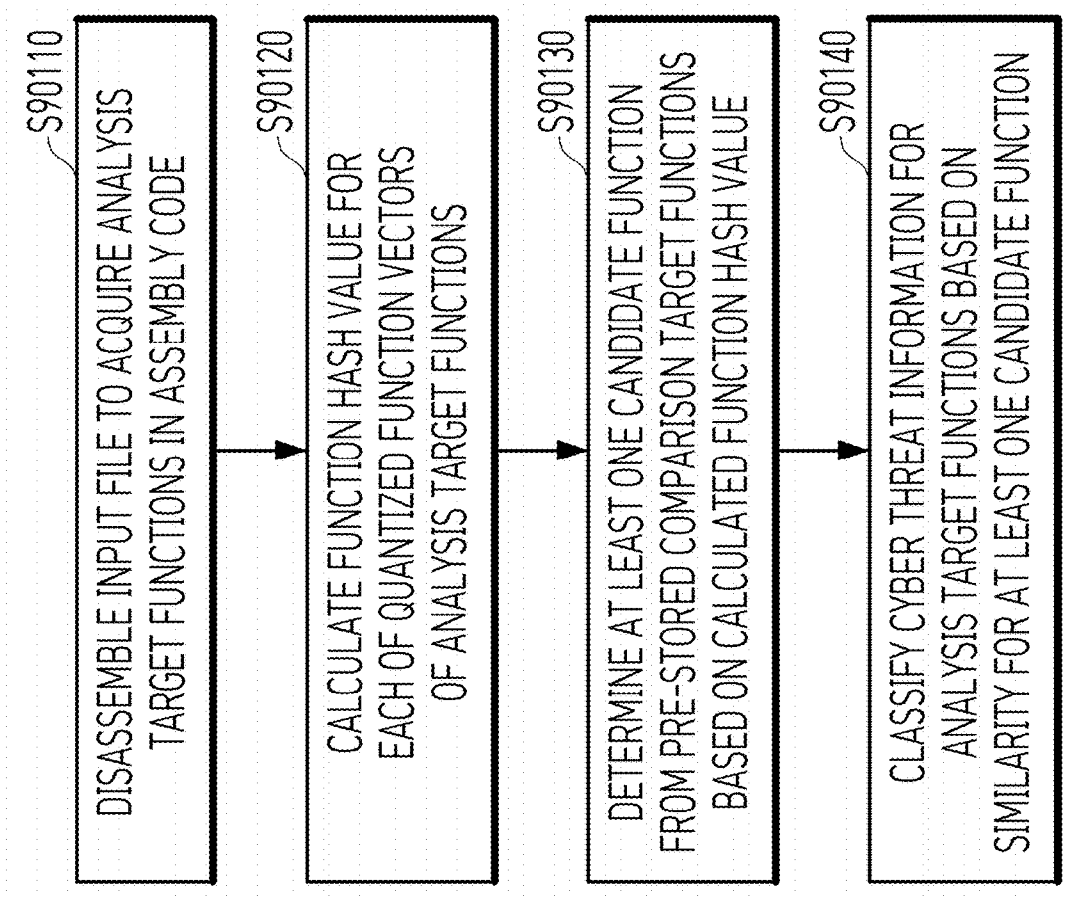
FIG. 74 is a flowchart disclosing another embodiment of the method of processing cyber threat information according to an embodiment.

FIG. 74 is a flowchart disclosing another embodiment of the method of processing cyber threat information according to an embodiment.

An input file is disassembled to acquire analysis target functions in assembly code (S90110). In an embodiment, the functions may include instructions that perform function operations.

A function hash value is calculated for each of quantized function vectors of the analysis target functions (S90120). In an embodiment, the function vectors of the analysis target functions may be quantized to generate a representative vector, and a function hash value for each representative vector may be calculated. That is, similar function vectors may be transformed into the same representative vector through vector quantization.

At least one candidate function is determined from the pre-stored comparison target functions based on the calculated function hash value (S90130). In an embodiment, at least one candidate function corresponding to each of the analysis target functions may be determined from the pre-stored comparison target functions based on the calculated function hash value.

In an embodiment, it is possible to determine at least one candidate function having the same function hash value as a function hash value for each of the analysis target functions among the pre-stored comparison target functions.

Cyber threat information for the analysis target functions is classified based on similarity for at least one candidate function (S90140). In an embodiment, cyber threat information for the analysis target functions may be classified based on similarity between at least one candidate function having the same function hash value and an analysis target function corresponding to at least one candidate function.

In an embodiment, when the similarity is less than a first threshold value, the analysis target function may be determined to be the same function as a candidate function corresponding to the similarity. In addition, when the similarity is equal to or greater than the first threshold value and less than a second threshold value, the analysis target function may be determined to be a function similar to the candidate function corresponding to the similarity. In addition, when the similarity is equal to or greater than the second threshold value, the analysis target function may be determined to be a function different from the candidate function corresponding to the similarity. Thereafter, cyber threat information for the analysis target function may be classified based on a result of determination. Here, detailed embodiments of classifying cyber threat information are disclosed in detail in FIGS. 12 to 15, FIG. 38, and FIG. 39.

Therefore, according to the disclosed embodiments, it is possible to detect and address malware not exactly matching data learned by machine learning and address a variant of malware.

According to the embodiments, it is possible to identify malware, an attack technique, and an attacker in a significantly short time even for a variant of malware, and furthermore to predict an attack technique of a specific attacker in the future.

According to the embodiments, it is possible to accurately identify a cyberattack implementation method based on whether such malware exists, an attack technique, an attack identifier, and an attacker, and provide the cyberattack implementation method as a standardized model. According to the embodiments, it is possible to provide information about malware, for which malware detection names, etc. are not unified or a cyberattack technique cannot be accurately described, using a normalized and standardized scheme.

In addition, it is possible to provide a means capable of predicting a possibility of generating previously unknown malware and attackers who can develop the malware, and predicting a cyber threat attack occurring in the future.

According to the embodiments, it is possible to more clearly detect and recognize different attack techniques or different attack groups generated according to differences in an execution process even when execution results of executed files are the same.

According to the embodiments, it is possible to identify cyber threat information, attack techniques, and attack groups for various file types contained within, even in the case of non-executable files.

According to the embodiments, it is possible to monitor web pages, identify web pages containing malicious behavior or information, and further identify cyber threat information, attack techniques, and attack groups included in the web pages.

According to the embodiment, even when the user is not an expert, the user may easily understand the mechanism and analysis basis of the CTI.

According to the embodiments, it may enable profiling of malicious code, attack techniques, attack groups, and threat types.

According to the embodiments, it is possible to efficiently reduce the candidate group of the function to be compared

What is claimed is:

1. A method of processing cyber threat information, the method comprising:

disassembling an input file to acquire analysis target functions in assembly code;

calculating a function hash value for each of quantized function vectors of the analysis target functions;

determining at least one candidate function having a function hash value identical to the function hash value for each of the analysis target functions from pre-stored comparison target functions based on the calculated function hash value; and classifying cyber threat information for the analysis target functions based on similarity for the at least one candidate function, wherein the at least one candidate function corresponds to a representative vector identical to each other among representative vectors transformed from the comparison target functions through vector quantization, and wherein the representative vector corresponds to the function hash value identical to the function hash value for each of the analysis target functions.

2. The method according to claim 1, wherein the classifying comprises classifying the cyber threat information for the analysis target function based on similarity between at least one candidate function having the same function hash value and an analysis target function corresponding to the at least one candidate function.

3. The method according to claim 2, wherein the classifying comprises:

determining the analysis target function to be the same function as a candidate function corresponding to the similarity when the similarity is less than a first threshold value;

determining the analysis target function to be the same function as the candidate function corresponding to the similarity when the similarity is equal to or greater than the first threshold value and less than a second threshold value;

determining the analysis target function to be a function different from the candidate function corresponding to the similarity when the similarity is equal to or greater than the second threshold value; and classifying the cyber threat information for the analysis target function based on a result of the determination.

4. An apparatus for processing cyber threat information, the apparatus comprising:

a database configured to store data; and a processor configured to process the data, wherein the processor is configured to:

disassemble an input file to acquire analysis target functions in assembly code;

calculate a function hash value for each of quantized function vectors of the analysis target functions;

determine at least one candidate function having a function hash value identical to the function hash value for each of the analysis target functions from pre-stored comparison target functions based on the calculated function hash value; and classify cyber threat information for the analysis target functions based on similarity for the at least one candidate function, wherein the at least one candidate function corresponds to a representative vector identical to each other among representative vectors transformed from the comparison target functions through vector quantization, and wherein the representative vector corresponds to the function hash value identical to the function hash value for each of the analysis target functions.

5. The apparatus according to claim 4, wherein the processor classifies the cyber threat information for the analysis target function based on similarity between at least one candidate function having the same function hash value and an analysis target function corresponding to the at least one candidate function.

6. The apparatus according to claim 5, wherein the processor is further configured to:

determine the analysis target function to be the same function as a candidate function corresponding to the similarity when the similarity is less than a first threshold value, determine the analysis target function to be the same function as the candidate function corresponding to the similarity when the similarity is equal to or greater than the first threshold value and less than a second threshold value, determine the analysis target function to be a function different from the candidate function corresponding to the similarity when the similarity is equal to or greater than the second threshold value, and classify the cyber threat information for the analysis target function based on a result of the determination.

7. A non-transitory storage medium configured to store a computer-executable program for providing an application service that performs steps of:

disassembling an input file to acquire analysis target functions in assembly code;

calculating a function hash value for each of quantized function vectors of the analysis target functions;

determining at least one candidate function having a function hash value identical to the function hash value for each of the analysis target functions from pre-stored comparison target functions based on the calculated function hash value; and classifying cyber threat information for the analysis target functions based on similarity for the at least one candidate function, wherein the at least one candidate function corresponds to a representative vector identical to each other among representative vectors transformed from the comparison target functions through vector quantization, and wherein the representative vector corresponds to the function hash value identical to the function hash value for each of the analysis target functions.

* * * * *